United States Patent
Rogers et al.

(10) Patent No.: US 12,502,134 B2
(45) Date of Patent: Dec. 23, 2025

(54) MULTIMODAL, MULTILAYERED SOFT ELECTRONICS IN ADVANCED DEVICES AND APPLICATIONS OF SAME

(71) Applicants: NORTHWESTERN UNIVERSITY, Evanston, IL (US); THE GEORGE WASHINGTON UNIVERSITY, Washington, DC (US)

(72) Inventors: John A. Rogers, Wilmette, IL (US); Roozbeh Ghaffari, Cambridge, MA (US); Igor Efimov, Arlington, VA (US); Mengdi Han, Evanston, IL (US)

(73) Assignees: NORTHWESTERN UNIVERSITY, Evanston, IL (US); THE GEORGE WASHINGTON UNIVERSITY, Washington, DC (US)

( * ) Notice: Subject to any disclaimer, the term of this patent is extended or adjusted under 35 U.S.C. 154(b) by 0 days.

(21) Appl. No.: 18/021,418

(22) PCT Filed: Aug. 18, 2021

(86) PCT No.: PCT/US2021/046473
§ 371 (c)(1),
(2) Date: Feb. 15, 2023

(87) PCT Pub. No.: WO2022/040292
PCT Pub. Date: Feb. 24, 2022

(65) Prior Publication Data
US 2023/0301595 A1    Sep. 28, 2023

Related U.S. Application Data

(60) Provisional application No. 63/066,860, filed on Aug. 18, 2020.

(51) Int. Cl.
*A61B 5/00* (2006.01)
*A61B 5/01* (2006.01)
(Continued)

(52) U.S. Cl.
CPC ........ *A61B 5/6853* (2013.01); *A61B 5/02055* (2013.01); *A61B 5/263* (2021.01);
(Continued)

(58) Field of Classification Search
CPC ... A61B 5/6853; A61B 5/02055; A61B 5/263; A61B 5/287; A61B 5/367; A61B 5/6885;
(Continued)

(56) References Cited

U.S. PATENT DOCUMENTS 9,904,393 B2 *   2/2018   Frey ................... G06F 3/04144
2007/0027514 A1 * 2/2007  Gerber ..................... A61N 1/05
                                                              607/116
(Continued)

OTHER PUBLICATIONS

Catheter-integrated soft multilayer electronic arrays for multiplexed sensing and actuation during cardiac surgery, Nature Biomedical Engineering Oct. 2020; 4, 997-1009, published Sep. 9, 2020 (Year: 2020).*

(Continued)

*Primary Examiner* — Joanne M Rodden
*Assistant Examiner* — Matthew David Becton
(74) *Attorney, Agent, or Firm* — troutman pepper locke; Tim Tingkang Xia, Esq.

(57) ABSTRACT

An electronic system for multimodal diagnostic measurements and therapeutic interventions includes a plurality of element network layers vertically stacked one with another on a flexible substrate, each element network layer being bi-axially stretchable and comprising a plurality of elements configured in an addressable, interconnected array formed in a multilayered structure and operably performing a distinct function. The electronic system is a multimodal, multiplexed soft electronic system in a multilayered configuration that supports capabilities ranging from high-density spatiotemporal mapping of temperature, pressure and electrophysiological parameters, to options in programmable high-den-
(Continued)

sity actuation of thermal inputs and/or electrical stimulation, drug elution, radio frequency ablation, and/or irreversible electroporation ablation.

43 Claims, 92 Drawing Sheets

(51) Int. Cl.
    *A61B 5/0205*     (2006.01)
    *A61B 5/263*     (2021.01)
    *A61B 5/287*     (2021.01)
    *A61B 5/367*     (2021.01)
    *A61B 18/14*     (2006.01)
    *A61B 18/00*     (2006.01)

(52) U.S. Cl.
    CPC .............. *A61B 5/287* (2021.01); *A61B 5/367* (2021.01); *A61B 5/6885* (2013.01); *A61B 18/1492* (2013.01); *A61B 5/01* (2013.01); *A61B 2018/0016* (2013.01); *A61B 2018/0022* (2013.01); *A61B 2018/00613* (2013.01); *A61B 2018/00797* (2013.01); *A61B 2560/0468* (2013.01); *A61B 2562/0261* (2013.01); *A61B 2562/0271* (2013.01); *A61B 2562/066* (2013.01); *A61B 2562/125* (2013.01); *A61B 2562/164* (2013.01)

(58) Field of Classification Search
    CPC .................. A61B 18/1492; A61B 5/01; A61B 2018/0016; A61B 2018/0022; A61B 2018/00613; A61B 2018/00797; A61B 2560/0468; A61B 2562/0261; A61B 2562/0271; A61B 2562/066; A61B 2562/125; A61B 2562/164; A61B 2018/00351; A61B 2018/00577; A61B 2090/064; A61B 2560/0462
    See application file for complete search history.

(56) References Cited

U.S. PATENT DOCUMENTS

| | | | | |
|---|---|---|---|---|
| 2009/0282930 | A1* | 11/2009 | Cheng | G01L 1/2293 73/862.627 |
| 2013/0041235 | A1* | 2/2013 | Rogers | A61N 1/05 600/386 |
| 2013/0274562 | A1* | 10/2013 | Ghaffari | A61B 5/6833 601/3 |
| 2013/0333094 | A1* | 12/2013 | Rogers | A61B 34/76 340/407.1 |
| 2014/0039290 | A1 | 2/2014 | Graff et al. | |
| 2015/0119882 | A1 | 4/2015 | Cao et al. | |
| 2016/0287177 | A1* | 10/2016 | Huppert | A61B 5/4839 |
| 2017/0038270 | A1* | 2/2017 | Drewes | C04B 37/025 |
| 2017/0348155 | A1* | 12/2017 | Duesterhoft | A61F 13/00051 |
| 2018/0014734 | A1* | 1/2018 | Rogers | A61B 5/0205 |
| 2018/0140356 | A1 | 5/2018 | Cao et al. | |
| 2018/0146545 | A1* | 5/2018 | Wang | H05K 1/095 |
| 2018/0235692 | A1* | 8/2018 | Efimov | A61B 5/0538 |
| 2018/0299335 | A1* | 10/2018 | Wong | G01B 7/18 |
| 2019/0202689 | A1* | 7/2019 | Jeon | H01B 1/22 |
| 2019/0328354 | A1* | 10/2019 | Xu | H10N 30/073 |
| 2020/0069364 | A1 | 3/2020 | Salahieh et al. | |
| 2020/0116578 | A1* | 4/2020 | Molinazzi | H01C 10/103 |
| 2020/0137982 | A1* | 5/2020 | Hussain | A01K 61/90 |
| 2020/0249197 | A1* | 8/2020 | Chou | A61B 5/297 |

OTHER PUBLICATIONS

Han, Catheter-integrated soft multilayer electronic arrays for multiplexed sensing and actuation during cardiac surgery, Nat Biomed Eng. Oct. 2020; 4, 997-1009, published Sep. 7, 2020 (Year: 2020).*
Webb, Ultrathin conformal devices for precise and continuous thermal characterization of human skin, Nature Materials Oct. 12, 2013 (10): 938-944 (Year: 2013).*
Korean Intellectual Property Office (ISR/KR), "International Search Report for PCT/US2021/046473", Korea, Dec. 14, 2021.
Lee, Stephen P. et al., "Catheter-based systems with integrated stretchable sensors and conductors in cardiac electrophysiology", Proceedings of The IEEE, Apr. 2015, vol. 103, No. 4, pp. 682-689.
Han, Mengdi et al., "Catheter-integrated soft multilayer electronic arrays for multiplexed sensing and actuation during cardiac surgery", Nature Biomedical Engineering, 2020, vol. 4, pp. 997-1009.
Biere, S. S. et al. Minimally invasive versus open oesophagectomy for patients with oesophageal cancer: a multicentre, open-label, randomised controlled trial. The Lancet 379, 1887-1892 (2012).
Bacha, E. & Kalfa, D. Minimally invasive paediatric cardiac surgery. Nature Reviews Cardiology 11, 24 (2014).
Martens, T. P. et al. Percutaneous cell delivery into the heart using hydrogels polymerizing in situ. Cell Transplantation 18, 297-304 (2009).
Oxley, T. J. et al. Minimally invasive endovascular stent-electrode array for high-fidelity, chronic recordings of cortical neural activity. Nature Biotechnology 34, 320-327 (2016).
Kim, D.-H. et al. Dissolvable films of silk fibroin for ultrathin conformal bio-integrated electronics. Nature Materials 9, 511-517 (2010).
Dukkipati, S. R. et al. Visual balloon-guided point-by-point ablation: reliable, reproducible, and persistent pulmonary vein isolation. Circulation: Arrhythmia Electrophysiology 3, 266-273 (2010).
Wazni, O., Wilkoff, B. & Saliba, W. Catheter ablation for atrial fibrillation. New England Journal of Medicine 365, 2296-2304 (2011).
Kim, D.-H. et al. Materials for multifunctional balloon catheters with capabilities in cardiac electrophysiological mapping and ablation therapy. Nature Materials 10, 316-323 (2011).
Roche, E. T. et al. A light-reflecting balloon catheter for atraumatic tissue defect repair. Science Translational Medicine 7, 306ra149-306ra149 (2015).
Lee, S. P. et al. Catheter-based systems with integrated stretchable sensors and conductors in cardiac electrophysiology. Proceedings of the IEEE 103, 682-689 (2015).
Kim, Y., Parada, G. A., Liu, S. & Zhao, X. Ferromagnetic soft continuum robots. Science Robotics 4, eaax7329 (2019).
Ashammakhi, N. et al. Minimally invasive and regenerative therapeutics. Advanced Materials 31, 1804041 (2019).
Fang, H. et al. Capacitively coupled arrays of multiplexed flexible silicon transistors for long-term cardiac electrophysiology. Nature Biomedical Engineering 1, 1-12 (2017).
Hua, Q. et al. Skin-inspired highly stretchable and conformable matrix networks for multifunctional sensing. Nature Communications 9, 1-11 (2018).
Chung, H. U. et al. Binodal, wireless epidermal electronic systems with in-sensor analytics for neonatal intensive care. Science 363, eaau0780 (2019).
Sharma, T., Aroom, K., Naik, S., Gill, B. & Zhang, J. X. Flexible thin-film PVDF-TrFE based pressure sensor for smart catheter applications. Annals of biomedical engineering 41, 744-751 (2013).
Klinker, L. et al. Balloon catheters with integrated stretchable electronics for electrical stimulation, ablation and blood flow monitoring. Extreme Mechanics Letters 3, 45-54 (2015).
Lee, K. et al. Microneedle drug eluting balloon for enhanced drug delivery to vascular tissue. Journal of Controlled Release (2020).
Liu, Z. et al. Transcatheter self-powered ultrasensitive endocardial pressure sensor. Advanced Functional Materials 29, 1807560 (2019).
Bergmann, O. et al. Dynamics of cell generation and turnover in the human heart. Cell 161, 1566-1575 (2015).
Xu, S. et al. Assembly of micro/nanomaterials into complex, three-dimensional architectures by compressive buckling. Science 347, 154-159 (2015).
Wu, J.-F. Scanning approaches of 2-D resistive sensor arrays: A review. IEEE Sensors Journal 17, 914-925 (2016).

(56) References Cited

OTHER PUBLICATIONS

Gustafsson, S. E. Transient plane source techniques for thermal conductivity and thermal diffusivity measurements of solid materials. Review of Scientific Instruments 62, 797-804 (1991).

Webb, R. C. et al. Ultrathin conformal devices for precise and continuous thermal characterization of human skin. Nature Materials 12, 938-944 (2013).

Krishnan, S. R. et al. Epidermal electronics for noninvasive, wireless, quantitative assessment of ventricular shunt function in patients with hydrocephalus. Science Translational Medicine 10 (2018).

Yokoyama, K. et al. Novel contact force sensor incorporated in irrigated radiofrequency ablation catheter predicts lesion size and incidence of steam pop and thrombus. Circulation: Arrhythmia and Electrophysiology 1, 354-362 (2008).

Ariyarathna, N., Kumar, S., Thomas, S. P., Stevenson, W. G. & Michaud, G. F. Role of contact force sensing in catheter ablation of cardiac arrhythmias: evolution or history repeating itself? JACC: Clinical Electrophysiology 4, 707-723 (2018).

Yousef, H., Boukallel, M. & Althoefer, K. Tactile sensing for dexterous in-hand manipulation in robotics—A review. Sensors and Actuators A: physical 167, 171-187 (2011).

Costa, P., Ribeiro, S. & Lanceros-Mendez, S. Mechanical vs. electrical hysteresis of carbon nanotube/styrene-butadiene-styrene composites and their influence in the electromechanical response. Composites Science and Technology 109, 1-5 (2015).

Jang, K.-I. et al. Self-assembled three dimensional network designs for soft electronics. Nature Communications 8, 1-10 (2017).

Dewire, J. & Calkins, H. State-of-the-art and emerging technologies for atrial fibrillation ablation. Nature Reviews Cardiology 7, 129 (2010).

Maor, E. et al. Pulsed electric fields for cardiac ablation and beyond: A state-of-the-art review. Heart Rhythm 16, 1112-1120 (2019).

Hjouj, M. & Rubinsky, B. Magnetic resonance imaging characteristics of nonthermal irreversible electroporation in vegetable tissue. The Journal of membrane biology 236, 137-146 (2010).

Ramer, O. Integrated optic electrooptic modulator electrode analysis. IEEE Journal of Quantum Electronics 18, 386-392 (1982).

Nath, S., DiMarco, J. P. & Haines, D. E. Basic aspects of radiofrequency catheter ablation. Journal of cardiovascular electrophysiology 5, 863-876 (1994).

McClintock, R. Strain gauge calibration device for extreme temperatures. Review of Scientific Instruments 30, 715-718 (1959).

Hur, S.-G., Kim, D.-J., Kang, B.-D. & Yoon, S.-G. Effect of the deposition temperature on temperature coefficient of resistance in CuNi thin film resistors. Journal of Vacuum Science Technology B: Microelectronics Nanometer Structures Processing, Measurement, Phenomena 22, 2698-2701 (2004).

Pikul, J. et al. Stretchable surfaces with programmable 3D texture morphing for synthetic camouflaging skins. Science 358, 210-214 (2017).

Gloschat, C. et al. RHYTHM: an open source imaging toolkit for cardiac panoramic optical mapping. Scientific Reports 8, 1-12 (2018).

Aras, K. K., Faye, N. R., Cathey, B. & Efimov, I. R. Critical vol. of human myocardium necessary to maintain ventricular fibrillation. Circulation: Arrhythmia Electrophysiology 11, e006692 (2018).

Rodenhauser, A. et al. PFEIFER: Preprocessing Framework for Electrograms Intermittently Fiducialized from Experimental Recordings. Journal of Open Source Software 3 (2018).

Magtibay, Karl, et al. "Physiological assessment of ventricular myocardial voltage using omnipolar electrograms." Journal of the American Heart Association 6.8 (2017): e006447.

https://www.bostonscientific.com/content/dam/bostonscientific/ep/general/Blazer%20Family%20of%20Ablation%20Catheters.pdf.

Wittkampf, Fred HM, et al. "Myocardial lesion depth with circular electroporation ablation." Circulation: Arrhythmia and Electrophysiology 5.3 (2012): 581-586.

\* cited by examiner electrodes, balloon catheter in silicone temperature sensors, balloon catheter in polyurethane

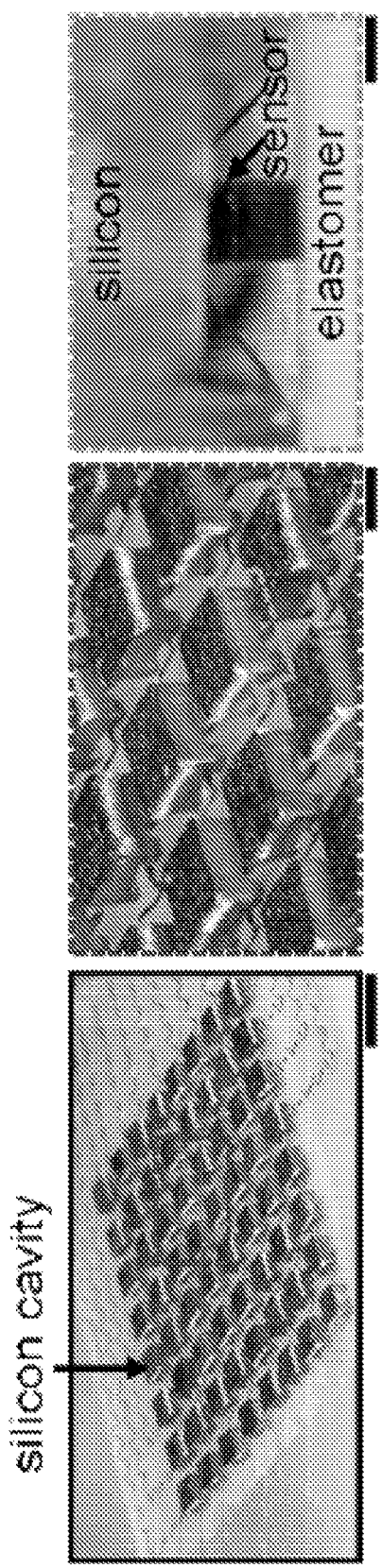
FIG. 2B
FIG. 2C
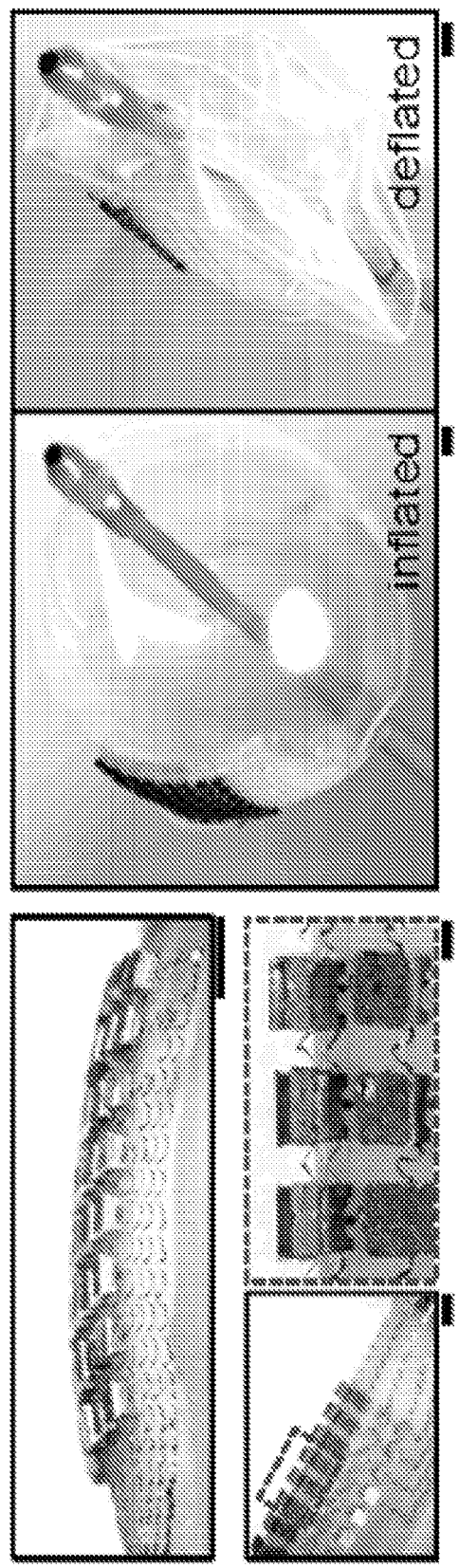
FIG. 2D

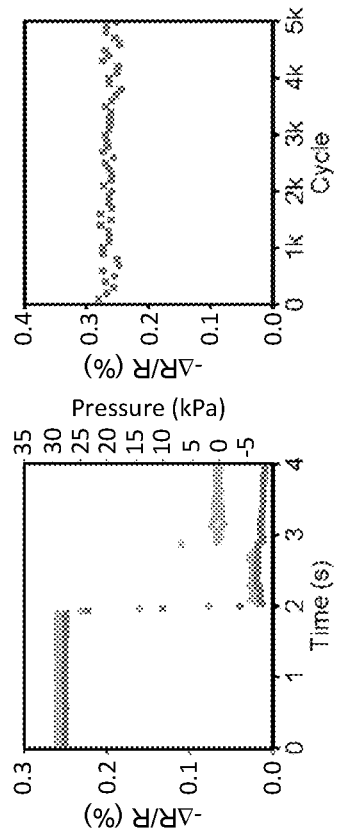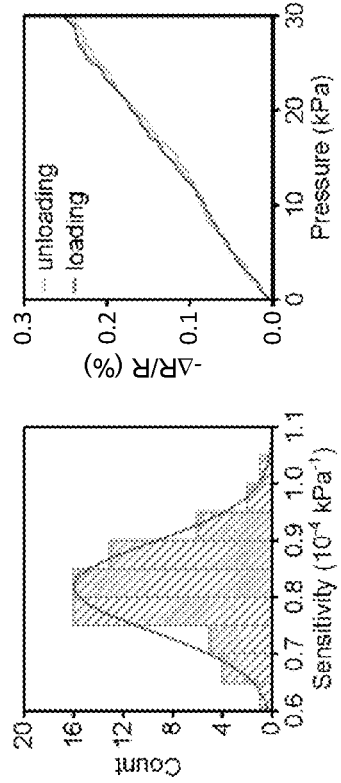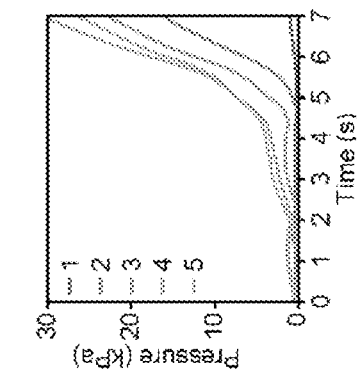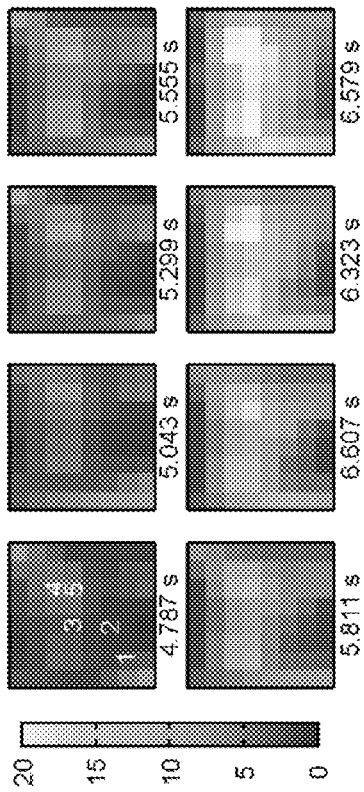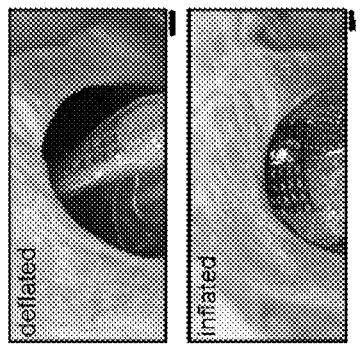
FIG. 2H FIG. 2I FIG. 2J FIG. 2K FIG. 2L FIG. 2M FIG. 2N

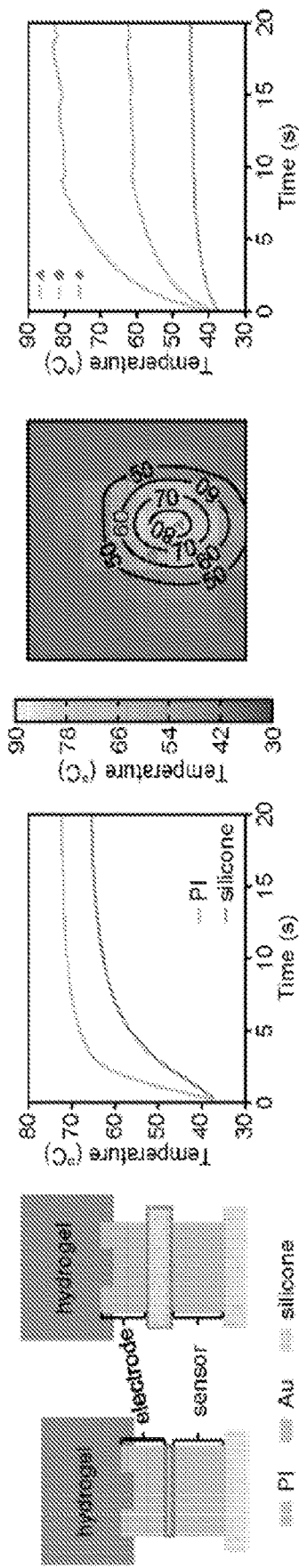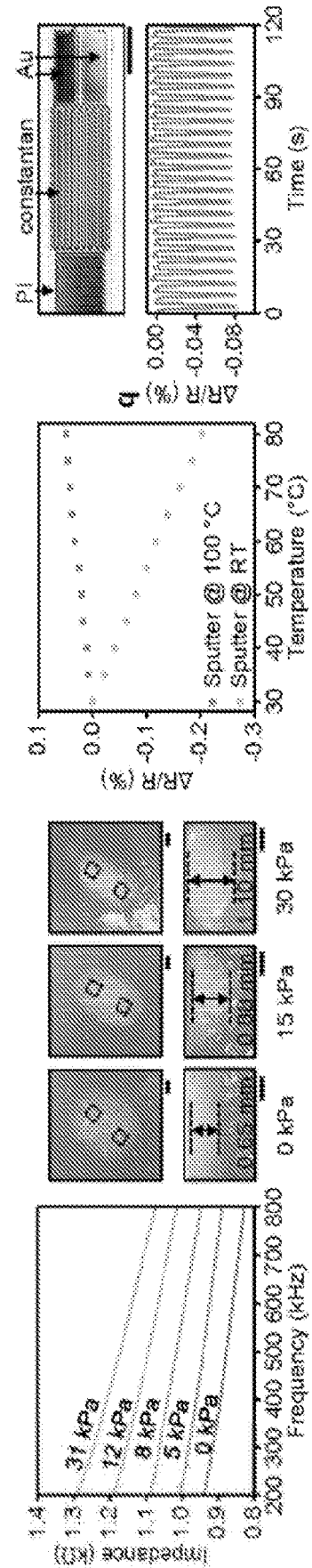

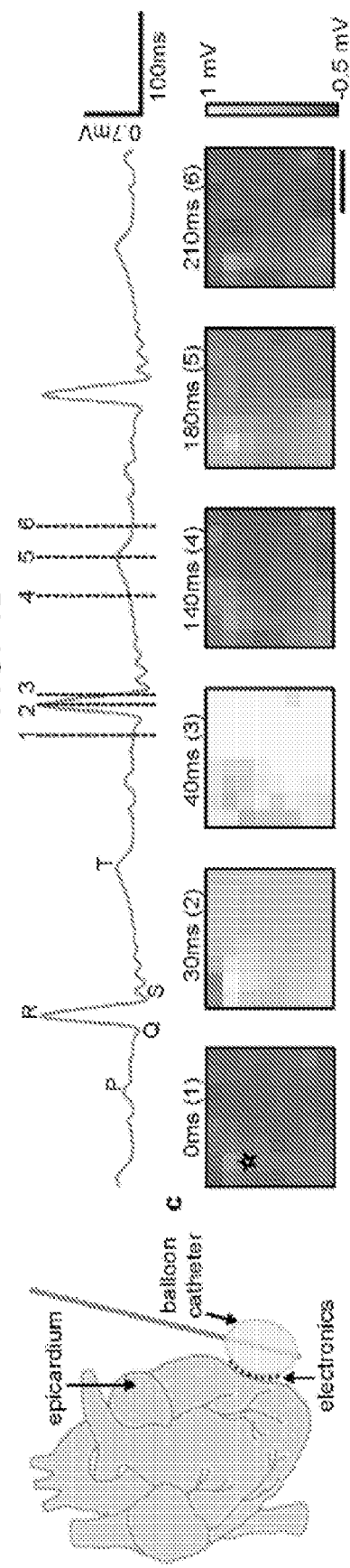
FIG. 4A
FIG. 4B
FIG. 4C
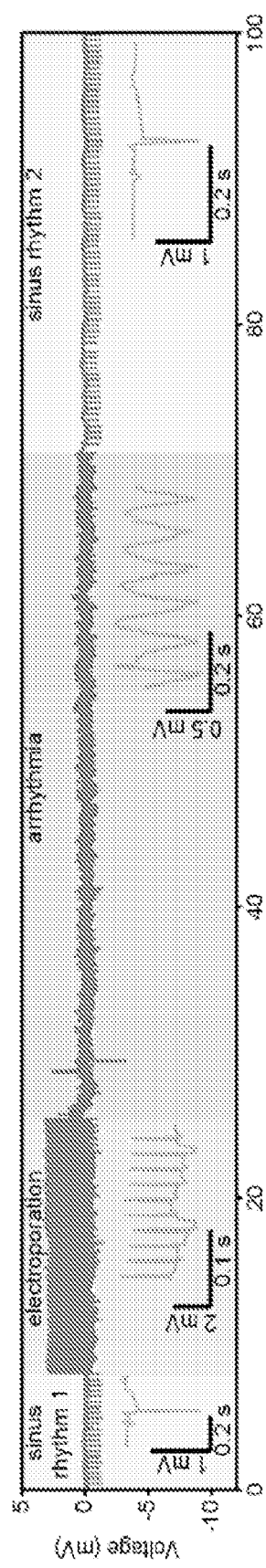
FIG. 4D

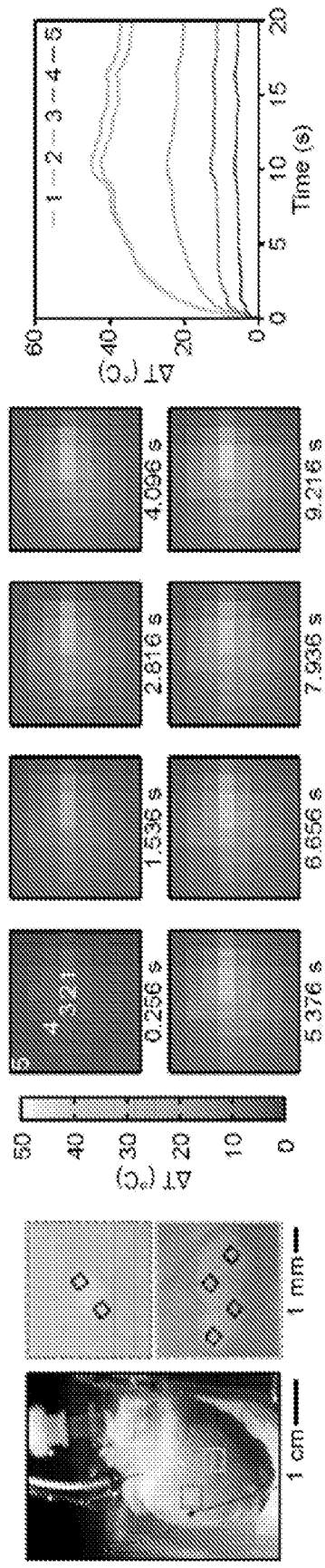
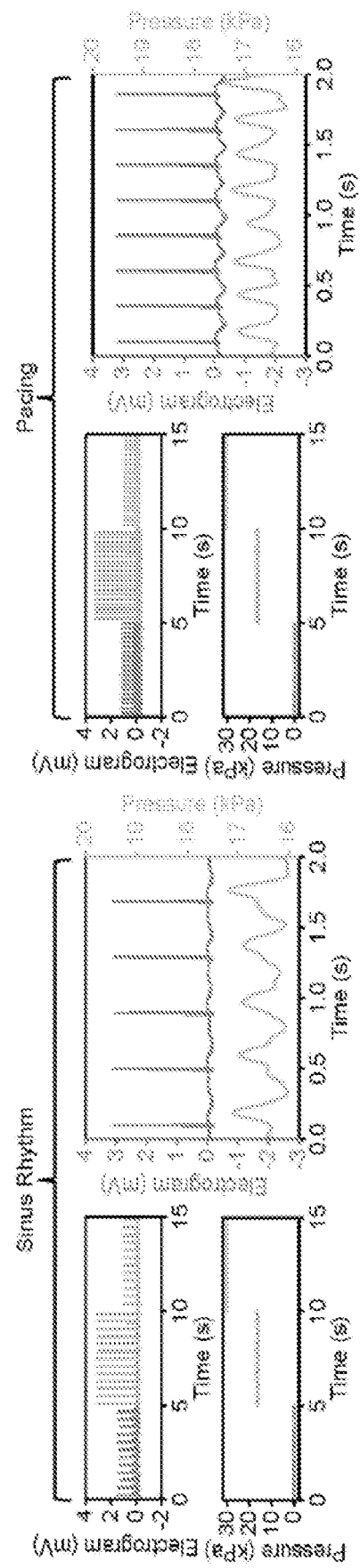
FIG. 4E
FIG. 4F
FIG. 4G
FIG. 4H
FIG. 4I

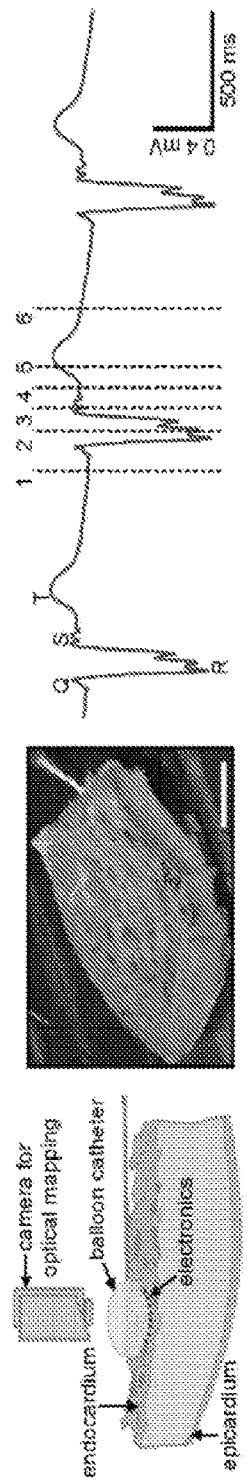
FIG. 5A
FIG. 5B
FIG. 5C
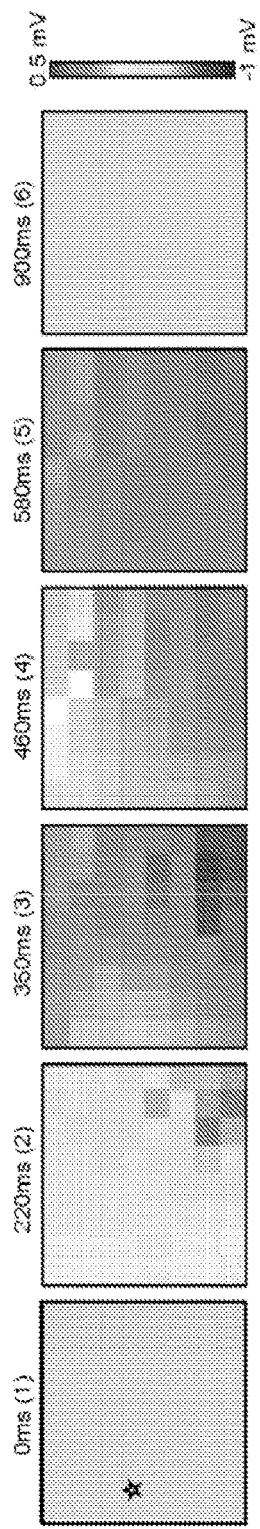
FIG. 5D
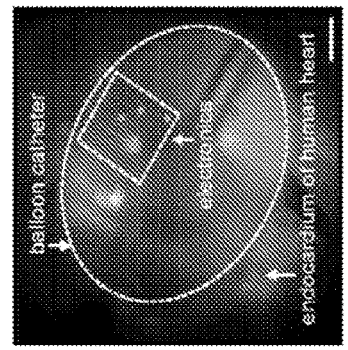
FIG. 5E
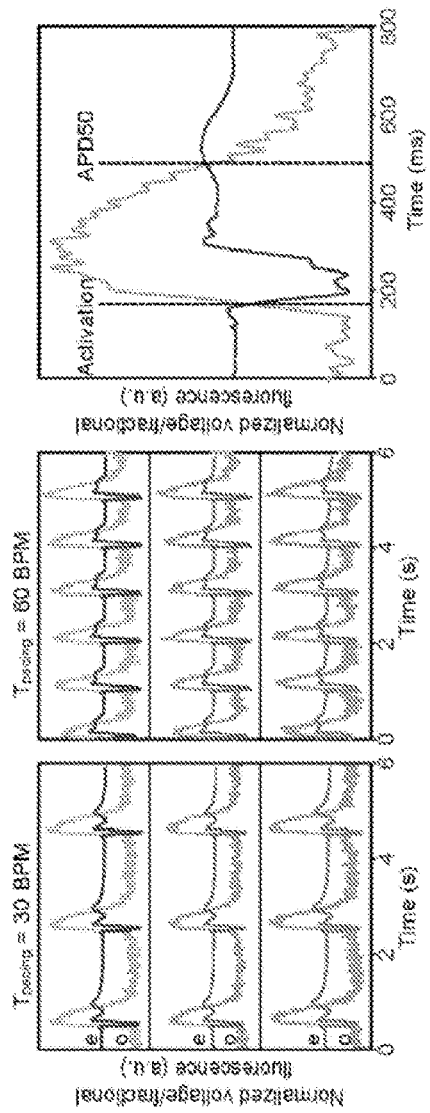
FIG. 5F
FIG. 5G

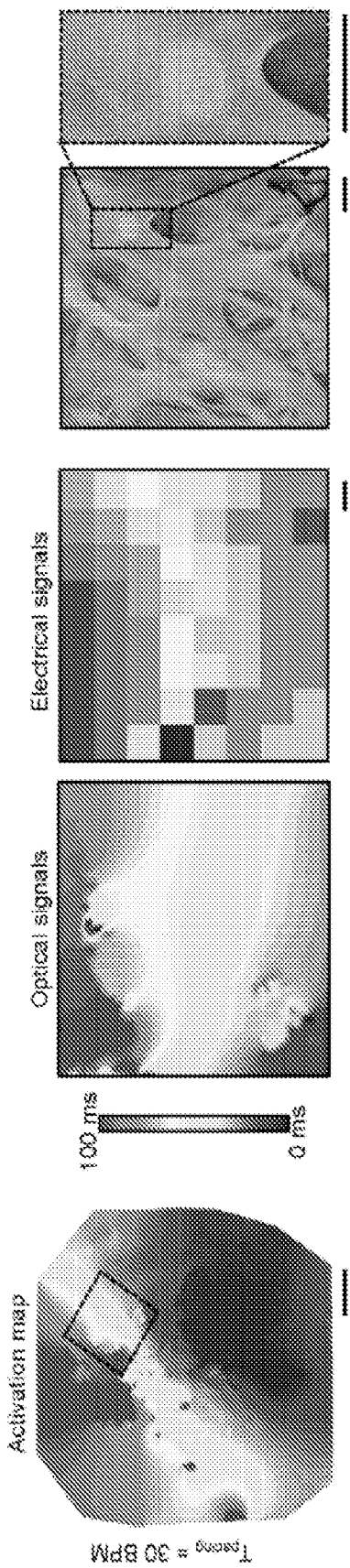
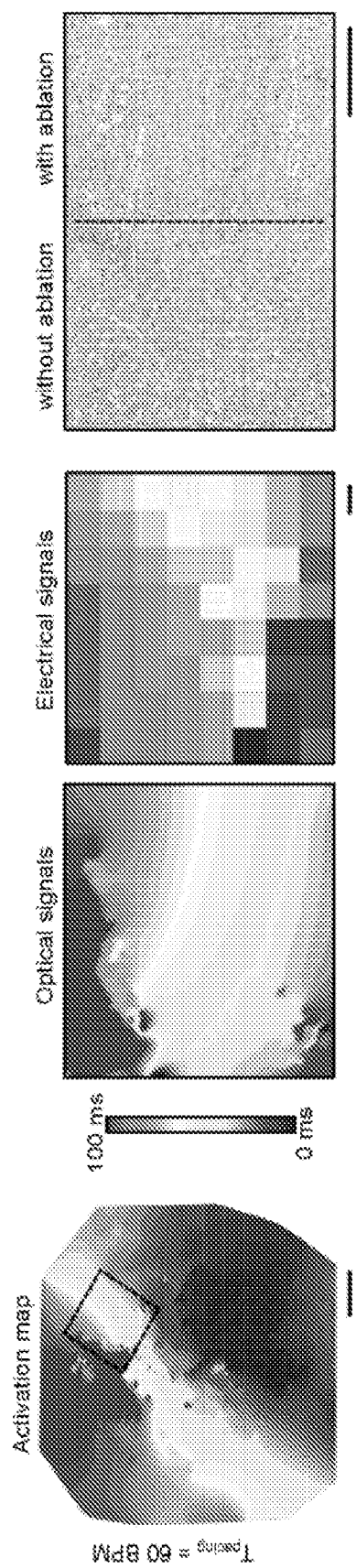
FIG. 5H  FIG. 5J  FIG. 5L
FIG. 5I  FIG. 5K  FIG. 5M a

Deflated b

Inflated a  bipolar ablation distance = 1.5 mm distance = 3.0 mm distance = 4.5 mm distance = 6.0 mm b  unipolar ablation one electrode two electrodes four electrodes twelve electrodes

MULTIMODAL, MULTILAYERED SOFT ELECTRONICS IN ADVANCED DEVICES AND APPLICATIONS OF SAME

CROSS-REFERENCE TO RELATED PATENT APPLICATION

This application claims priority to and the benefit of U.S. Provisional Patent Application No. 63/066,860, filed Aug. 18, 2020, which is incorporated herein in its entirety by reference.

STATEMENT AS TO RIGHTS UNDER FEDERALLY-SPONSORED RESEARCH

This invention was made with government support under grant number HL141470 awarded by the National Institutes of Health (NIH). The government has certain rights in the invention.

FIELD OF THE INVENTION

The present invention relates generally to healthcare, and more particularly to multimodal and multilayered electronic systems for multimodal diagnostic measurements and therapeutic interventions, fabricating methods and applications of the same.

BACKGROUND OF THE INVENTION

The background description provided herein is for the purpose of generally presenting the context of the invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions. Work of the presently named inventors, to the extent it is described in the background of the invention section, as well as aspects of the description that may not otherwise qualify as prior art at the time of filing, are neither expressly nor impliedly admitted as prior art against the invention.

Minimally invasive surgeries involve the insertion of advanced diagnostic and therapeutic tools through small percutaneous incisions for treatment of cardiovascular diseases, cancers, and other health conditions, with fast recovery times and low risks compared to those of conventional procedures. Catheters represent one of the most compelling platforms for such purposes due to their capabilities in deploying medical devices (e.g., intravascular stents, heart valve prosthesis), capturing information during surgical procedures (e.g., force, temperature, electrograms) and/or performing procedures that involve delivery of forces, electromagnetic energy, thermal stimuli and/or biomaterials (e.g., drugs, cells, nanoparticles) to targeted sites on or within soft tissues. Although these catheter-based approaches have widespread use in modern medicine, they suffer from (1) mechanical rigidity or insufficient compliance, leading to non-ideal interfaces to soft tissues and low coupling efficiency, (2) limited spatial densities and array configurations of sensing/actuating elements, leading to the need for asynchronous "roving probe" procedures and guided placement for effective diagnosis and therapy, and (3) narrow functional options, leading to requirements for insertion and navigation of multiple catheters in the context of a single surgery.

Therefore, a heretofore unaddressed need exists in the art to address the aforementioned deficiencies and inadequacies.

SUMMARY OF THE INVENTION

This invention in certain aspects discloses an electronic system for multimodal diagnostic measurements and therapeutic interventions. In one embodiment, the electronic system comprises a plurality of element network layers vertically stacked one with another on a flexible substrate, each element network layer being bi-axially stretchable and comprising a plurality of elements configured in an addressable, interconnected array formed in a multilayered structure and operably performing a distinct function.

In one embodiment, the flexible substrate is a balloon catheter or an elastic object that is operably in a deflated state or an inflated state.

In one embodiment, the plurality of element network layers comprises an electrode array configured to perform electrophysiological recording and/or therapeutic interventions in a target of interest.

In one embodiment, the therapeutic interventions comprise electrical stimulation, drug elution, radio frequency (RF) ablation, and/or irreversible electroporation (IRE) ablation.

In one embodiment, the electrode array comprises a plurality of electrodes connected to stretchable interconnects and disposed between first and second polymer layers such that the plurality of electrodes is exposed.

In one embodiment, the plurality of electrodes is individually and selectively controllable and/or programmable.

In one embodiment, the exposed electrodes are in contact with connected to the target of interest when the flexible object is operably the inflated state.

In one embodiment, each of the first and second polymer layers is formed of polyimides, polyurethane, polyethylene, and/or silicone.

In one embodiment, each of the first and second polymer layers has a thickness of about 0.8-4 μm.

In one embodiment, each electrode has a lateral dimension of about 400 μm×400 μm to 1 mm×1 mm, and a thickness of about 200 nm to 750 nm.

In one embodiment, the plurality of electrodes and the stretchable interconnects are formed of a metal including gold, platinum, palladium, platinum iridium, or an alloy.

In one embodiment, the stretchable interconnects are configured to accommodate bi-axial stretching greater than about 30% without inducing fractures in the electrode array.

In one embodiment, each of the stretchable interconnects has a width of about 10-80 μm and is separated from one another by a width of about 10-100 μm of polyimides, polyurethane, polyethylene, and/or silicone.

In one embodiment, the plurality of element network layers further comprises a temperature sensor array for precision thermography, and/or a pressure sensor array for measuring forces/pressures associated with soft tissue contact in the target of interest.

In one embodiment, the temperature sensor array comprises a plurality of temperature sensors, each temperature sensor being formed of metal traces, and electrically coupled to two temperature sensor connection lines that allow column and row selection multiplexing using signals delivered through the temperature sensor connection lines.

In one embodiment, the metal traces are formed of a metal including gold, platinum, palladium, platinum iridium, or an alloy.

In one embodiment, the metal traces are formed of gold, or a copper-nickel alloy.

In one embodiment, each metal trace has a thickness of about 80-120 nm and a width of about 3-5 μm.

In one embodiment, the temperature sensor connection lines for row selection reside in a first layer with the plurality of temperature sensors, while those for column selection lie a second layer above the first layer, separated by an insulating layer and connected to one side of the temperature sensors through a via hole.

In one embodiment, the insulating layer is formed of polyimides, polyurethane, polyethylene, and/or silicone.

In one embodiment, the insulating layer has a thickness in a range of about 1-10 μm.

In one embodiment, averaged outputs from the plurality of temperature sensors yield a precision of one standard deviation ranging from about 10 mK to about 200 mK.

In one embodiment, the temperature sensor array further comprises a layer of thermal actuators separated from the plurality of temperature sensors for spatial mapping of tissue thermal conductivity.

In one embodiment, transient plane source analysis of the time-domain temperature profiles from the plurality of temperature sensors yields tissue thermal conductivities at different locations.

In one embodiment, data acquired from the temperature sensor array are processed for assessment of parameters including flow of blood and other biofluids and tissue hydration levels.

In one embodiment, the pressure sensor array comprises a plurality of pressure sensors, each pressure sensor being formed of a metal strain gauge, and electrically coupled to two pressure sensor connection lines that allow column and row selection multiplexing using signals delivered through the pressure sensor connection lines.

In one embodiment, column and row selection occurs through serpentine interconnects across two different layers.

In one embodiment, two terminals of each strain gauge is arranged in a cross-shaped geometry having a ribbon width and a ribbon length for facilitating wiring for the column and row selections.

In one embodiment, each strain gauge and its two terminals are formed of a metal or an alloy.

In one embodiment, each strain gauge has a thickness in a range of about 80-120 μm and a width in a range of about 1-3 μm, and wherein the ribbon width is in a range of about 100-150 μm, and the ribbon length is in a range of about 700-1100 μm.

In one embodiment, the metal strain gauge of each pressure sensor is in a form of a three-dimension (3D) tent-like mesostructure with high sensitivity to normal force and low effective modulus, and wherein the serpentine interconnections are in a form of 3D helices with exceptional stretchability.

In one embodiment, each 3D tent-like mesostructure is covered with a silicon cavity, and said cavity has lateral dimensions with a plurality of pillars at the corners, each pillar having a length and a height.

In one embodiment, the lateral dimensions of said cavity is in a range of about 0.5 mm by 0.5 mm to 1 mm by 1 mm, the length and the height of the pillars are in ranges of about 100-250 μm and about 150-200 μm, respectively.

In one embodiment, sensitivity of each pressure sensor is tunable by adjusting side lengths of the pillars of said cavity, shapes of the 3D tent-like mesostructures, thicknesses of the polymer layers, and/or thickness and modulus of the flexible substrate.

In one embodiment, the pressure sensor array further comprises rigid islands selectively bonded to the bottom surface of the pressure sensor array to constrain deformations of the 3D tent-like mesostructures under stretching, while maintaining stretchability of the pressure sensor array.

In one embodiment, the pressure sensor array is insensitive to other types of mechanical deformations including bending and twisting.

In one embodiment, the pressure sensor array is disposed on the flexible substrate, the temperature sensor array is disposed on the pressure sensor array, and the electrode array is disposed on the temperature sensor array.

In one embodiment, the temperature sensor array is bonded to a bottom surface of the electrode array with a thin layer of PI to offer small thickness, strong adhesion and excellent thermal and physical contact for precise temperature measurements during ablation or other procedures.

In one embodiment, the thin layer of PI has a thickness in a range of about 1-2 μm.

In one embodiment, the pressure sensor array locates at the bottom of the plurality of element network layers for measurements of the local transverse forces at the interface between the electrodes and the contacting soft tissues.

In one embodiment, the electrode array, the temperature sensor array and the pressure sensor array are vertically stacked to define a multilayer mesh having an array of sensing elements, each element comprising an electrode, a temperature sensor and a pressure sensor, and being connected to one another through the stretchable interconnects and connection lines that are untethered to the flexible substrate so as to enable out-of-plane deformations for enhanced stretchability.

In one embodiment, the array of sensing elements is individually and selectively controllable and/or programmable.

In one embodiment, in operation, the flexible substrate is in the inflated state, the exposed electrodes of the electrode array are in contact with target biological tissues to perform electrophysiological recording and/or therapeutic interventions, the temperature sensor array tracks changes in temperature associated with the therapeutic interventions; and the pressure sensor array measures local transverse forces at the interface between the electrodes and the biological tissues.

In one embodiment, the measured temperature and pressure provide feedbacks for the therapeutic interventions in the target surface of interest.

In one embodiment, the electronic system further comprises a multiplexed data acquisition (DAQ) system electrically coupled to the electrode array, wherein the DAQ comprises an application-specific integrated circuit (ASIC) configured to amplify, digitize and multiplex signals output from or input to the plurality of electrodes, thereby reducing a total number of wires connecting to an external instrument.

In one embodiment, the electronic system further comprises a multiplexing circuit coupled to the temperature sensor array and/or the pressure sensor array for multiplexing of input and output signals of the plurality of temperature sensors and/or the plurality of pressure sensors and eliminating crosstalk with grounding.

In one embodiment, the electronic system is conformally integrated with the flexible substrate.

In another aspect, the invention relates to a method of fabricating an electronic system for multimodal diagnostic measurements and therapeutic interventions, comprising forming each of a plurality of element network layers, each element network layer being biaxial stretchable and comprising a plurality of elements configured in an addressable, interconnected array formed in a multilayered structure and operably performing a distinct function; and integrating the plurality of element network layers in a vertical stack of one with another on a flexible substrate.

In one embodiment, the flexible substrate is a balloon catheter or an elastic object that is operably in a deflated state or an inflated state.

In one embodiment, the forming step comprises forming an electrode array by preparing a sacrificial layer on a silicon wafer; coating a bottom polymer layer on the sacrificial layer; defining a pattern of the electrode array on the bottom polymer layer, wherein the pattern comprises a plurality of electrodes and stretchable interconnects connecting to the plurality of electrodes; coating a top polymer layer on the pattern over the bottom polymer layer to cover the electrode array thereon; defining a polymer pattern to expose the plurality of electrodes of the electrode array; and undercutting the sacrificial layer to release the electrode array.

In one embodiment, the plurality of electrodes and the stretchable interconnects are formed of a metal including gold, platinum, palladium, platinum iridium, or an alloy.

In one embodiment, the forming step comprises forming a temperature sensor array by preparing a sacrificial layer on a silicon wafer; coating a bottom polymer layer on the sacrificial layer; defining a bottom pattern of the temperature sensor array on the bottom polymer layer, wherein the bottom pattern of the temperature sensor array comprises a plurality of temperature sensors and serpentine connections connecting to a first region of each temperature sensor for row selection; coating a middle polymer layer on the bottom pattern over the bottom polymer to cover the bottom pattern thereon; defining vias through the middle polymer layer at predetermined locations, such that a second region of each temperature sensor is exposed at a respective via; coating the exposed second region of each temperature sensor and side walls of the respective via with a metal or an alloy; defining a top pattern of the temperature sensor array on the middle polymer, wherein the top pattern comprises serpentine connections connecting to the coated vias that are connected to the plurality of temperature sensors for column selection; coating a top polymer layer on the top pattern over the middle polymer to cover the top pattern for column selection; defining a polymer pattern to form the outline of the temperature sensor array; and undercutting the sacrificial layer to release the temperature sensor array.

In one embodiment, the forming step comprises forming the pressure sensor array by preparing a sacrificial layer on a silicon wafer; coating a bottom polymer layer on the sacrificial layer; defining a bottom pattern of the pressure sensor array on the bottom polymer layer, wherein the bottom pattern of the pressure sensor array comprises a plurality of pressure sensors and serpentine connections connecting to a first region of each pressure sensor for row selection; coating a middle polymer layer on the bottom pattern over the bottom polymer to cover the bottom pattern thereon; defining vias through the middle polymer layer at predetermined locations, such that a second region of each pressure sensor is exposed at a respective via; coating the exposed second region of each pressure sensor and side walls of the respective via with a metal or an alloy; defining a top pattern of the pressure sensor array on the middle polymer, wherein the top pattern comprises serpentine connections connecting to the coated vias that are connected to the plurality of pressure sensors for column selection; coating a top polymer layer on the top pattern over the middle polymer to cover the top pattern for column selection; defining a polymer pattern to form the outline of the pressure sensor array; undercutting the sacrificial layer to release the pressure sensor array; defining bonding regions with $SiO_2$ via a shadow mask on the bottom surface of the bottom polymer layer; transferring to a pre-stretched elastomer on the bonding regions; and releasing the pre-stretched elastomer to form 3D mesostructures, bond rigid cavities and rigid islands.

In one embodiment, the step of defining the bottom pattern of the pressure sensor array on the bottom polymer layer comprises defining a first pattern of the pressure sensor array on the bottom polymer layer, wherein the first pattern of the pressure sensor array comprises a plurality of serpentine connections for row selection; and defining a second pattern of the pressure sensor array on the bottom polymer layer, wherein the second pattern of the pressure sensor array comprises a plurality of the pressure sensors connected to the plurality of serpentine connections, wherein the first pattern and the second pattern are formed of two different materials.

In one embodiment, the integrating step comprises preparing a stamp with micro patterns; stacking the electrode array with the temperature sensor array, comprising: attaching the stamp onto a uncured polymer layer, and detaching the stamp from the uncured polymer layer to form an uncured polymer pattern thereon; aligning the uncured polymer pattern on the stamp to the temperature sensor array; and transferring the uncured polymer pattern to the temperature sensor array by attaching and detaching the stamp; aligning the electrode array to the temperature sensor array with the uncured PI pattern as an adhesive layer; and curing the uncured polymer pattern to integrate the electrode array to the temperature sensor array.

In one embodiment, the integrating step further comprises treating the bottom surface of the temperature sensor array and the top surface of the pressure sensor array to induce hydroxyl termination for bonding; aligning the stacked arrays of electrodes and temperature sensors with the pressure sensor array; and bonding the aligned arrays of electrodes, temperature sensors and pressure sensors to complete the fabrication.

In one embodiment, each polymer layer is formed of polyimides, polyurethane, polyethylene, and/or silicone.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment.

FIG. 1A: Schematic illustration of the devices arrays in a multilayer format. The top functional system allows electrophysiological mapping and RF/IRE ablation, where layers E1 to E3 correspond to the top polymer film with openings, the array of electrodes and interconnects, and the bottom polymer film, respectively, for the electrode array. The next system allows measurements of temperature distributions, where layers T1 to T5 correspond to the top polymer, the array of temperature sensors and row selection lines, a polymer interlayer with via openings, the column selection lines, and the bottom polymer film, respectively. The bottom system supports measurements of pressure distributions, where layers P1 to P8 correspond to the array of silicon cavities, the top polymer film, the array of pressure sensors and row selection lines, a polymer interlayer with via openings, the column selection lines, the bottom polymer film, a layer of silicone elastomer, and an array of rigid islands, respectively. FIG. 1B: Optical image of an inflated, instrumented balloon catheter inserted into a transparent heart model. The green dashed curve illustrates the path of the catheter. Scale bars, 1 cm; 2 mm for the insets. FIG. 1C: Optical image of the vertically stacked arrays of electrodes, temperature sensors, and pressure sensors. Scale bar, 2 mm. FIG. 1D: Optical image of one unit of the stacked arrays. Arrows and text in blue, orange, and green correspond to layers for electrodes, temperature sensors and pressure sensors, respectively. Scale bar, 200 μm. FIGS. 1E-1F: Optical images of the array of electrodes (FIG. 1E) and array of temperature sensors (FIG. 1F) in planar format. FIG. 1G: Optical images of the array of electrodes transferred onto a balloon catheter of silicone. FIG. 1H: Optical images of the array of temperature sensors transferred on a balloon catheter of polyurethane. Scale bars in FIGS. 1E-1H, 2 mm for the images in black squares, 500 μm for images in blue dashed squares, 100 μm for images in orange dashed squares, 20 μm for the image in green dashed squares.

FIGS. 2A-2N show design, assembly and characterization of the array of 3D pressure sensors, according to embodiments of the invention. FIG. 2A: Optical images of the array before (FIG. 2A) and after (FIG. 2B) adding the silicon cavities. FIG. 2C: Optical images of the array transferred to curvilinear surfaces. FIG. 2D: Optical images of the array transferred on a customized balloon catheter. FIG. 2H: Histogram and Gaussian lineshape fitting of the sensitivities. FIG. 2I: Fractional change of resistance of the sensor at different pressures during loading and unloading. FIG. 2J: Responses from the sensor (blue curve) and a commercial force gauge (orange curve) under fast unloading. FIG. 2K: Fractional change of resistance under 5000 cycles of loading/unloading. FIG. 2L: Optical images of a customized balloon catheter instrumented with an array of 3D pressure sensors inserted into a porcine heart model. FIG. 2M: Spatiotemporal mapping of pressure during inflation of the balloon catheter on a porcine heart. FIG. 2N: Time-domain pressure curves from five sensors. The numbers in FIG. 2M indicate the positions of the five sensors. Scale bars, 2 mm for the images in black squares, 500 μm for images in blue dashed squares, 100 μm for images in orange dashed squares, 20 μm for the image in green dashed squares.

FIGS. 3A-3P show therapeutic functions and simultaneous, multimodal operation, according to embodiments of the invention. FIG. 3A: Temperature profiles determined with sensors at the locations of electrodes during bi-polar RF ablation with two adjacent electrodes at different input powers. FIG. 3I: Schematic illustration of the side view of the stacked electrode and temperature sensor with PI (left) and silicone (right) as the interlayer. FIG. 3J: Temperature profiles during RF ablation measured from temperature sensors with PI (1.5 μm in thickness) and silicone (Ecoflex, 100 μm in thickness) as the interlayer between the sensor and the ablation electrodes. FIG. 3K: Temperature distribution at 20 s after initiating ablation during bi-polar RF ablation (measured from the temperature sensor array). Computation of the isotherms relies on a four-order two-dimensional interpolation of the raw data. FIG. 3L: Time-domain temperature curves from three temperature sensors. The ablation experiments in FIGS. 3I-3L involve agar hydrogel (2 wt. % agar+98 wt. % 0.1 M PBS) at 37° C. FIG. 3M: Impedance spectra of the electrode when contacting with a non-perfused tissue (chicken breast, immersed in 0.1 M PBS) at different pressures. FIG. 3N: Photographs of lesions created on non-perfused tissues at different pressures. Top and bottom frames show top and side views of the lesions, respectively. The black dashed squares illustrate the positions of the electrodes for ablation. Scale bars, 0.5 mm. FIG. 3O: Fractional change of resistance of resistors formed with constantan sputtered at 100° C. and RT. FIG. 3P: Optical image of a sensor formed in constantan and Au. Scale bar, 100 μm. Fractional change of resistance of the pressure sensor in constantan under periodic pressure of 20 kpa.

FIGS. 4A-4I show multifunctionality of instrumented balloon catheters demonstrated with ex vivo Langendorff-perfused rabbit heart models, according to embodiments of the invention. FIG. 4A: Schematic illustration of the testing setup. FIG. 4B: A single trace electrogram measured from the electrode array under pacing (200 BPM). FIG. 4C: Voltage mapping data at different time points (indicated by the black dashed lines in FIG. 4B). Scale bar, 5 mm. FIG. 4D: ECG of the rabbit heart recorded before, during and after IRE at a frequency of 50 Hz. Insets: magnified time-domain curves. FIG. 4E: Lesions created on the epicardial surface of a rabbit heart through bi-polar RF ablation. The black dashed squares illustrate the positions of the electrodes for ablation. FIG. 4F: Spatiotemporal temperature mapping during bi-polar RF ablation on a rabbit heart (measured from the temperature sensor array). FIG. 4F: Time-domain temperature curves from five temperature sensors. The numbers in FIG. 4F indicate the positions of the five temperature sensors. FIGS. 4H-4I: Simultaneous electrogram and pressure recording during sinus rhythm (FIG. 4H) and pacing (FIG. 4I). The left frames in FIGS. 4H-4I show electrograms under different contact pressures between the balloon catheter and the rabbit heart. The right frames in FIGS. 4H-4I show magnified time-domain curves of the electrograms and pressure at contact pressures of about 16 kpa (right).

FIGS. 5A-5M show endocardial electrophysiological studies on Langendorff-perfused human heart models, according to embodiments of the invention. FIG. 5A: Image of the setup for synchronized optical and electrical mapping. Scale bar, 30 mm. FIG. 5B: Image of the endocardial surface of a human ventricle. Scale bar, 15 mm. FIG. 5C: A single trace electrogram measured from the electrode array under pacing (60 BPM). FIG. 5D: Voltage mapping data at different time points (indicated by the black dashed lines in FIG. 5C). FIG. 5E: Image from the camera for optical recording (with a 700 nm long pass filter, under 655 nm excitation light, more details are described in the section of Methods below). The white dashed circle indicates the position of the instrumented balloon catheter. The white dashed square indicates the position of the electrode array. Scale bar, 5 mm. FIG. 5F: Representative optical (o) and electrical (e) signals from three different locations (marked with stars in FIG. 5E). Left: pacing at 30 BPM; Right: pacing at 60 BPM. FIG. 5G: Comparison of the optical and electrical signals in one cycle. FIGS. 5H-5I: Activation maps of the human heart LV wedge calculated from the optical data. Scale bars, 1 cm. FIGS. 5J-5K: Activation maps obtained from the optical and electrical data for regions inside the black dashed squares in FIGS. 5H-5I. Scale bars, 1 mm. FIG. 5L: Optical images of the lesion created on a human heart. Scale bar, 5 mm. FIG. 5M: Histology image of the lesion created on a human heart. Scale bar, 200 µm.

b, FEA results of the pressure sensor under bending. c, Experimental results of the pressure sensor under various kinds of deformations.

Figure 44:
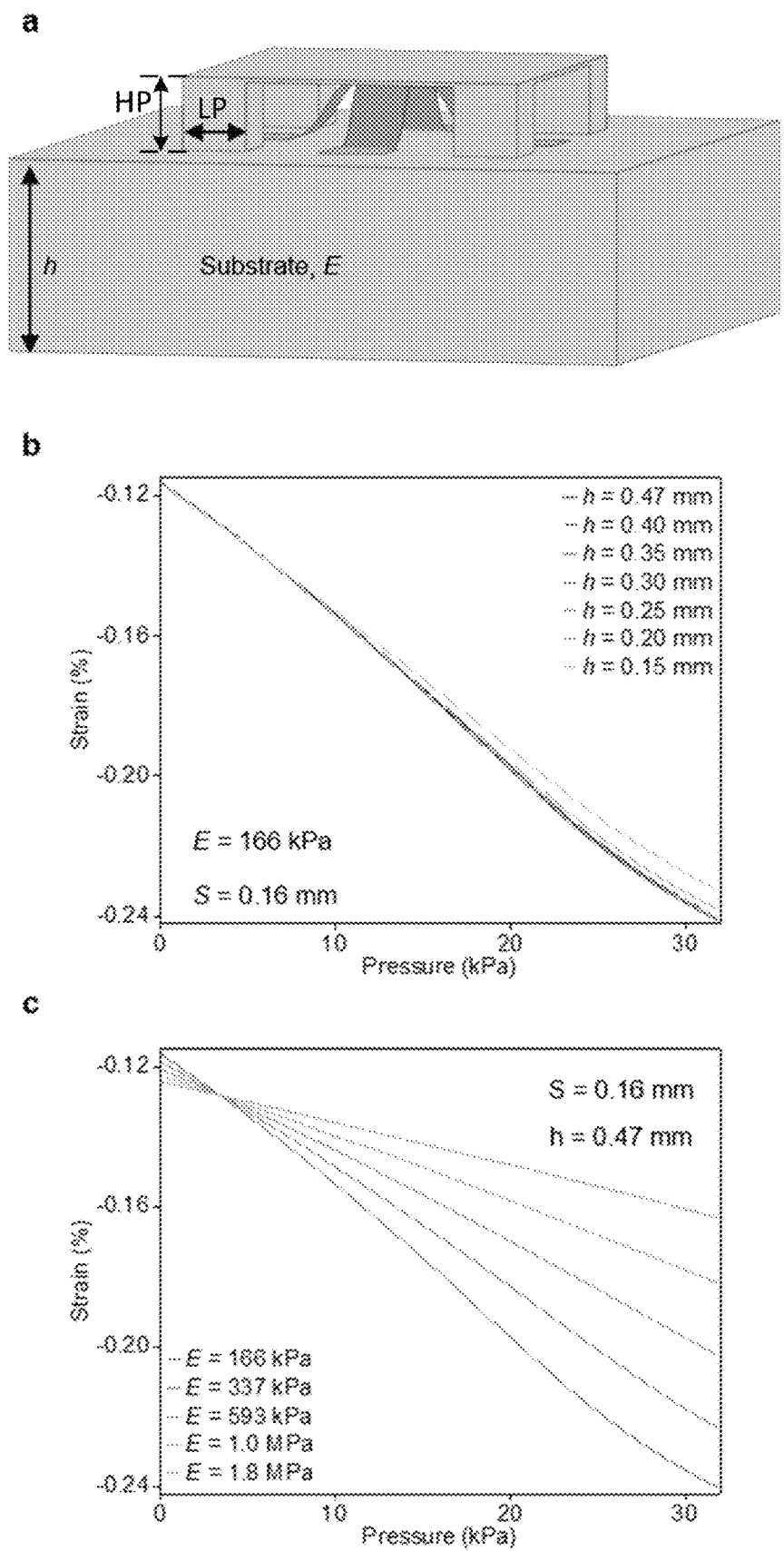

FIG. 44 shows FEA results for the sensitivities of the 3D pressure sensors for different design parameters, according to embodiments of the invention. a, Schematic illustration. b, Influence of the substrate thickness (h). c, Influence of the substrate modulus (E).

Figure 45:
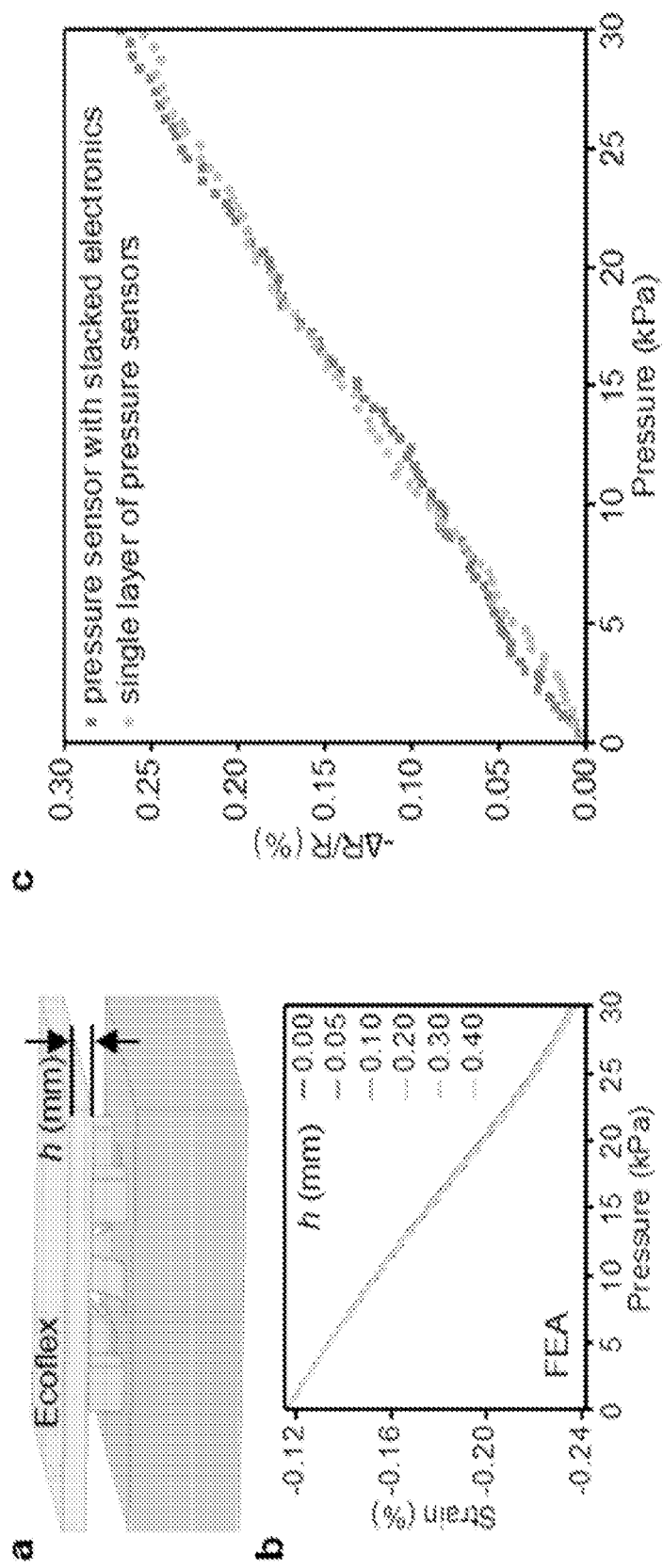

FIG. 45 shows sensitivities of the 3D pressure sensors with and without top elastomeric layer, according to embodiments of the invention. a, Schematic illustration. b, FEA results. c, Experimental results of the sensitivities before and after stacking with the electrode and temperature sensor. The elastomeric substrate for the electrode and temperature is Ecoflex (about 100 µm in thickness).

Figure 46:
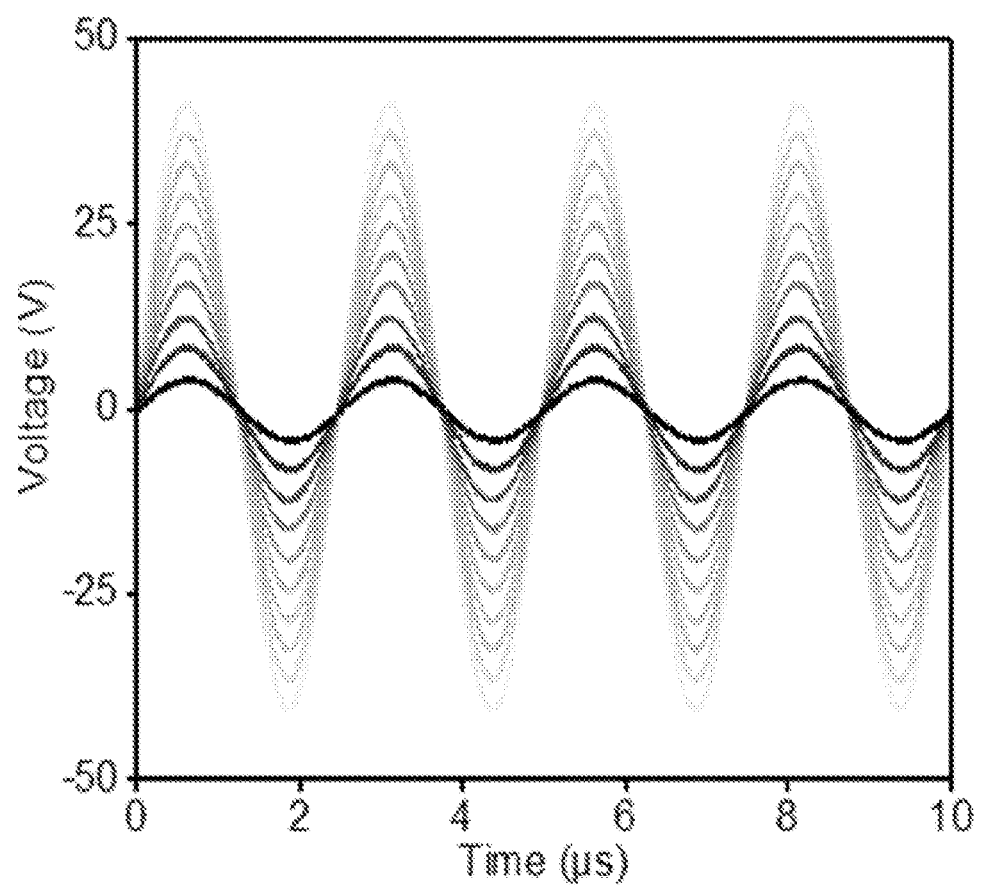

FIG. 46 shows waveforms for different input signals for RF ablation, according to embodiments of the invention.

Figure 47:
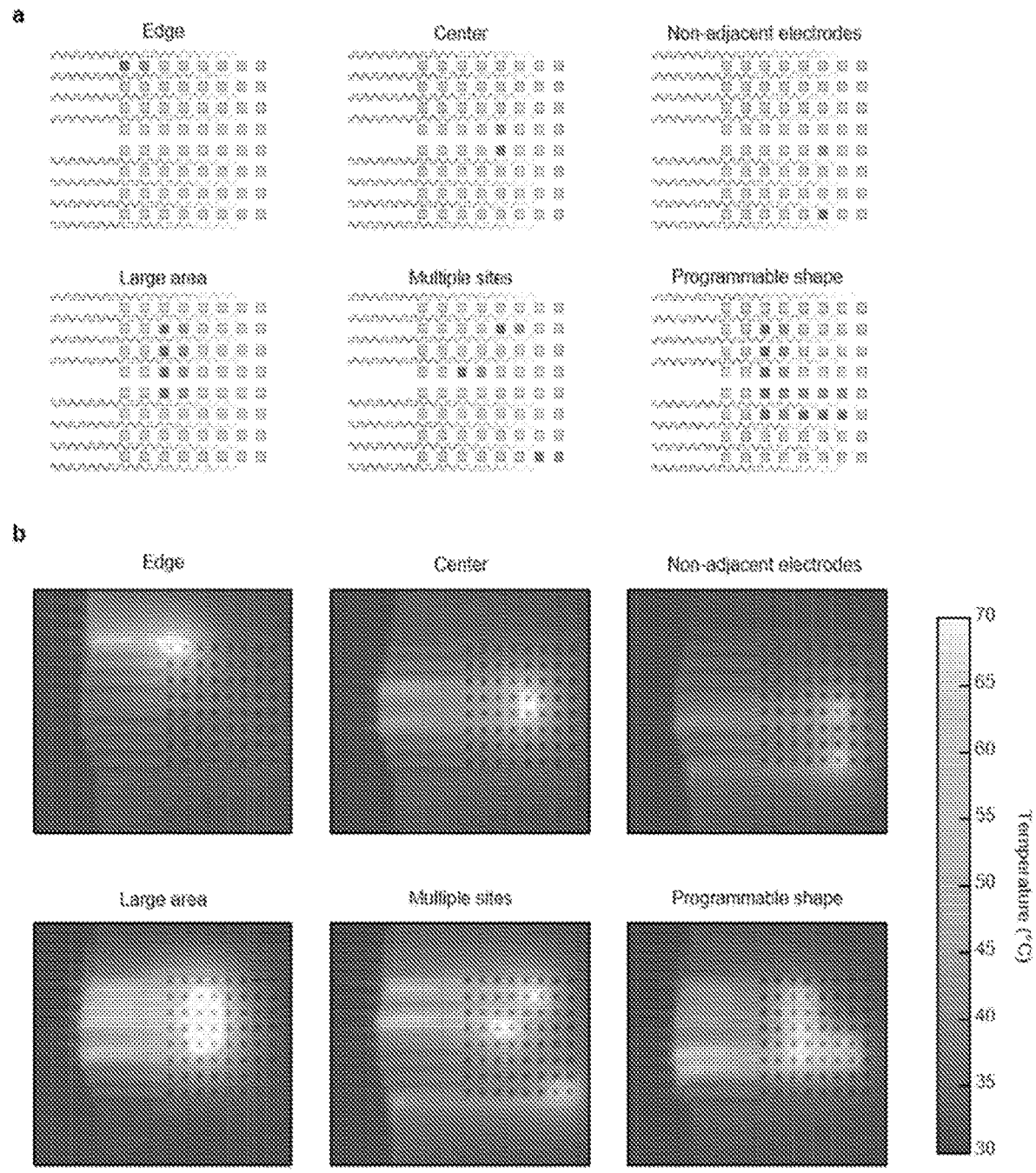

FIG. 47 shows various spatial distributions of temperatures of bipolar RF ablation on agar hydrogel at 37° C., according to embodiments of the invention. a, Schematic illustrations. Red and blue squares indicate the electrodes connected to RF signal input and ground, respectively. b, Temperature distributions measured from an IR microscope.

Figure 48:
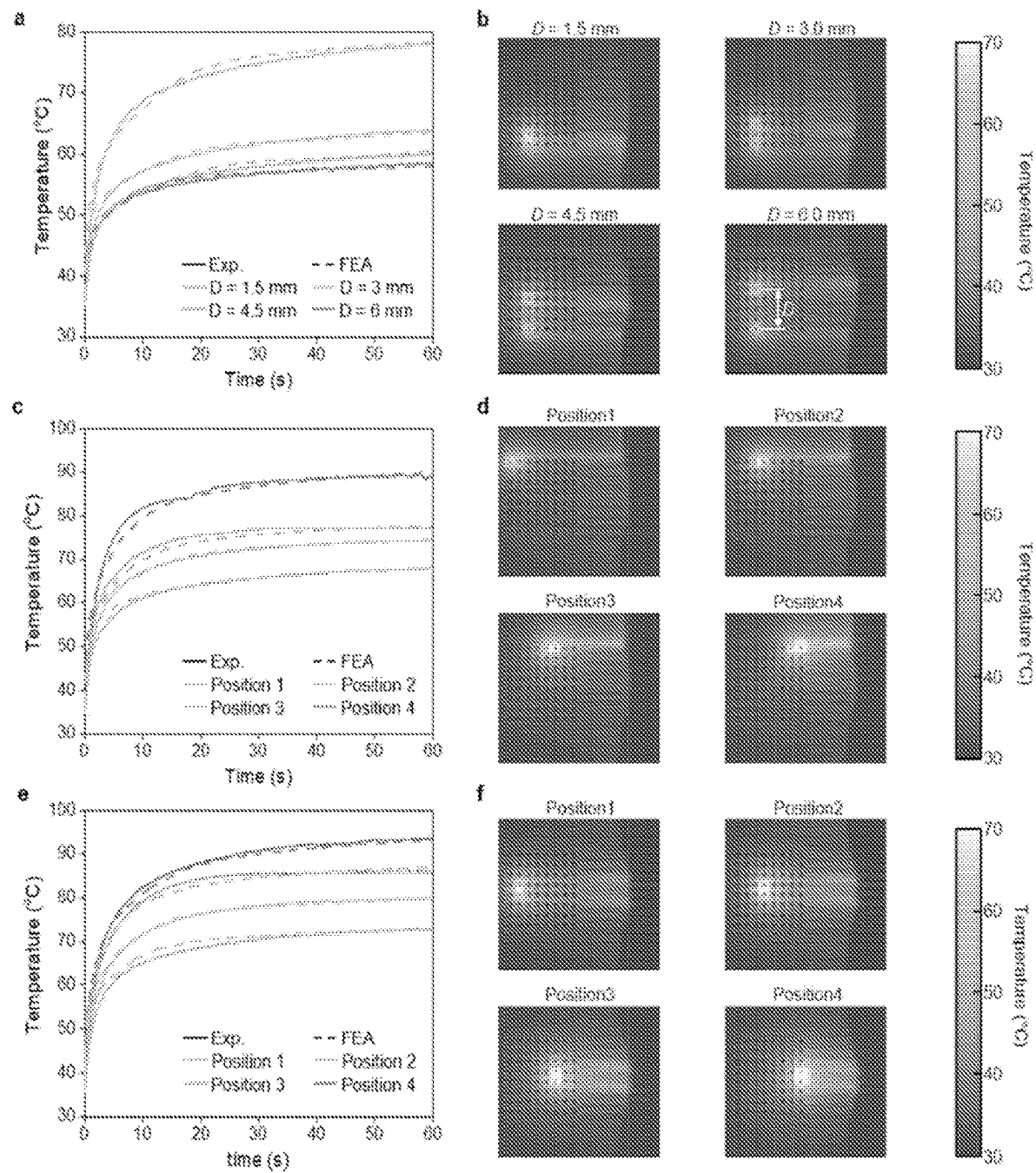

FIG. 48 shows experimental results for temporal and spatial distributions of temperatures during bipolar RF ablation on agar hydrogel at 37° C., according to embodiments of the invention. a-b, Time-domain temperature profiles (a) and spatial temperature distributions (b) at different distances. c-d, Time-domain temperature profile (c) and spatial temperature distribution (d) at different positions (adjacent electrodes, adjacent wires). e-f, Time-domain temperature profile (e) and spatial temperature distribution (f) at different positions (adjacent electrodes, non-adjacent wires, measured from an IR microscope). Solid and dashed lines in (a), (c) and (e) are experimental results measured from an IR microscope and FEA results, respectively. Spatial temperature distributions in (b), (d) and (f) are experimental results measured from an IR microscope.

Figure 49:
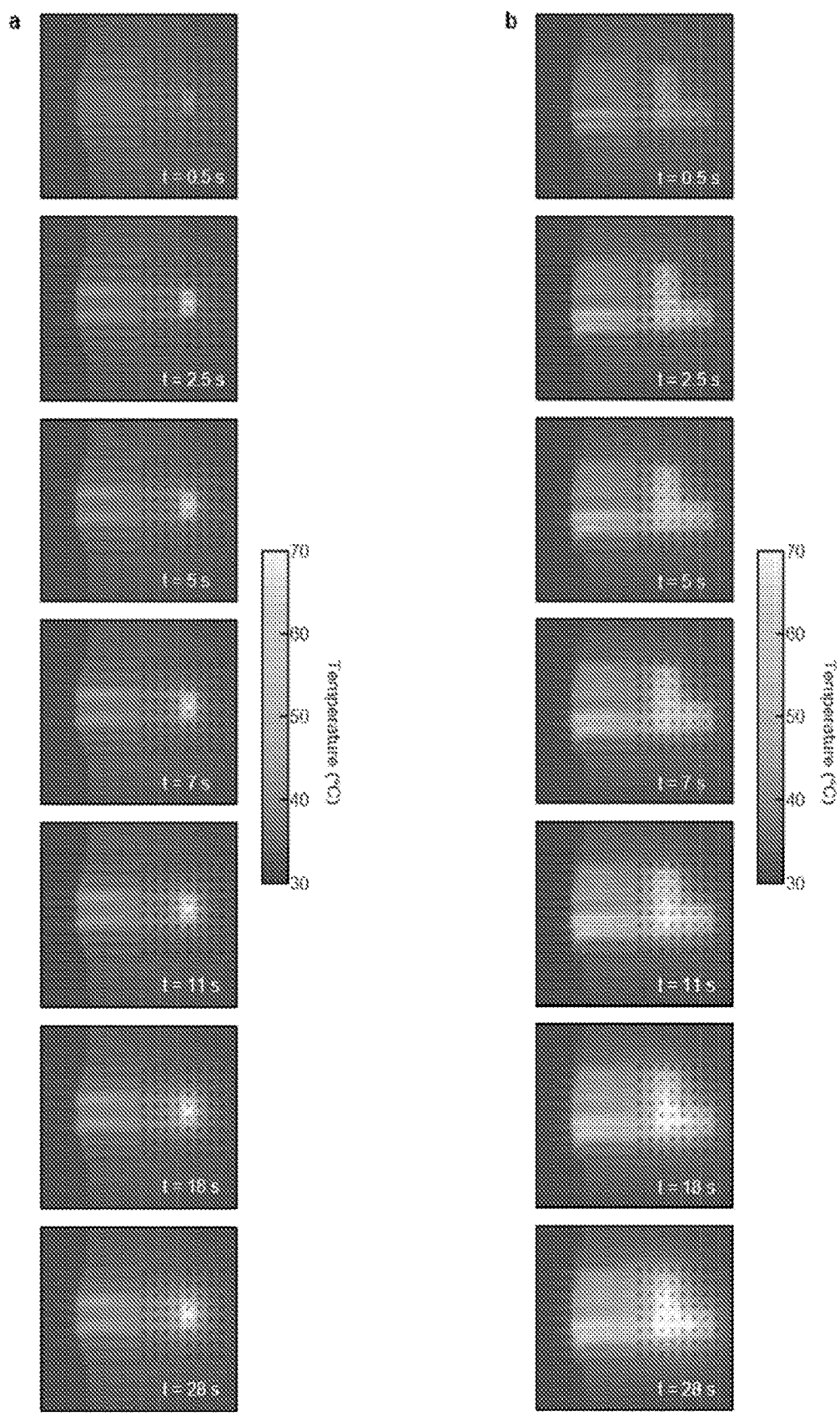

FIG. 49 shows spatial distributions of temperatures of bipolar RF ablation (agar hydrogel, 37° C.) at different time points (measured from an IR microscope), according to embodiments of the invention. a, Ablation with two adjacent electrodes. b, Ablation with multiple electrodes.

Figure 50:
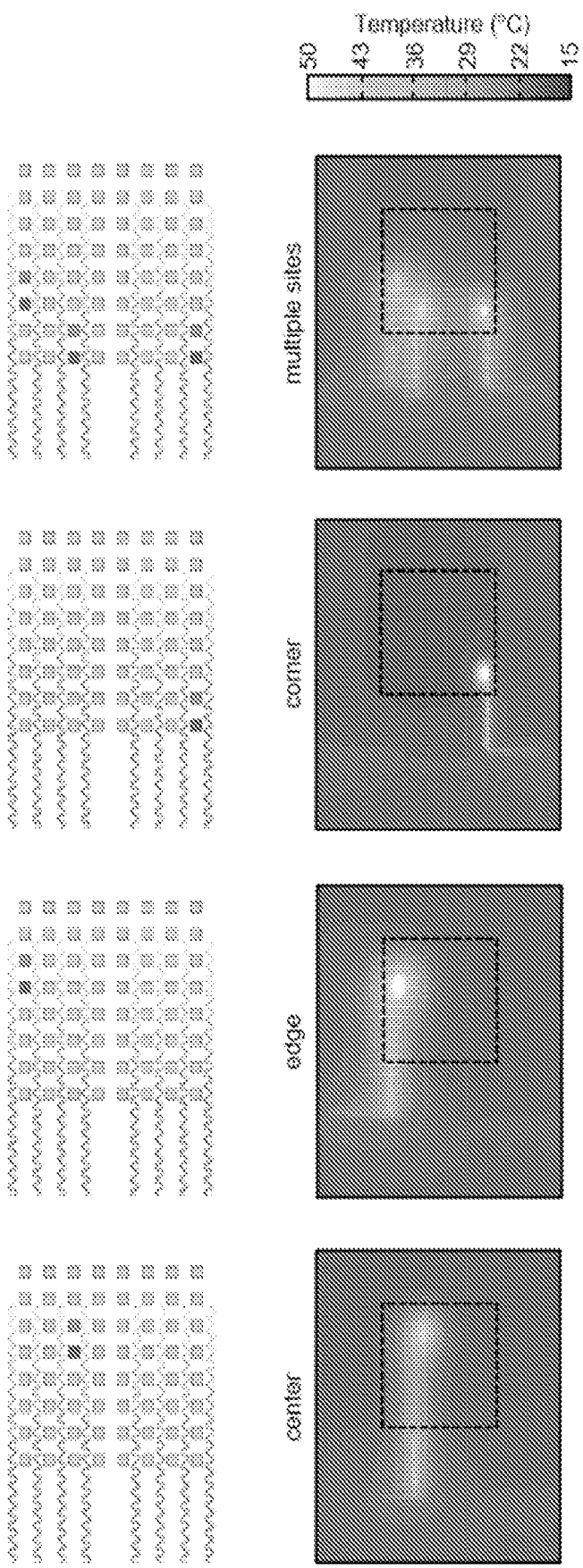

FIG. 50 shows experimental results for bipolar RF ablation on PBS (0.1 M) at room temperature (measured from an IR microscope). Top frames are schematic illustrations. Red and blue squares indicate the electrodes connected to RF signal input and ground, respectively. Bottom frames are corresponding spatial distributions of temperatures. Black dashed boxes indicate positions of the electrode array.

Figure 51:
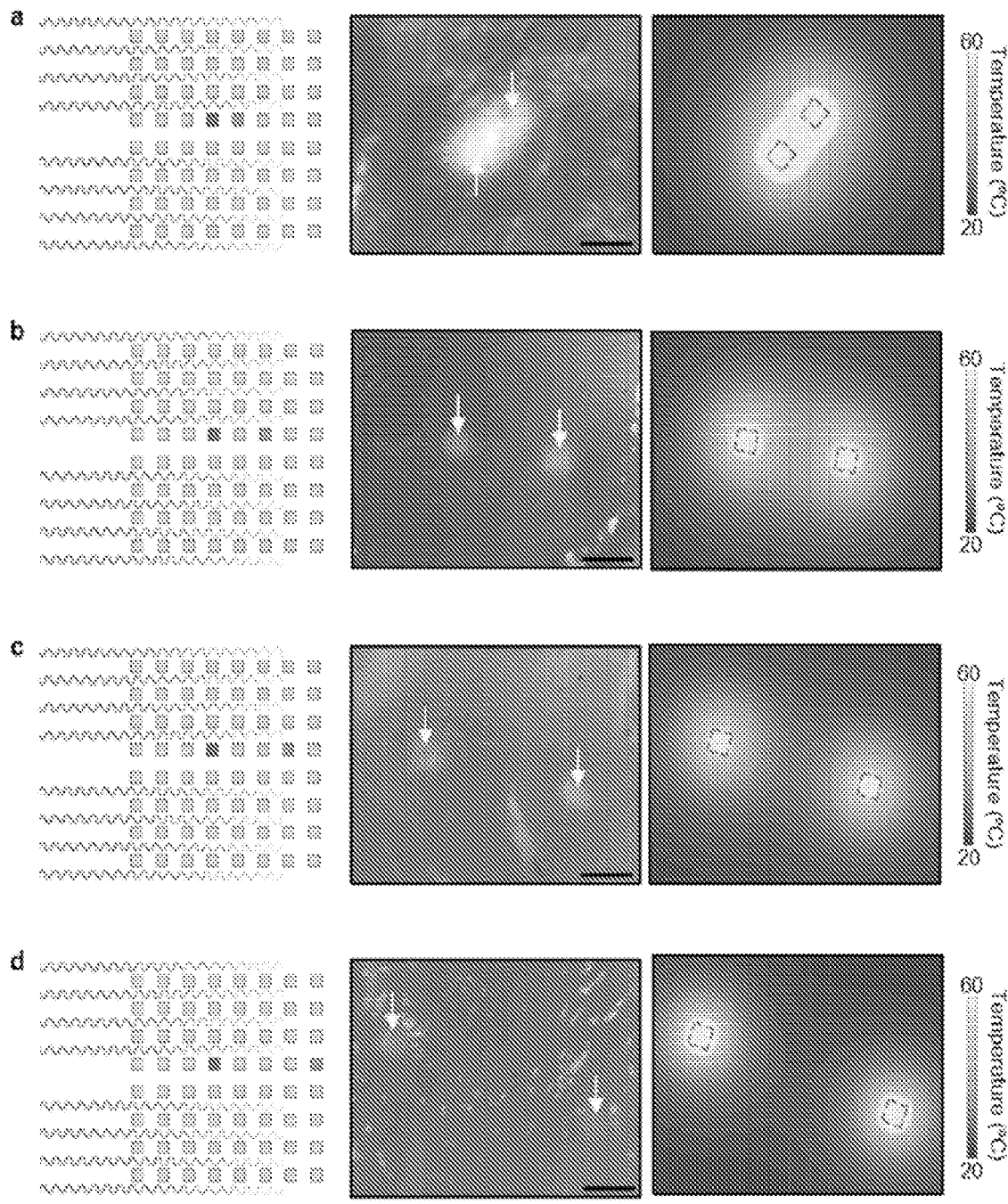

FIG. 51 shows a schematic illustrations (left), optical images of the lesions (middle) and FEA results of temperature distributions (right) of bipolar RF ablation on non-perfused tissues, according to embodiments of the invention. a, Distance between two electrodes: 1.5 mm. b, Distance between two electrodes: 3.0 mm. c, Distance between two electrodes: 4.5 mm. d, Distance between two electrodes: 6.0 mm. Red and blue squares in the schematic illustrations indicate the electrodes connected to RF signal input and ground, respectively. Yellow arrows in the optical images indicate positions of the lesions. Scale bars, 1.5 mm.

Figure 52:
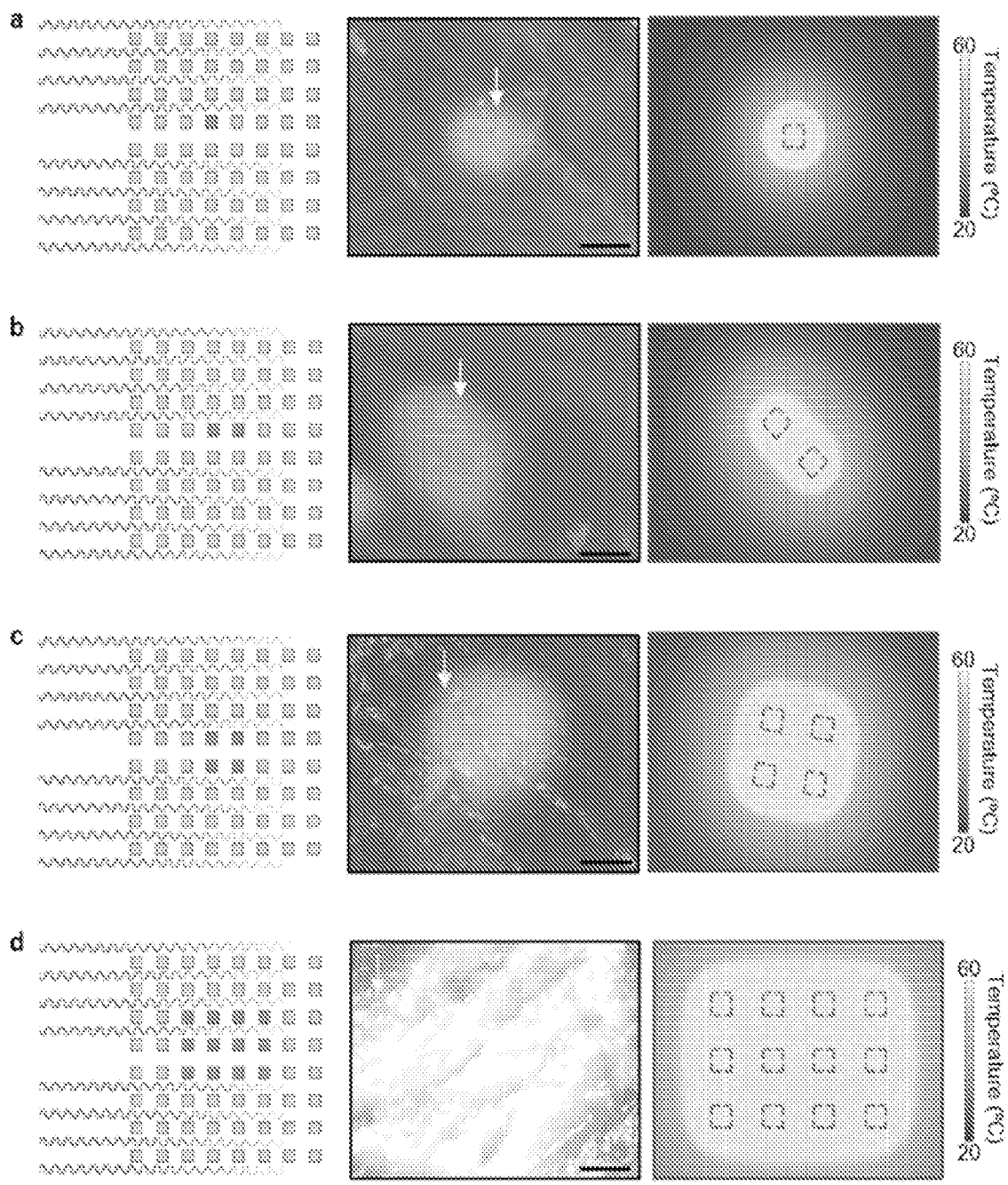

FIG. 52 shows a schematic illustrations (left), optical images of the lesions (middle) and FEA results of temperature distributions (right) of monopolar RF ablation for non-perfused tissues, according to embodiments of the invention. a, One electrode. b, Two electrodes. c, Four electrodes. d, Twelve electrodes. Red squares in the schematic illustrations indicate the electrodes with RF signal input. Yellow arrows in the optical images indicate positions of the lesions. Scale bars, 1.5 mm.

Figure 53:
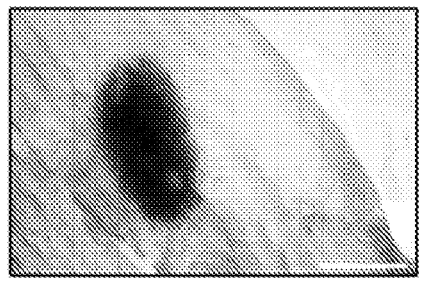
Figure 53:
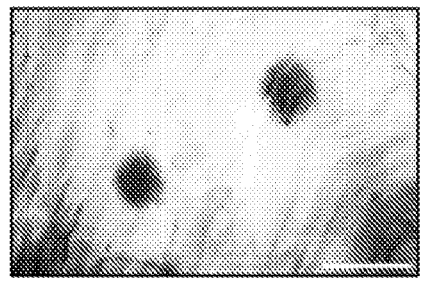
Figure 53:
Figure 53:
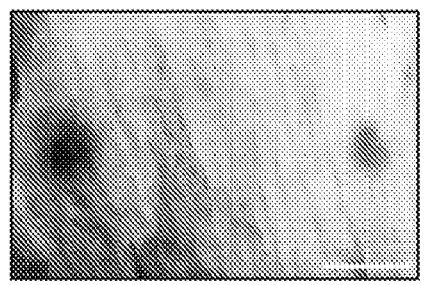
Figure 53:
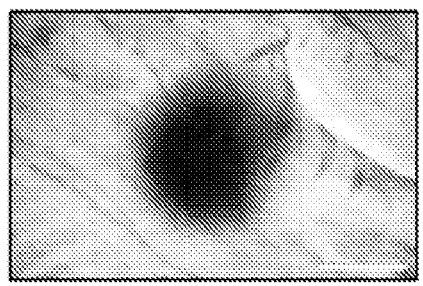
Figure 53:
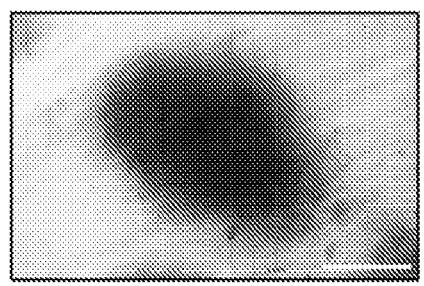
Figure 53:
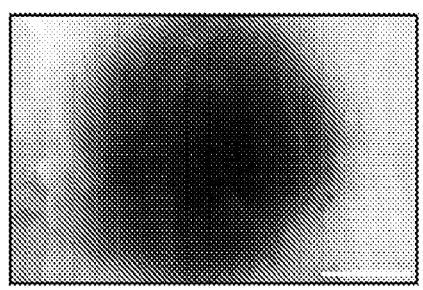
Figure 53:
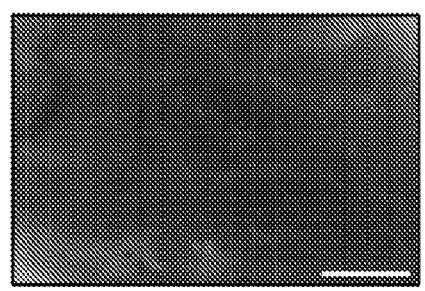

FIG. 53 shows optical images of the lesions in FIGS. 49 and 50 using transmittance light, according to embodiments of the invention. a, Bipolar ablation with different distances. b, Monopolar ablation with different numbers of electrodes. Scale bars, 1.5 mm.

Figure 54:
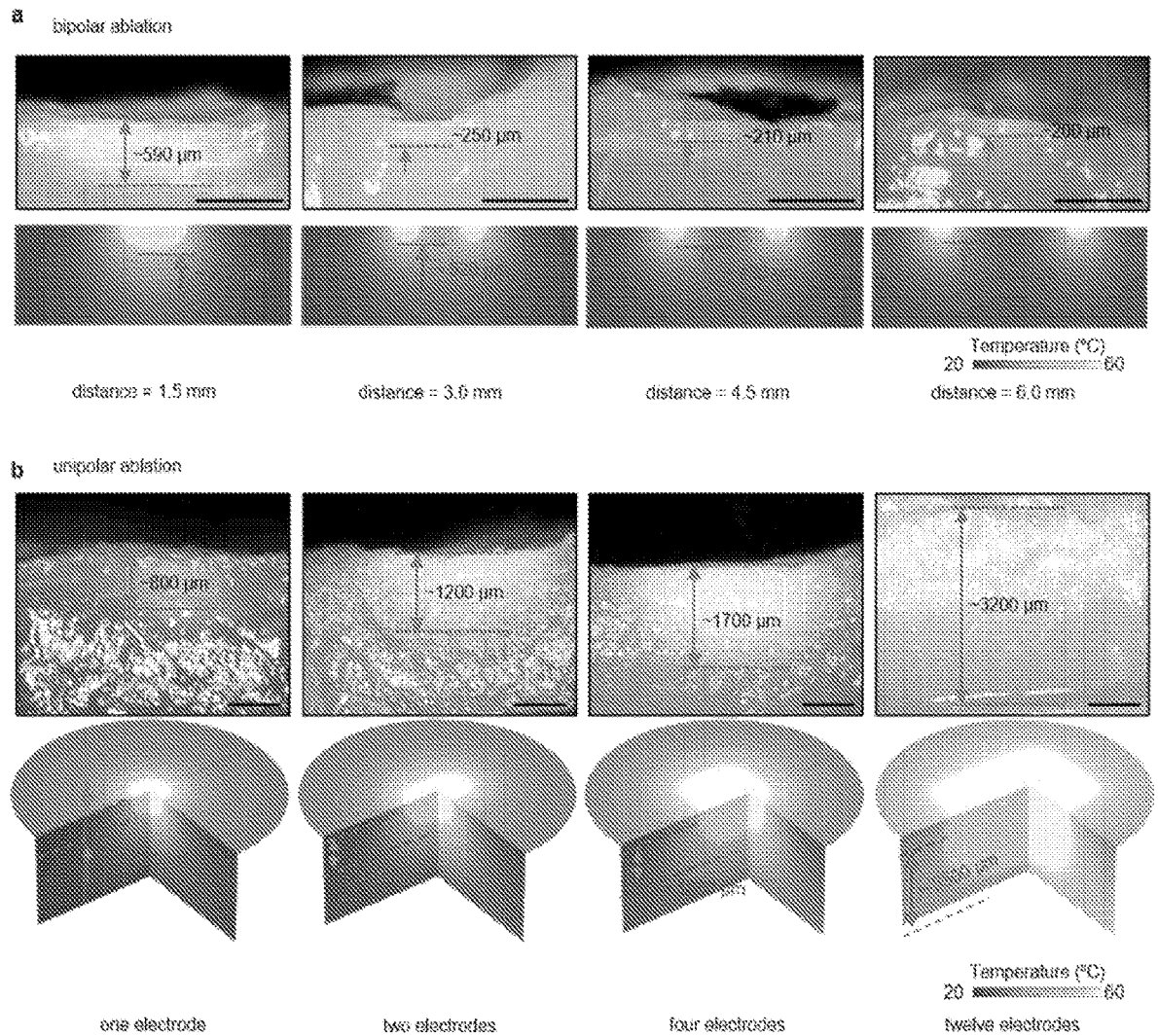

FIG. 54 shows a side view of the lesions in FIGS. 49 and 50. a, Optical images of the lesions (top) and FEA results of the temperature distributions (bottom) during bipolar ablation with different distances. b, Optical images of the lesions (top) and FEA results of the temperature distributions (bottom) during monopolar ablation with different numbers of electrodes. Scale bars, 1 mm.

Figure 55:
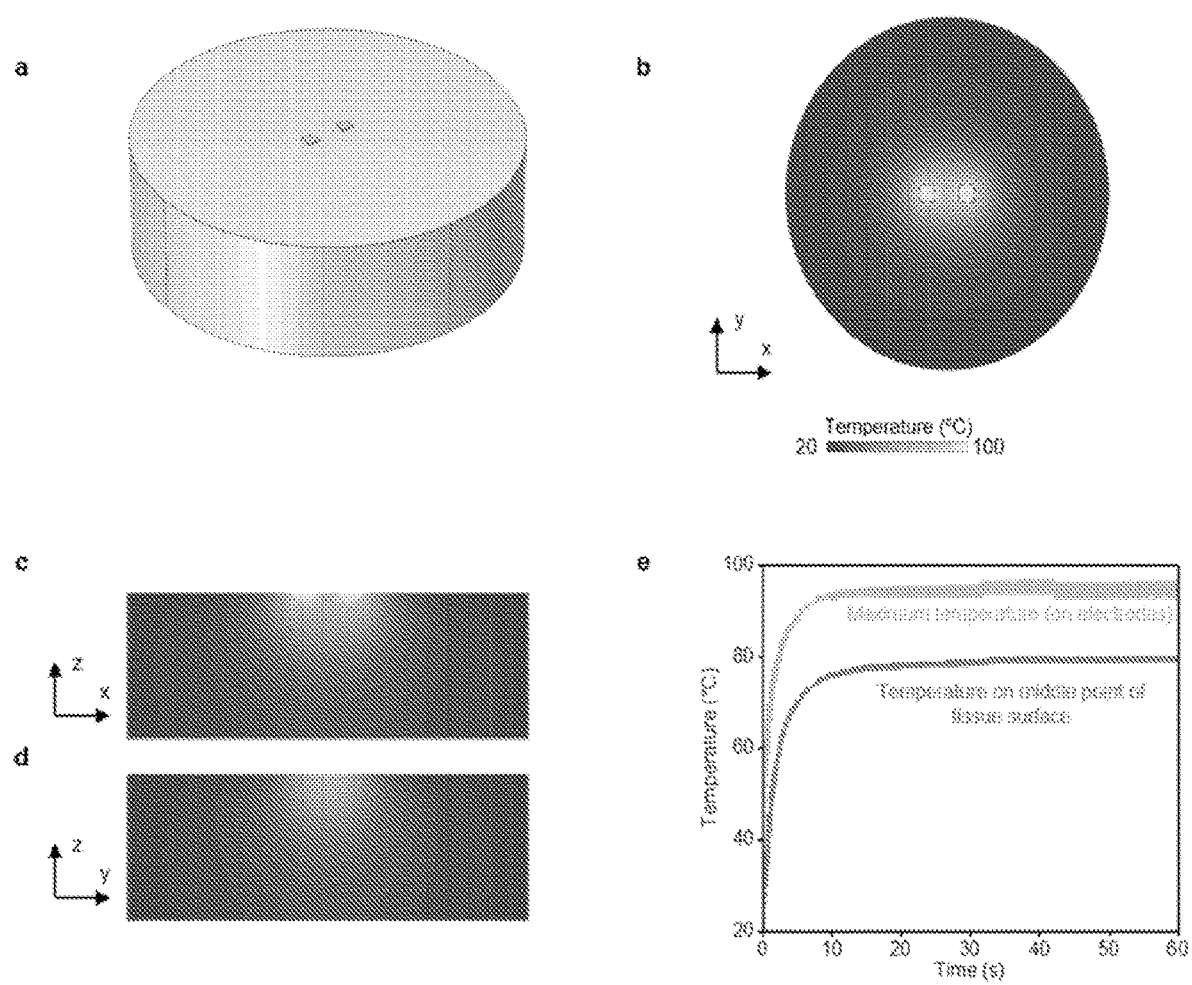

FIG. 55 shows FEA results of the temperature distribution determined by coupled thermal and electrical modelling of the ablation process, according to embodiments of the invention. a, Schematic illustration of the model. b, Top view. c, Front view. d, Left view. e, Maximum temperature on electrodes and temperature on middle point of tissue surface during ablation.

Figure 56:
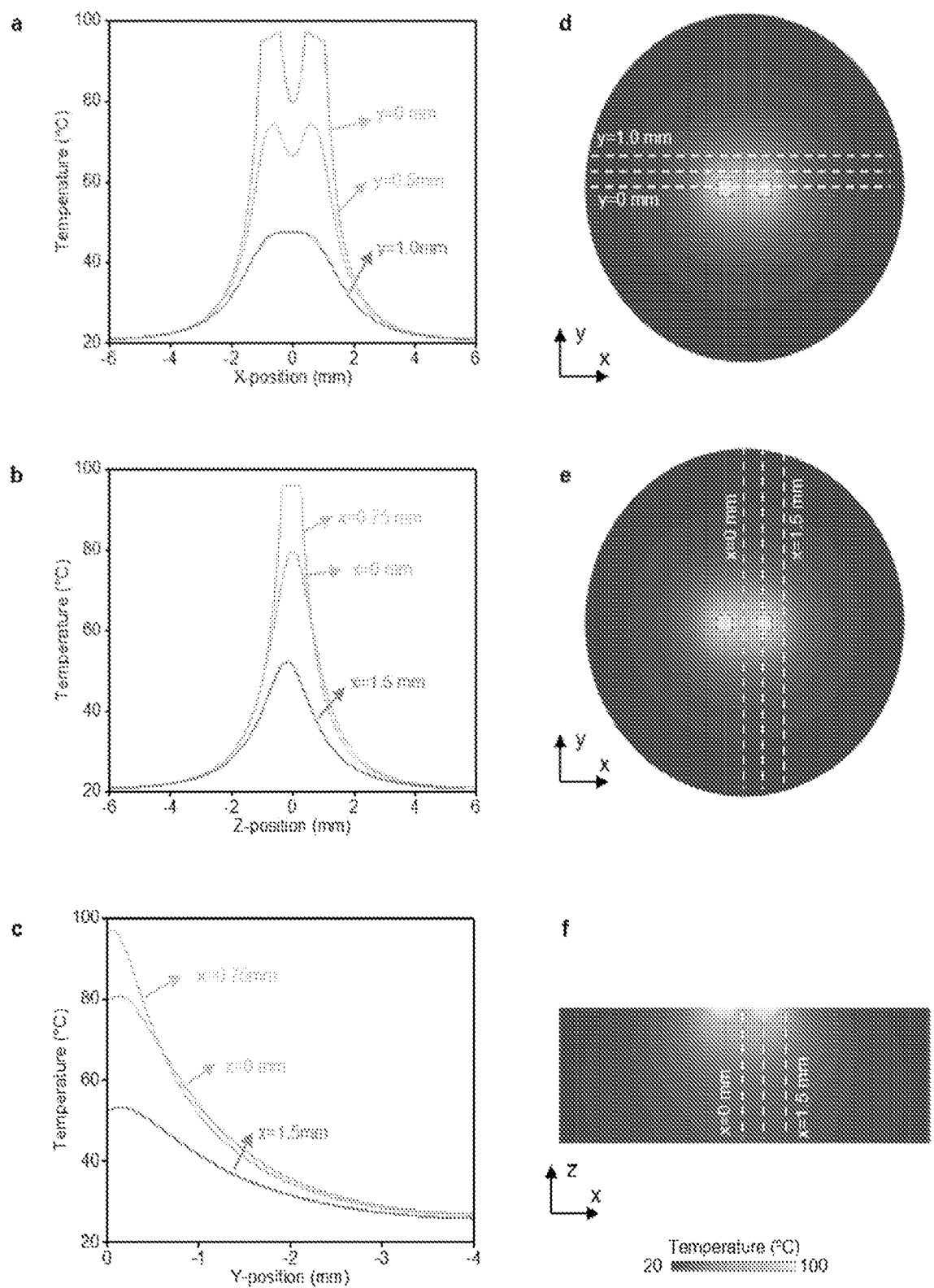

FIG. 56 shows FEA results of the temperature distributions in different directions, according to embodiments of the invention. a, Along X-axis, d, Top view, b, Along Y-axis, e, Top view, c, Along Z-axis, and f, Front view.

Figure 57:
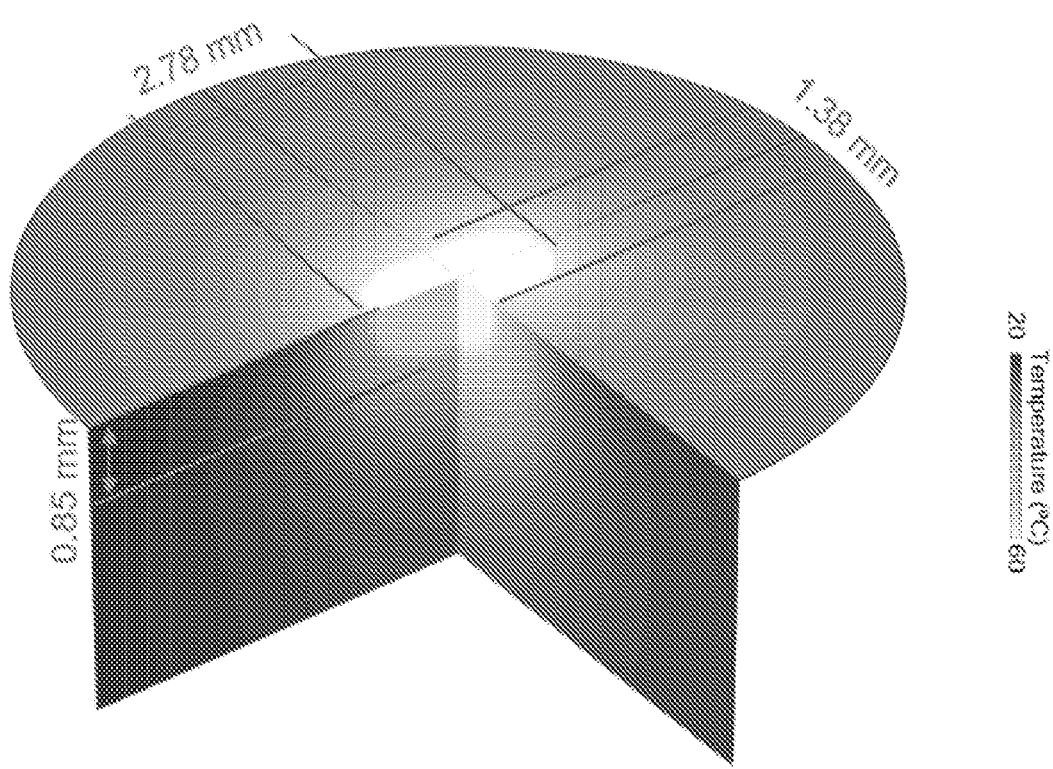

FIG. 57 shows FEA results of temperature distribution under bipolar RF ablation on non-perfused tissue, according to embodiments of the invention.

Figure 58:
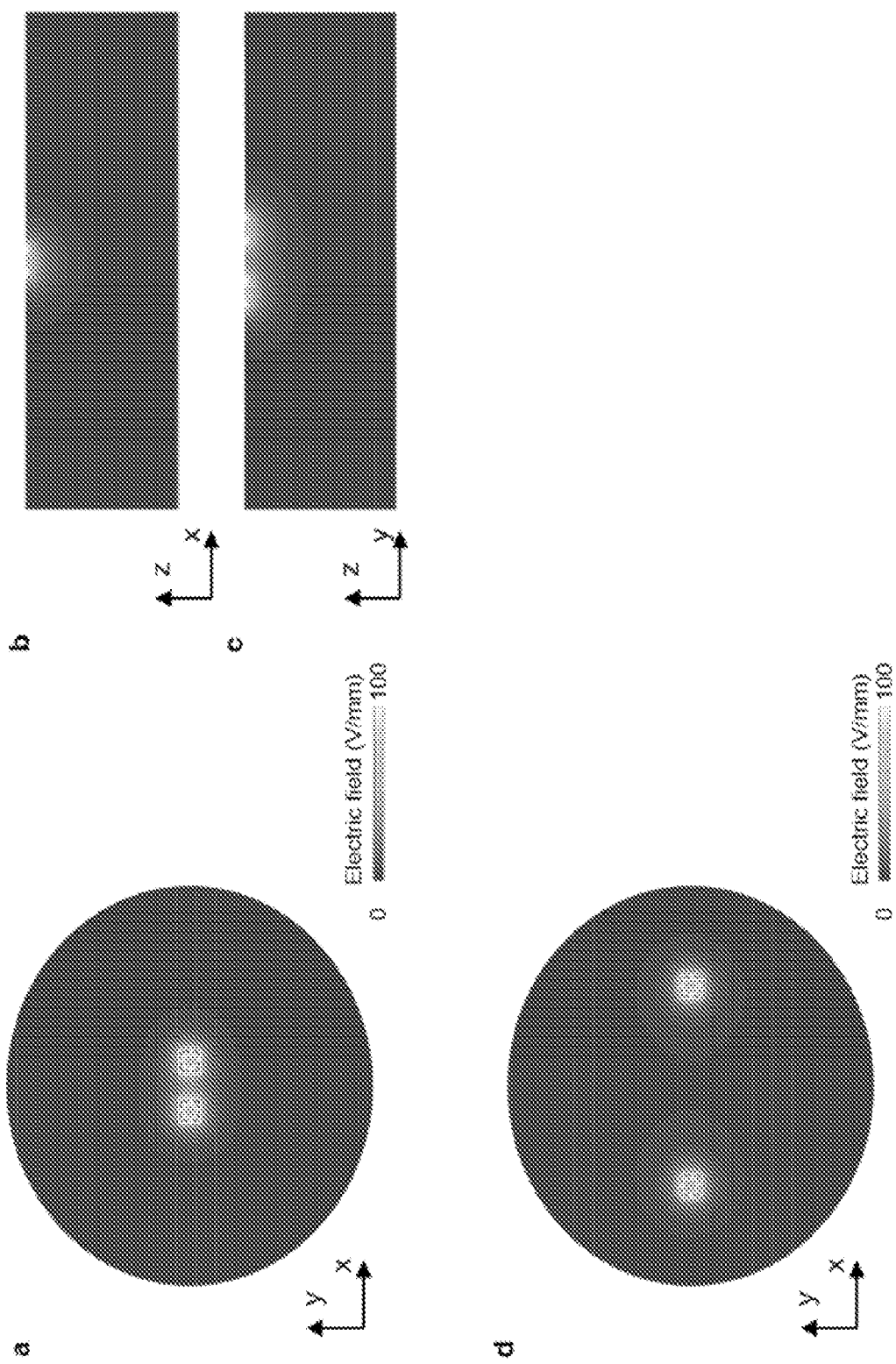

FIG. 58 shows FEA results of electric filed distributions determined by coupled thermal and electrical modelling of the ablation process, according to embodiments of the invention. a-c, Top view (a), front view (b), and left view (c) with electrode spacing of 1.5 mm. d, Top view with electrode spacing of 6 mm.

Figure 59:
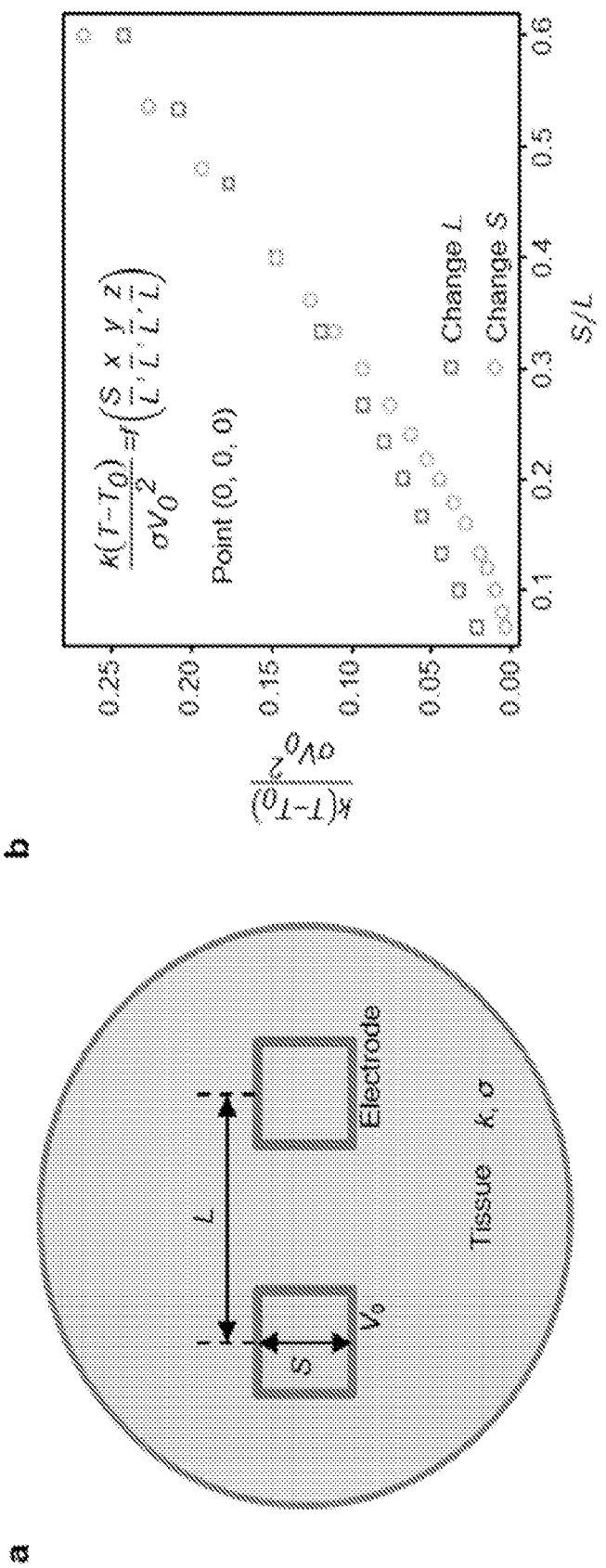

FIG. 59 shows FEA validation of the scaling law for steady-state bipolar tissue ablation without consideration of the substrate underneath the electrodes, according to embodiments of the invention. a, Schematic illustration of the tissue ablation model. L is the distance between adjacent electrodes, S is the side length of the electrodes, $V_0$ is the applied potential, k and σ are thermal conductivity and electric conductivity of the tissue, respectively. b, Normalized temperature vs. normalized geometry parameters. $T_0$ is the initial temperature, T is the temperature after ablation, x, y, z are the positions in Cartesian coordinates, respectively. The results in (b) correspond to the case where x=y=z=0.

Figure 60:
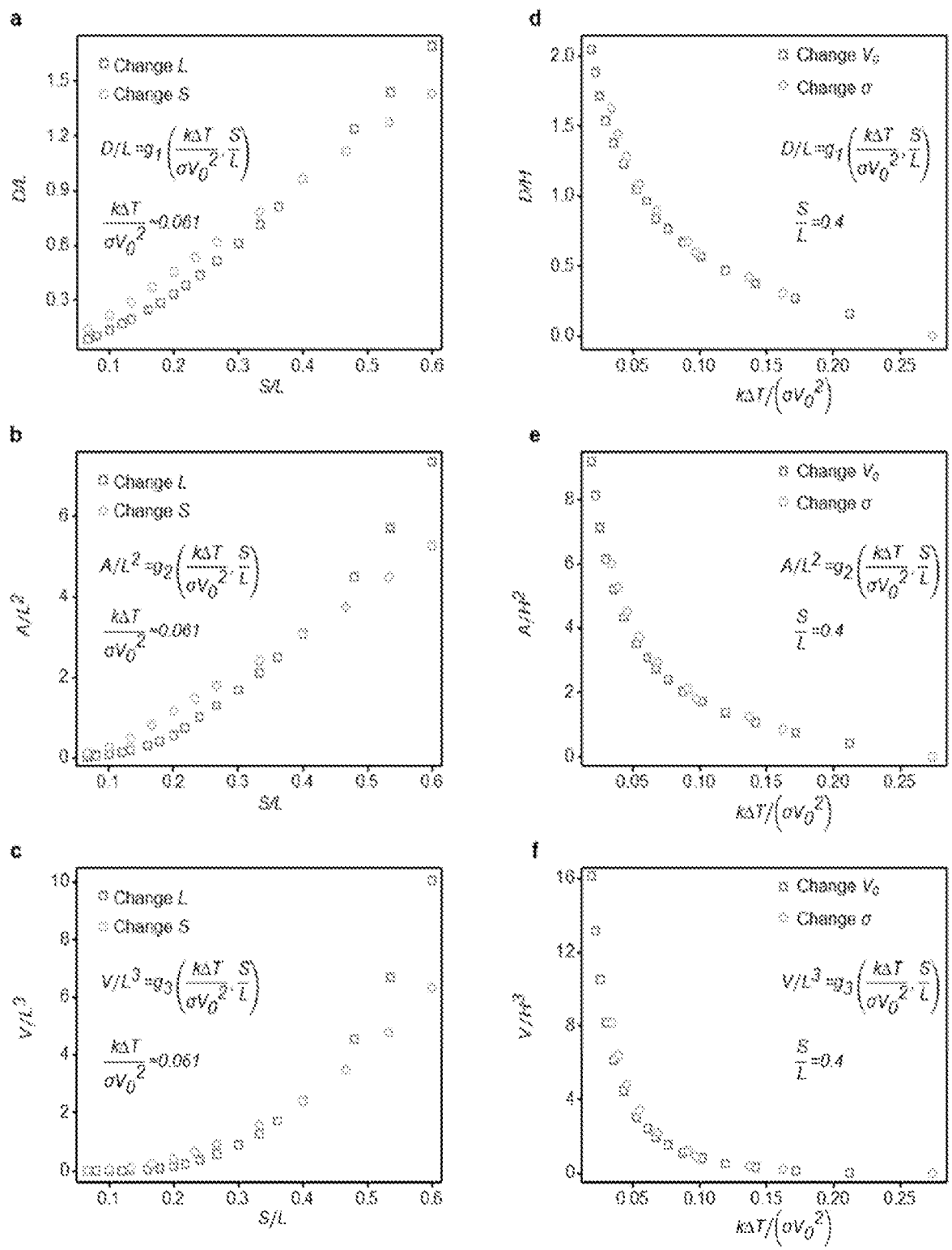

FIG. 60 shows FEA validation of the scaling law for steady-state bipolar tissue ablation without consideration of the substrate underneath the electrodes, according to embodiments of the invention. a-c, Normalized lesion size vs. normalized geometry parameters. D, A, and V are the lesion depth (under the electrode), area, and volume, respectively. L is the distance between adjacent electrodes, S is the side length of the electrodes. d-f, Normalized lesion size vs. normalized physical parameters. $V_0$ is the applied potential, k and σ are thermal conductivity and electric conductivity of the tissue, respectively. ΔT is the temperature difference between lesion temperature ($T_c$=60° C.) and the initial temperature ($T_0$).

Figure 61:
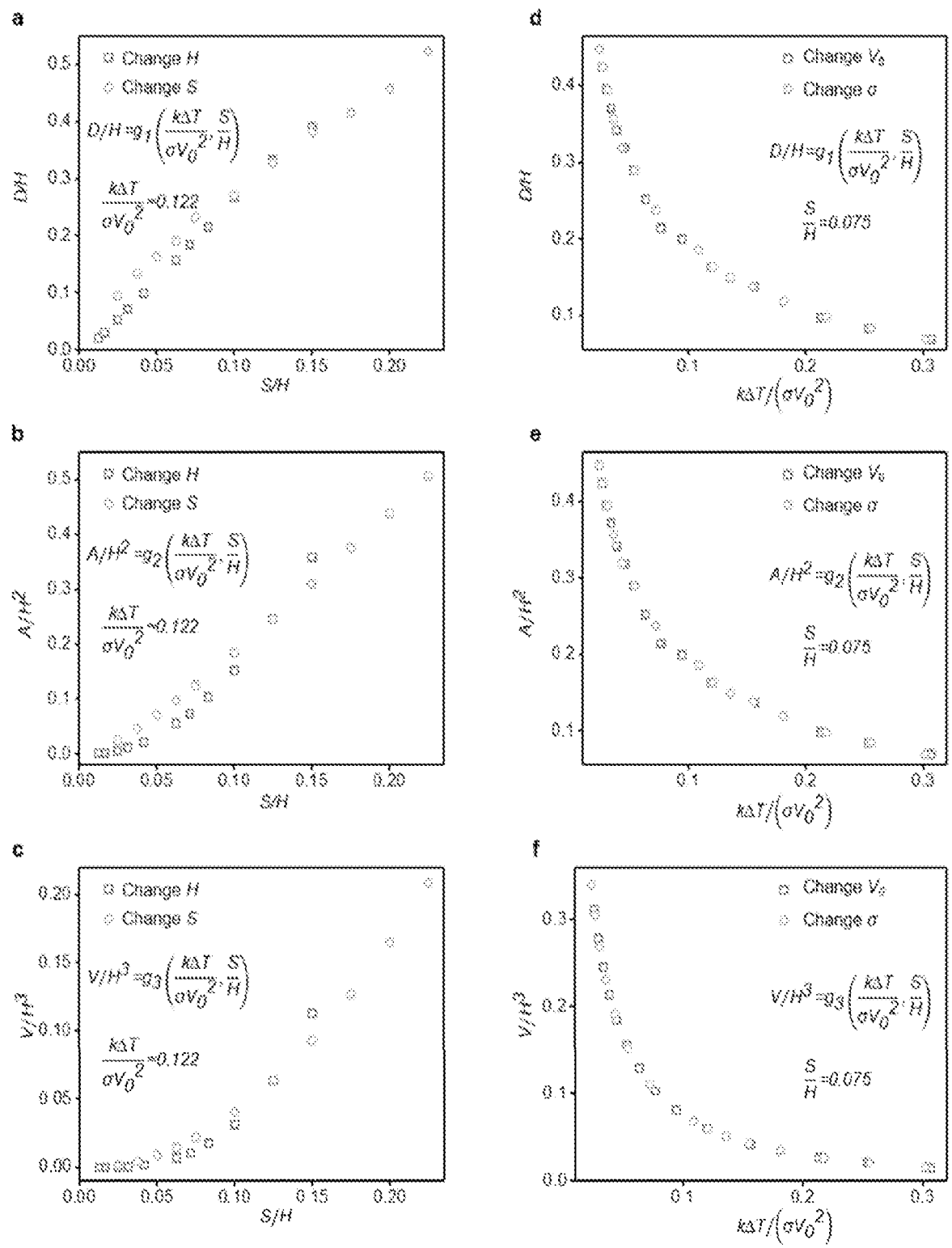

FIG. 61 shows FEA validation of the scaling law for steady-state monopolar tissue ablation without consideration of the substrate underneath the electrodes, according to embodiments of the invention. a-c, Normalized lesion size vs. normalized geometry parameters. D, A, and V are the lesion depth (under the electrode), area, and volume, respectively. H is the tissue thickness, S is the side length of the electrodes. d-f, Normalized lesion size vs. normalized physical parameters. $V_0$ is the applied potential, k and σ are thermal conductivity and electric conductivity of the tissue, respectively. ΔT is the temperature difference between lesion temperature ($T_c$=60° C.) and the initial temperature ($T_0$).

Figure 62:
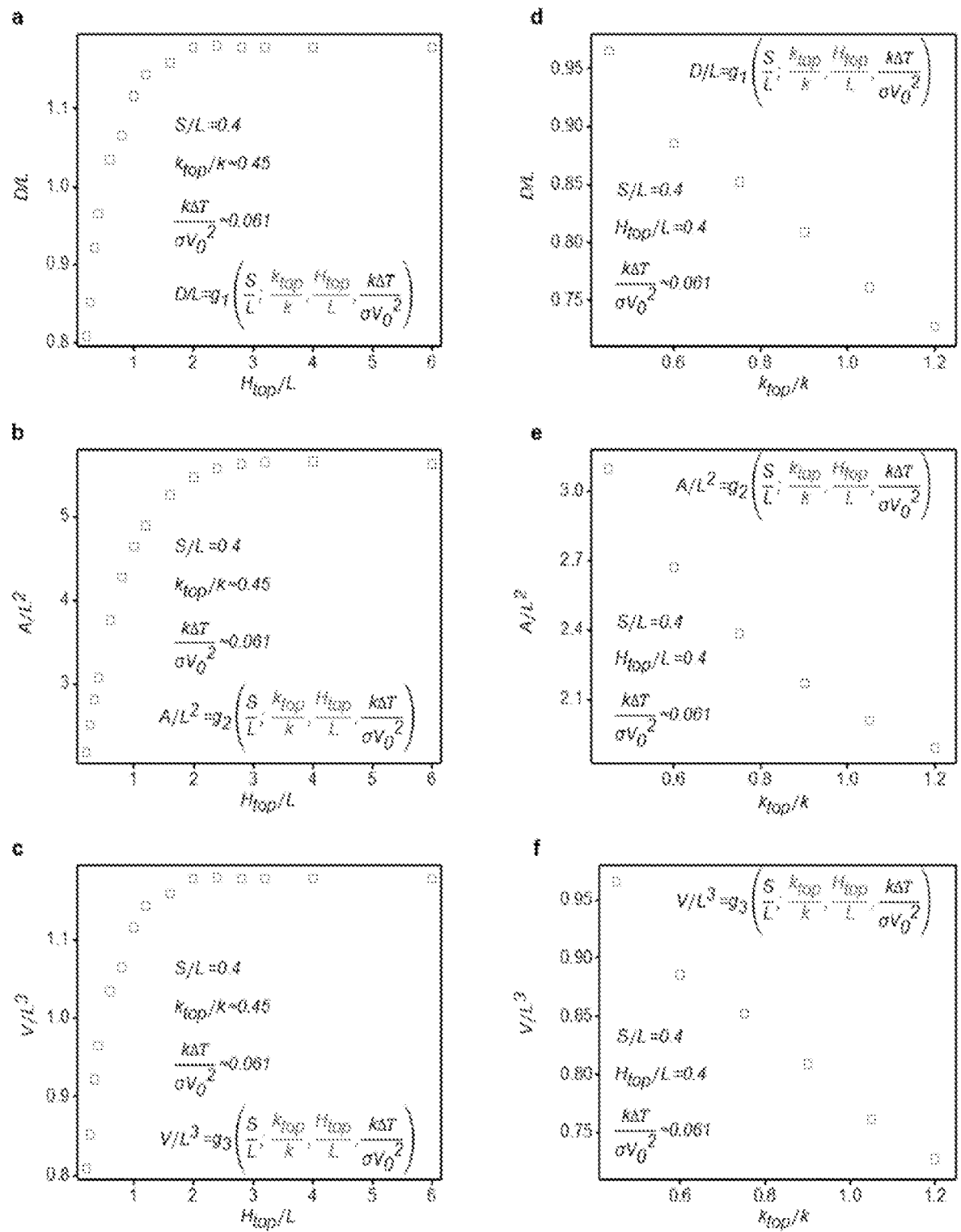

FIG. 62 shows influence of substrate underneath the electrodes on steady-state bipolar tissue ablation, according to embodiments of the invention. a-c, Normalized lesion size vs. normalized thickness of substrate under the electrode. D, A, and V are the lesion depth (under the electrode), area, and volume, respectively. $H_{top}$ is the thickness of the substrate under the electrodes, L is the distance between adjacent electrodes, S is the side length of the electrodes. d-f, Normalized lesion size vs. normalized thermal conductivity of substrate under the electrode. $k_{top}$ is the thermal conductivity of the substrate under the electrode, k and σ are thermal conductivity and electric conductivity of the tissue, respectively. $V_0$ is the applied potential. ΔT is the temperature difference between the lesion temperature ($T_c$=60° C.) and the initial temperature ($T_0$).

Figure 63:
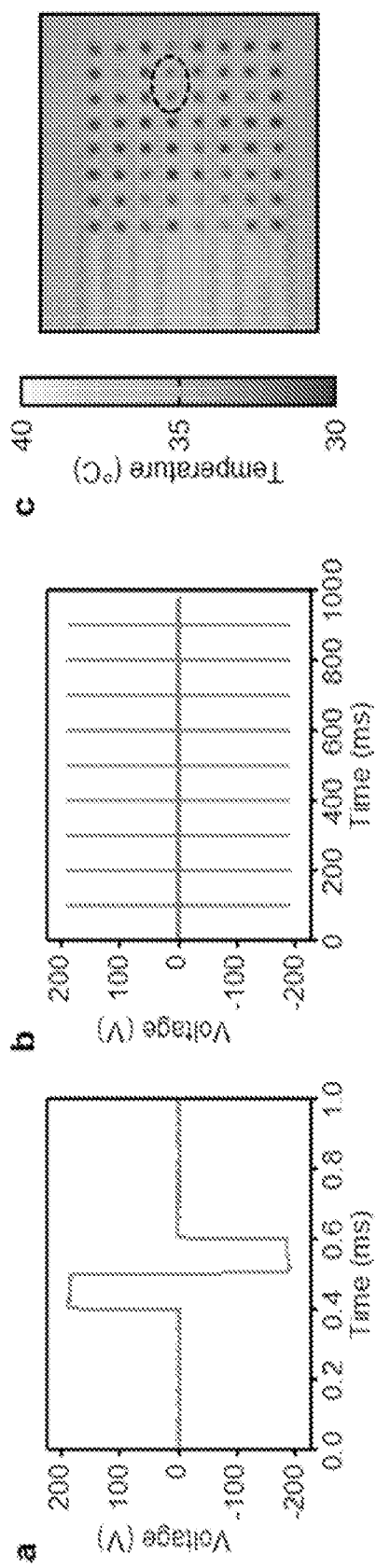

FIG. 63 shows a typical input signal for electroporation. a, Waveform of the input pulse for electroporation, according to embodiments of the invention. b, Waveform of the input pulses applied at a frequency of 10 Hz. c, Temperature distribution (measured from an IR microscope) under electroporation with 1 Hz, about 200 V biphasic pulses (pulse duration: 100 μs). The black dashed circle indicates the electrodes with input pulse for electroporation.

Figure 64:
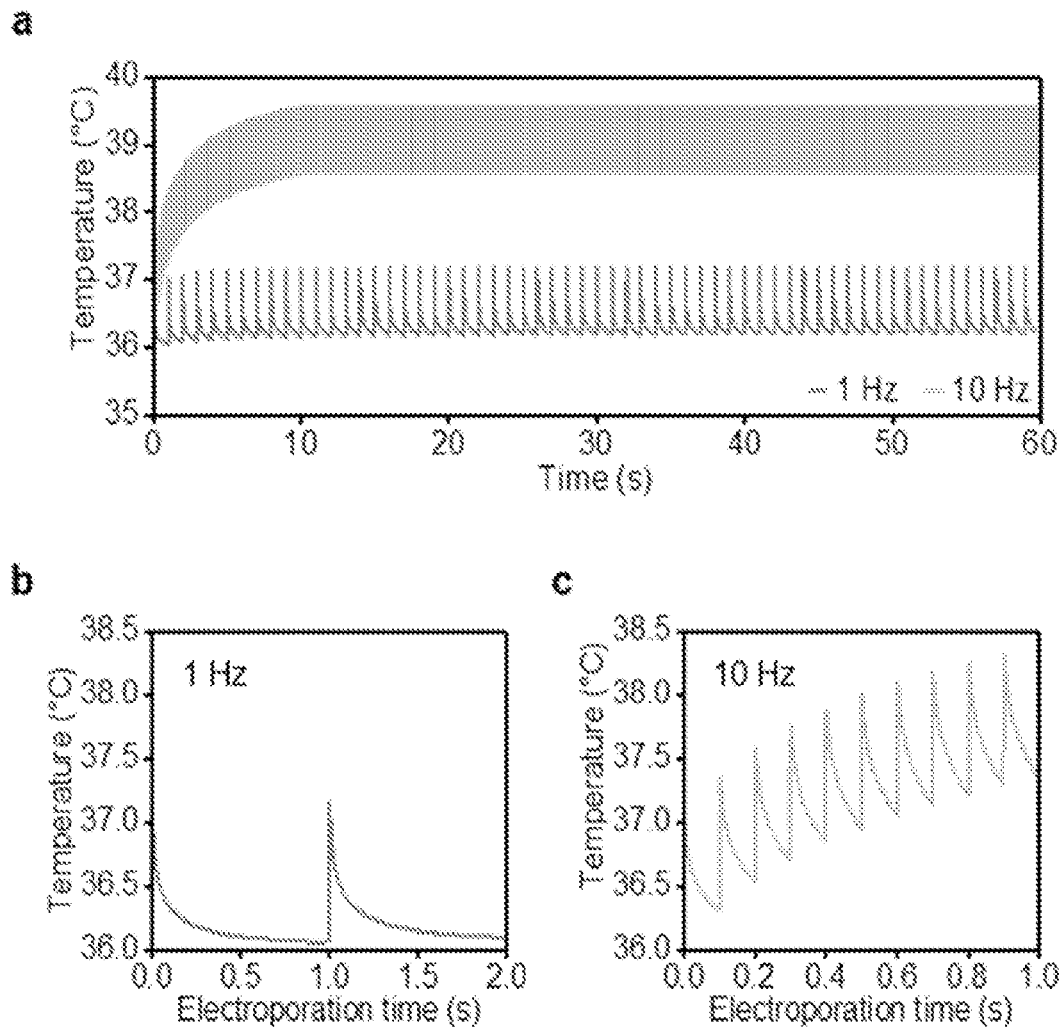

FIG. 64 shows FEA results of the temperature profiles during electroporation at 1 and 10 Hz, according to embodiments of the invention. a, Temperature profile at 60 s. b, Temperature profile at 2 s during electroporation at 1 Hz. c, Temperature profile at 1 s during electroporation at 10 Hz.

Figure 65:
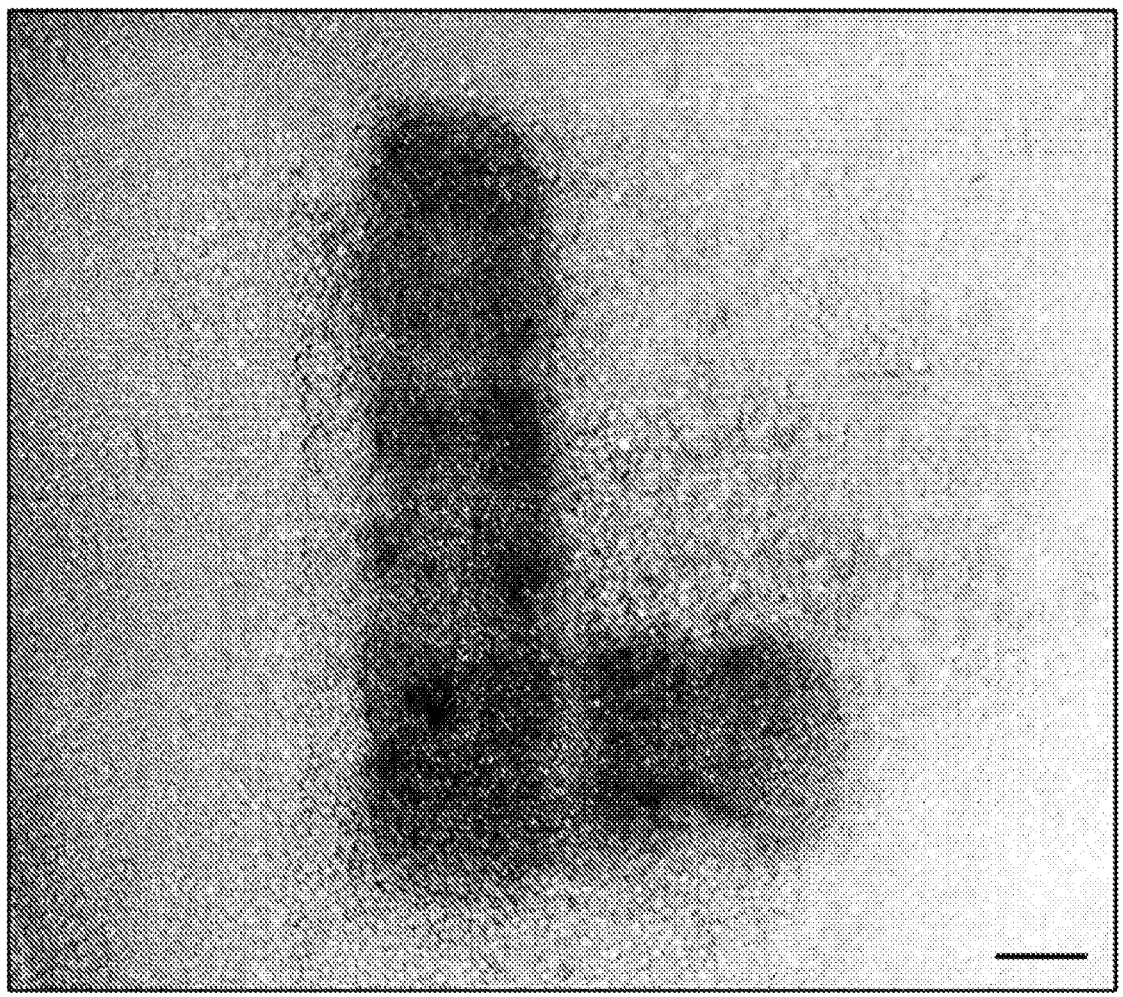

FIG. 65 shows multiple lesions formed on a potato through electroporation, according to embodiments of the invention. Input signals are biphasic pulses with a duration of 100 μs, a frequency of 1 Hz, an amplitude of 200 V. Scale bar, 1 mm.

Figure 66:
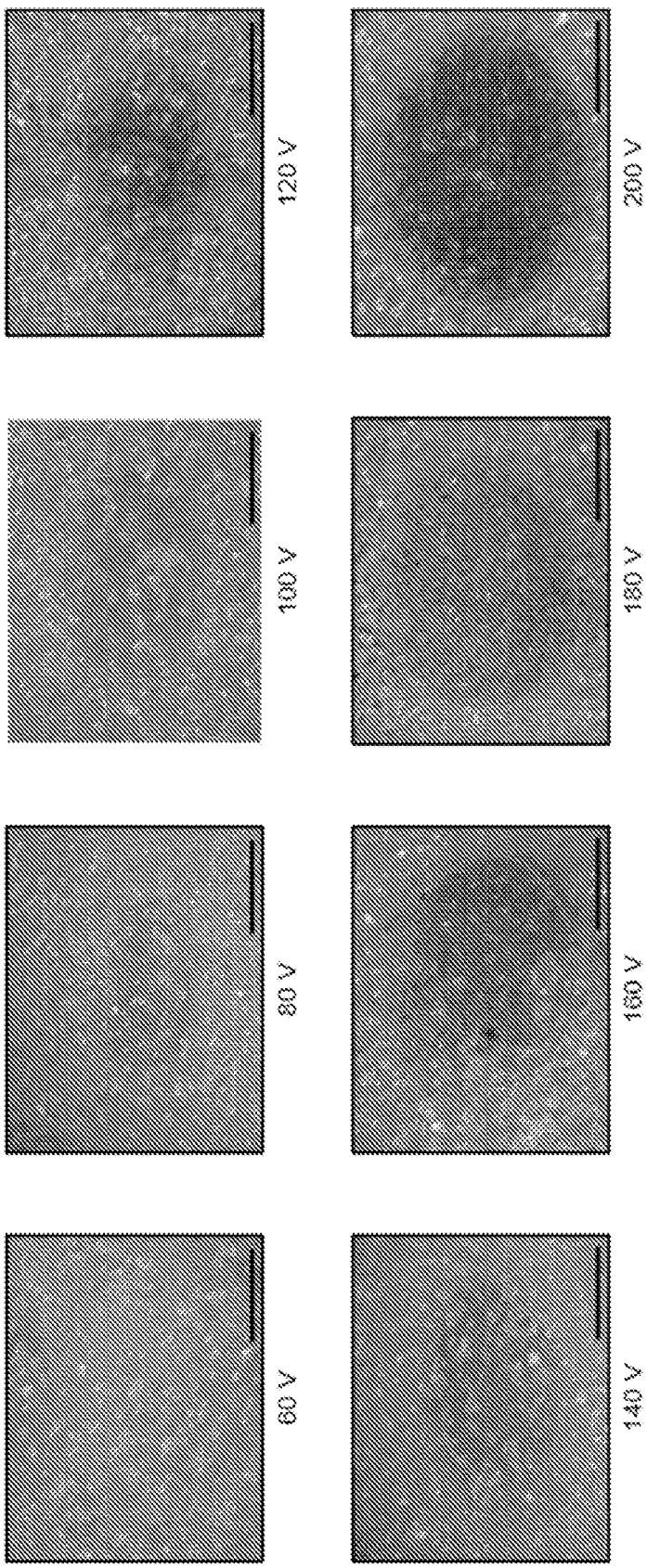

FIG. 66 shows pictures of the potatoes after electroporation with two adjacent electrodes on the electrode array, according to embodiments of the invention. Input signals are biphasic pulses with a duration of 100 μs, a frequency of 1 Hz, and amplitudes ranging from 60 V to 200 V. Red dashed circles indicate regions of the lesions after electroporation. Scale bars, 1 mm.

Figure 67:
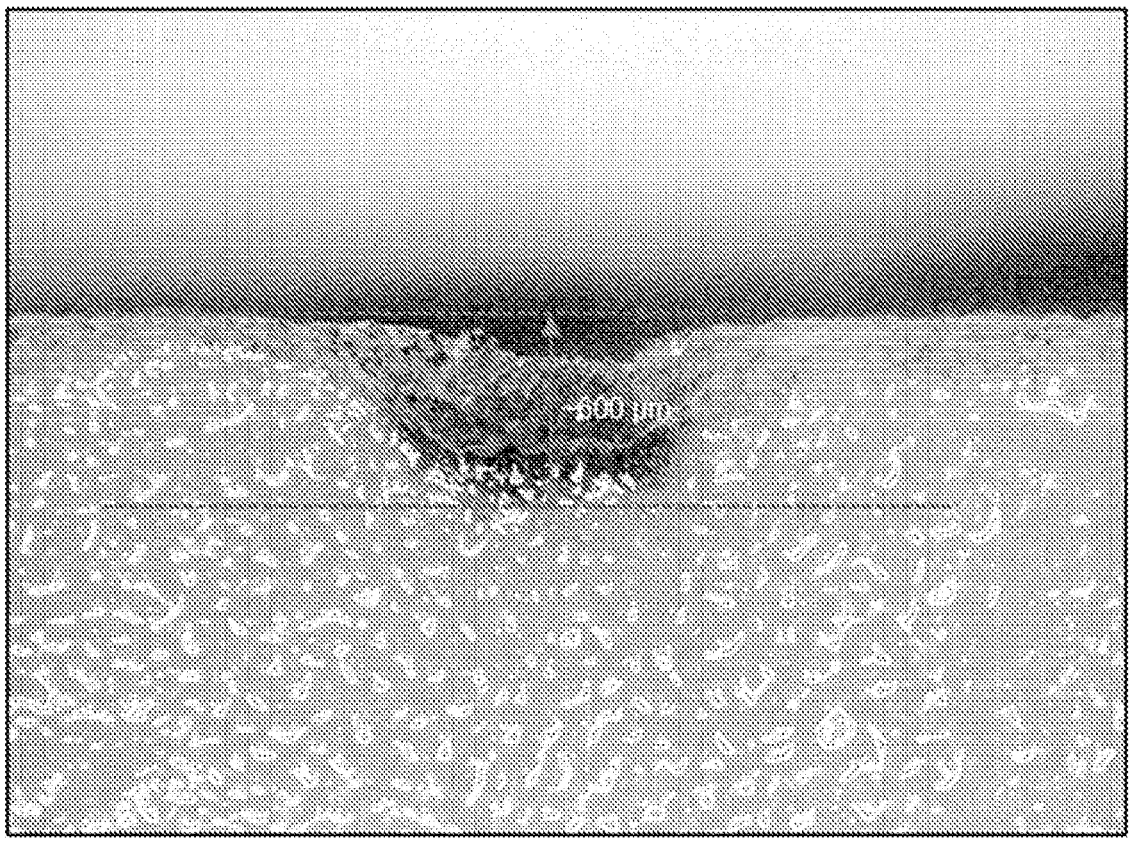

FIG. 67 shows a side view of a lesion created through electroporation on a potato model, according to embodiments of the invention. The input biphasic pulse has a duration of 100 μs, a frequency of 1 Hz, an amplitude of 200 V. Scale bar, 1 mm.

Figure 68:
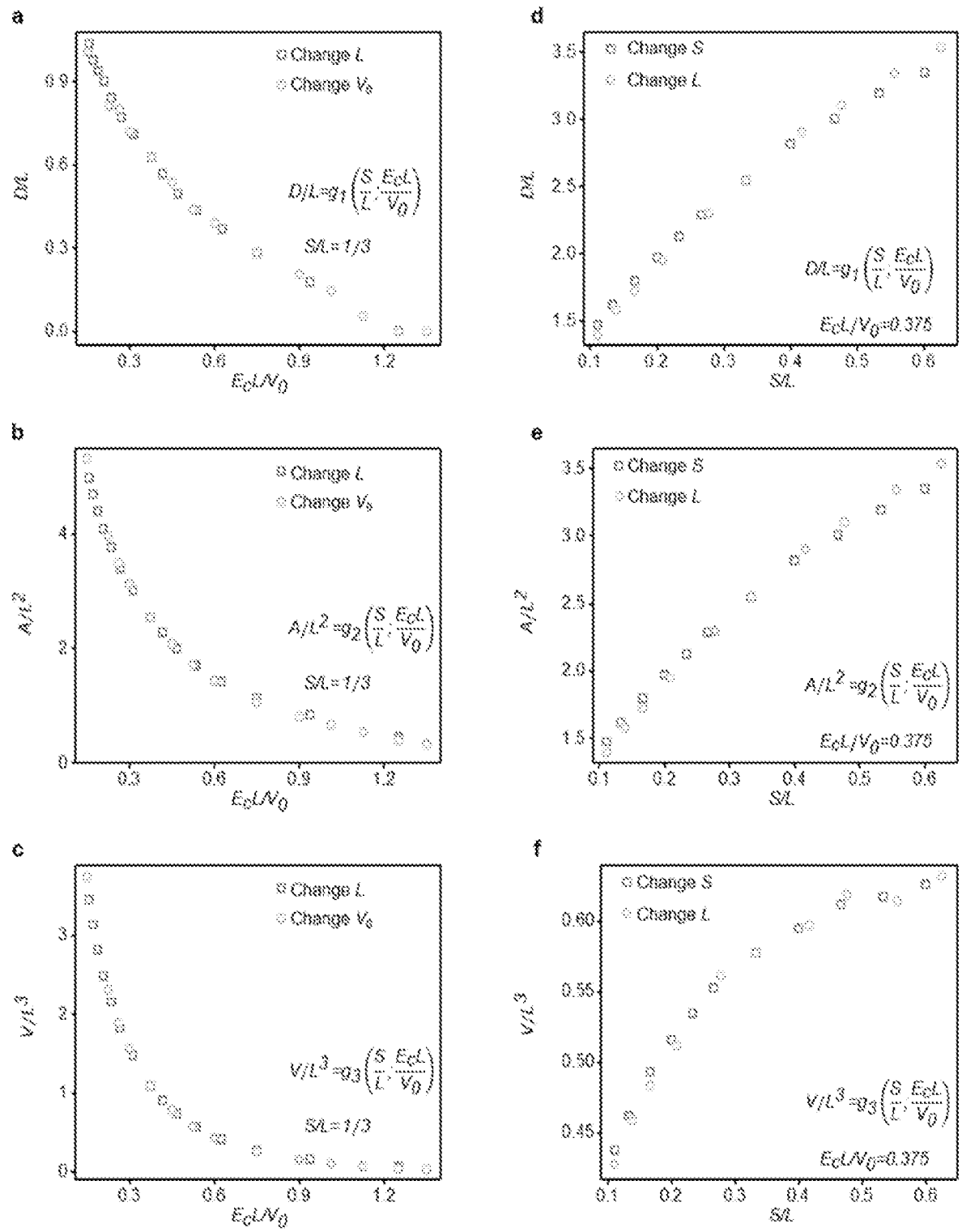

FIG. 68 shows FEA validation of the scaling law for potato electroporation with two adjacent electrodes, according to embodiments of the invention. a-c, Normalized lesion size vs. normalized physical parameters. D, A, and V are the lesion depth (under the electrode), area, and volume, respectively. $E_c$ is the critical electrical intensity (500 V/cm) that causes the potato damage. V0 is the applied potential, L is the distance between adjacent electrodes, S is the side length of the electrodes. d-f, Normalized lesion size vs. normalized geometry parameters.

Figure 69:
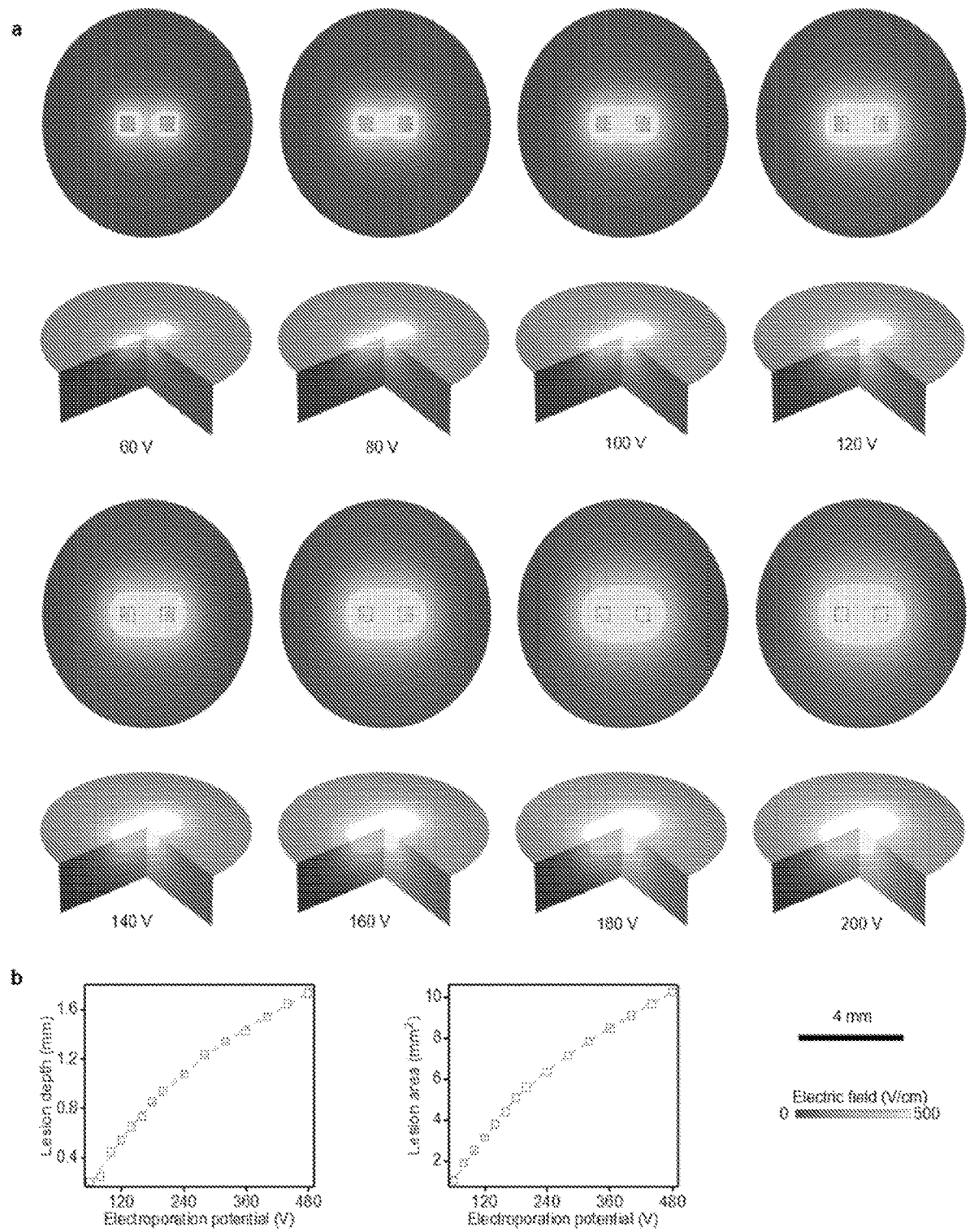

FIG. 69 shows FEA results of electroporation on a potato model, according to embodiments of the invention. a, Electric field distribution under different applied voltages. b, Dependence of lesion depth and area (on potato surface) on the applied voltages.

Figure 70:
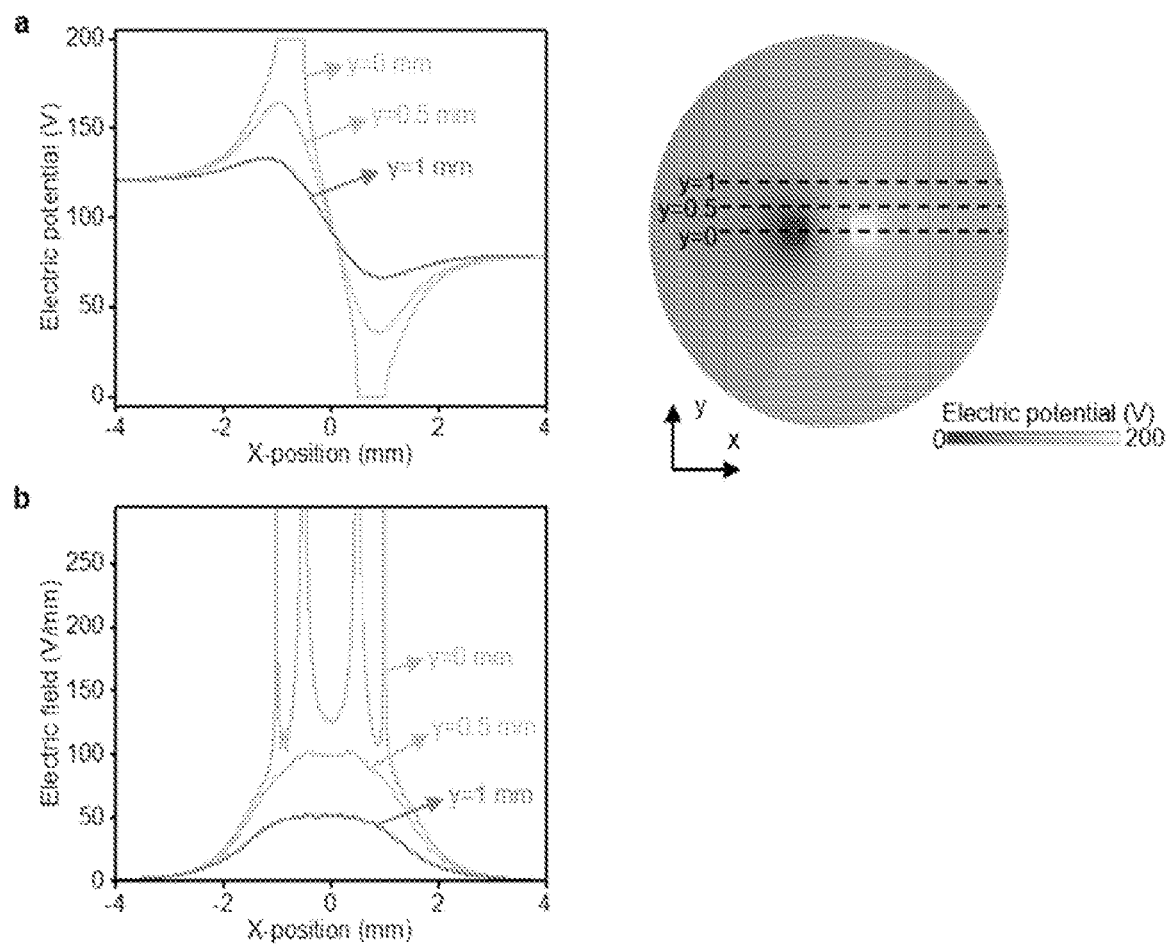

FIG. 70 shows FEA results of the distributions of electric potential and electric field along X-axis, according to embodiments of the invention. a, Electric potential distribution. b, Electric field distribution along X-axis. Amplitude of the voltage applied to the electrode is 200 V.

Figure 71:
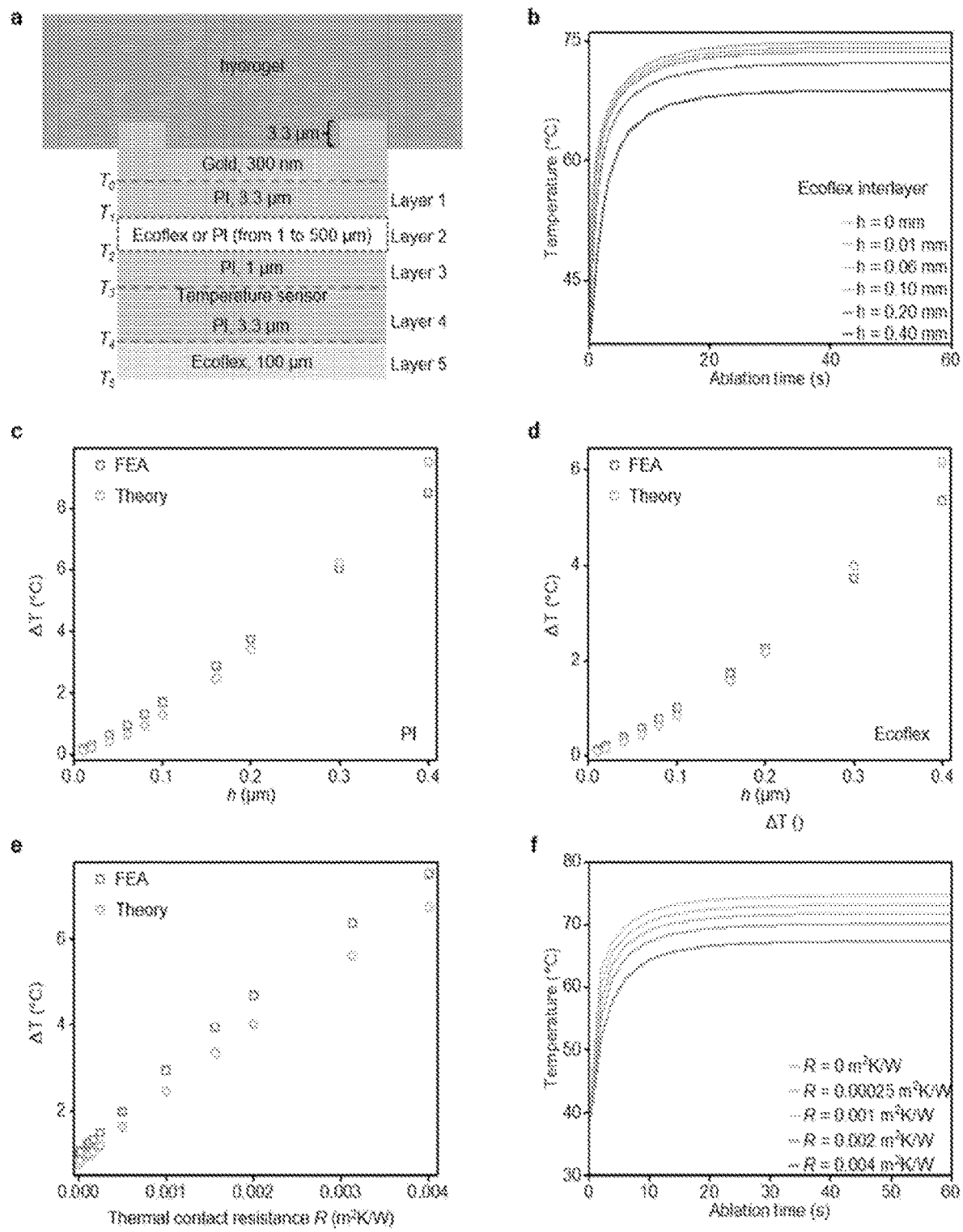

FIG. 71 FEA results of the temperature difference between electrode and temperature sensor, according to embodiments of the invention. a, Schematic illustration of the FEA model. b-d, Dependence of the temperature difference on the thickness of the interlayer polymer (PI or Ecoflex, Layer 2) shown in (a) without considering interface thermal resistance. e, f, Dependence of the temperature difference on the thermal contact resistance (R) around the interlayer polymer (Layer 2 in (a)). The interlayer polymer in (e, f) is a layer of Ecoflex with the thickness of 0.1 mm.

Figure 72:
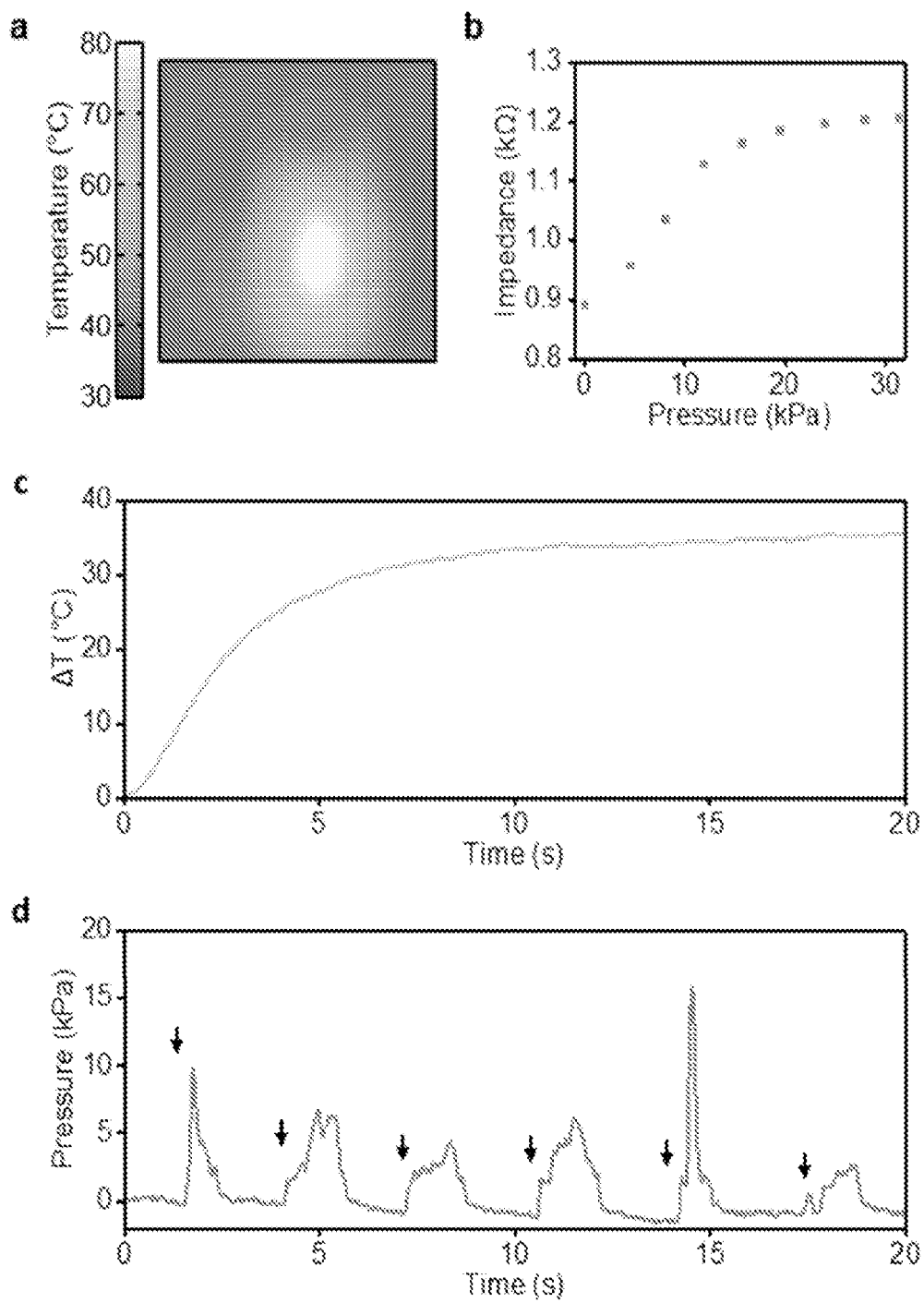

FIG. 72 shows additional results of the simultaneous, multimodal operation of the integrated electrodes, temperature sensors, and pressure sensors, according to embodiments of the invention. a, Spatial temperature distribution from the results in FIG. 3k after a four-order two-dimensional interpolation. b, Influence of pressure on the impedance between the electrode and non-perfused tissue (chicken breast, immersed in 0.1 M PBS). c, Response of the temperature sensor during RF ablation and random pressing. d, Response of the pressure sensor in constantan during RF ablation and random pressing. Conditions of the RF ablation in (c-d): (1) inputting RF signals (0.44 W, 400 kHz) to two adjacent electrodes yields bipolar ablation on non-perfused tissue at room temperature; (2) black arrows in (d) indicate the manual application of normal forces on the non-perfused tissue during ablation.

Figure 73:
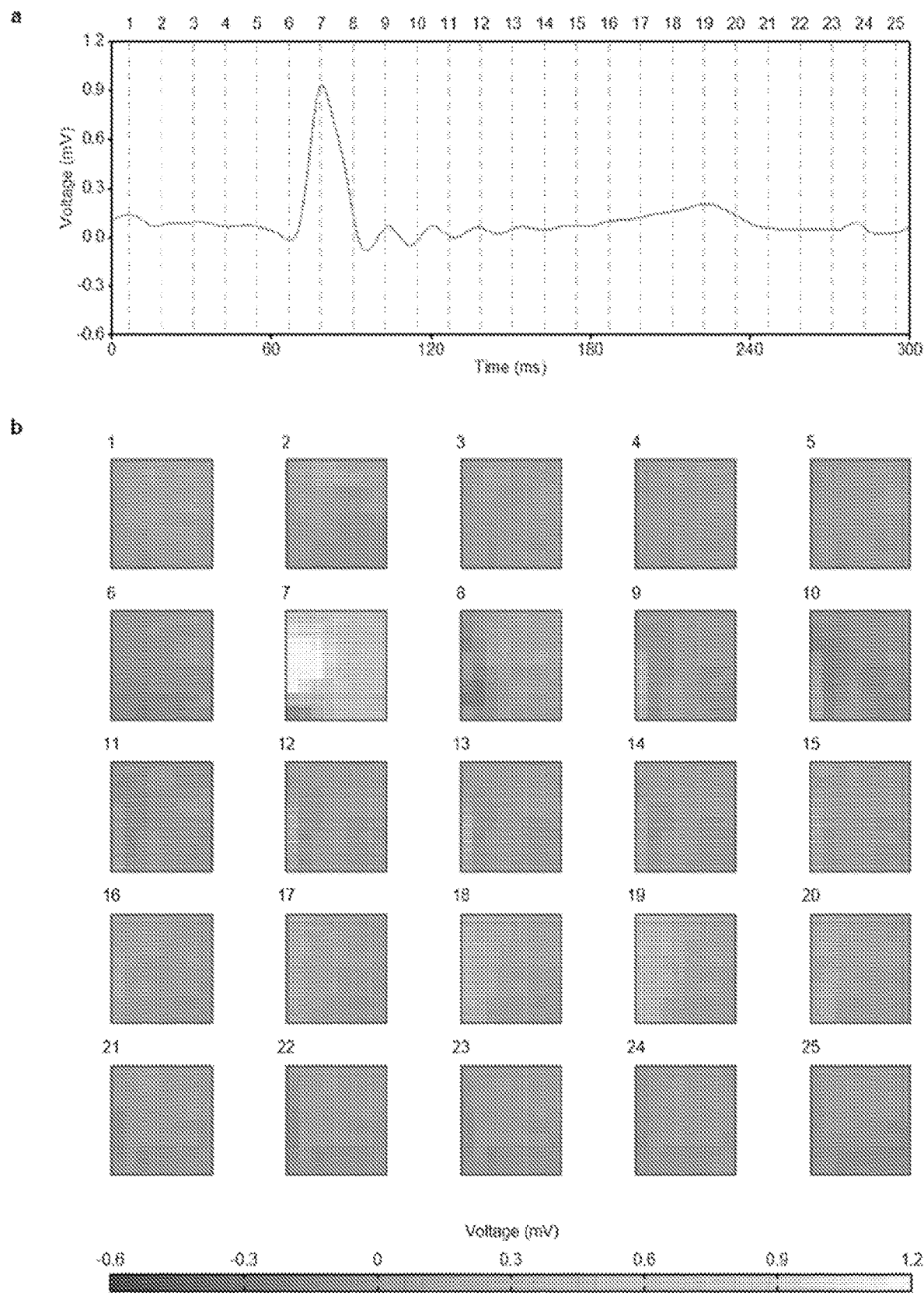

FIG. 73 shows electrogram from a rabbit heart during pacing (200 BPM). a, Electrogram from one electrode. b, Electrogram maps in one pacing cycle.

Figure 74:
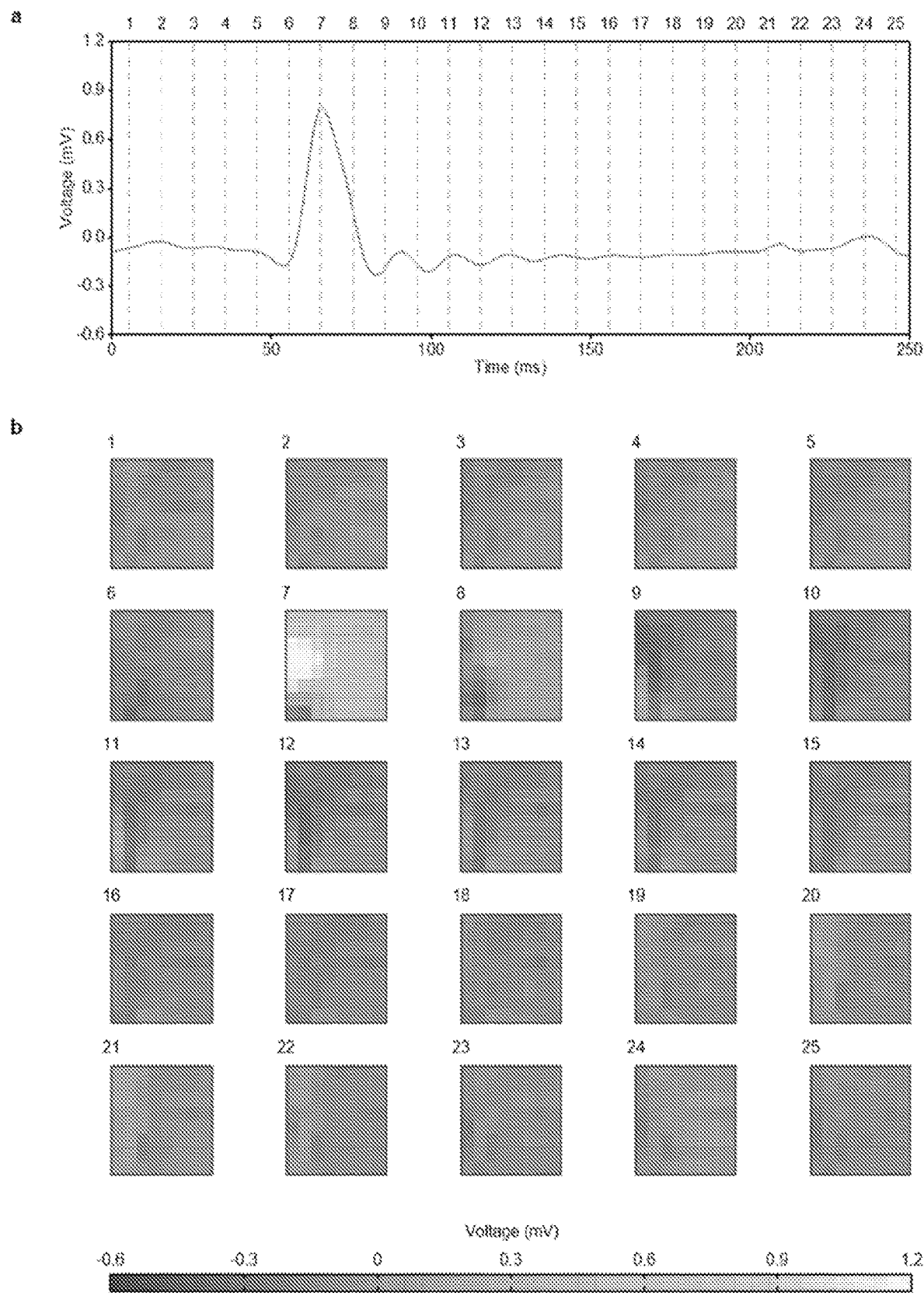

FIG. 74 shows electrogram from a rabbit heart during pacing (240 BPM). a, Electrogram from one electrode. b, Electrogram maps in one pacing cycle.

Figure 75:
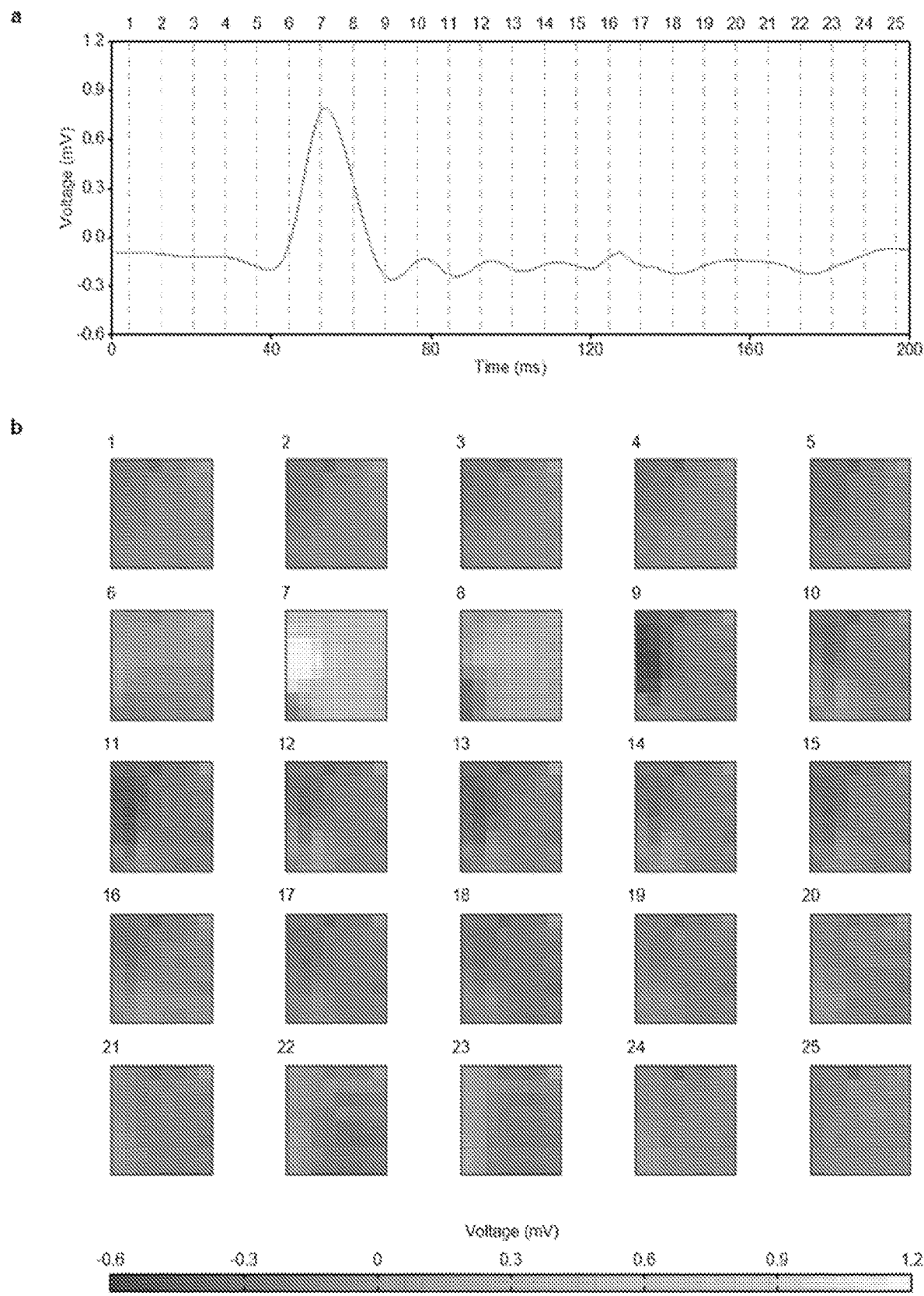

FIG. 75 shows electrogram from a rabbit heart during pacing (300 BPM). a, Electrogram from one electrode. b, Electrogram maps in one pacing cycle.

Figure 76:
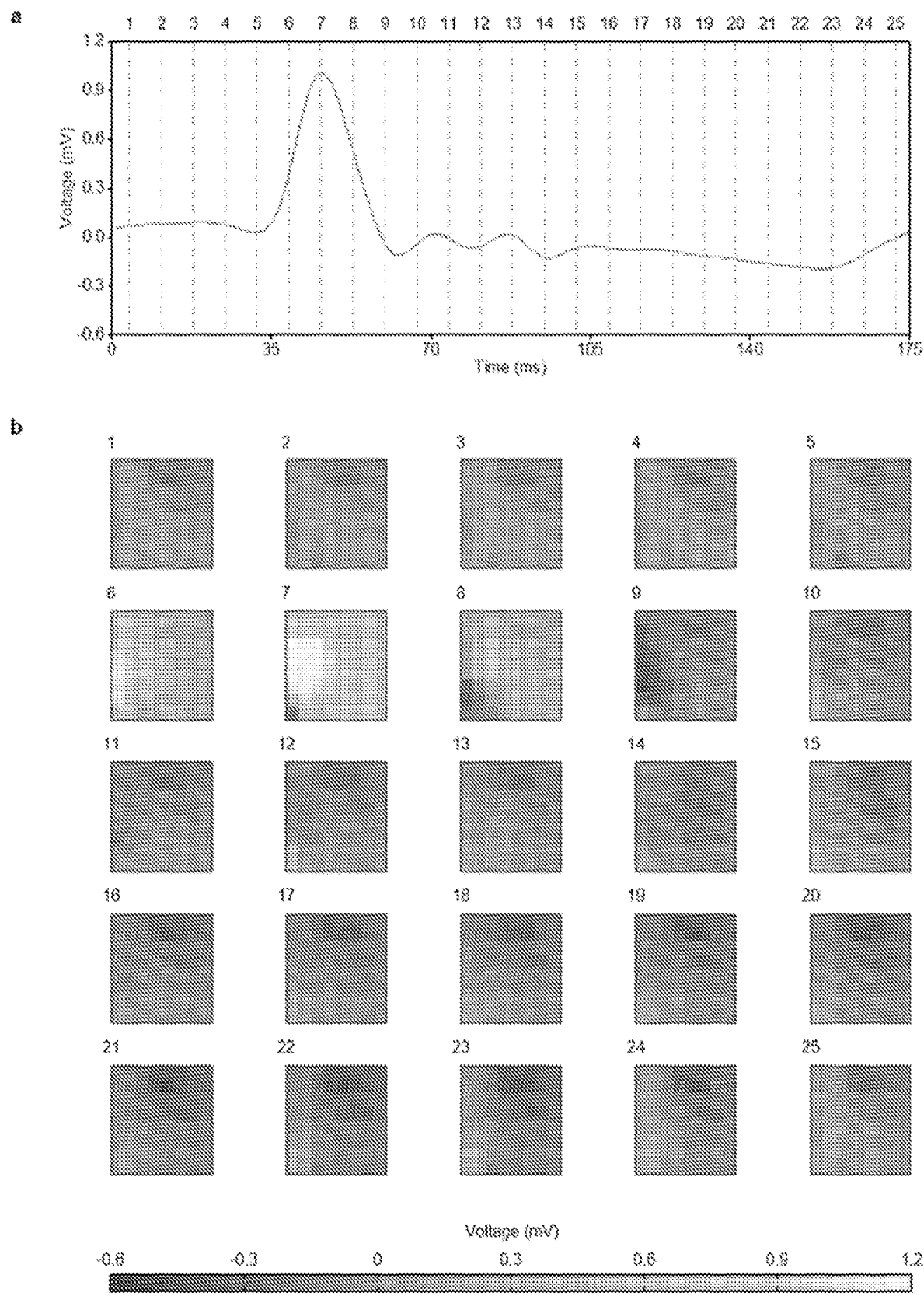

FIG. 76 shows electrogram from a rabbit heart during pacing (343 BPM). a, Electrogram from one electrode. b, Electrogram maps in one pacing cycle.

Figure 77:
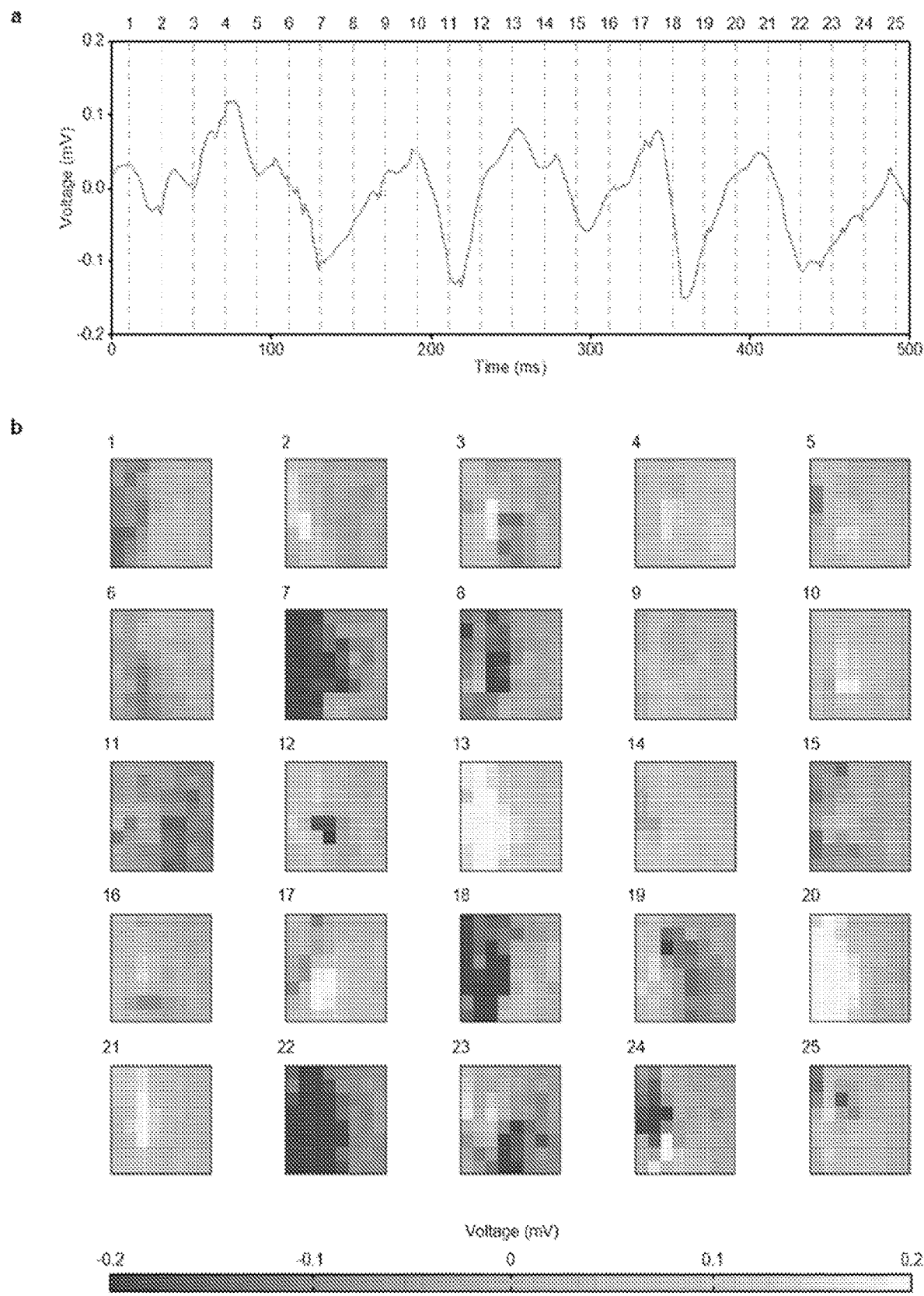

FIG. 77 shows electrogram of rabbit heart during arrhythmia. a, Electrogram from one electrode. b, Electrogram maps.

Figure 78:
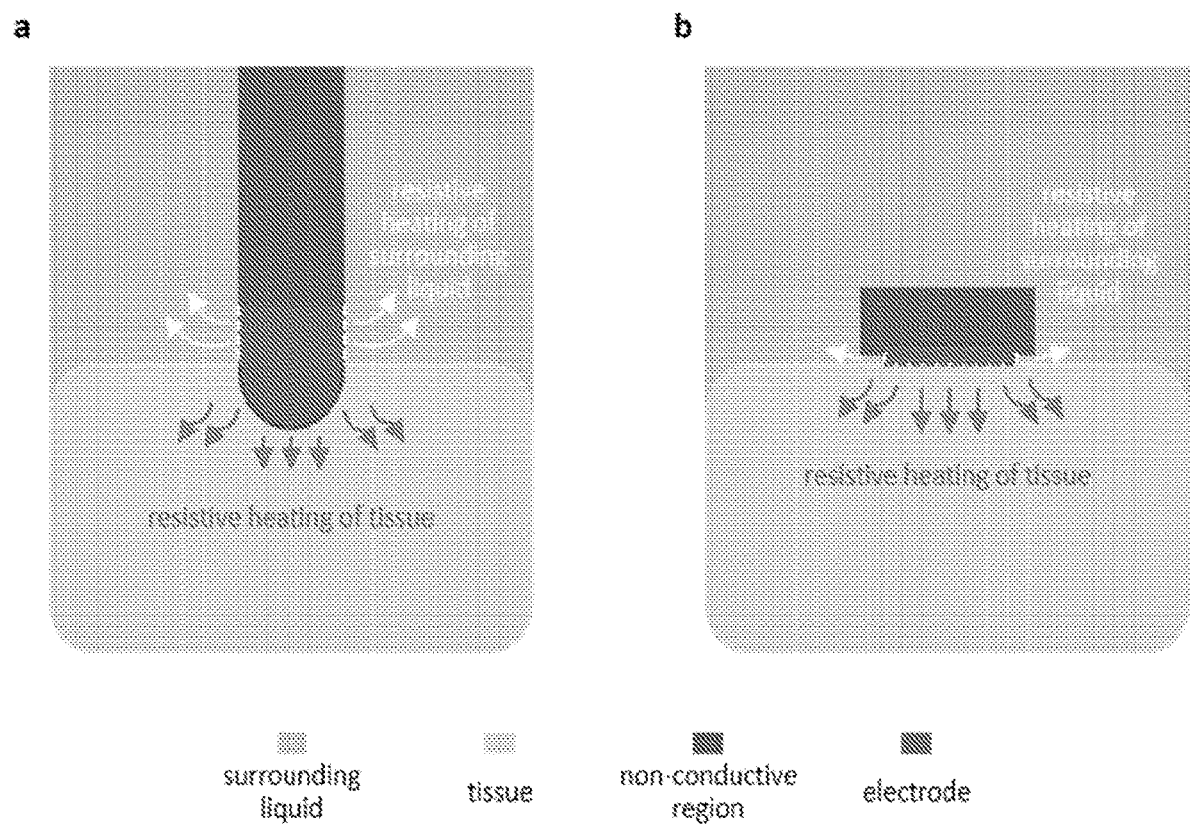

FIG. 78 shows schematic illustrations of the interfaces, according to embodiments of the invention. a, Interfaces between the rigid electrode, the cardiac tissue, and the circulating blood.

b, Interfaces between the soft electrode, the cardiac tissue, and the circulating blood.

Figure 79:
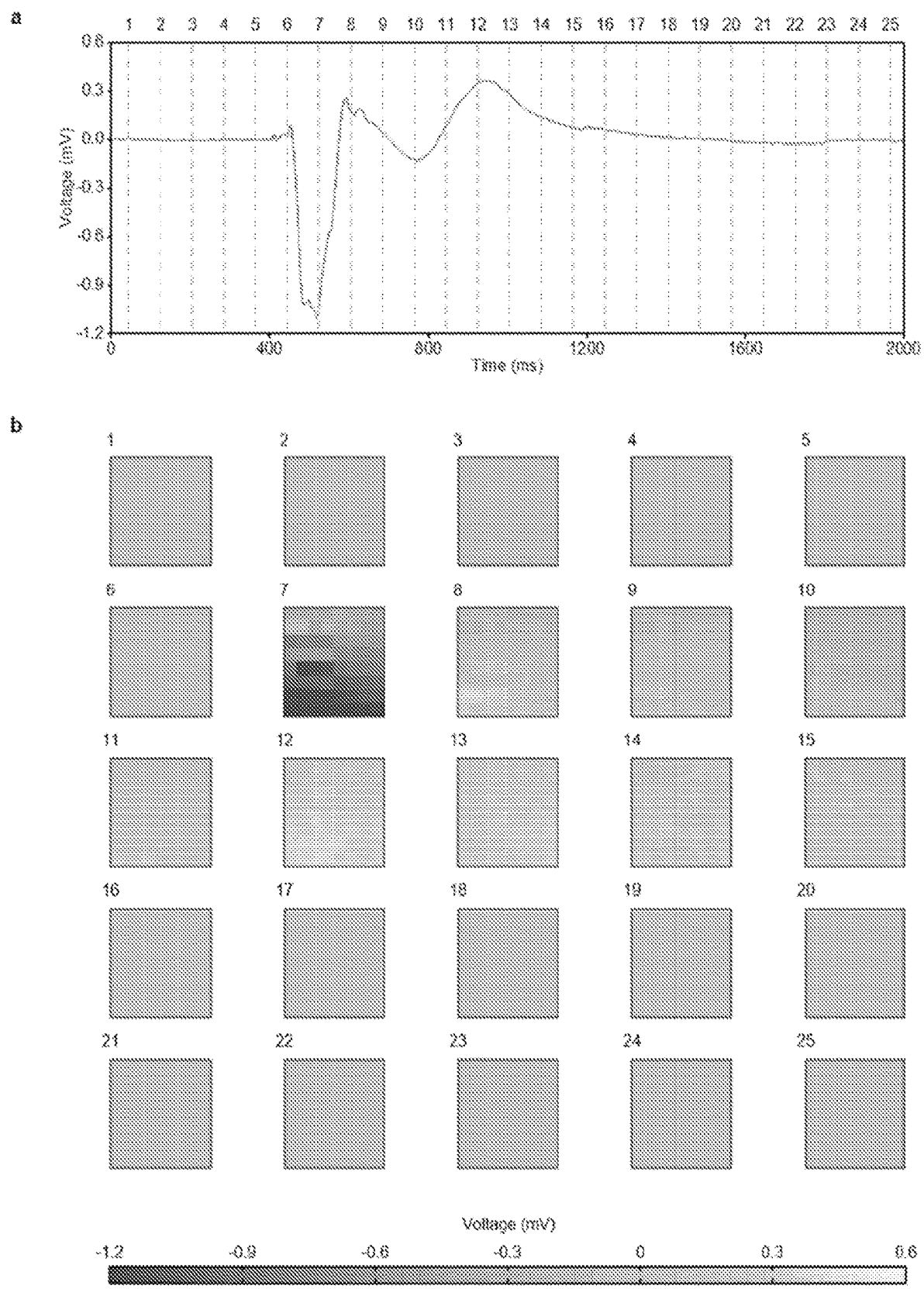

FIG. 79 shows electrogram from a human heart during pacing (30 BPM). a, Electrogram from one electrode. b, Electrogram maps in one pacing cycle.

Figure 80:
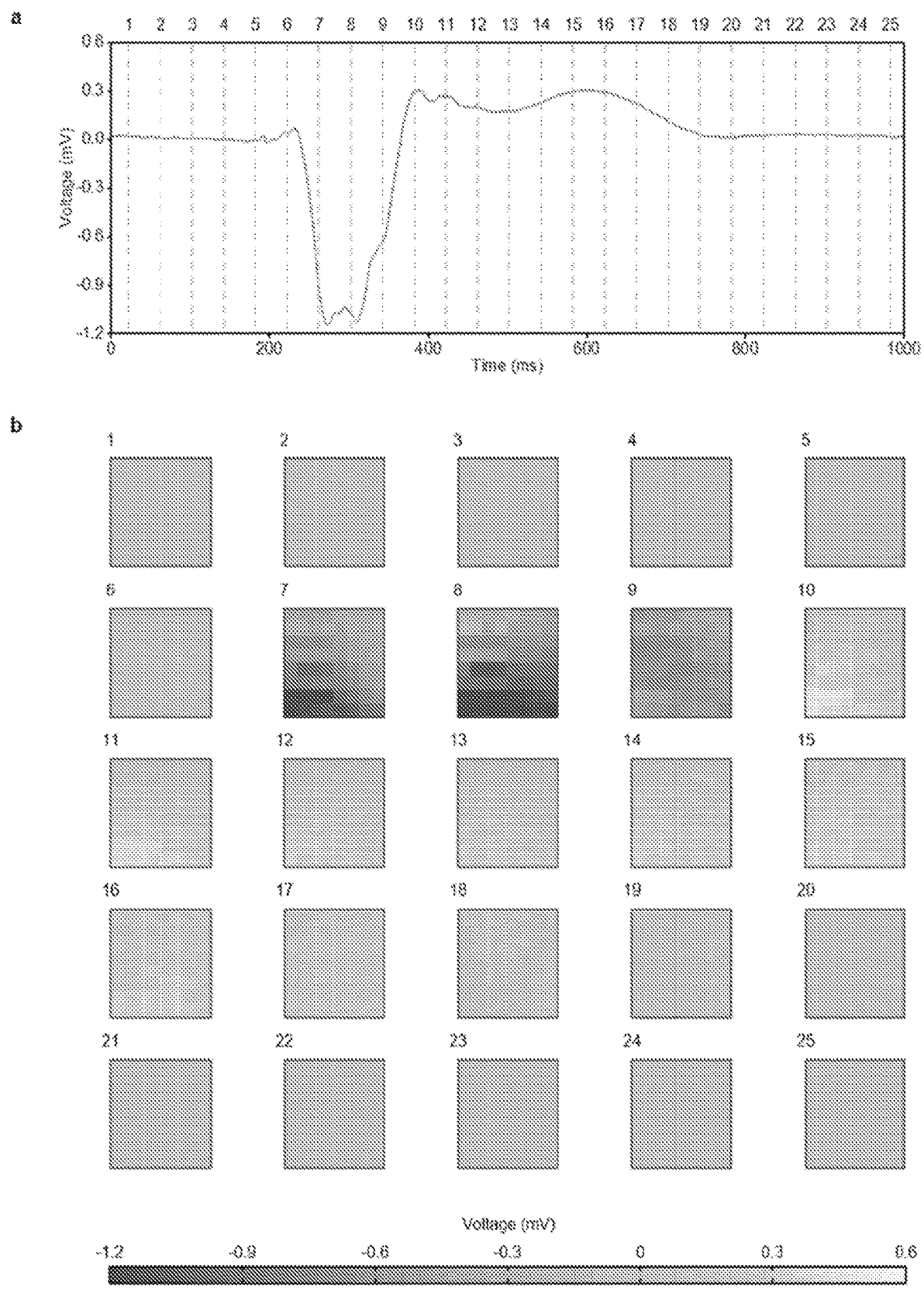

FIG. 80 shows electrogram from a human heart during pacing (60 BPM). a, Electrogram from one electrode. b, Electrogram maps in one pacing cycle.

Figure 81:
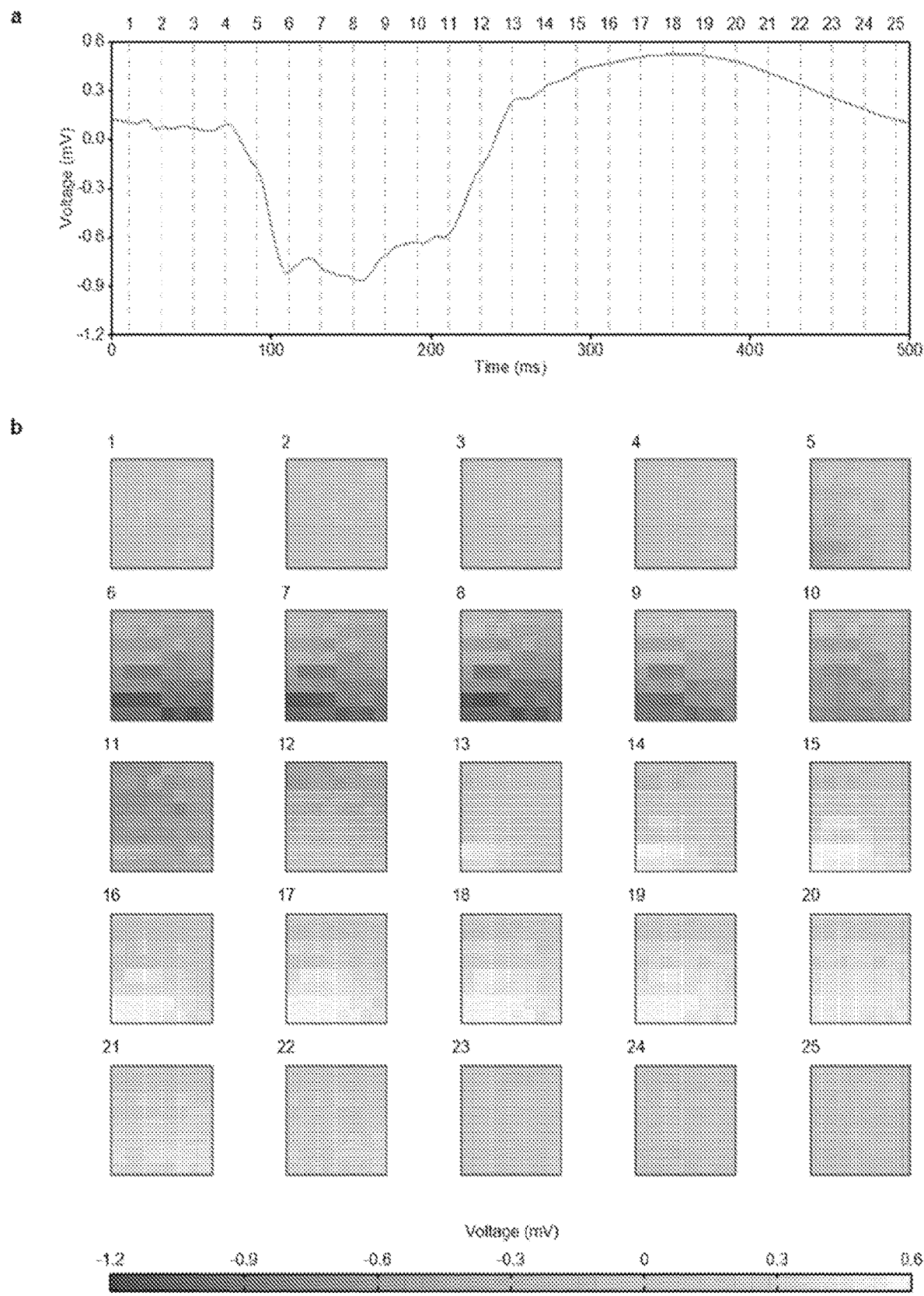

FIG. 81 shows electrogram from a human heart during pacing (120 BPM). a, Electrogram from one electrode. b, Electrogram maps in one pacing cycle.

Figure 82:
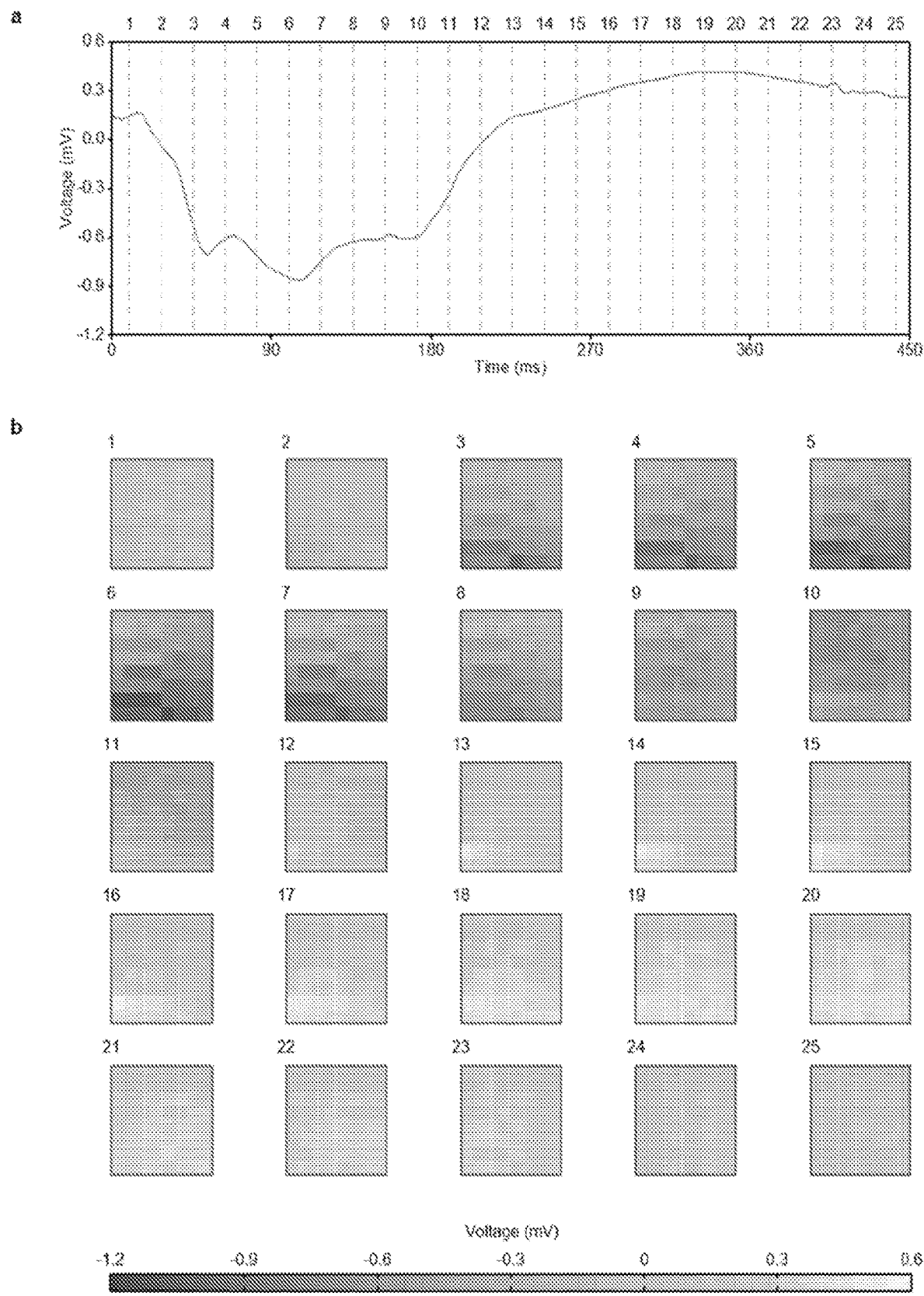

FIG. 82 shows electrogram from a human heart during pacing (133 BPM). a, Electrogram from one electrode. b, Electrogram maps in one pacing cycle.

Figure 83:
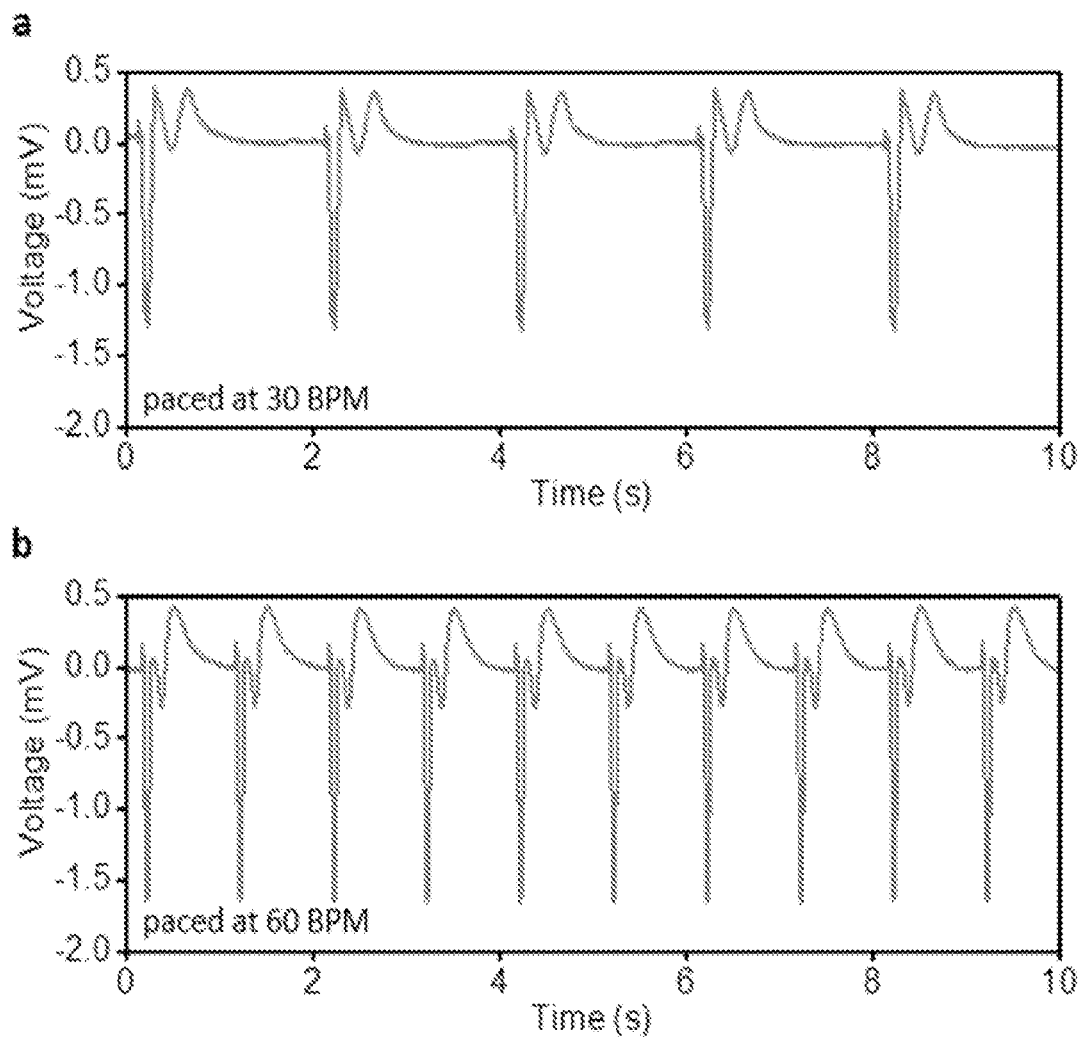

FIG. 83 shows mechanical robustness of the system after attached to ex vivo Langendorff-perfused human heart models, according to embodiments of the invention. a, Signals recorded immediately after attached to the heart (paced at 30 BPM). b, Signals recorded about 60 min after attached to the heart (paced at 60 BPM).

DETAILED DESCRIPTION OF THE INVENTION

The invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this invention will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the invention has been specifically disclosed by preferred embodiments and optional features, modification and variation of the concepts herein disclosed may be resorted to by those skilled in the art, and that such modifications and variations are considered to be within the scope of this invention as defined by the appended claims.

Whenever a range is given in the specification, for example, a temperature range, a time range, or a composition or concentration range, all intermediate ranges and subranges, as well as all individual values included in the ranges given are intended to be included in the invention. It will be understood that any subranges or individual values in a range or subrange that are included in the description herein can be excluded from the claims herein.

It will be understood that, as used in the description herein and throughout the claims that follow, the meaning of "a", "an", and "the" includes plural reference unless the context clearly dictates otherwise. Thus, for example, reference to "a cell" includes a plurality of such cells and equivalents thereof known to those skilled in the art. As well, the terms "a" (or "an"), "one or more" and "at least one" can be used interchangeably herein. It is also to be noted that the terms "comprising", "including", and "having" can be used interchangeably.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature. It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Furthermore, relative terms, such as "lower" or "bottom" and "upper" or "top," may be used herein to describe one element's relationship to another element as illustrated in the figures. It will be understood that relative terms are intended to encompass different orientations of the device in addition to the orientation depicted in the figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

It will be further understood that the terms "comprises" and/or "comprising", or "includes" and/or "including", or "has" and/or "having", or "carry" and/or "carrying", or "contain" and/or "containing", or "involve" and/or "involving", "characterized by", and the like are to be open-ended, i.e., to mean including but not limited to. When used in this disclosure, they specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

As used in the disclosure, "around", "about", "approximately" or "substantially" shall generally mean within 20 percent, preferably within 10 percent, and more preferably within 5 percent of a given value or range. Numerical quantities given herein are approximate, meaning that the term "around", "about", "approximately" or "substantially" can be inferred if not expressly stated.

As used in the disclosure, the phrase "at least one of A, B, and C" should be construed to mean a logical (A or B or C), using a non-exclusive logical OR. As used herein, the term "and/or" includes any and all combinations of one or more of the associated listed items.

The terms "flexible" and "bendable" are used synonymously in the present description and refer to the ability of a material, structure, device or device component to be deformed into a curved or bent shape without undergoing a transformation that introduces significant strain, such as strain characterizing the failure point of a material, structure, device or device component. In an exemplary embodiment, a flexible material, structure, device or device component may be deformed into a curved shape without introducing strain larger than or equal to 5%, for some applications larger than or equal to 1%, and for yet other applications larger than or equal to 0.5% in strain-sensitive regions. As used herein, some, but not necessarily all, flexible structures are also stretchable. A variety of properties provide flexible structures (e.g., device components) of the invention, including materials properties such as a low modulus, bending stiffness and flexural rigidity; physical dimensions such as small average thickness (e.g., less than 100 microns, optionally less than 10 microns and optionally less than 1 micron) and device geometries such as thin film and mesh geometries.

As used herein, the term "stretchable" refers to the ability of a material, structure, device or device component to be strained without undergoing fracture. In an exemplary embodiment, a stretchable material, structure, device or device component may undergo strain larger than 0.5% without fracturing, for some applications strain larger than 1% without fracturing and for yet other applications strain larger than 3% without fracturing. As used herein, many stretchable structures are also flexible. Some stretchable structures (e.g., device components) are engineered to be able to undergo compression, elongation and/or twisting so as to be able to deform without fracturing. Stretchable structures include thin film structures comprising stretchable materials, such as elastomers; bent structures capable of elongation, compression and/or twisting motion; and structures having an island—bridge geometry. Stretchable device components include structures having stretchable interconnects, such as stretchable electrical interconnects.

As used herein, the term "substrate" refers to a portion of the device that provides mechanical support for a component(s) disposed on or within the substrate. The substrate may have at least one skin-related function or purpose. For example, the substrate may have a mechanical functionality, for example, providing physical and mechanical properties for establishing conformal contact at the interface with a tissue, such as skin or a nail surface. The substrate may have a thermal loading or mass small enough so as to avoid interference with measurement and/or characterization of a tissue parameter. The substrate of any of the present devices and methods may be biocompatible and/or bioinert. A substrate may facilitate mechanical, thermal, chemical and/or electrical matching to the underlying tissue, such as skin or nail of a subject such that the mechanical, thermal, chemical and/or electrical properties of the substrate and the tissue are within 20%, or 15%, or 10%, or 5% of one another.

A flexible substrate that is mechanically matched to a tissue, such as skin, provides a conformable interface, for example, useful for establishing conformal contact with the surface of the tissue. Devices and methods described herein may incorporate mechanically functional substrates comprising soft materials, for example exhibiting flexibility and/or stretchability, such as polymeric and/or elastomeric materials. A mechanically matched substrate may have a Young's modulus less than or equal to 100 MPa, and optionally for some embodiments less than or equal to 10 MPa, and optionally for some embodiments, less than or equal to 1 MPa. In an embodiment, a mechanically matched substrate has a thickness less than or equal to 0.5 mm, and optionally for some embodiments, less than or equal to 1 cm, and optionally for some embodiments, less than or equal to 3 mm. In an embodiment, a mechanically matched substrate has a bending stiffness less than or equal to 1 nN m, optionally less than or equal to 0.5 nN m.

In some embodiments, a mechanically matched substrate is characterized by one or more mechanical properties and/or physical properties that are within a specified factor of the same parameter for an epidermal layer of the skin or nail, such as a factor of 10 or a factor of 2. For example, a substrate may have a Young's Modulus or thickness that is within a factor of 20, or optionally for some applications within a factor of 10, or optionally for some applications within a factor of 2, of a tissue, such as an epidermal layer of the skin or of the nail surface, at the interface with a device of the present invention. A mechanically matched substrate may have a mass or modulus that is equal to or lower than that of skin.

In some embodiments, a substrate that is thermally matched to skin has a thermal mass small enough that deployment of the device does not result in a thermal load on the tissue, such as skin, or small enough so as not to impact measurement and/or characterization of a physiological parameter. In some embodiments, for example, a substrate that is thermally matched to skin has a thermal mass low enough such that deployment on skin results in an increase in temperature of less than or equal to 2 degrees Celsius, and optionally for some applications less than or equal to 1 degree Celsius, and optionally for some applications less than or equal to 0.5 degree Celsius, and optionally for some applications less than or equal to 0.1 degree Celsius. In some embodiments, for example, a substrate that is thermally matched to skin has a thermal mass low enough that is does not significantly disrupt water loss from the skin, such as avoiding a change in water loss by a factor of 1.2 or greater. Therefore, the device does not substantially induce sweating or significantly disrupt transdermal water loss from the skin, while maintaining an effectiveness of determining hydration sate of the skin.

The substrate may have a Young's modulus less than or equal to 100 MPa, or less than or equal to 50 MPa, or less than or equal to 10 MPa, or less than or equal to 100 kPa, or less than or equal to 80 kPa, or less than or equal to 50 kPa. Further, in some embodiments, the device may have a thickness less than or equal to 5 mm, or less than or equal to 2 mm, or less than or equal to 100 µm, or less than or equal to 50 µm, and a net bending stiffness less than or equal to 1 nN m, or less than or equal to 0.5 nN m, or less than or equal to 0.2 nN m. For example, the device may have a net bending stiffness selected from a range of 0.1 to 1 nN m, or 0.2 to 0.8 nN m, or 0.3 to 0.7 nN m, or 0.4 to 0.6 nN m.

As used herein, the term "conformable" refers to a device, material or substrate which has a bending stiffness that is sufficiently low to allow the device, material or substrate to adopt any desired contour profile, for example a contour profile allowing for conformal contact with a curvilinear surface, including a surface whose shape may change over time, such as with physical exertion or normal every day movement, such as skin.

As used herein, the term "conformal contact" refers to contact established between a device and a receiving surface. In one aspect, conformal contact involves a macroscopic adaptation of one or more surfaces (e.g., contact surfaces) of a device to the overall shape of a surface. In another aspect, conformal contact involves a microscopic adaptation of one or more surfaces (e.g., contact surfaces) of a device to a surface resulting in an intimate contact substantially free of voids. In an embodiment, conformal contact involves adaptation of a contact surface(s) of the device to a receiving surface(s) such that intimate contact is achieved, for example, wherein less than 20% of the surface area of a contact surface of the device does not physically contact the receiving surface, or optionally less than 10% of a contact surface of the device does not physically contact the receiving surface, or optionally less than 5% of a contact surface of the device does not physically contact the receiving surface. Devices of certain aspects are capable of establishing conformal contact with internal and external tissue. Devices of certain aspects are capable of establishing conformal contact with tissue surfaces characterized by a range of surface morphologies including planar, curved, contoured, macro-featured and micro-featured surfaces and any combination of these. Devices of certain aspects are capable of establishing conformal contact with tissue surfaces corresponding to tissue undergoing movement, including an internal organ or skin.

Any of the devices and methods provided herein may be personalized to a user. In this context, "personalized" refers to the device or method that is tailored to that of an individual user, recognizing there may be relatively significant person-to-person variability with respect to one or more baseline tissue parameters, and tissue behavior to a stimulus. For example, some people may have higher inherent thermal conductivity, or high resting hydration level. The devices or methods may accurately determine the baseline tissue parameter, with monitoring and corresponding treatment tailored to that individual's baseline tissue parameter.

Embodiments of the invention are illustrated in detail hereinafter with reference to accompanying drawings. The description below is merely illustrative in nature and is in no way intended to limit the invention, its application, or uses. The broad teachings of the invention can be implemented in a variety of forms. Therefore, while this invention includes particular examples, the true scope of the invention should not be so limited since other modifications will become apparent upon a study of the drawings, the specification, and the following claims. For purposes of clarity, the same reference numbers will be used in the drawings to identify similar elements. It should be understood that one or more steps within a method may be executed in different order (or concurrently) without altering the principles of the invention.

Many minimally invasive surgeries rely on catheters equipped with elements for sensing and/or actuation to deliver, through small incisions, diagnostic measurements and therapeutic interventions for a range of diseases and conditions. The rigid physical properties of these devices and their relatively primitive modes of operation impede their conformal contact with soft tissue surfaces, limit the scope of their uses, lengthen the times for the surgeries and increase the required levels of surgical skill.

In order to address the aforementioned deficiencies and inadequacies, this invention discloses materials, two and three dimensional (2D and 3D) device designs and fabrication approaches for integrating advanced electronic functionality with such types of surgical tools, with a specific focus on balloon catheter systems. Particularly, the invention provides multimodal, multiplexed soft electronic systems in multilayered configurations that support capabilities ranging from high-density spatiotemporal mapping of temperature, pressure and electrophysiological parameters, to options in programmable high-density actuation of thermal inputs and/or electrical stimulation, radio frequency (RF) ablation and irreversible electroporation (IRE). The resulting advanced classes of medical instruments enable soft contacts to curved tissue surfaces, with ability to address broad requirements in minimally invasive surgeries. Demonstrations with endocardial balloon catheter devices in plastic heart models and on Langendorff-perfused animal and human hearts, together with numerical multi-physics modeling of their operation, highlight some of the essential features of the technology. The key benefits of this approach are, among other things, in improved efficacy and faster procedure times with one shot ablation without having to move, or readjust, or swap in new catheters.

In one aspect, the invention relates to an electronic system for multimodal diagnostic measurements and therapeutic interventions. The electronic system comprises a plurality of element network layers vertically stacked one with another on a flexible substrate, each element network layer being bi-axially stretchable and comprising a plurality of elements configured in an addressable, interconnected array formed in a multilayered structure and operably performing a distinct function.

In some embodiments, the flexible substrate is a balloon catheter or an elastic object that is operably in a deflated state or an inflated state.

In some embodiments, the plurality of element network layers comprises an electrode array configured to perform electrophysiological recording and/or therapeutic interventions in a target of interest. In some embodiments, the therapeutic interventions comprise electrical stimulation, drug elution, RF ablation, and/or IRE ablation.

In some embodiments, the electrode array comprises a plurality of electrodes connected to stretchable interconnects and disposed between first and second polymer layers such that the plurality of electrodes is exposed. In some embodiments, the exposed electrodes are in contact with connected to the target of interest when the flexible object is operably the inflated state.

In some embodiments, the plurality of electrodes is individually and selectively controllable and/or programmable.

In some embodiments, each of the first and second polymer layers is formed of polyimides, polyurethane, polyethylene, and/or silicone. In some embodiments, each of the first and second polymer layers has a thickness of about 0.8-4 µm.

In some embodiments, each electrode has a lateral dimension of about 400 μm×400 μm to 1 mm×1 mm, and a thickness of about 200 nm to 750 nm.

In some embodiments, the plurality of electrodes and the stretchable interconnects are formed of a metal including gold, platinum, palladium, platinum iridium, or an alloy.

In some embodiments, the stretchable interconnects are configured to accommodate bi-axial stretching greater than about 30% without inducing fractures in the electrode array.

In some embodiments, each of the stretchable interconnects has a width of about 10-80 μm and is separated from one another by a width of about 10-100 μm of polyimides, polyurethane, polyethylene, and/or silicone.

In some embodiments, the plurality of element network layers further comprises a temperature sensor array for precision thermography, and/or a pressure sensor array for measuring forces/pressures associated with soft tissue contact in the target of interest.

In some embodiments, the temperature sensor array comprises a plurality of temperature sensors, each temperature sensor being formed of metal traces, and electrically coupled to two temperature sensor connection lines that allow column and row selection multiplexing using signals delivered through the temperature sensor connection lines.

In some embodiments, the metal traces are formed of a metal including gold, platinum, palladium, platinum iridium, or an alloy. In some embodiments, the metal traces are formed of gold, or a copper-nickel alloy.

In some embodiments, each metal trace has a thickness of about 80-120 nm and a width of about 3-5 μm.

In some embodiments, the temperature sensor connection lines for row selection reside in a first layer with the plurality of temperature sensors, while those for column selection lie a second layer above the first layer, separated by an insulating layer and connected to one side of the temperature sensors through a via hole.

In some embodiments, the insulating layer is formed of polyimides, polyurethane, polyethylene, and/or silicone. In some embodiments, the insulating layer has a thickness in a range of about 1-10 μm.

In some embodiments, the temperature sensor array further comprises a layer of thermal actuators separated from the plurality of temperature sensors for spatial mapping of tissue thermal conductivity.

In some embodiments, transient plane source analysis of the time-domain temperature profiles from the plurality of temperature sensors yields tissue thermal conductivities at different locations.

In some embodiments, averaged outputs from the plurality of temperature sensors yield a precision of one standard deviation ranging from about 10 mK to about 200 mK.

In some embodiments, data acquired from the temperature sensor array are processed for assessment of parameters including flow of blood and other biofluids and tissue hydration levels.

In some embodiments, the pressure sensor array comprises a plurality of pressure sensors, each pressure sensor being formed of a metal strain gauge, and electrically coupled to two pressure sensor connection lines that allow column and row selection multiplexing using signals delivered through the pressure sensor connection lines. In some embodiments, column and row selection occurs through serpentine interconnects across two different layers. In some embodiments, two terminals of each strain gauge is arranged in a cross-shaped geometry having a ribbon width and a ribbon length for facilitating wiring for the column and row selections.

In some embodiments, each strain gauge and its two terminals are formed of a metal or an alloy.

In some embodiments, each strain gauge has a thickness in a range of about 80-120 μm and a width in a range of about 1-3 μm, and wherein the ribbon width is in a range of about 100-150 μm, and the ribbon length is in a range of about 700-1100 μm.

In some embodiments, the metal strain gauge of each pressure sensor is in a form of a 3D tent-like mesostructure with high sensitivity to normal force and low effective modulus, and wherein the serpentine interconnections are in a form of 3D helices with exceptional stretchability.

In some embodiments, each 3D tent-like mesostructure is covered with a silicon cavity, and said cavity has lateral dimensions with a plurality of pillars at the corners, each pillar having a length and a height. In some embodiments, the lateral dimensions of said cavity is in a range of about 0.5 mm by 0.5 mm to 1 mm by 1 mm, the length and the height of the pillars are in ranges of about 100-250 μm and about 150-200 μm, respectively.

In some embodiments, sensitivity of each pressure sensor is tunable by adjusting side lengths of the pillars of said cavity, shapes of the 3D tent-like mesostructures, thicknesses of the polymer layers, and/or thickness and modulus of the flexible substrate.

In some embodiments, the pressure sensor array further comprises rigid islands selectively bonded to the bottom surface of the pressure sensor array to constrain deformations of the 3D tent-like mesostructures under stretching, while maintaining stretchability of the pressure sensor array.

In some embodiments, the pressure sensor array is insensitive to other types of mechanical deformations including bending and twisting.

In some embodiments, the pressure sensor array is disposed on the flexible substrate, the temperature sensor array is disposed on the pressure sensor array, and the electrode array is disposed on the temperature sensor array.

In some embodiments, the temperature sensor array is bonded to a bottom surface of the electrode array with a thin layer of PI to offer small thickness, strong adhesion and excellent thermal and physical contact for precise temperature measurements during ablation or other procedures.

In some embodiments, the thin layer of PI has a thickness in a range of about 1-2 μm. In some embodiments, the pressure sensor array locates at the bottom of the plurality of element network layers for measurements of the local transverse forces at the interface between the electrodes and the contacting soft tissues.

In some embodiments, the electrode array, the temperature sensor array and the pressure sensor array are vertically stacked to define a multilayer mesh having an array of sensing elements, each element comprising an electrode, a temperature sensor and a pressure sensor, and being connected to one another through the stretchable interconnects and connection lines that are untethered to the flexible substrate so as to enable out-of-plane deformations for enhanced stretchability.

In some embodiments, the array of sensing elements is individually and selectively controllable and/or programmable.

In some embodiments, in operation, the flexible substrate is in the inflated state, the exposed electrodes of the electrode array are in contact with target biological tissues to perform electrophysiological recording and/or therapeutic interventions, the temperature sensor array tracks changes in temperature associated with the therapeutic interventions;

and the pressure sensor array measures local transverse forces at the interface between the electrodes and the biological tissues.

In some embodiments, the measured temperature and pressure provide feedbacks for the therapeutic interventions in the target surface of interest.

In some embodiments, the electronic system further comprises a multiplexed data acquisition (DAQ) system electrically coupled to the electrode array, wherein the DAQ comprises an application-specific integrated circuit (ASIC) configured to amplify, digitize and multiplex signals output from or input to the plurality of electrodes, thereby reducing a total number of wires connecting to an external instrument.

In some embodiments, the electronic system further comprises a multiplexing circuit coupled to the temperature sensor array and/or the pressure sensor array for multiplexing of input and output signals of the plurality of temperature sensors and/or the plurality of pressure sensors and eliminating crosstalk with grounding.

In some embodiments, the electronic system is conformally integrated with the flexible substrate.

In another aspect, the invention relates to a method of fabricating an electronic system for multimodal diagnostic measurements and therapeutic interventions, comprising forming each of a plurality of element network layers, each element network layer being biaxial stretchable and comprising a plurality of elements configured in an addressable, interconnected array formed in a multilayered structure and operably performing a distinct function; and integrating the plurality of element network layers in a vertical stack of one with another on a flexible substrate.

In some embodiments, the flexible substrate is a balloon catheter or an elastic object that is operably in a deflated state or an inflated state.

In some embodiments, the forming step comprises forming an electrode array by preparing a sacrificial layer on a silicon wafer; coating a bottom polymer layer on the sacrificial layer; defining a pattern of the electrode array on the bottom polymer layer, wherein the pattern comprises a plurality of electrodes and stretchable interconnects connecting to the plurality of electrodes; coating a top polymer layer on the pattern over the bottom polymer layer to cover the electrode array thereon; defining a polymer pattern to expose the plurality of electrodes of the electrode array; and undercutting the sacrificial layer to release the electrode array.

In some embodiments, the plurality of electrodes and the stretchable interconnects are formed of a metal including gold, platinum, palladium, platinum iridium, or an alloy.

In some embodiments, the forming step comprises forming a temperature sensor array by preparing a sacrificial layer on a silicon wafer; coating a bottom polymer layer on the sacrificial layer; defining a bottom pattern of the temperature sensor array on the bottom polymer layer, wherein the bottom pattern of the temperature sensor array comprises a plurality of temperature sensors and serpentine connections connecting to a first region of each temperature sensor for row selection; coating a middle polymer layer on the bottom pattern over the bottom polymer to cover the bottom pattern thereon; defining vias through the middle polymer layer at predetermined locations, such that a second region of each temperature sensor is exposed at a respective via; coating the exposed second region of each temperature sensor and side walls of the respective via with a metal or an alloy; defining a top pattern of the temperature sensor array on the middle polymer, wherein the top pattern comprises serpentine connections connecting to the coated vias that are connected to the plurality of temperature sensors for column selection; coating a top polymer layer on the top pattern over the middle polymer to cover the top pattern for column selection; defining a polymer pattern to form the outline of the temperature sensor array; and undercutting the sacrificial layer to release the temperature sensor array.

In some embodiments, the forming step comprises forming the pressure sensor array by preparing a sacrificial layer on a silicon wafer; coating a bottom polymer layer on the sacrificial layer; defining a bottom pattern of the pressure sensor array on the bottom polymer layer, wherein the bottom pattern of the pressure sensor array comprises a plurality of pressure sensors and serpentine connections connecting to a first region of each pressure sensor for row selection; coating a middle polymer layer on the bottom pattern over the bottom polymer to cover the bottom pattern thereon; defining vias through the middle polymer layer at predetermined locations, such that a second region of each pressure sensor is exposed at a respective via; coating the exposed second region of each pressure sensor and side walls of the respective via with a metal or an alloy; defining a top pattern of the pressure sensor array on the middle polymer, wherein the top pattern comprises serpentine connections connecting to the coated vias that are connected to the plurality of pressure sensors for column selection; coating a top polymer layer on the top pattern over the middle polymer to cover the top pattern for column selection; defining a polymer pattern to form the outline of the pressure sensor array; undercutting the sacrificial layer to release the pressure sensor array; defining bonding regions with $SiO_2$ via a shadow mask on the bottom surface of the bottom polymer layer; transferring to a pre-stretched elastomer on the bonding regions; and releasing the pre-stretched elastomer to form 3D mesostructures, bond rigid cavities and rigid islands.

In some embodiments, the step of defining the bottom pattern of the pressure sensor array on the bottom polymer layer comprises defining a first pattern of the pressure sensor array on the bottom polymer layer, wherein the first pattern of the pressure sensor array comprises a plurality of serpentine connections for row selection; and defining a second pattern of the pressure sensor array on the bottom polymer layer, wherein the second pattern of the pressure sensor array comprises a plurality of the pressure sensors connected to the plurality of serpentine connections, wherein the first pattern and the second pattern are formed of two different materials.

In some embodiments, the integrating step comprises preparing a stamp with micro patterns; stacking the electrode array with the temperature sensor array, comprising: attaching the stamp onto a uncured polymer layer, and detaching the stamp from the uncured polymer layer to form an uncured polymer pattern thereon; aligning the uncured polymer pattern on the stamp to the temperature sensor array; and transferring the uncured polymer pattern to the temperature sensor array by attaching and detaching the stamp; aligning the electrode array to the temperature sensor array with the uncured PI pattern as an adhesive layer; and curing the uncured polymer pattern to integrate the electrode array to the temperature sensor array.

In some embodiments, the integrating step further comprises treating the bottom surface of the temperature sensor array and the top surface of the pressure sensor array to induce hydroxyl termination for bonding; aligning the stacked arrays of electrodes and temperature sensors with the pressure sensor array; and bonding the aligned arrays of electrodes, temperature sensors and pressure sensors to complete the fabrication.

In some embodiments, each polymer layer is formed of polyimides, polyurethane, polyethylene, and/or silicone.

These and other aspects of the present invention are further described below. Without intent to limit the scope of the invention, exemplary instruments, apparatus, methods and their related results according to the embodiments of the present invention are given below. Note that titles or subtitles may be used in the examples for convenience of a reader, which in no way should limit the scope of the invention. Moreover, certain theories are proposed and disclosed herein; however, in no way they, whether they are right or wrong, should limit the scope of the invention so long as the invention is practiced according to the invention without regard for any particular theory or scheme of action.

Example 1

Multimodal, Multilayered Soft Electronics in Advanced Devices for Cardiac Surgery Instrumenting catheters with advanced electronic components, sensors and actuators may establish a means to overcome the aforementioned shortcomings. Emerging strategies in soft electronics that leverage materials and fabrication capabilities adapted from the semiconductor industry have potential to provide immediate opportunities in this context. An essential goal is in the construction of networks of integrated elements that support multimodal diagnostic and therapeutic functions in addressable, interconnected array configurations.

This exemplary study reports progress in this area, with an emphasis on 2D and 3D device architectures, layered configurations and advanced modalities. The specific advances over previous systems include (1) instrumented sensors and actuators in multiplexed array formats, with spatial densities designed to probe the complex nature of the tissues, specifically the heart (e.g., greater than $10^9$ cardiomyocytes in the human heart), (2) multilayer architectures with combined diagnostic and therapeutic functions, including the latest cardiac procedures that rely on electroporation, and (3) capabilities in real-time feedback control, enabled by simultaneous, multimodal operation of sensors and actuators. The specific systems disclosed herein enable conformal contacts to tissues, for simultaneous, multimodal, mapping of temperature, pressure and electrophysiological parameters, with options in programmable actuation of thermal inputs and electrical stimulation, RF ablation and/or IRE at soft tissue surfaces. Studies on Langendorff-perfused rabbit and human hearts demonstrate the multifunctionality and high measurement fidelity of the system, and computational models highlight the underlying mechanisms.

Figure 1A:
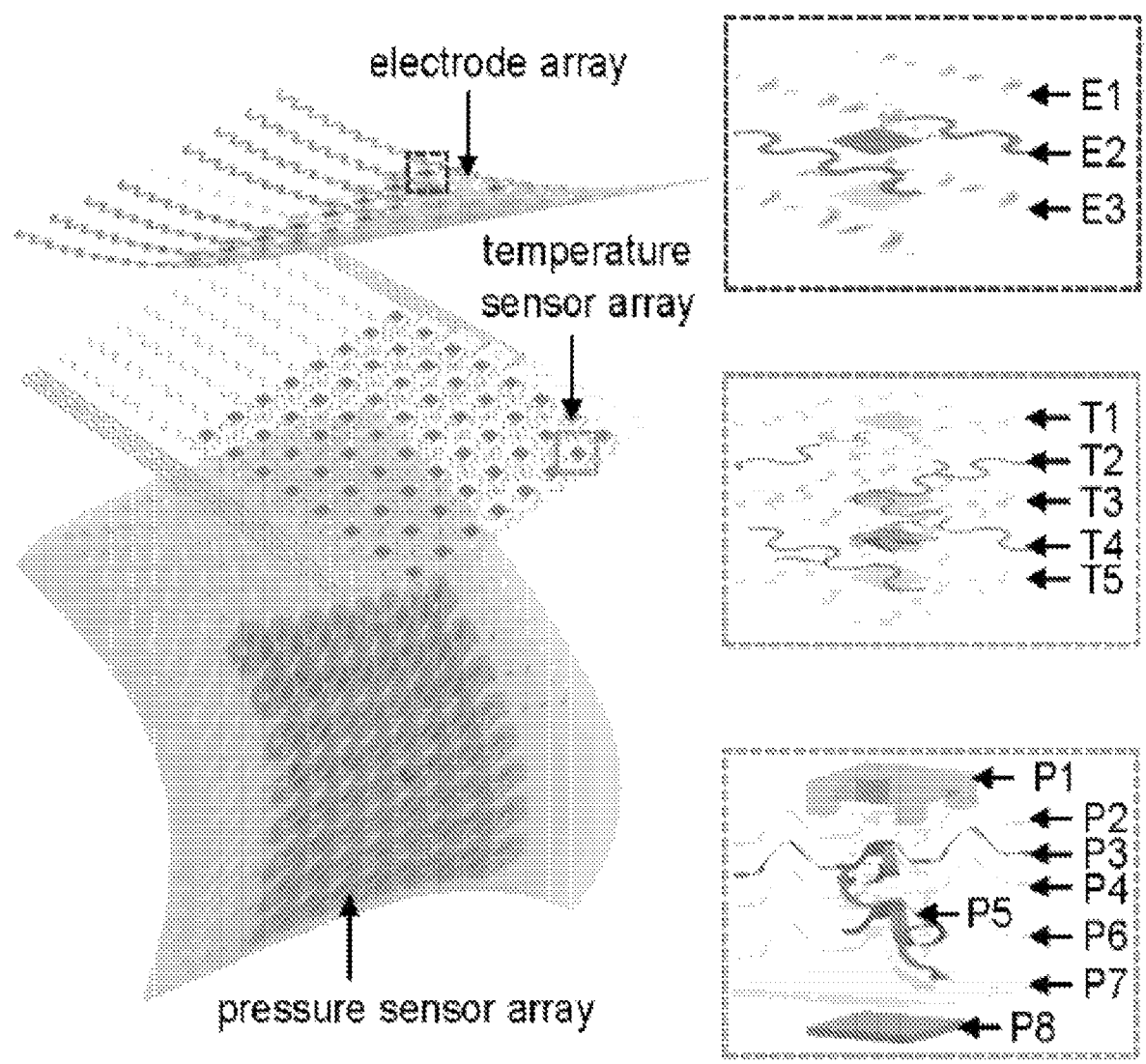
FIGS. 1A-1H show multimodal, multiplexed soft sensors and actuators for minimally invasive surgery, according to embodiments of the invention.

FIG. 1A presents a schematic illustration of the system according one embodiment of the invention. Multifunctional collections of sensors, actuators and associated electronics mount on elastic surfaces in multilayer designs, where each layer serves a distinct function. Stretchable interconnects (gold (Au), about 100-300 nm in thickness, about 15-50 μm in width) sandwiched in polyimide (PI, about 1-3.3 μm in thickness, about 21-100 μm in width) create multiplexed arrays covering areas of about 1 by 1 cm. The network demonstrated herein includes, but are not limited to, electrodes (8×8) for electrophysiological recording and electrical stimulation (i.e., RF and IRE ablation), temperature sensors (8×8) for precision thermography, and pressure sensors (8×8) for measuring the forces associated with soft tissue contact, corresponding collectively to capabilities in multifunctional spatiotemporal mapping. Fabrication exploits microfabrication techniques adapted from those used in the semiconductor industry to build multilayers of sensing elements, actuators, and ultrathin polymers (about 1-3.3 μm in thickness) using silicon wafers as temporary substrates and transfer printing methods to deliver these layers to soft, elastomeric substrates. Strategies in compressive buckling transform parts of these structures into 3D configurations to enable their targeted performance. These strategies support high spatial densities (about 160 cm$^{-2}$) of sensors and actuators, while leveraging fast switching and multiplexing capabilities across rows and columns of elements.

Figure 1B:
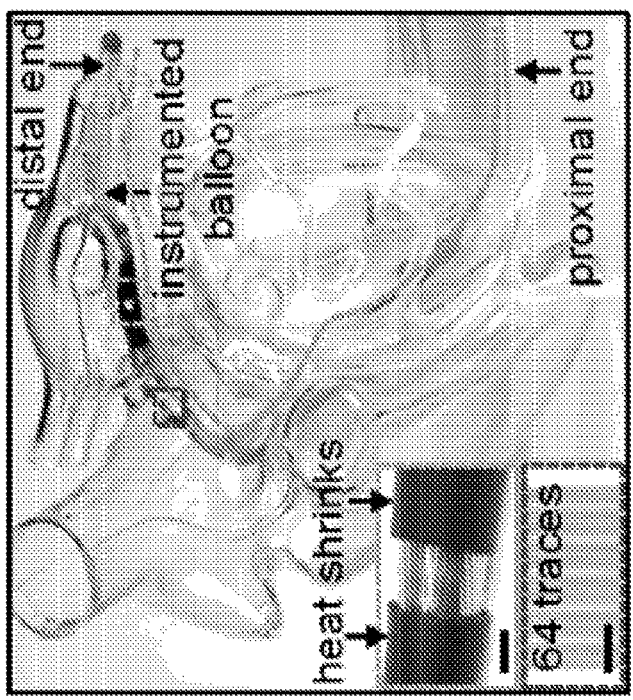
Figure 6:
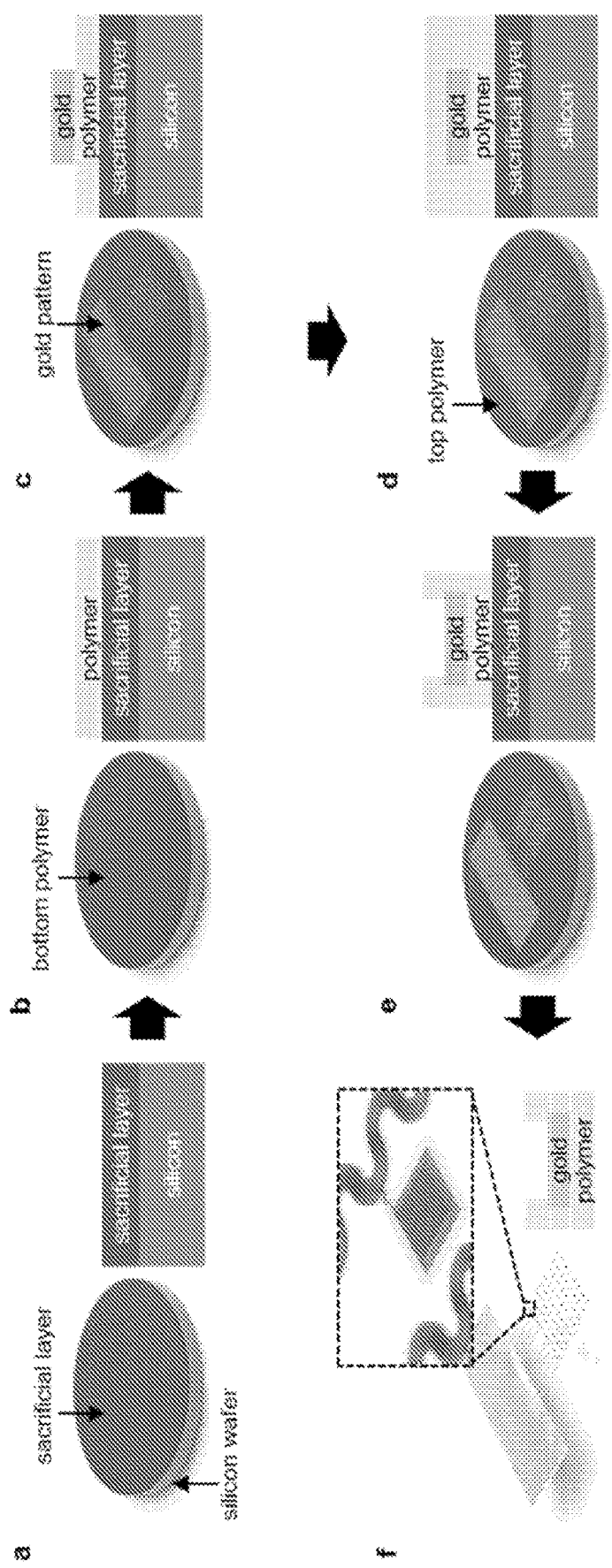
FIG. 6 shows a schematic illustration of the fabrication procedures for the electrode array, according to embodiments of the invention. a, Prepare sacrificial layer on silicon wafer. b, Coat bottom polymer layer. c, Define gold pattern. d, Coat top polymer layer. e, Define polymer pattern. f, Undercut the sacrificial layer to release the electrode array.
Figure 7:
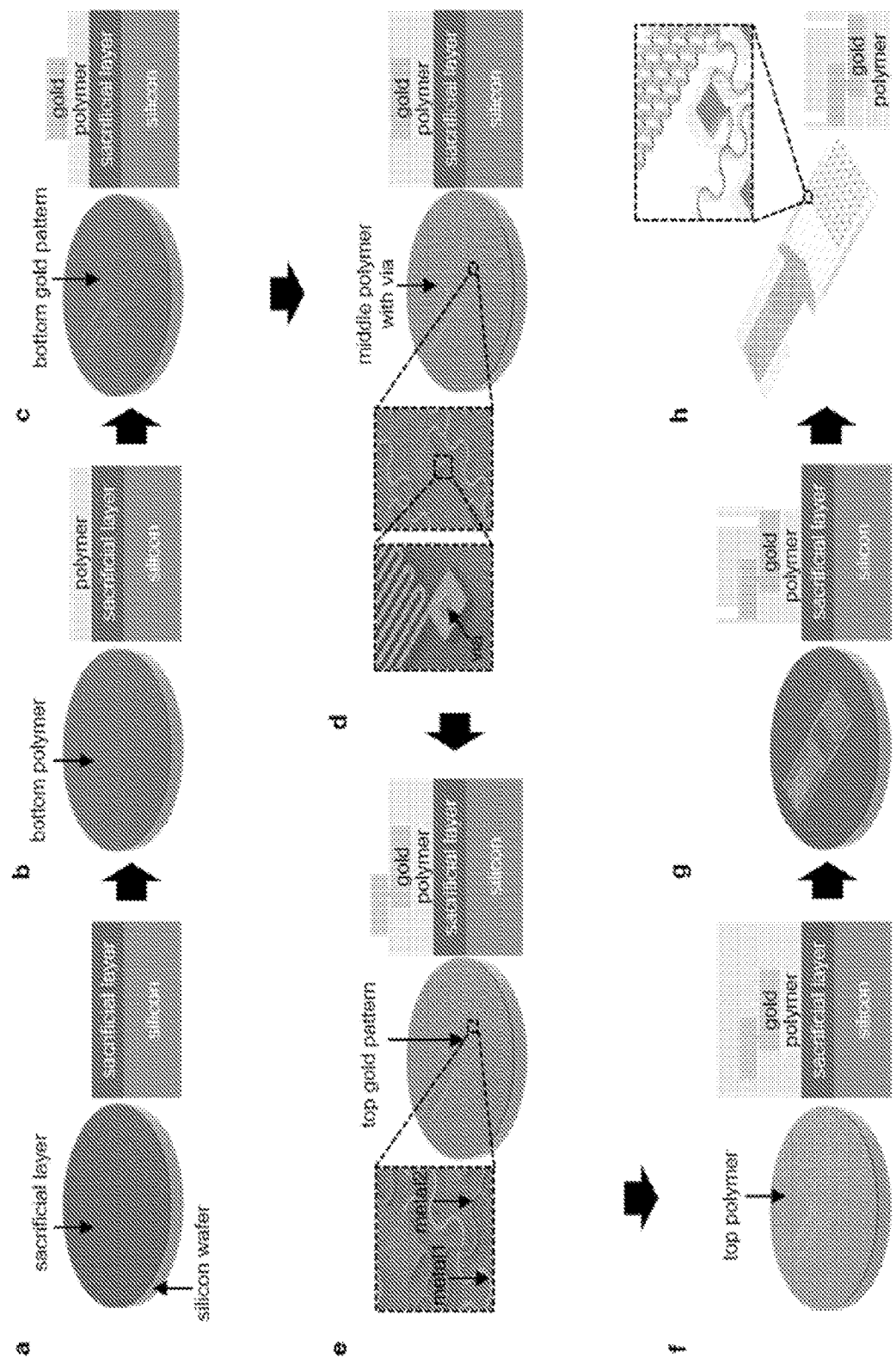
FIG. 7 shows a schematic illustration of the fabrication procedures for the temperature sensor array, according to embodiments of the invention. a, Prepare sacrificial layer on silicon wafer. b, Coat bottom polymer layer. c, Define bottom gold pattern. d, Coat middle polymer layer and pattern via. e, Define top gold pattern. f, Coat top polymer layer. g, Define polymer pattern. h, Undercut the sacrificial layer to release the temperature sensor array.
Figure 8:
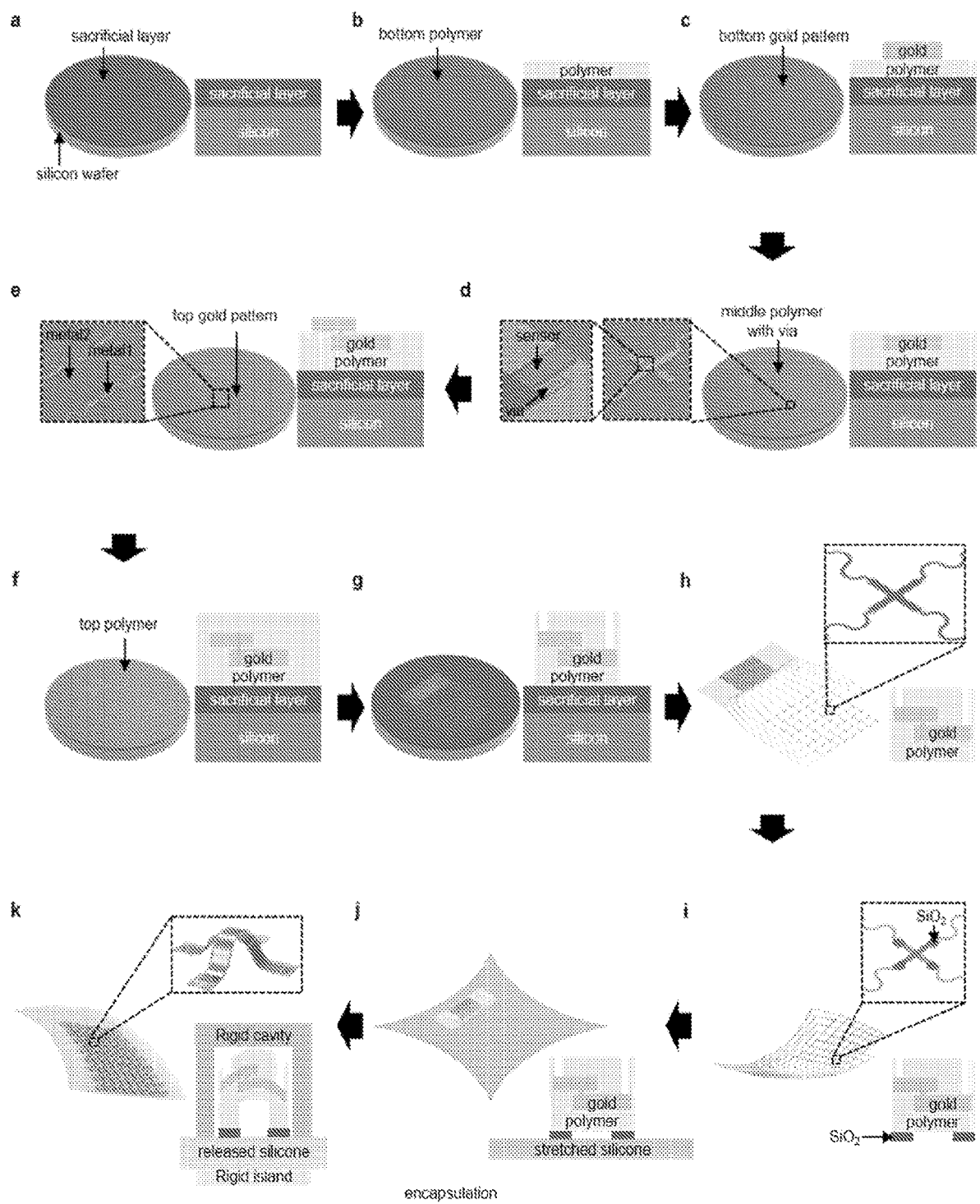
FIG. 8 shows a schematic illustration of the fabrication procedures for the pressure sensor array, according to embodiments of the invention. a, Prepare sacrificial layer on silicon wafer. b, Coat bottom polymer layer. c, Define bottom gold pattern. d, Coat middle polymer layer and pattern via. e, Define top gold pattern. f, Coat top polymer layer. g, Define polymer pattern. h, Undercut the sacrificial layer to release the temperature sensor array. i, Define bonding sites via shadow mask. j, transfer to prestretched elastomer. k, Release the elastomer to form 3D mesostructures, bond rigid cavities and rigid islands.
Figure 9:
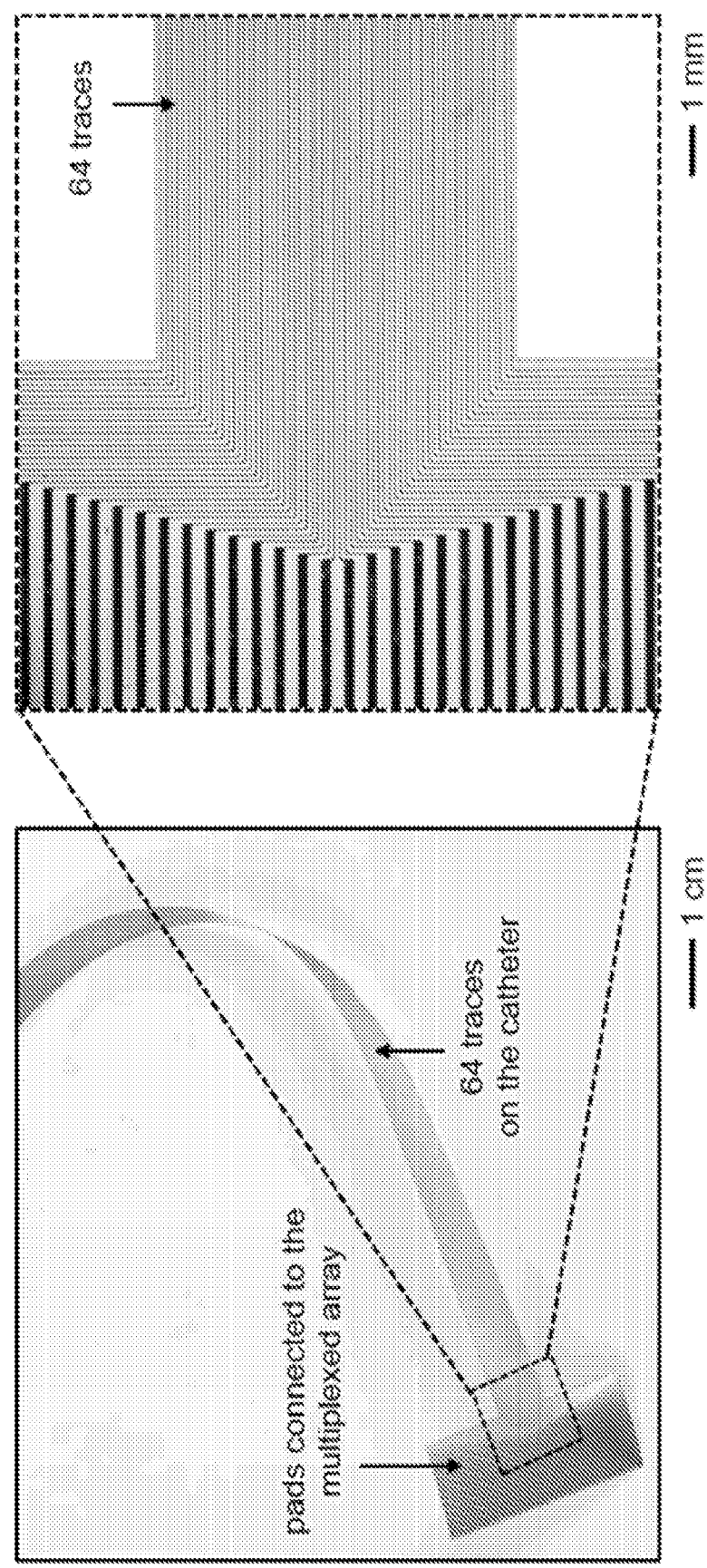
FIG. 9 shows optical images of the flexible PCB connector, according to embodiments of the invention.

EXAMPLE 2 and FIGS. 6-8 illustrate the fabrication processes for each layer. The soft and stretchable mechanics of these systems facilitate mounting on a variety of curvilinear surfaces. Minimally invasive tools, such as balloon catheter-based systems, represent a compelling opportunity for this integration, due primarily to an unmet need for dense, multifunctional capabilities in the context of diagnostic and therapeutic surgical procedures, specifically in endocardial electrophysiology and ablation. FIG. 1B shows a representative balloon catheter instrumented with an electrode array (8×8) deployed inside the left atrium (LA) of a transparent heart model. Thin metal traces (Cu, about 18 μm in thickness, about 60 μm in width, about 60 μm in spacing) connect the array at the distal end of the balloon catheter to wired connections that route through the catheter extrusion (insets in FIG. 1B and FIG. 9).

Figure 1C:
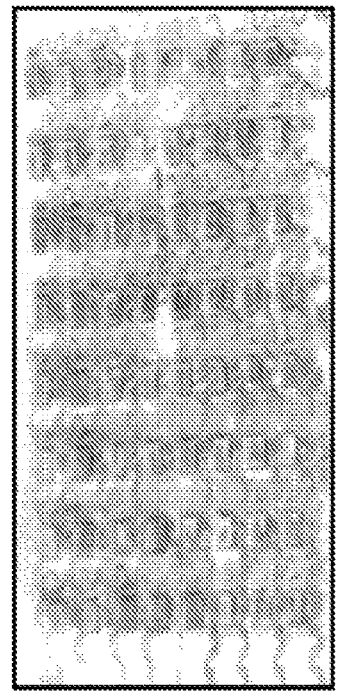
Figure 1D:
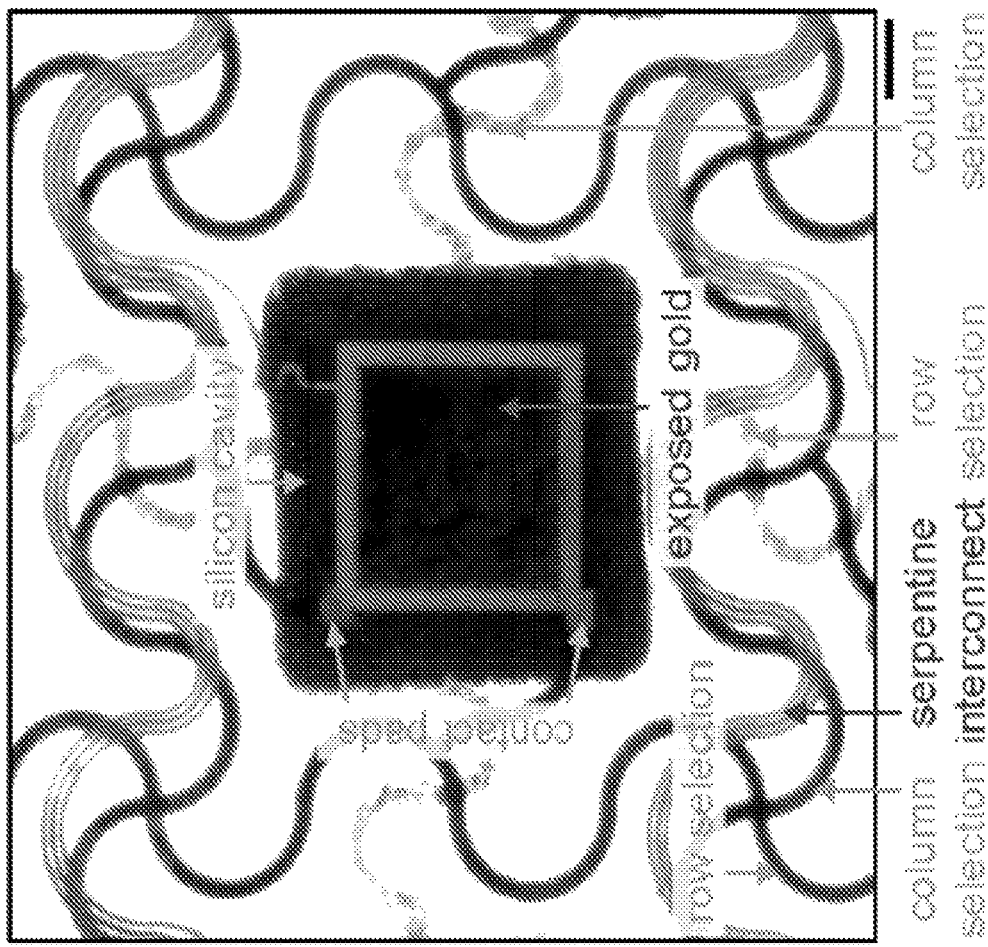
Figure 10:
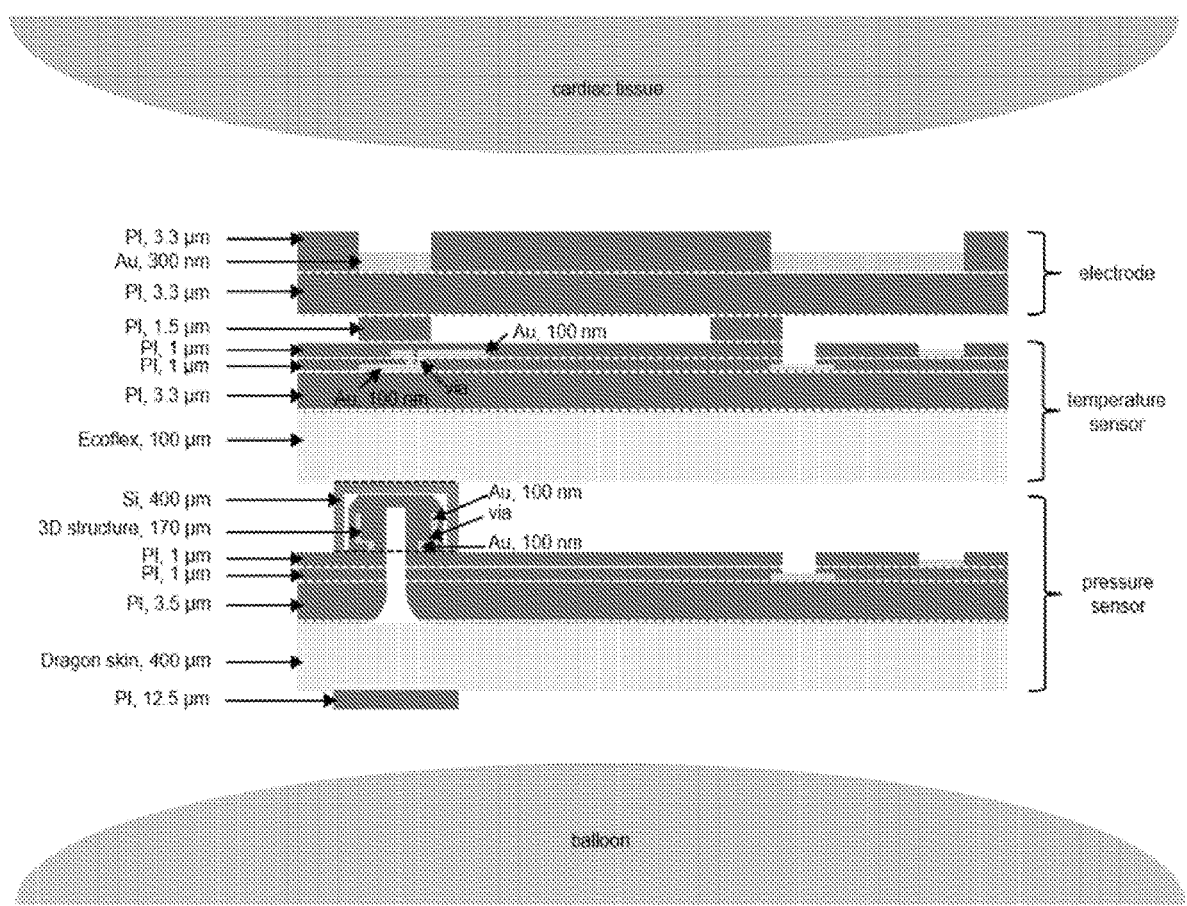
FIG. 10 shows a schematic illustration of the cross-section of the multifunctional, multiplexed electronics instrumented on a balloon catheter, according to embodiments of the invention.
Figure 11:
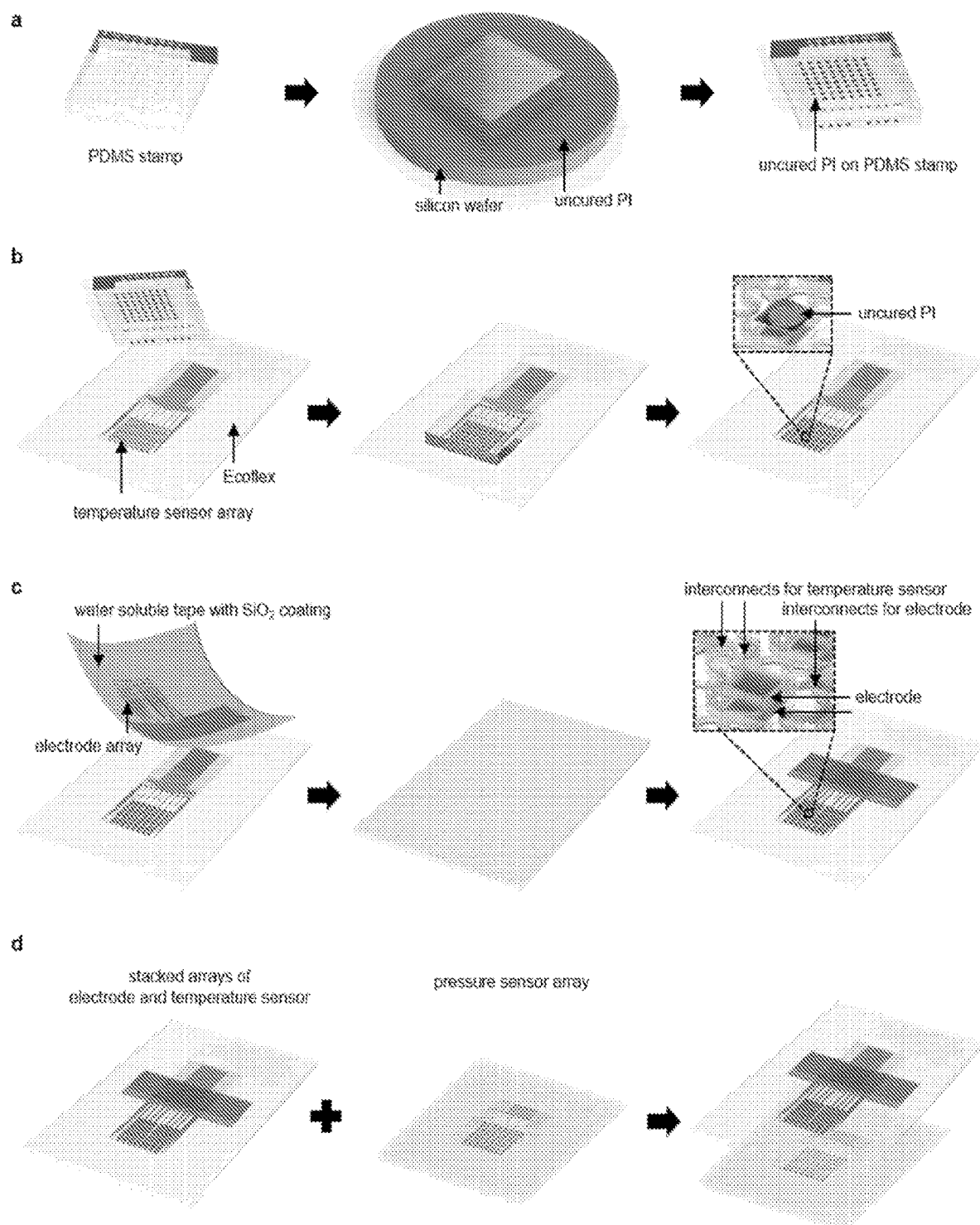
FIG. 11 shows a schematic illustration of the fabrication procedures for stacking multilayers of multiplexed electronics, according to embodiments of the invention. a, Prepare PDMS stamp (left), attach PDMS stamp to uncured PI (middle), and detach PDMS stamp to get uncured PI pattern (right). b, Transfer the uncured PI pattern to temperature sensor array by attaching (left and middle) and detaching (right) the PDMS stamp. c, Align electrode array on water soluble tape to the temperature sensor array with uncured PI pattern (left and middle), and dissolve the water soluble tape (right). d, Align pressure sensor array to stacked layers of temperature sensor and electrode.
Figure 12:
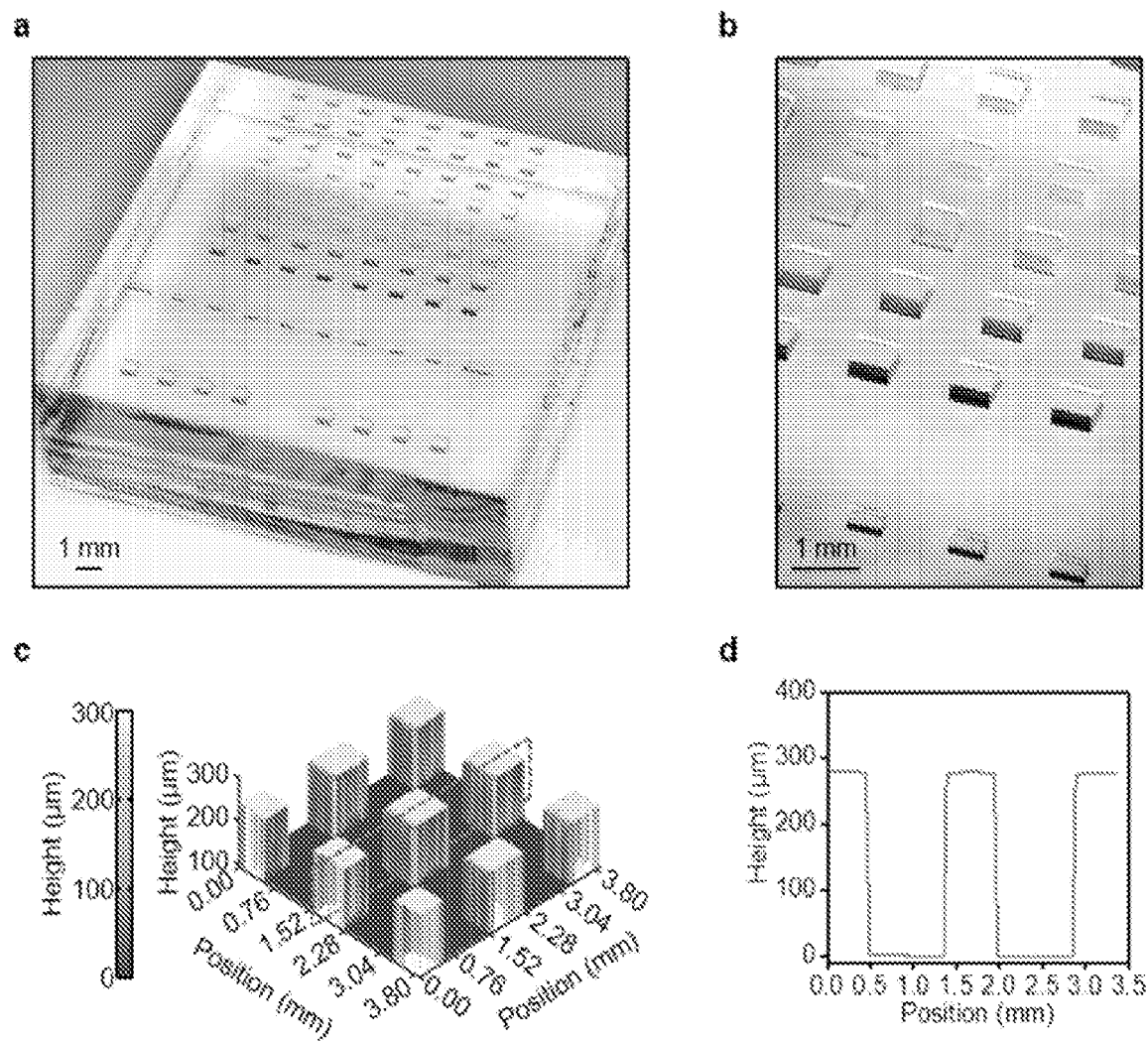
FIG. 12 shows PDMS stamp for stacking the electrode array and temperature sensor array, according to embodiments of the invention. a-b, Optical images of the PDMS stamp. c, Height distribution of the PDMS stamp measured using a 3D Optical Profiler. d, Height distribution of the PDMS stamp along the red dashed box in (c).

Precise multiparametric measurements, effective treatment and optimal mechanics (i.e., elastic response to compression during deflation and stretching during inflation of the balloon) require careful axial orientation of each layer of sensors and actuators. In this multilayered configuration, the electrode arrays reside on the topmost surface to allow direct contact with biological tissues. Temperature sensors lie subjacent to the electrodes, separated by a thin insulating layer of PI (about 6 μm in thickness), to allow tracking of changes in temperature associated with ablation or other procedures. The layer with pressure sensors locates at the bottom, for measurements of the local transverse forces at the interface between the electrodes and the contacting soft tissues (FIG. 10). The vertical stack of arrays of electrodes, temperature sensors and pressure sensors joins the sensing units together as the nodes of the multilayer mesh (positioning/overlay accuracy higher than about 100 μm across the whole array), but leaves the stretchable interconnects untethered to the elastomeric substrate to enable out-of-plane deformations for enhanced stretchability (greater than about 30% of biaxial stretch). FIGS. 1C-1D show optical images of the multilayer electronic system with arrays of sensing elements (about 0.8 by 0.8 mm in lateral dimension for each pixel) and interconnects embedded in each layer. Detailed fabrication procedures is described in EXAMPLE 2 and FIGS. 11 and 12.

Figure 1E:
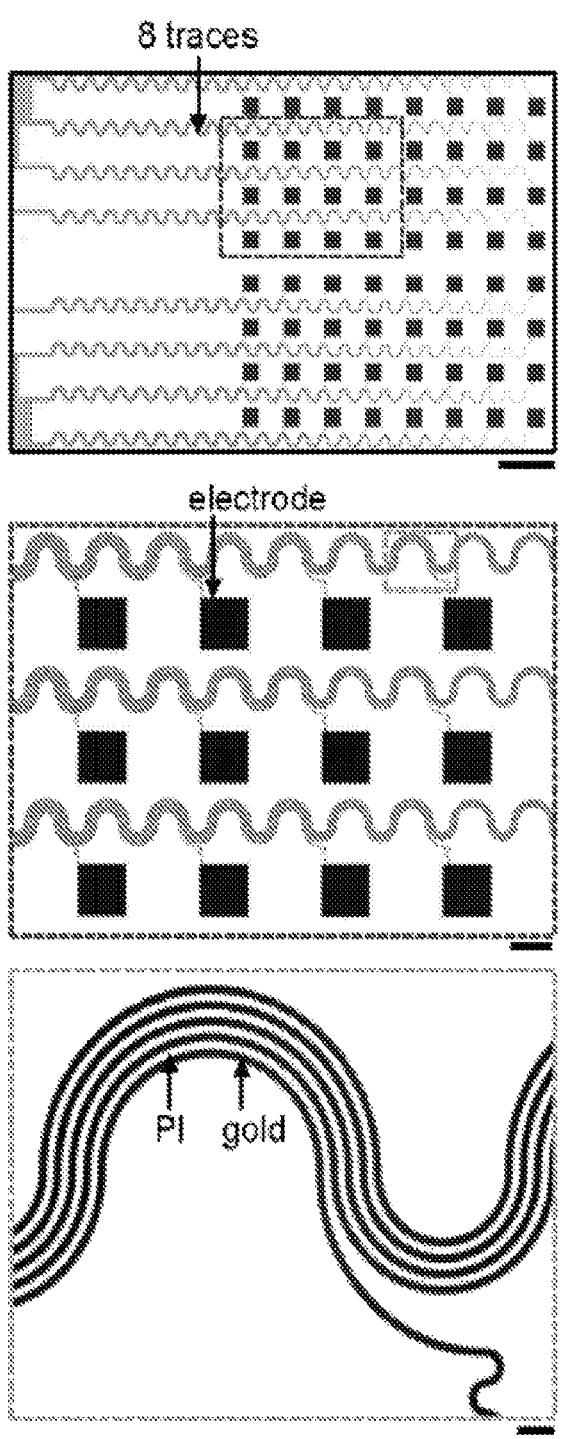
Figure 13:
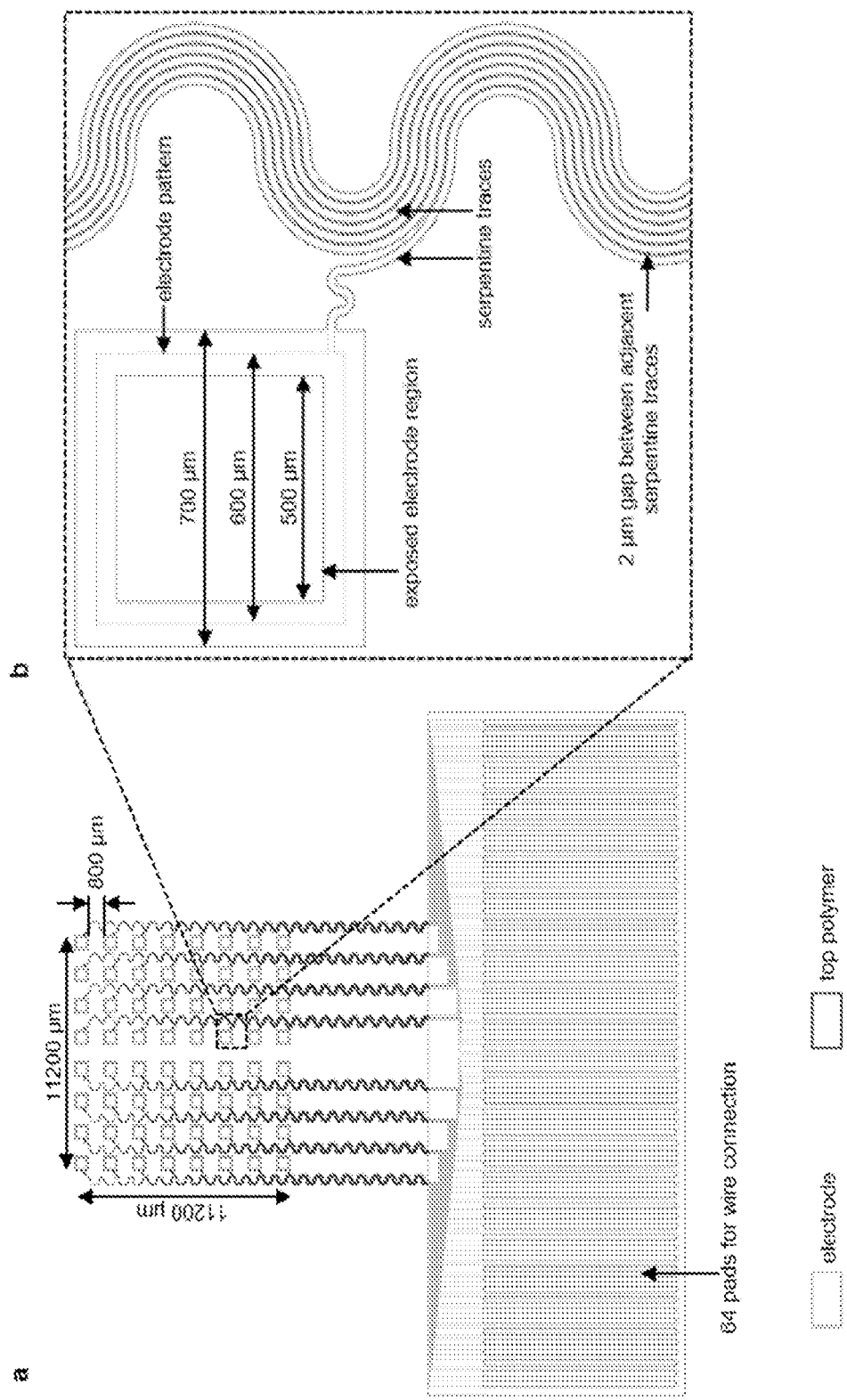
FIG. 13 shows a layout of the electrode array, according to embodiments of the invention. a, An 8 by 8 array. b, A unit cell.
Figure 14:
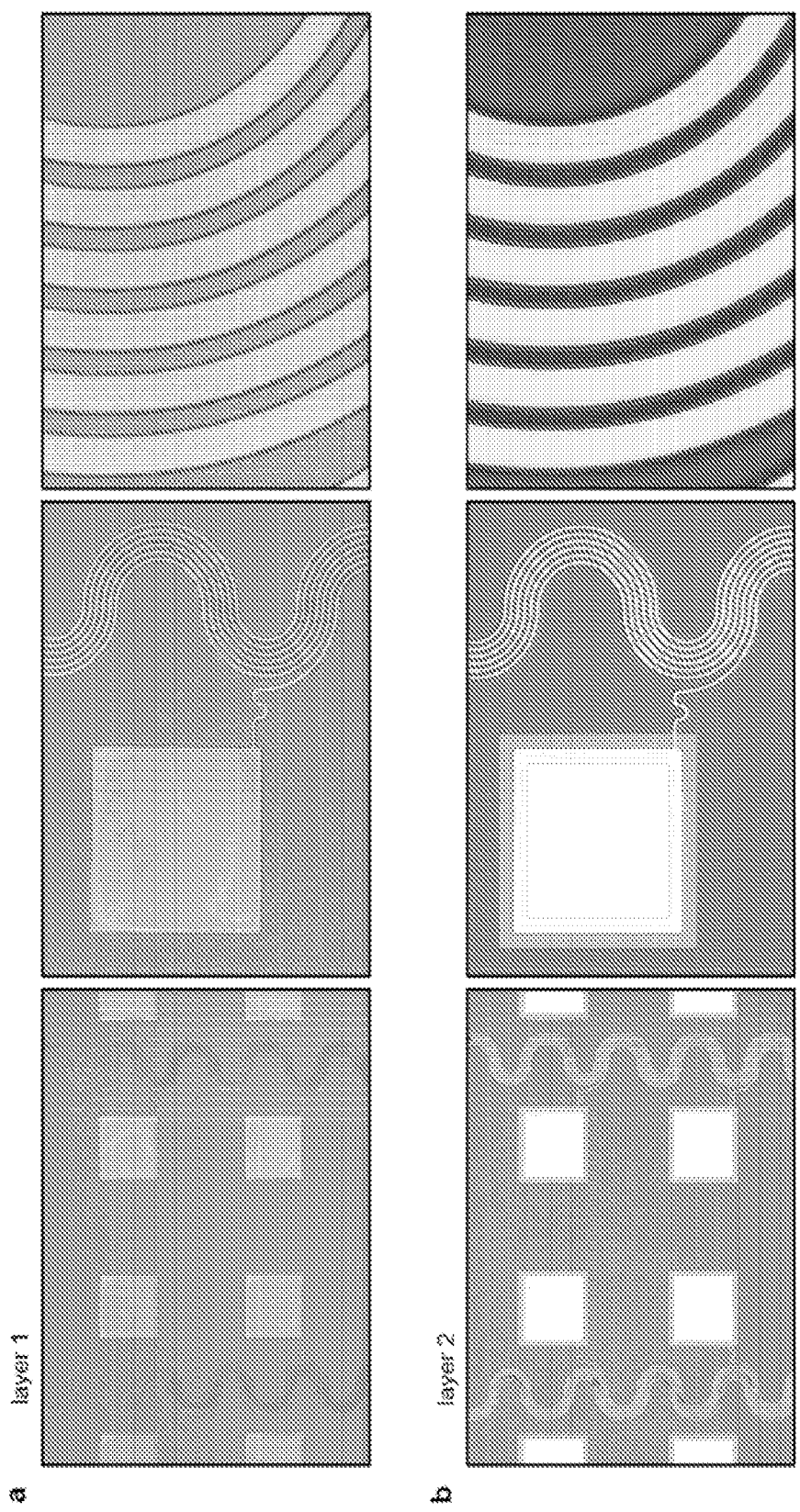
FIG. 14 shows optical images of the electrode array at different stages of the fabrication, according to embodiments of the invention. a, Layer of electrodes. b, Layer of polymer.
Figure 15:
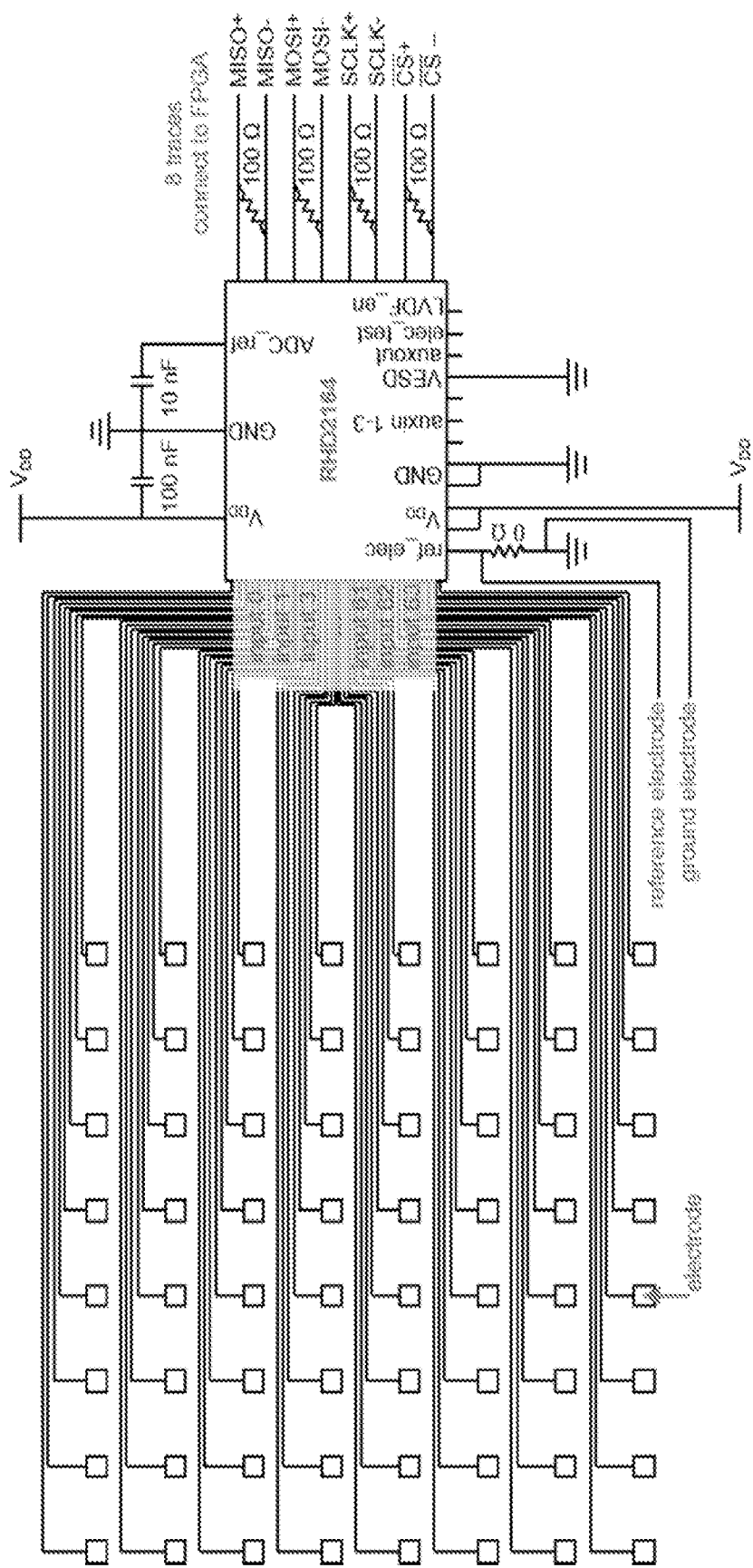
FIG. 15 shows a multiplexing circuit for the 8 by 8 electrode array, according to embodiments of the invention.
Figure 16:
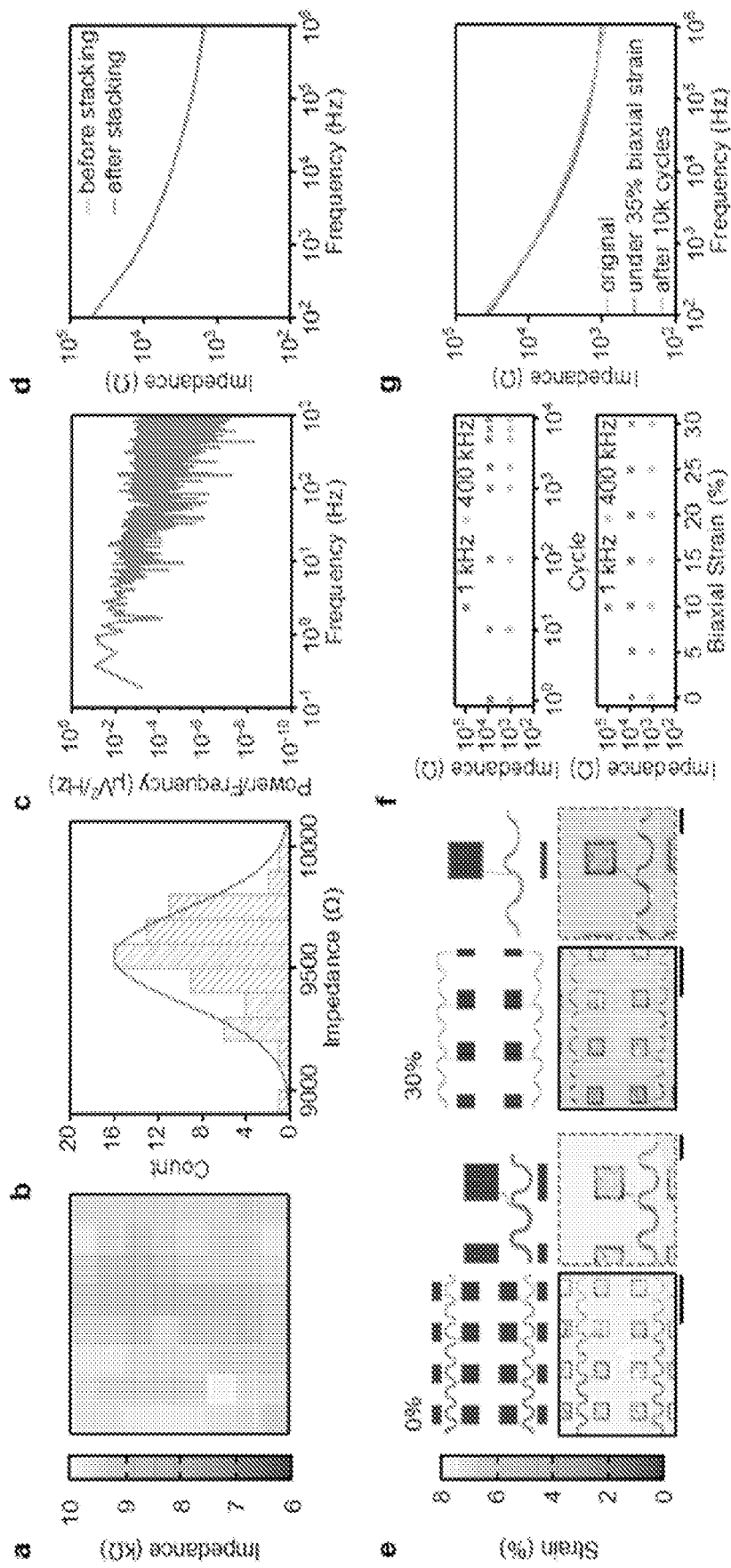
FIG. 16 shows characterizations of the electrode array, according to embodiments of the invention. a, Spatial map of the impedances of the electrode array at 1 kHz in 0.1 M phosphate-buffered saline (PBS) at room temperature (RT). b, Histogram and Gaussian lineshape fitting of the electrode impedances. c, Power spectral density of the noise signal from the electrode. d, Impedance spectra of the electrode before and after stacking with other layers of electronics. e, FEA results (top) and optical images (bottom) of the electrode array under biaxial strains of 0% and 30%. f, Impedance of the electrode under cyclic 20% uniaxial stretching (top) and different biaxial strains (bottom). g, Impedance spectra of the electrode at various conditions. Scale bars, 2 mm for the images in black squares, 500 µm for images in blue dashed squares.
Figure 17:
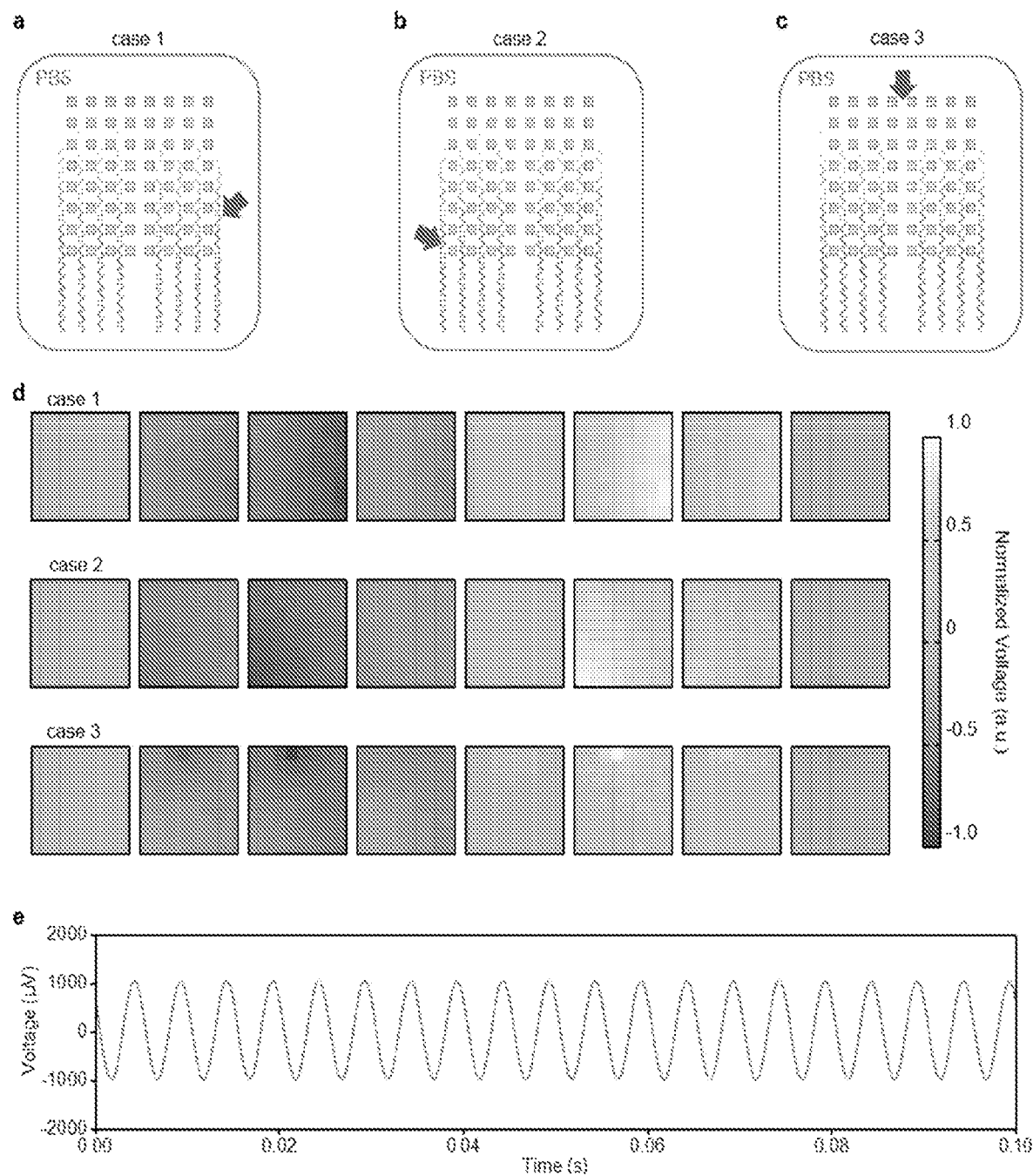
FIG. 17 shows mapping performance of the electrode array in PBS (0.1 M), demonstrating the 100% yield of the device, according to embodiments of the invention. a-c, Schematic illustrations of the setup. Red arrows indicate the positions of the electrodes with input signals (sinusoidal wave, 200 Hz). d, Corresponding normalized electrical mapping results at different time points. Frame interval: 0.75 ms. e, Time-domain response of a electrode to the input signal.
Figure 18:
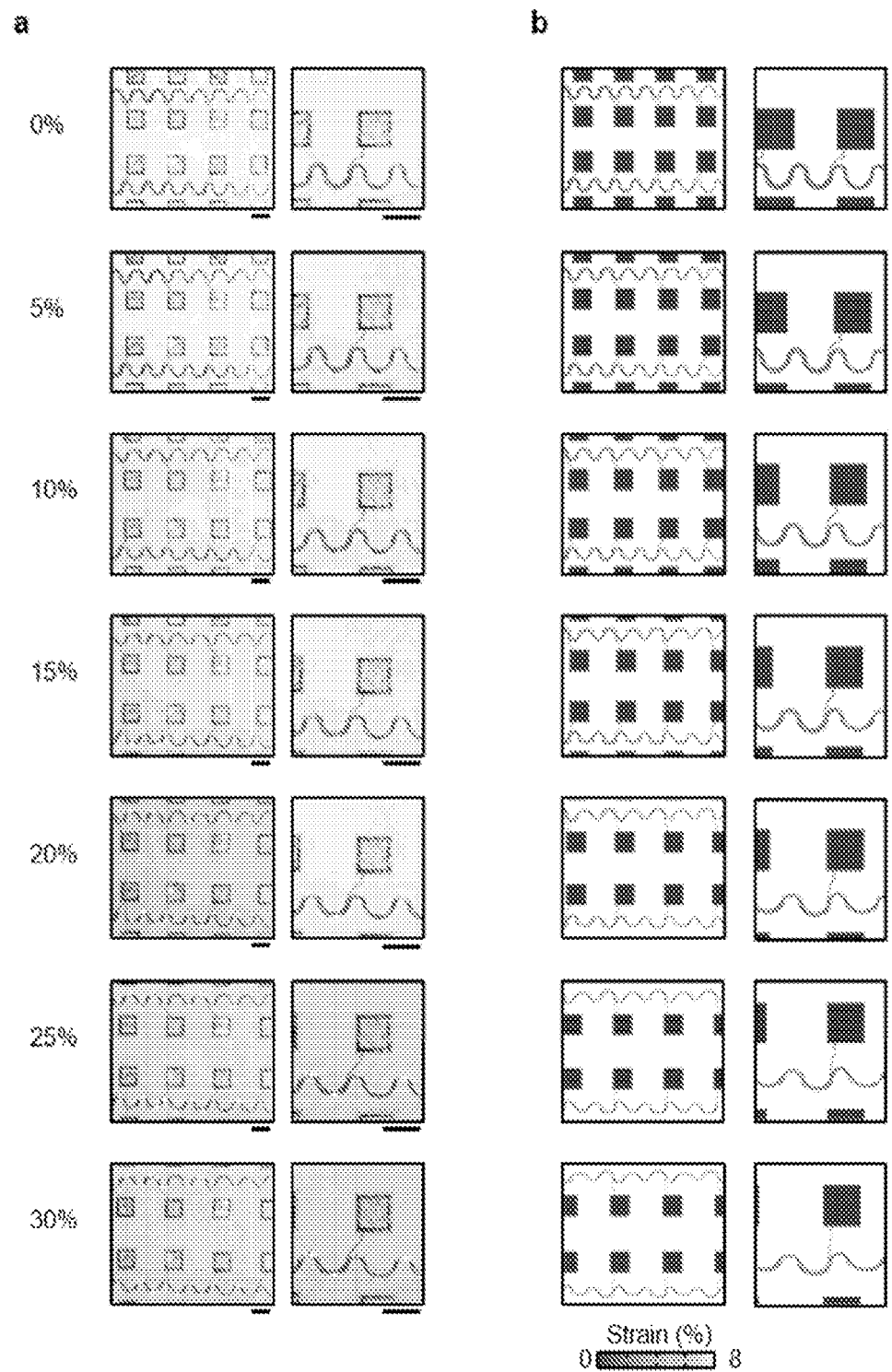
FIG. 18 shows an electrode array under biaxial stretching, according to embodiments of the invention. a, Optical images. b, FEA results. Scale bars, 700 µm.

The electrode array includes exposed Au pads (about 500 by 500 μm in lateral dimension, about 300 nm in thickness) interconnected by serpentine traces and sandwiched between two layers of PI (about 3.3 μm in thickness each). These traces adopt optimal geometric designs (Au: about 15 μm in width, PI: about 21 μm in width) to accommodate biaxial stretching of about 30% without inducing fractures in the constituent materials (FIGS. 1E, 13 and 14). A multiplexed data acquisition (DAQ) system includes an application-specific integrated circuit (ASIC) chip (RHD2164, Intan Technologies) to amplify, digitize and multiplex the signals, thereby reducing the total number of wires that connect to the testing instrument from sixty-four to eight (FIG. 15). Using the ASIC chip eliminates the requirement for flexible transistors at each unit cell and allows the system to leverage state-of-the-art microelectronic elements (Table 1). In vitro measurements on the electrode array indicate an ability to reach 100% yields, with high levels of uniformity (impedances with a mean of about 9547Ω and a standard deviation of about 192.5Ω under Gaussian fitting) and stretchability (toleration to biaxial tensile strains of about 30%), and stable impedances under various conditions (e.g., after stacking with more layers of electronics, under about 30% biaxial stretching, and after about 10,000 cycles of about 20% uniaxial stretching, FIGS. 16-18).

TABLE 1

Comparison of the multiplexing strategies.

| | Conventional Strategy | The invention |
|---|---|---|
| Components at each pixel | transistors + sensors | only sensors |
| Positions of the active components | inside the array | outside of the array |
| Total number of wires (8 by 8 array) | 24 | 8 (electrode) 16 (temperature/ pressure sensor) |
| Fabrication procedures | Microfabrication transfer printing | assembly on printed circuit board |

Figure 1F:
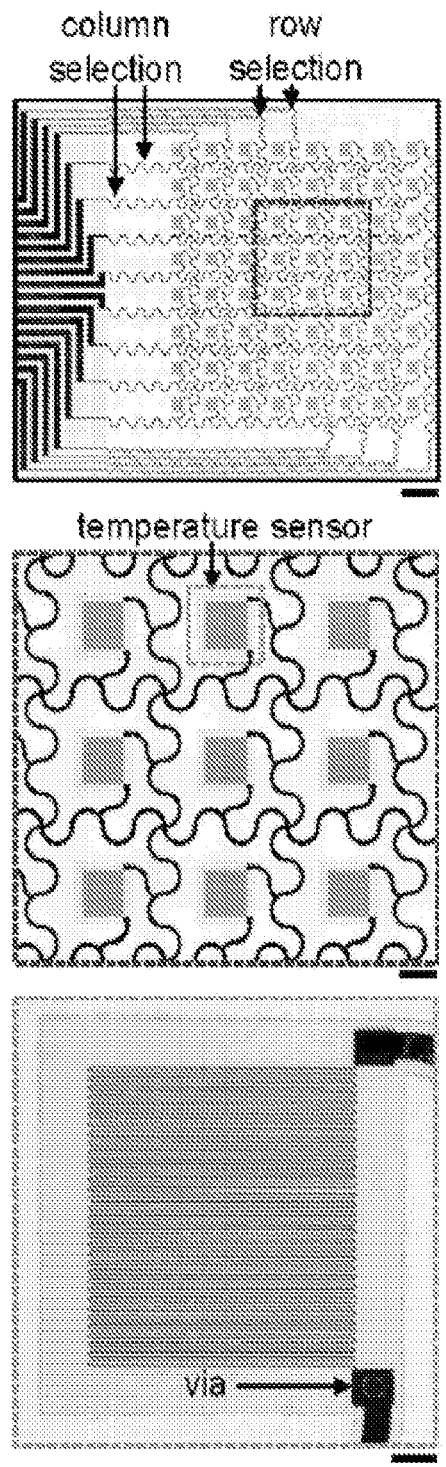
Figure 1G:
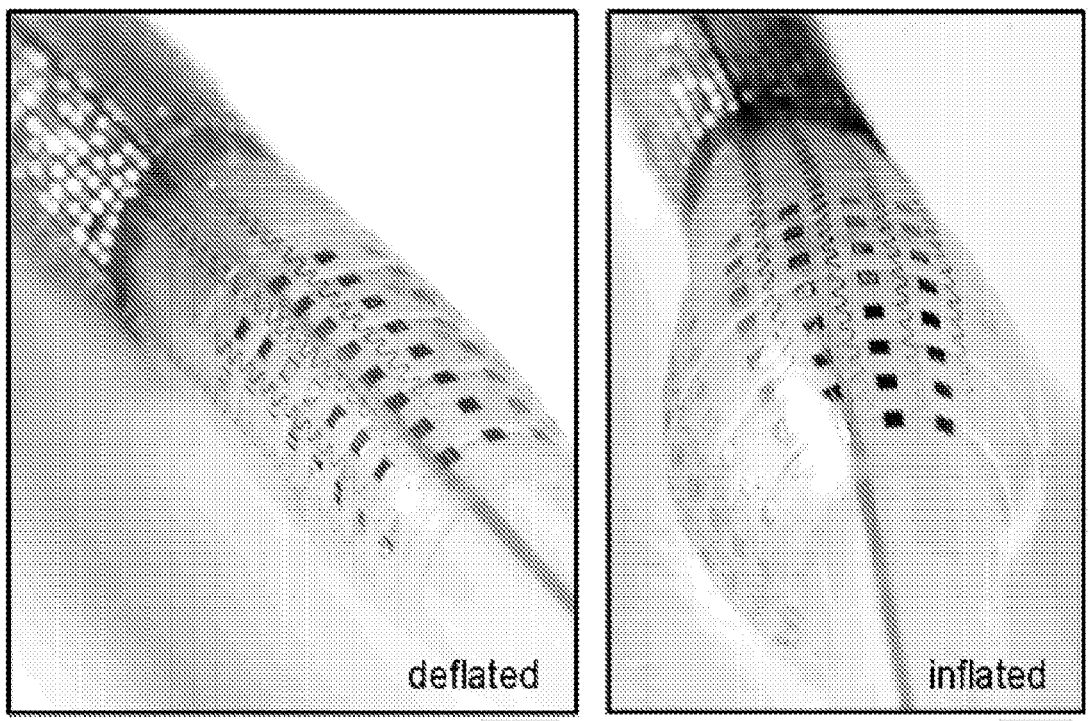
Figure 1H:
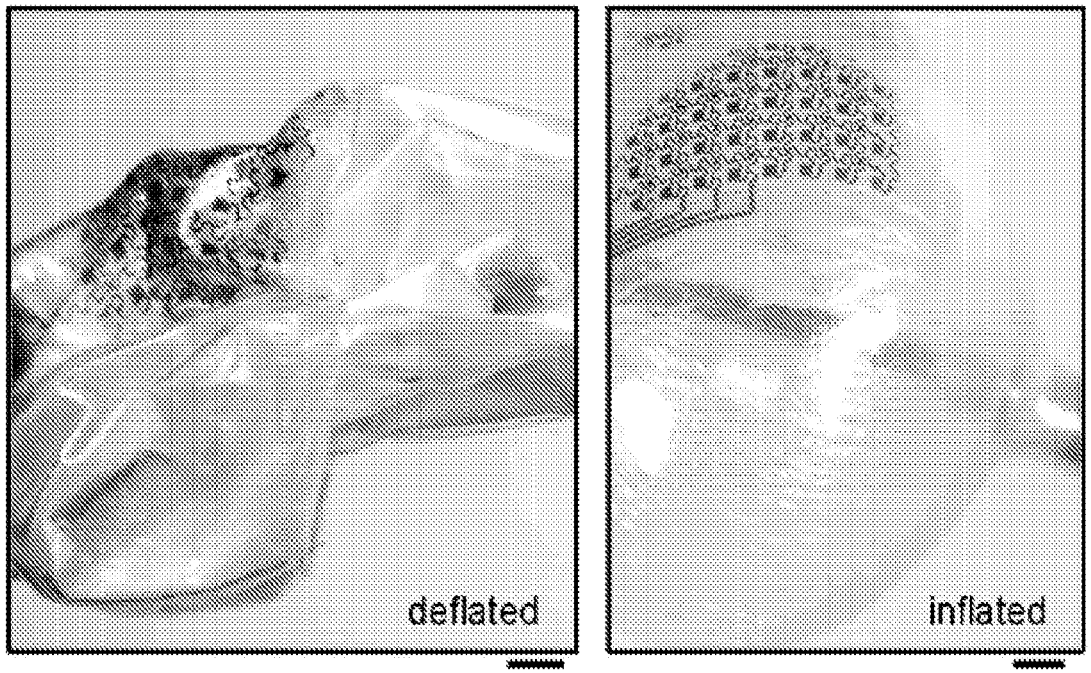
Figure 19:
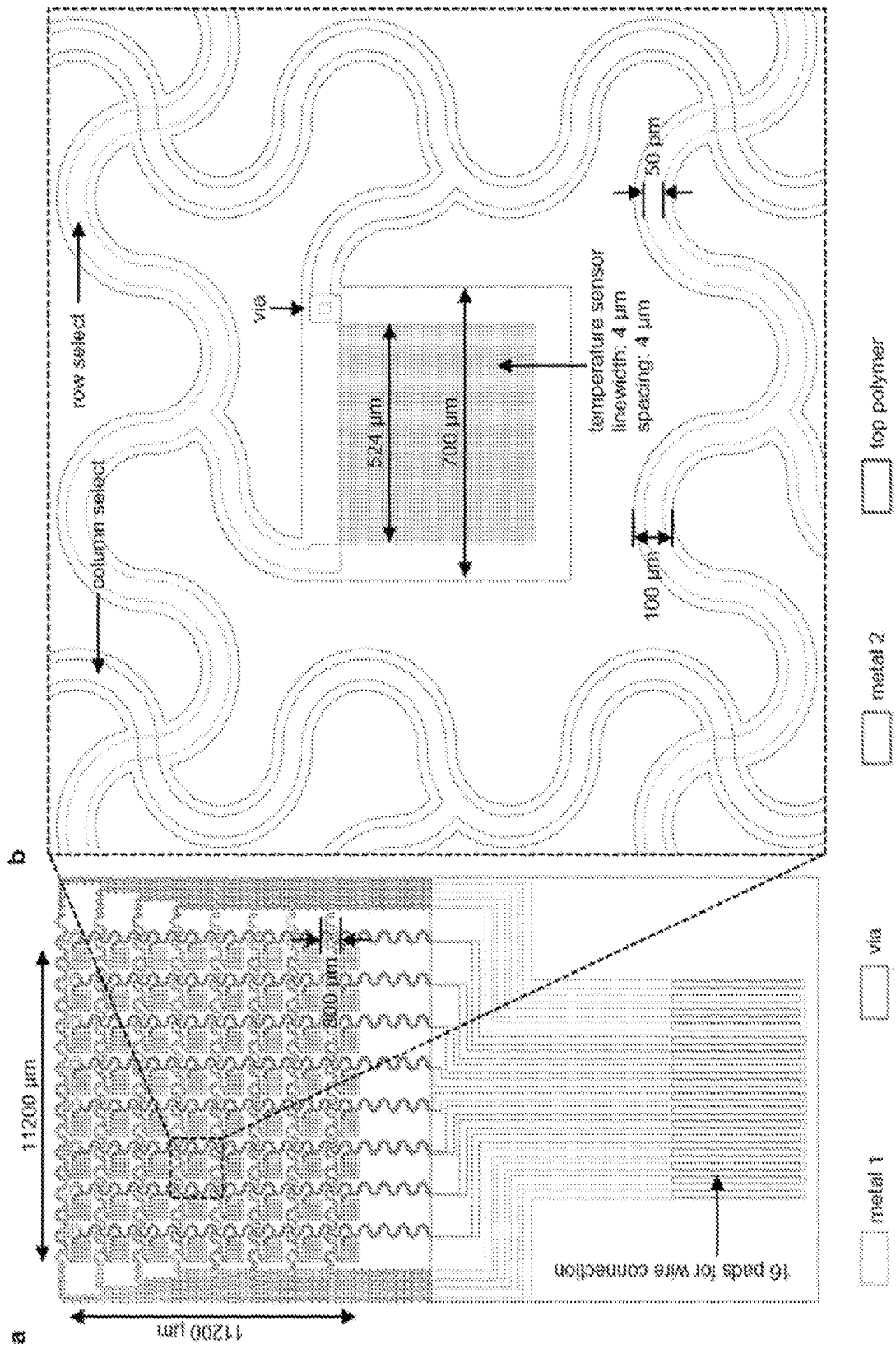
FIG. 19 shows a layout of the temperature sensor array, according to embodiments of the invention. a, An 8 by 8 array. b, A unit cell.
Figure 20:
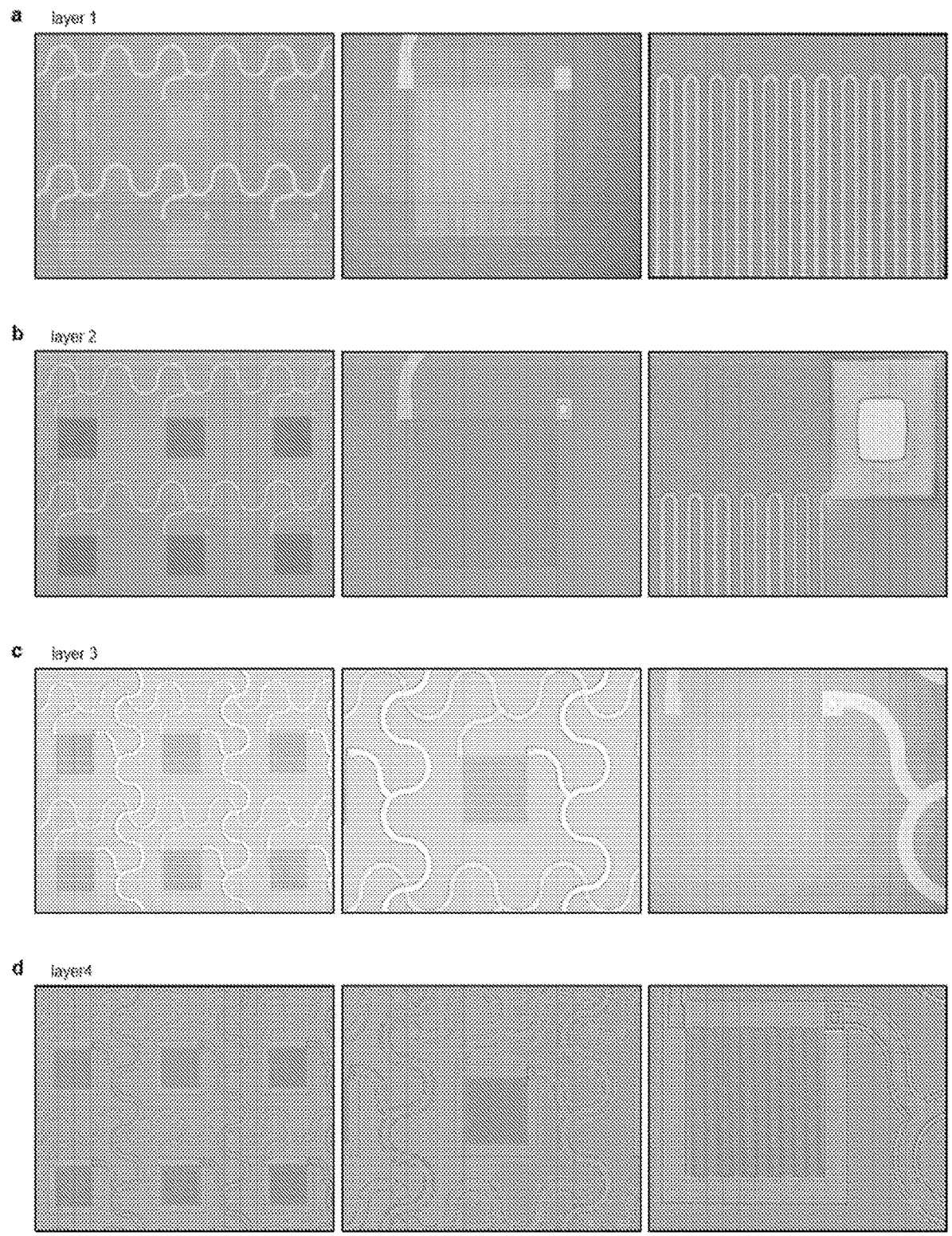
FIG. 20 shows optical images of the temperature sensor array at different stages of the fabrication, according to embodiments of the invention. a, Layer of temperature sensors and row selection lines. b, Layer of via. c, Layer of column selection. d, Layer of polymer.
Figure 21:
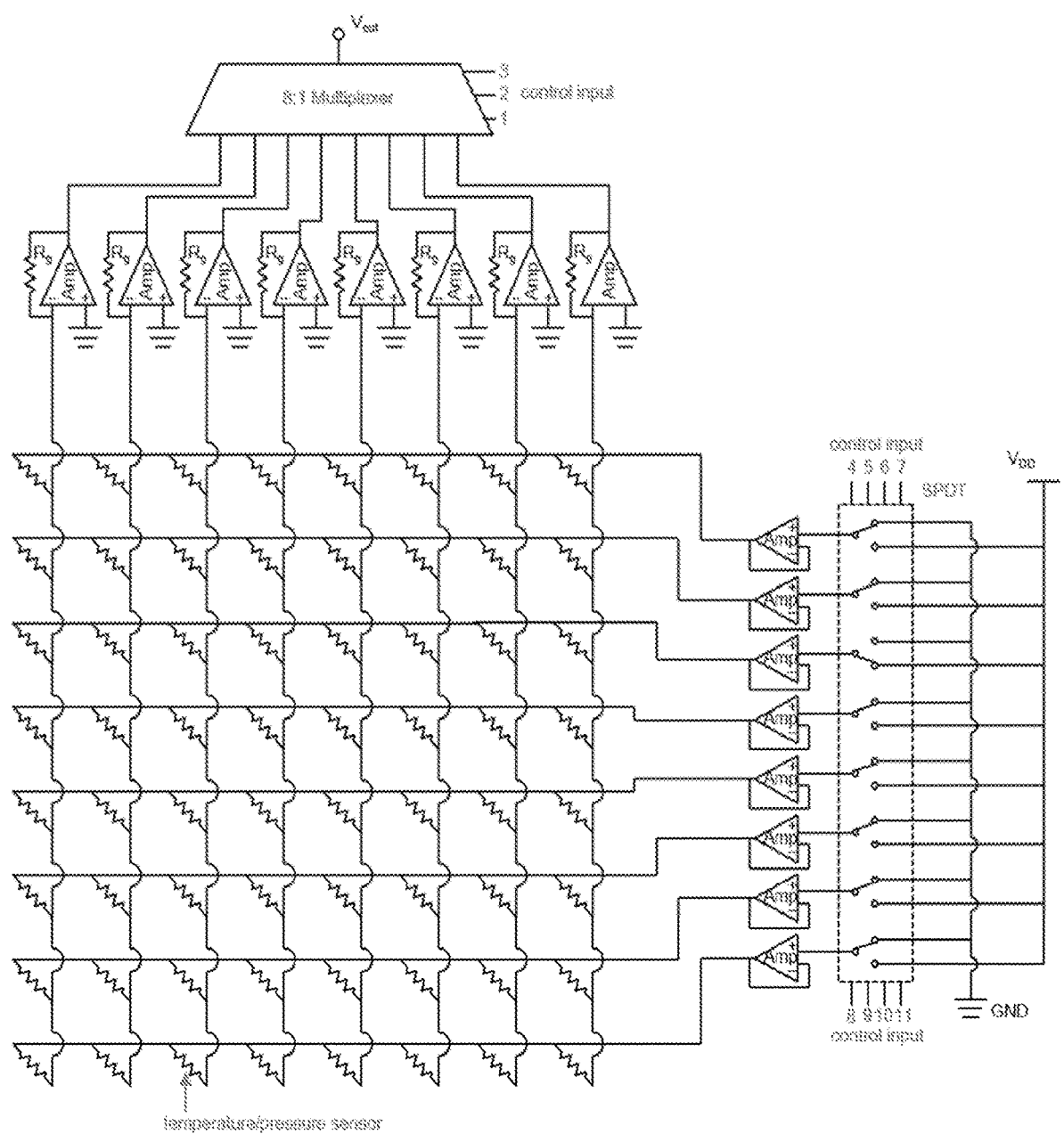
FIG. 21 shows a multiplexing circuit for the 8 by 8 temperature and pressure sensor arrays, according to embodiments of the invention.
Figure 22:
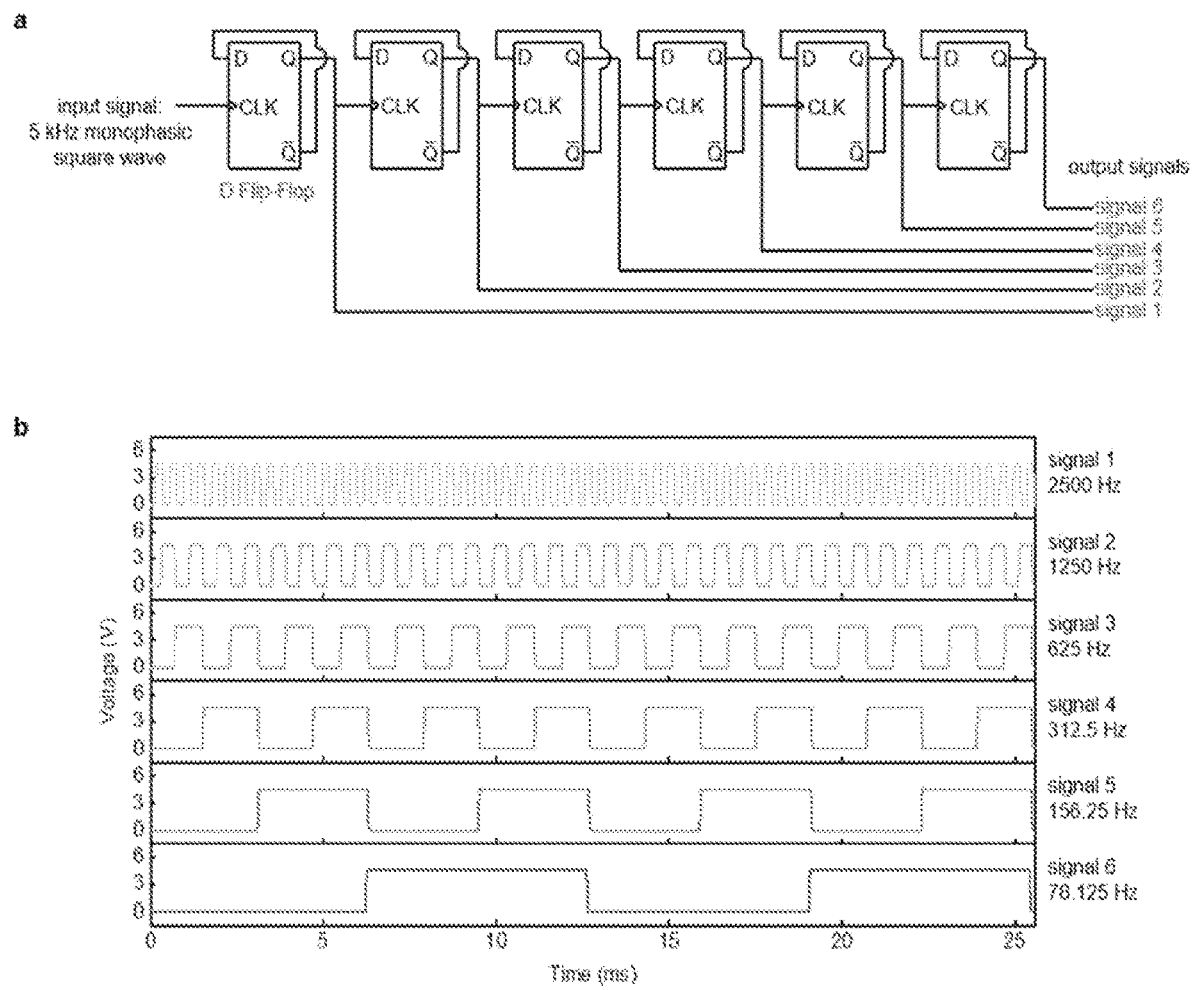
FIG. 22 shows a control input for the multiplexers, according to embodiments of the invention. a, Circuit diagram. b, Waveforms of the output signals.
Figure 23:
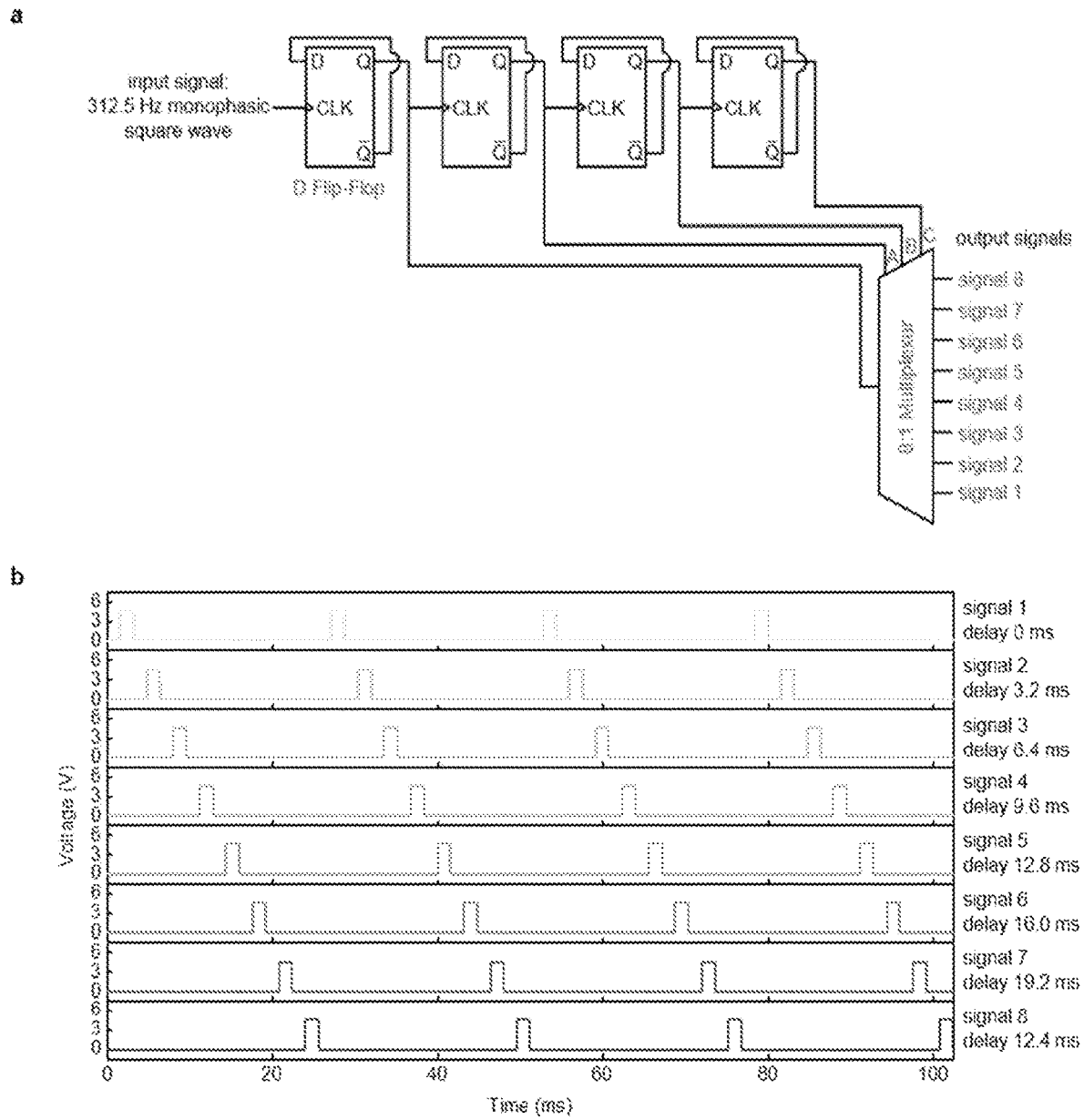
FIG. 23 shows a control input for the single pole double throw (SPDT) switches, according to embodiments of the invention. a, Circuit diagram. b, Waveforms of the output signals.
Figure 24:
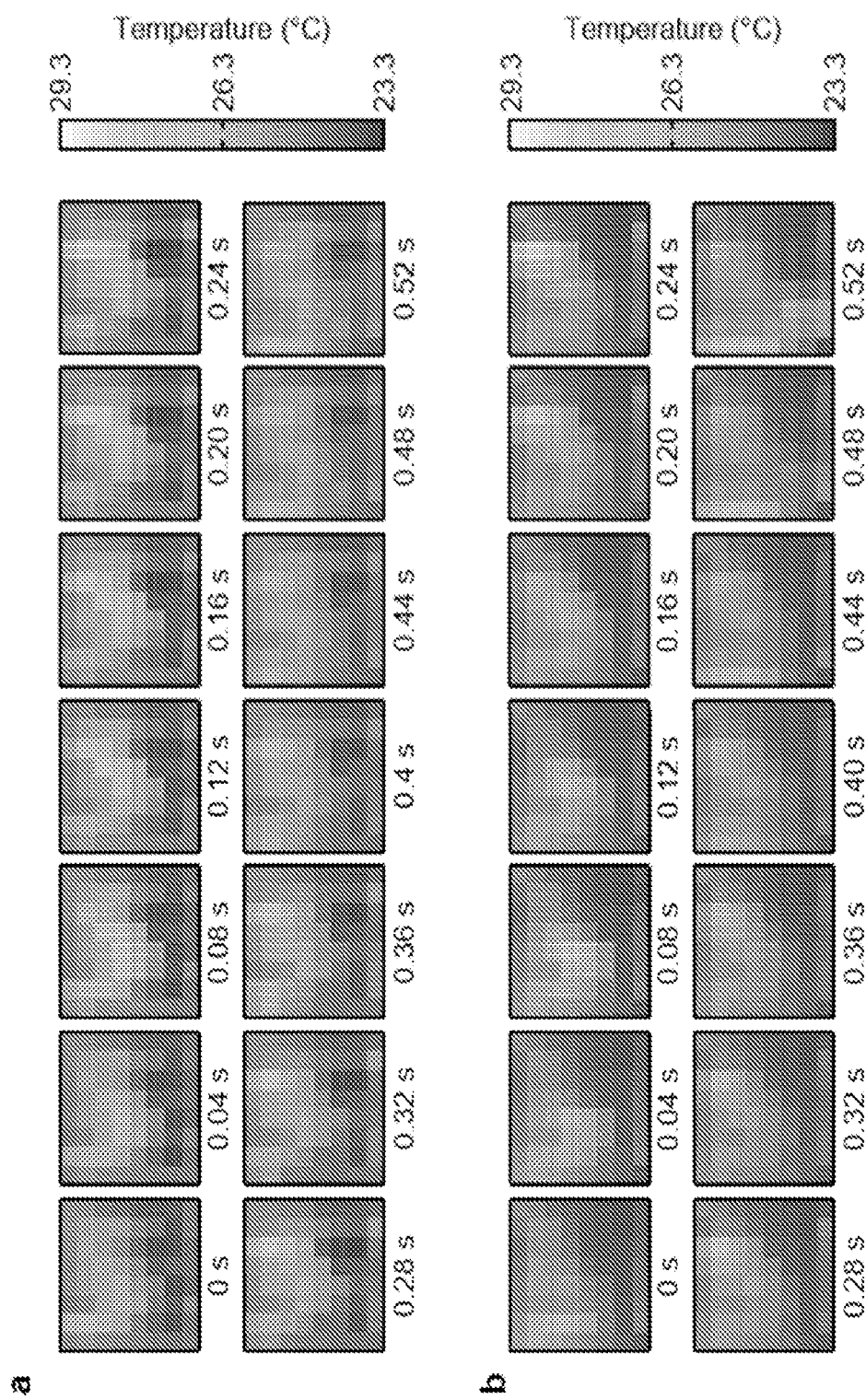
FIG. 24 shows temperature mapping with proper grounding to eliminate the crosstalk, according to embodiments of the invention. a, Temperature distribution measured from the 8 by 8 temperature sensor array. b, Temperature distribution measured from an IR camera.
Figure 25:
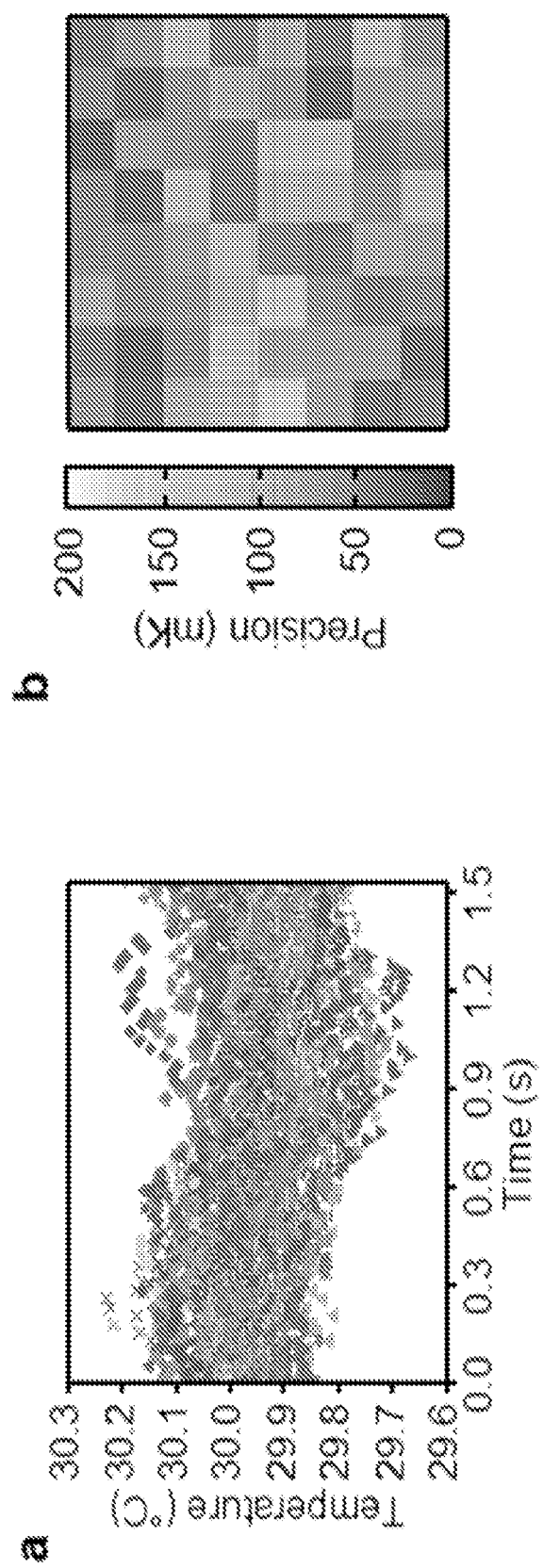
FIG. 25 shows measurement precision associated with the temperature sensor array, according to embodiments of the invention. a, Responses of the sixty-four temperature sensors on a hotplate. Standard deviation ranges from about 24 to about 147 mK. b, Precision map of the temperature sensors, calculated from the standard deviation of 61 points.
Figure 26:
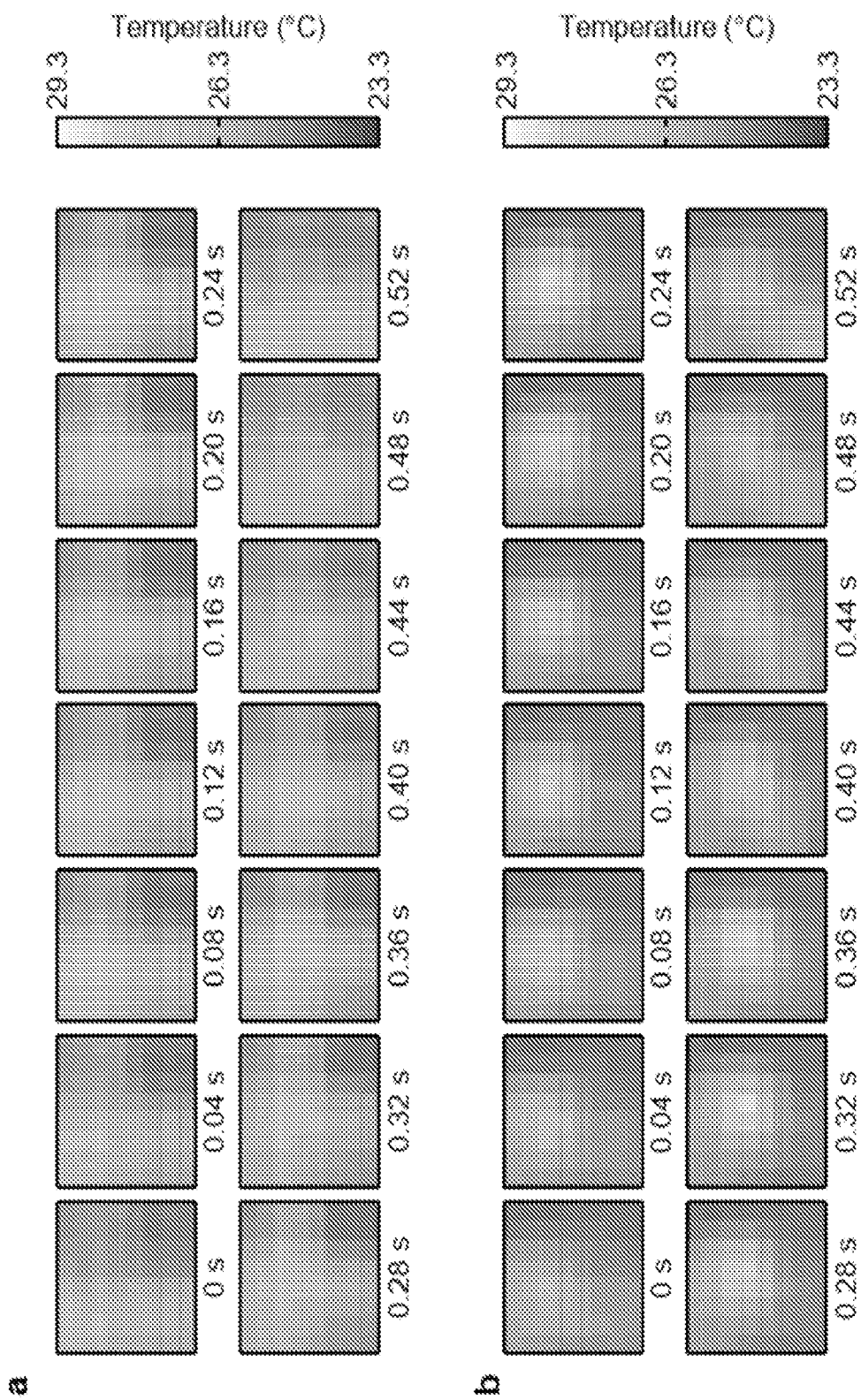
FIG. 26 shows temperature mapping from the circuit with crosstalk, according to embodiments of the invention. a, Temperature distribution measured from the 8 by 8 temperature sensor array. b, Temperature distribution measured from an IR camera.
Figure 27:
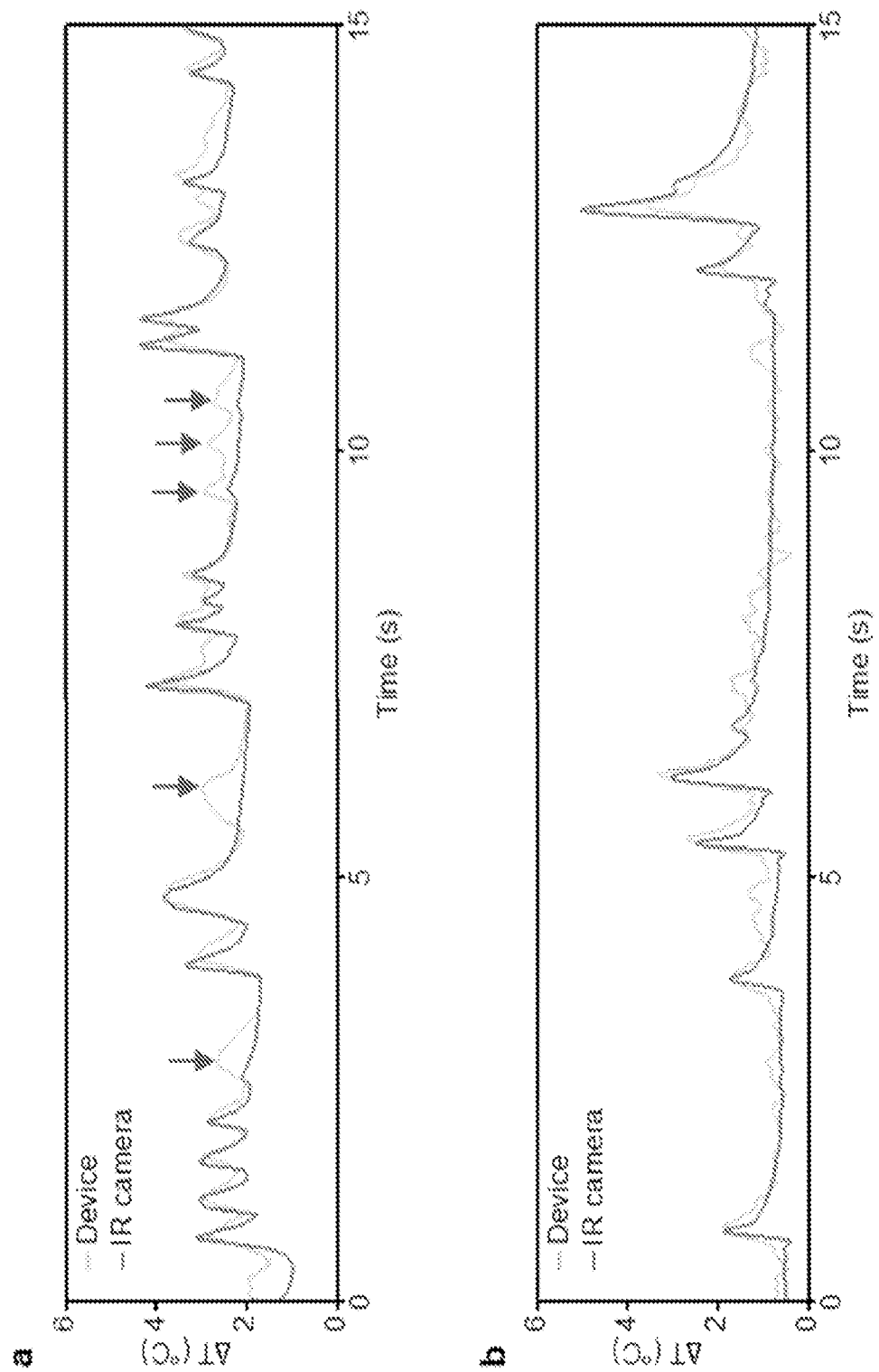
FIG. 27 shows a comparison of the results from the infrared camera and the stretchable temperature sensor array, according to embodiments of the invention. a, Results from the circuit with crosstalk. Red colors indicate inaccurate temperature increase due to the crosstalk. b, Results from the circuit with proper grounding to eliminate the crosstalk.
Figure 28:
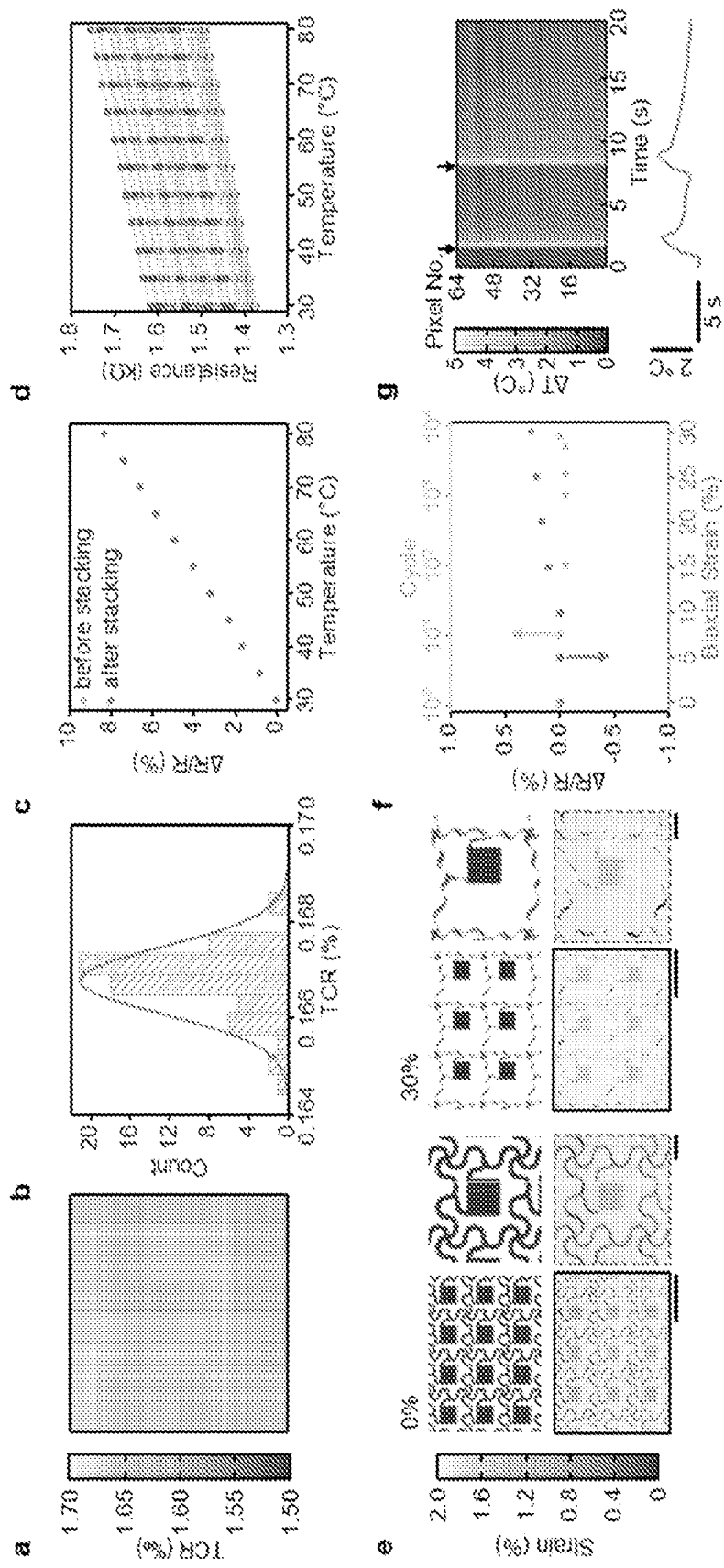
FIG. 28 shows characterization results for the temperature sensor array. a, Spatial map of the TCRs of the temperature sensors in the array, according to embodiments of the invention. b, Histogram and Gaussian lineshape fitting of the TCRs. c, Fractional change of resistance of the temperature sensor at different temperatures before and after stacking with other layers of electronics. d, Resistances of the sixty-four temperature sensors at temperatures from 30 to 80° C. e, FEA results (top) and optical images (bottom) of the temperature sensor array under biaxial strains of 0% and 30%. f, Fractional change of resistance of a temperature sensor under cyclic 20% uniaxial stretching (orange points) and different biaxial strains (blue points). g, Responses of the sixty-four temperature sensors under hot air (top), and time-domain temperature curve of a single temperature sensor (bottom). Black arrows indicate the application of hot air. Scale bars, 2 mm for the images in black squares, 500 μm for images in blue dashed squares.
Figure 29:
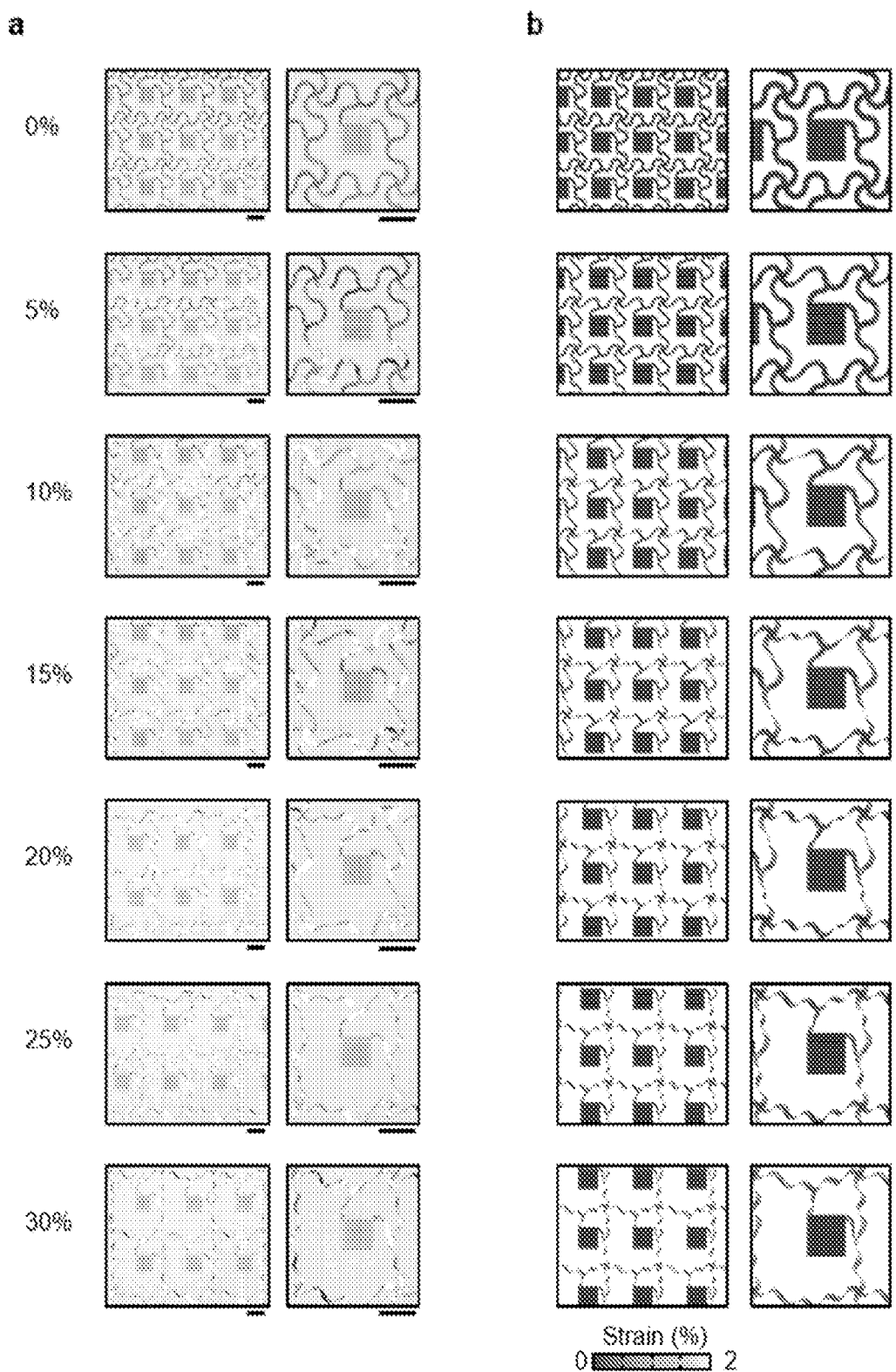
FIG. 29 shows a temperature sensor array under biaxial stretching, according to embodiments of the invention. a, Optical images. b, FEA results. Scale bars, 700 μm.
Figure 30:
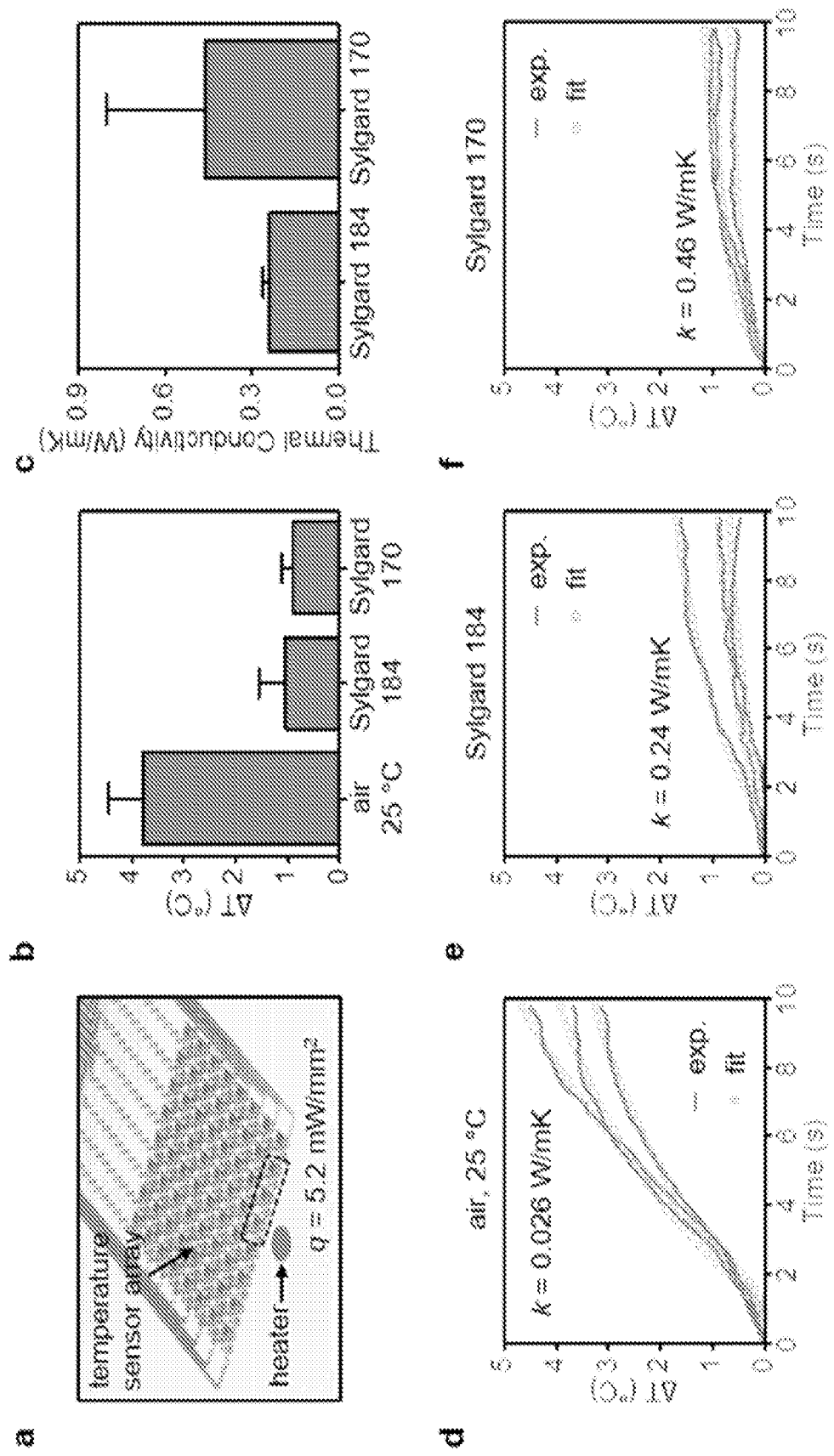
FIG. 30 shows assessment of thermal conductivities using a heater and the arrays of temperature sensors. a, Schematic illustration of the setup. b, Averaged temperature change (ΔT) at 10 s when placing the temperature sensor array in air and laminating layers of silicone (Sylgard 184 and Sylgard 170) onto the array. ΔT is measured from three temperature sensors in the black dashed square in (a). c, Calculated thermal conductivities (k) using transient plane source analysis. Air serves as the reference material with known thermal properties. Fitting the time-domain temperature profiles yield k for Sylgard 184 and Sylgard 170. d-e, Time-domain temperature profiles in different conditions (temperature sensor array in air (d), temperature sensor array laminated with a layer of Sylgard 184 (e) and Sylgard 170 (f)) measured from the temperature sensors in the black dashed square in (a).
Figure 31:
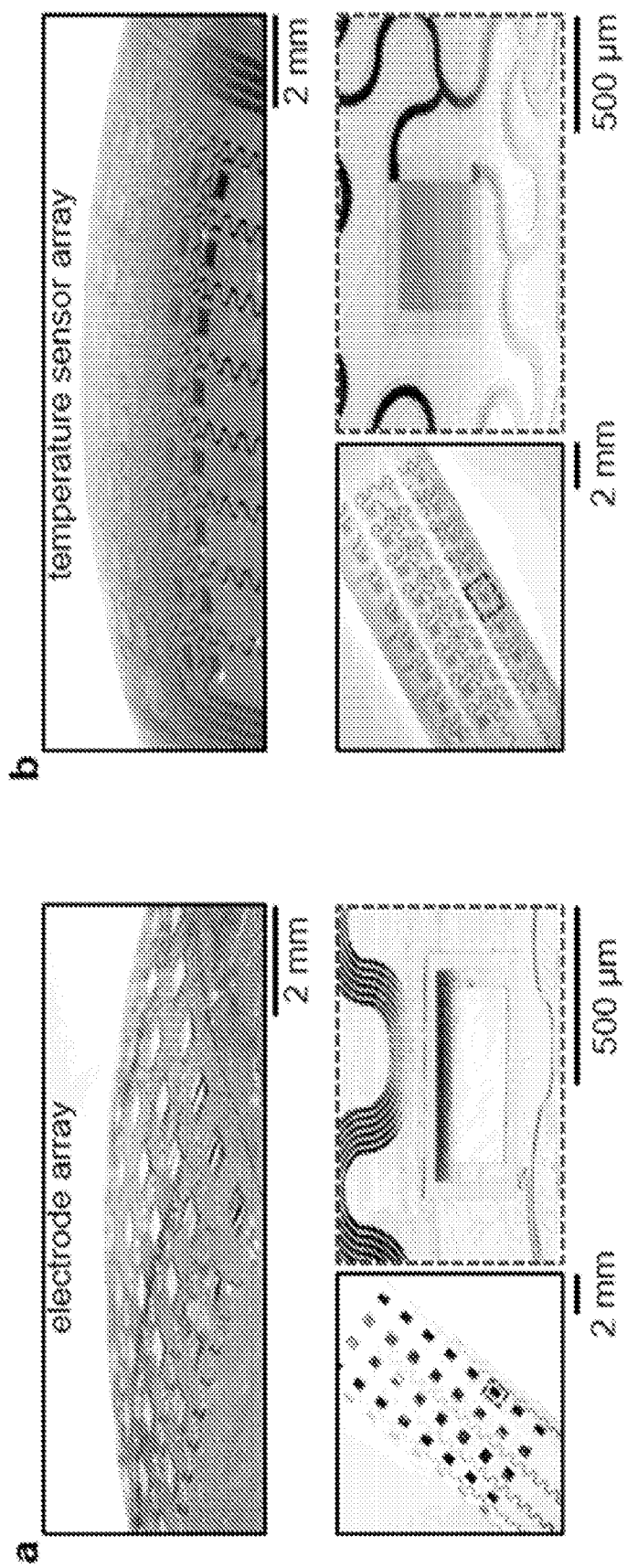
FIG. 31 shows optical images of the arrays on various curvilinear surfaces, according to embodiments of the invention. a, Electrode array. b, Temperature sensor array.
Figure 32:
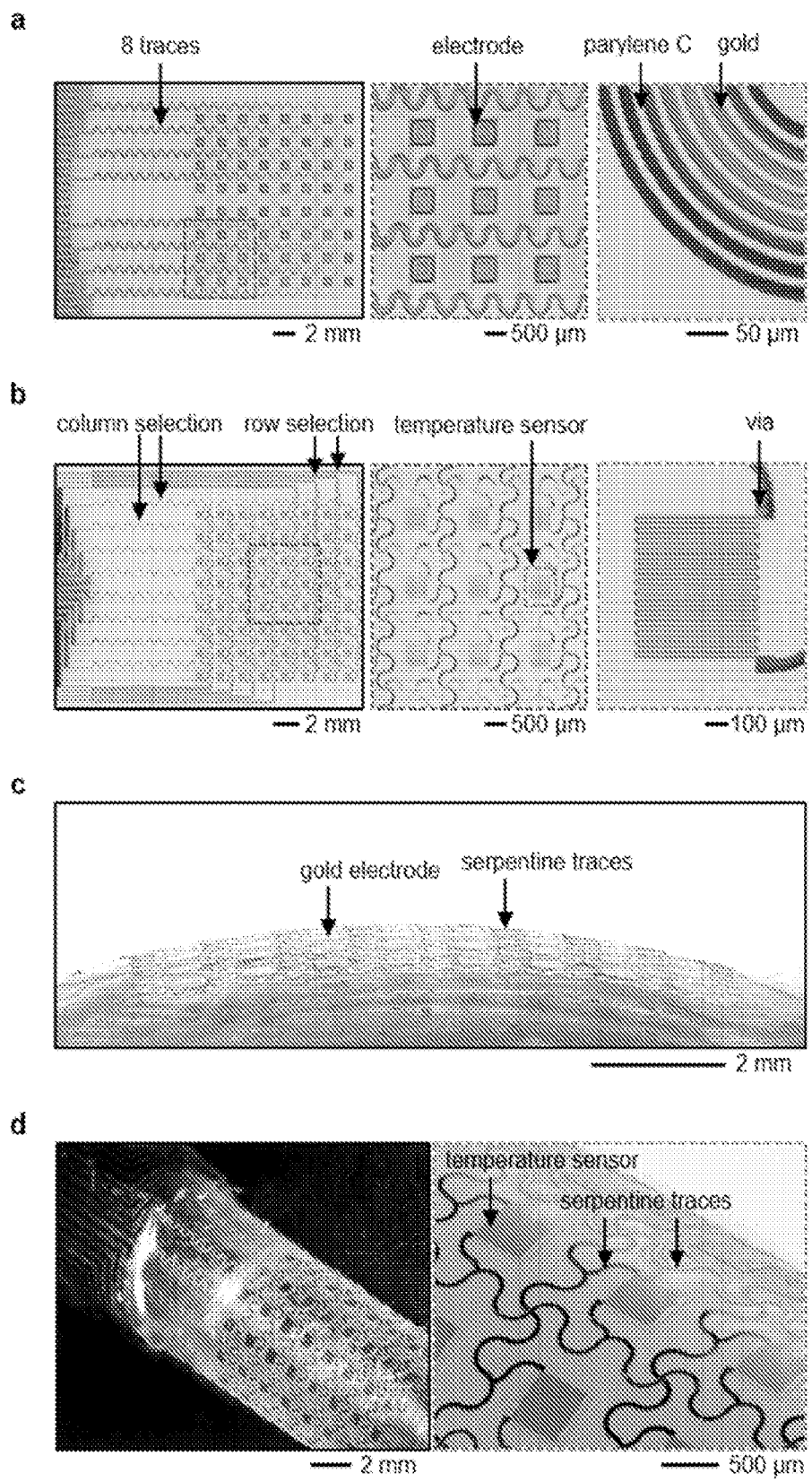
FIG. 32 shows optical images of the parylene-C-based multiplexed devices, according to embodiments of the invention. a, Electrode array on planar substrate. b, Temperature sensor array on planar substrate. c, Electrode array on planar curvilinear surface. d, Temperature sensor array on curvilinear surface.
Figure 33:
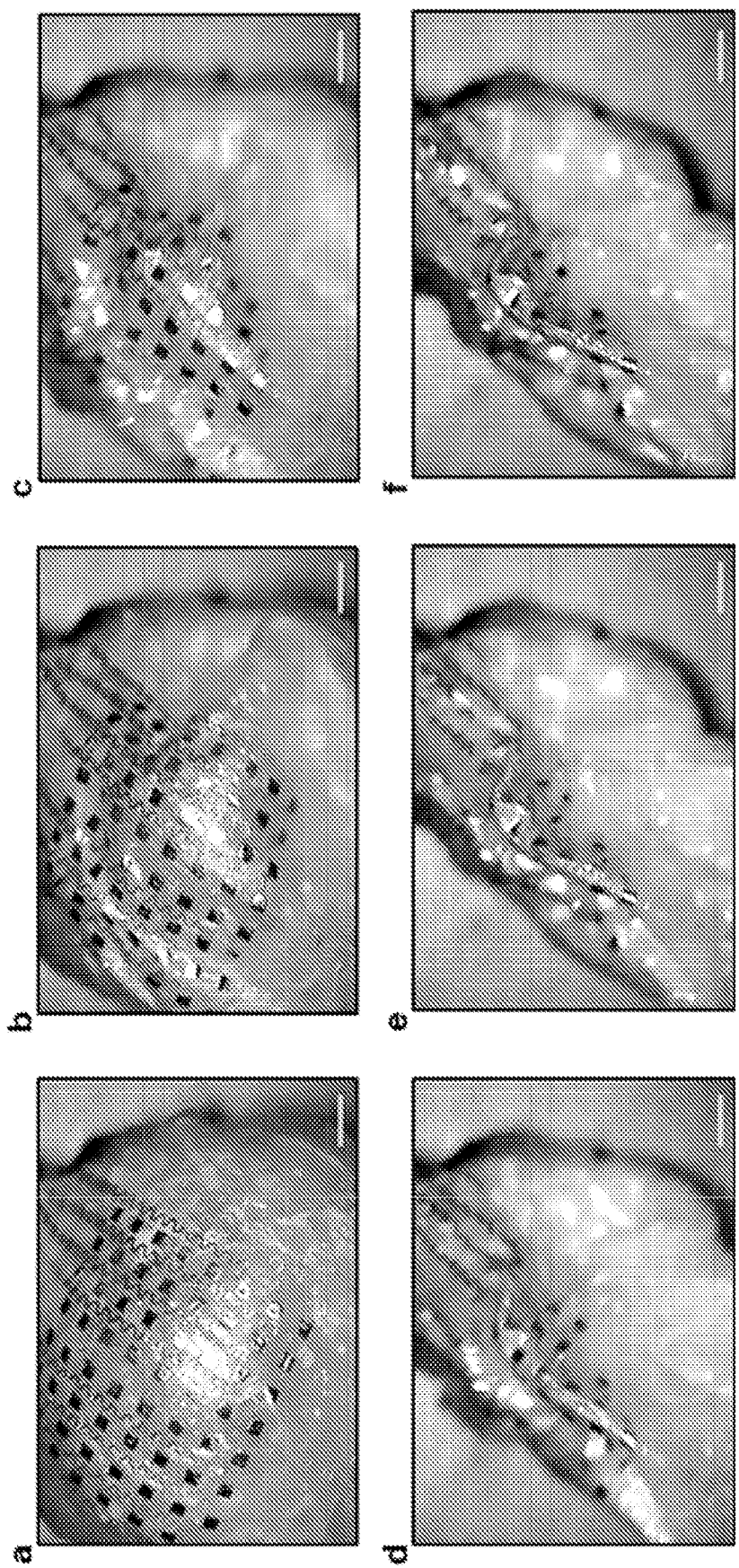
FIG. 33 shows optical images of the electrode array on a commercial balloon catheter in polyurethane, according to embodiments of the invention. a, Fully inflated. b,c, Partially inflated. d,e, Partially deflated. f, Fully deflated. Scale bars, 2 mm.
Figure 34:
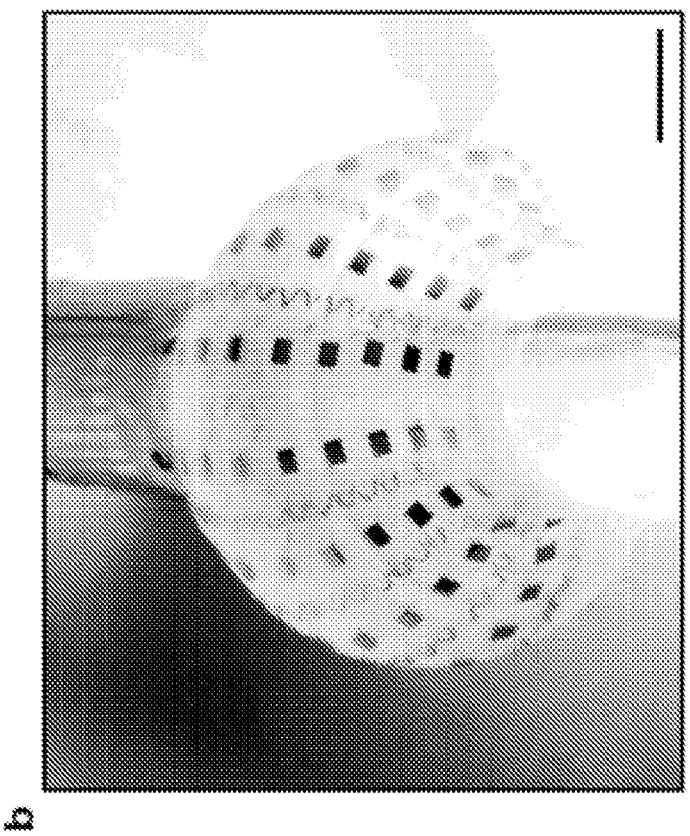
FIG. 34 shows optical images of the electrode array on a commercial balloon catheter in silicone, according to embodiments of the invention. a, Deflated. b, Inflated. Scale bars, 2 mm.
Figure 34:
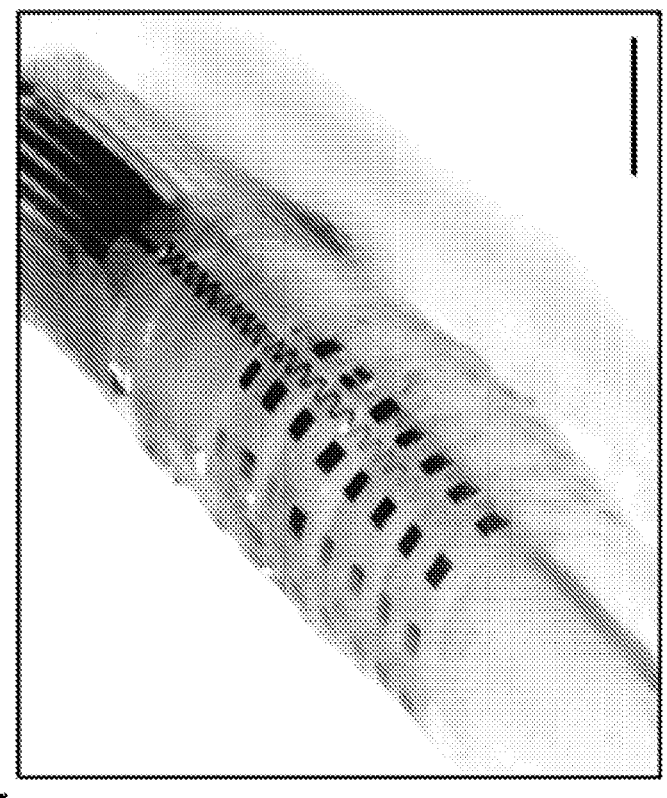
Figure 35:
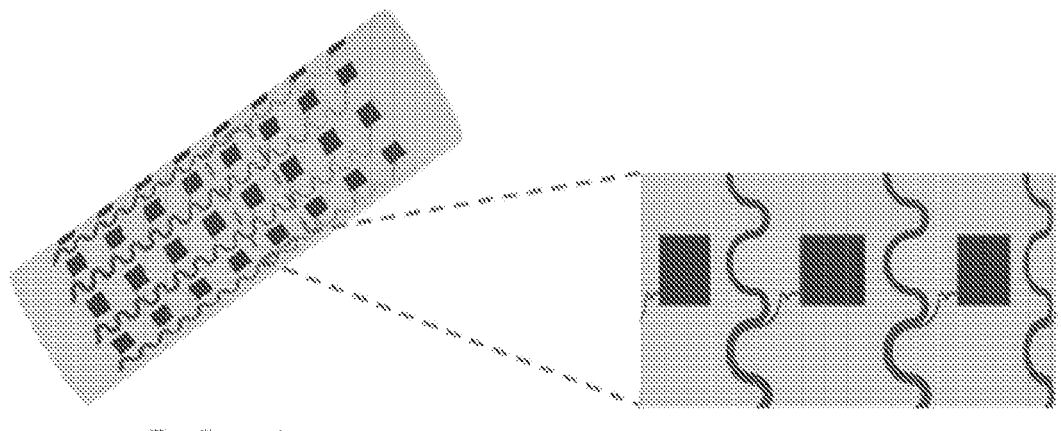
FIG. 35 shows FEA results of the balloon in silicone instrumented with an electrode array, according to embodiments of the invention. a, Deflated. b, Inflated.
Figure 35:
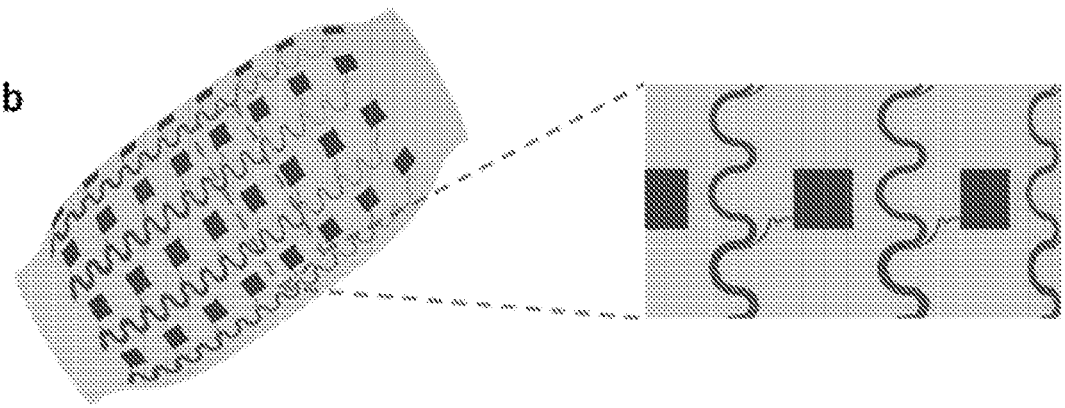

Much like the electrode array design, the temperature sensor array exploits thin metal traces of Au (about 100 nm in thickness, about 4 μm in width), but configured as resistive elements each electrically interfaced to two connection lines. This feature allows column and row selection multiplexing using signals delivered through these lines. The lines for row selection reside in the layer with the temperature sensor, while those for column selection lie above, separated by a layer of PI (about 1 μm in thickness) and connected to one side of the sensors through a via hole (about 24 by 30 μm in area, FIGS. 1F, 19 and 20). An 8×8 array of temperature sensors in this configuration yields sixteen wires (eight for row selection, eight for column selection). A customized circuit mounted outside of the array allows multiplexing of the signals and eliminates crosstalk with proper grounding (FIGS. 21-24 and Table 1). A 5 kHz clock signal enables each individual sensor to record temperatures at a sampling rate of about 40 Hz. Averaged outputs from sixty-four temperature sensors yield a precision (one standard deviation) ranging from about 20 to about 150 mK (n=61, FIG. 25). Synchronized temperature recordings from an infrared (IR) camera and the sensor array under irradiation by ultraviolet (UV) laser to create a distribution of heating by optical absorption verify the accuracy of the system (FIG. 24). Measurements taken without grounding suffer from leakage currents, leading to poor spatiotemporal temperature mapping results (FIGS. 26 and 27). In vitro characterization results in FIGS. 28 and 29 illustrate uniform sensitivity (temperature coefficients of resistances, TCRs, with a mean of about 0.17% and a standard deviation of about 0.0007% under Gaussian fitting), linear responses from about 30 to about 80° C. (R-squared>0.9999 in linear regression before and after stacking with other layers of electronics), as well as mechanical robustness (stable resistance under biaxial strains of about 30% and about 10,000 cycles of about 20% uniaxial stretching). The array of temperature sensors can also be exploited for spatial mapping of tissue thermal conductivity by introducing a separate layer of thermal actuators (about 3 mm² in area, about 4 kΩ in resistance, FIG. 30). In this embodiment, transient plane source analysis of the time-domain temperature profiles from the sensors yields thermal conductivities at different locations. Assessment of other parameters, such as flow of blood and other biofluids and tissue hydration levels, are also possible through further analysis of the data.

FIGS. 1G-1H and 31-35 present optical images and the results of finite element analysis (FEA) of the mechanics associated with electrode and temperature sensor arrays integrated onto various curvilinear surfaces. The small lateral dimensions of the arrays (about 1 by 1 cm) facilitate integration onto different types of minimally invasive balloon catheters, including those constructed in silicone (Bard Bardex Foley Catheter 14 Fr, mounted in its deflated state, FIG. 1G) and polyurethane (cryoballoon catheter, Medtronic, Arctic Front™, mounted in its inflated state, FIG. 1H). Such fabrication and integration processes establish straightforward routes to broad classes of advanced surgical instruments that can deliver therapy and provide high-quality multifunctional sensing.

Measurement of localized pressures represents another essential function of relevance to many procedures. In particular, high fidelity mapping of electrophysiological signals in the LA requires good contact between the sensor and the cardiac tissue. Furthermore, RF and IRE ablation demand intimate interfaces and well-controlled pressures to define the lateral spread and depths of lesions. Both cases could benefit from pressure sensors capable of measuring small forces at soft tissue interfaces, outside of the scope of capabilities of traditional thin film sensors. The approach introduced here exploits compressive buckling to transform traditional metal strain gauges into 3D shapes with high sensitivity to normal force and low effective modulus. These simple metal constructs can be fabricated easily and at low cost, with necessary performance and without the hysteresis behaviors that tend to dominate alternative designs that use conductive composites.

Figure 2A:
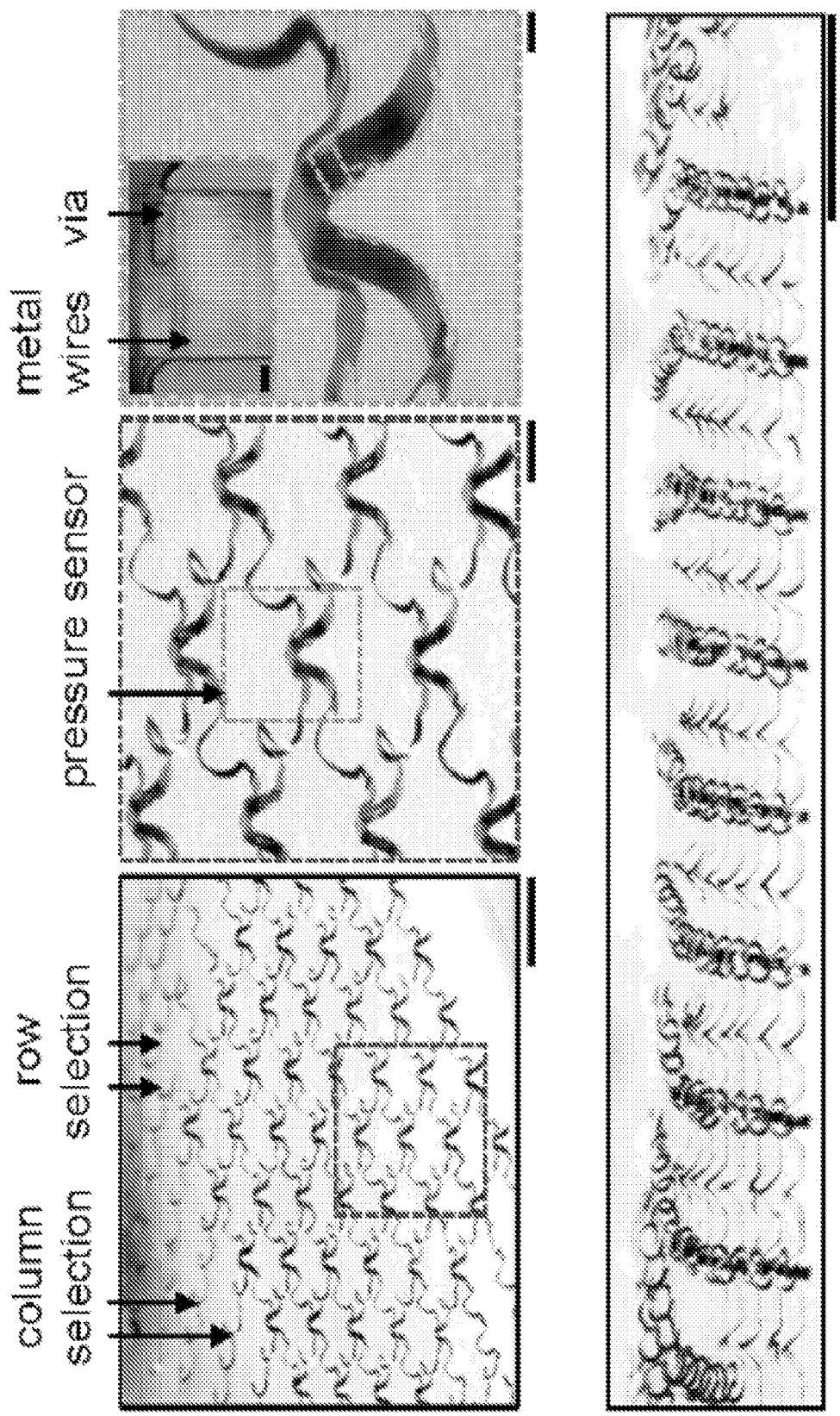
Figure 36:
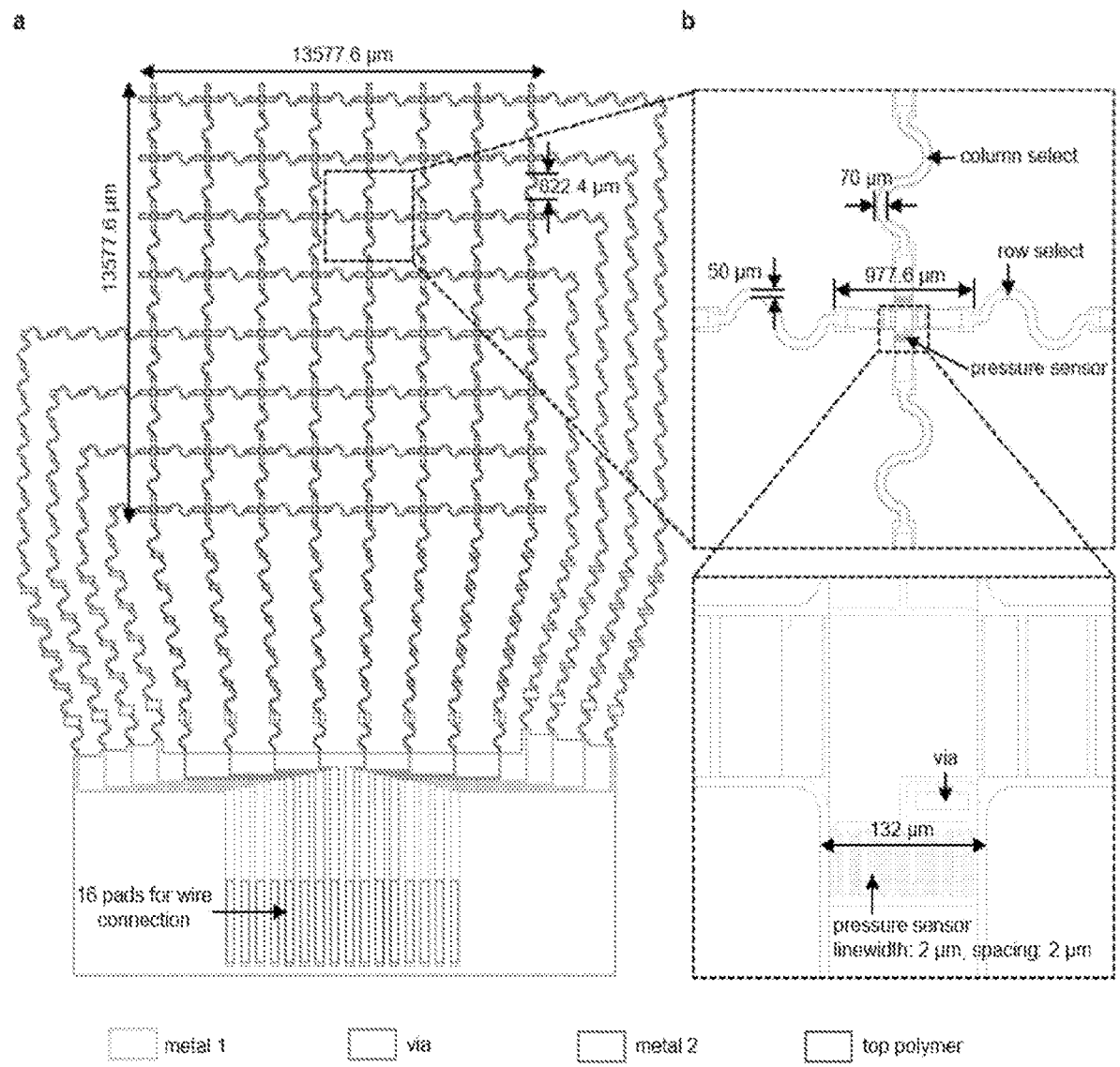
FIG. 36 shows a layout of the pressure sensor array, according to embodiments of the invention. a, An 8 by 8 array. b, A unit cell.
Figure 37:
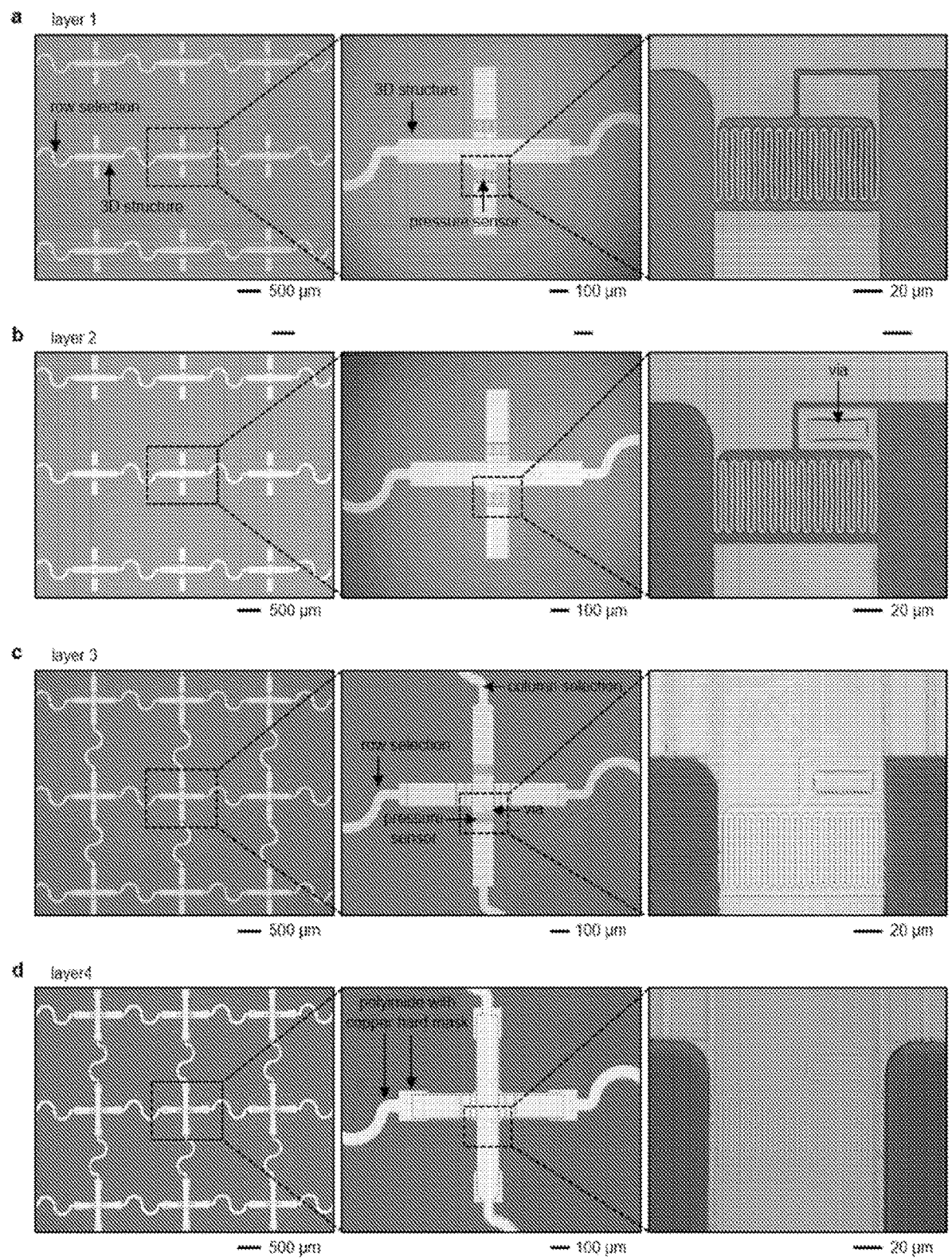
FIG. 37 shows optical images of the pressure sensor array at different stages of the fabrication, according to embodiments of the invention. a, Layer of temperature sensor and row selection. b, Layer of via. c, Layer of column selection. d, Layer of polymer.
Figure 38:
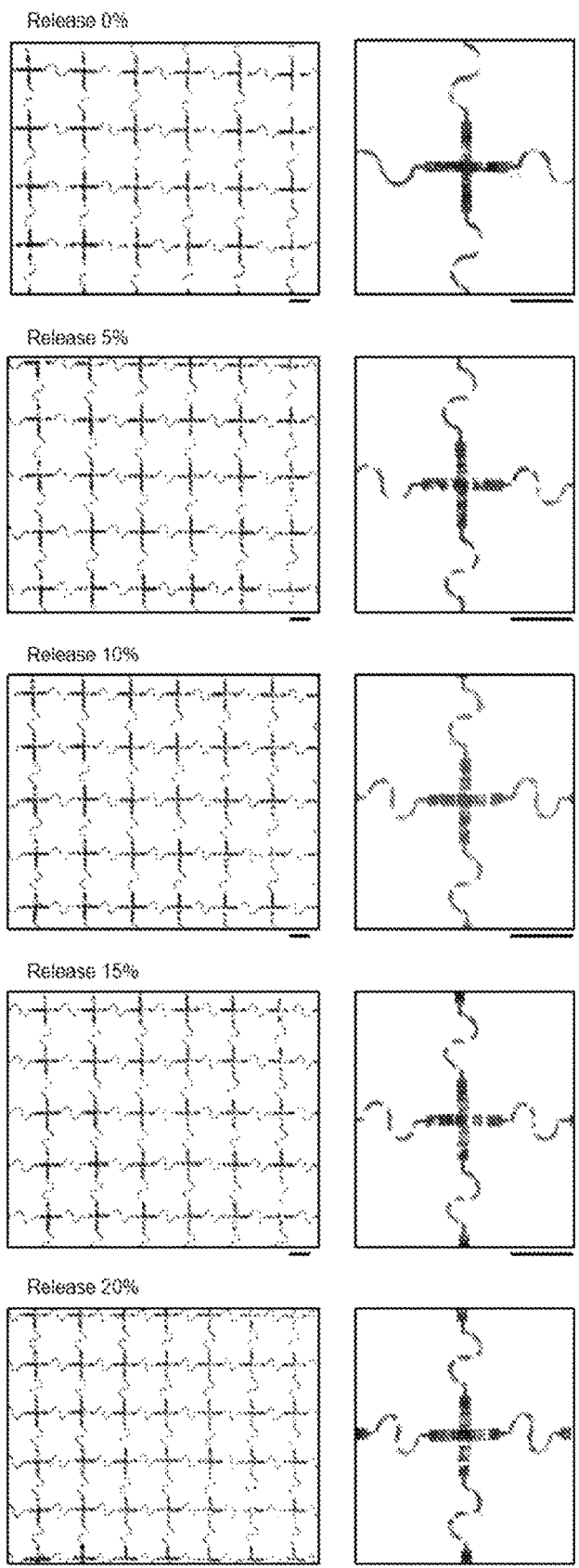
FIG. 38 shows optical images of the pressure sensor array during the compressive buckling process, according to embodiments of the invention. Scale bars, 700 μm.
Figure 39:
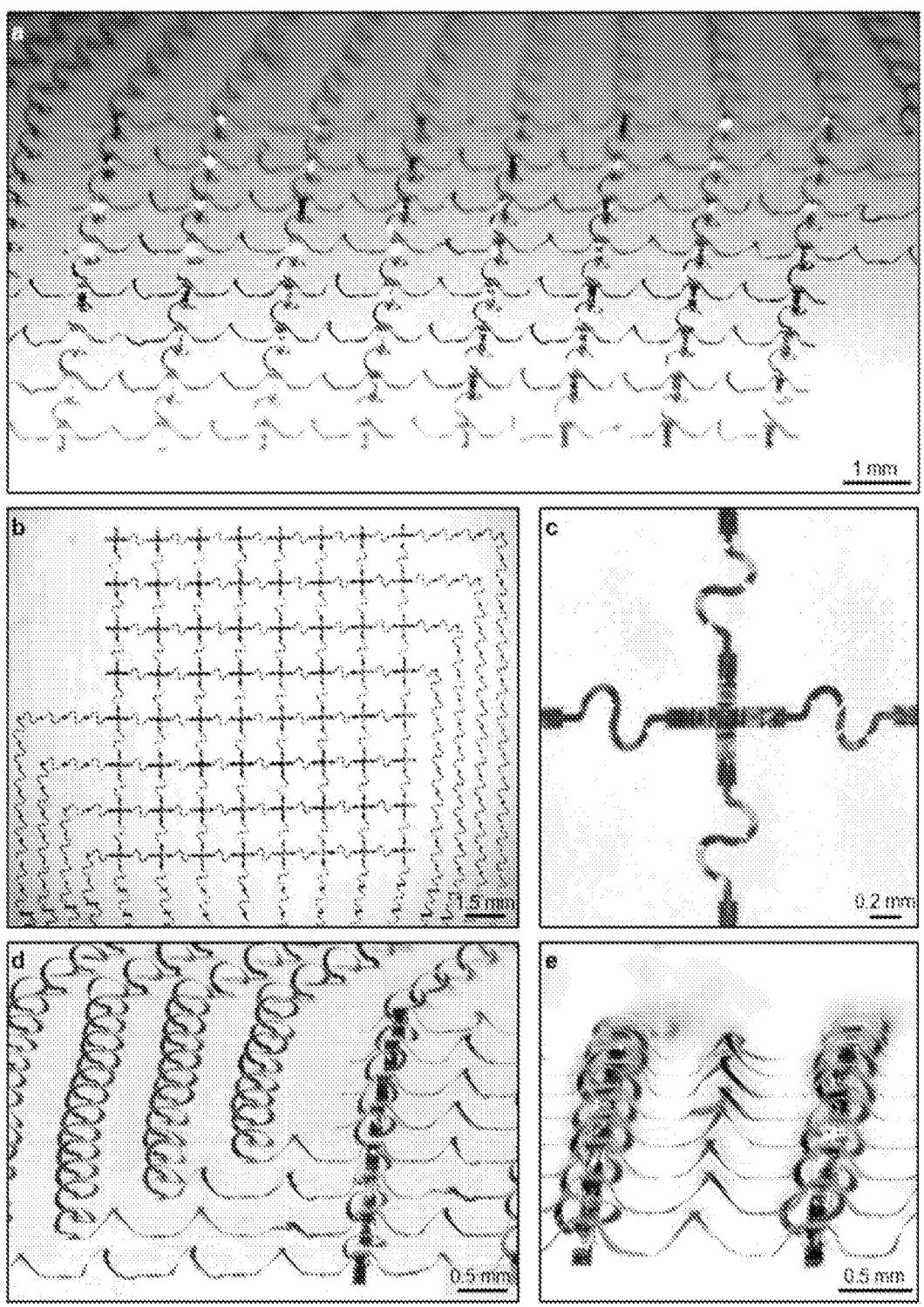
FIG. 39 shows optical images of the pressure sensor array before attaching silicon cavities, according to embodiments of the invention. a, Tilted view of the array. b, Top view of the array. c, Top view of one device. d-e, The 3D helical interconnects.
Figure 40:
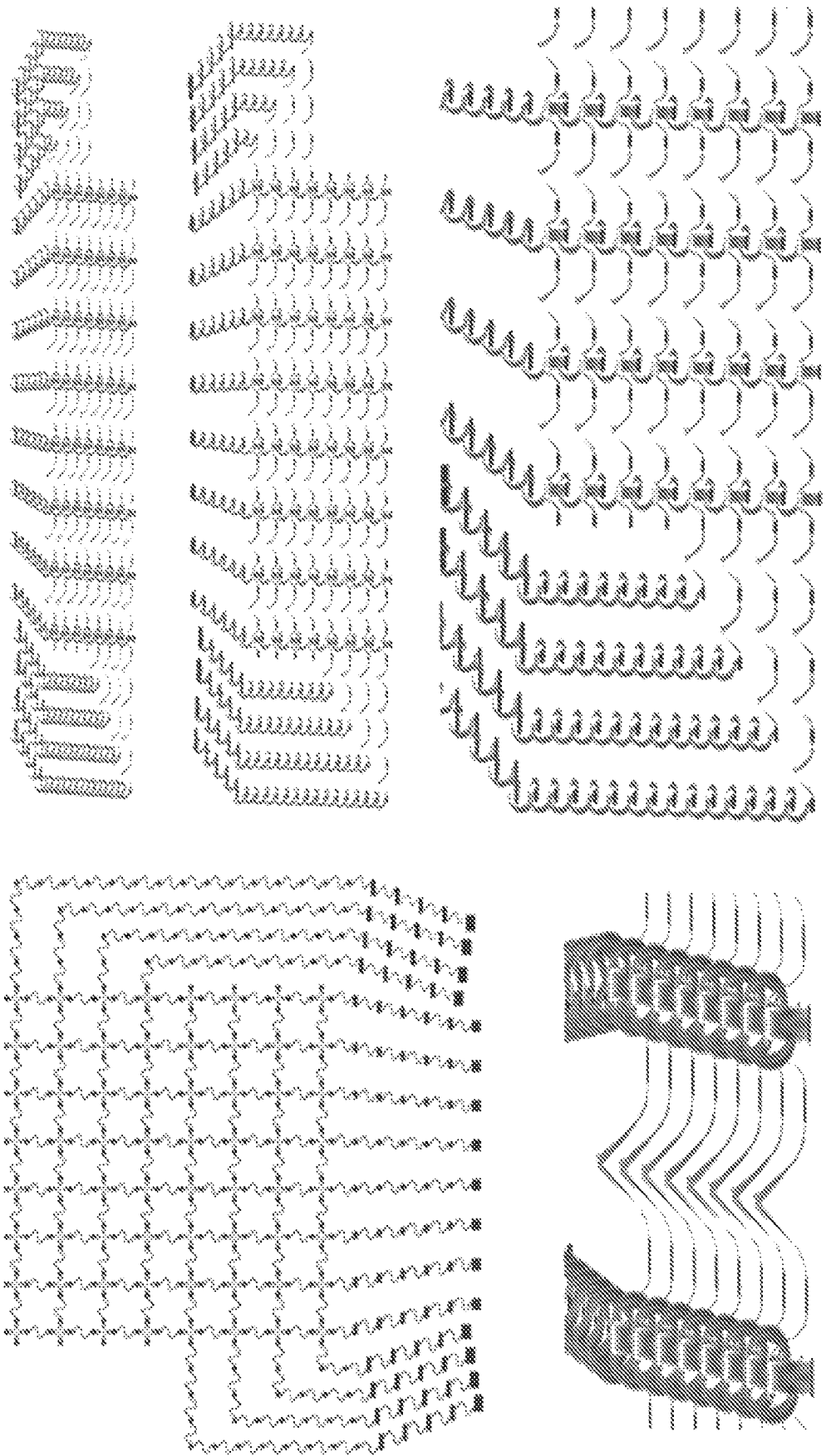
FIG. 40 shows FEA results of the 3D structures in the pressure sensor array, according to embodiments of the invention.

The layouts for arrays of metal strain gauges of this type use geometries and architectures similar to those of the temperature sensors, in which column and row selection occurs through serpentine interconnects across two different layers. The two terminals of each strain gauge (Au, about 100 μm in thickness, about 2 μm in width) adopt a unique cross-shaped geometry (about 130 μm in ribbon width, about 900 μm in ribbon length, FIGS. 36 and 37) to facilitate wiring for column and row selections. Compressive buckling with a biaxial strain of about 20% converts the cross-shaped patterns into tent-like 3D mesostructures (about 170 μm in height) and the serpentine interconnections into 3D helices with exceptional stretchability (about 210 μm in height, FIG. 38). As demonstrated here, this simple scheme yields an 8×8 array of pressure sensors with 3D helical interconnections, involving more than 400 bonding sites, more than 300 3D mesostructures, and sixty-four 3D pressure sensors in five layers of polymer and metal (FIGS. 2A, 39 and 40).

Figure 2E:
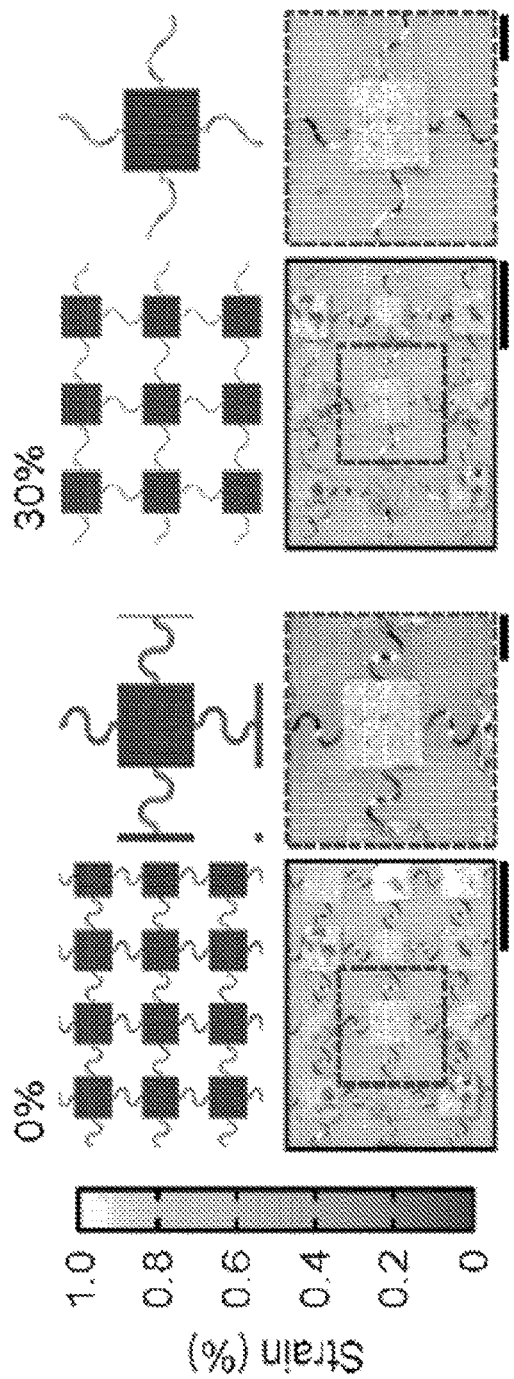
FIG. 2E: FEA results (top) and optical images (bottom) of the array under biaxial strains of 0% and 30%.
Figure 41:
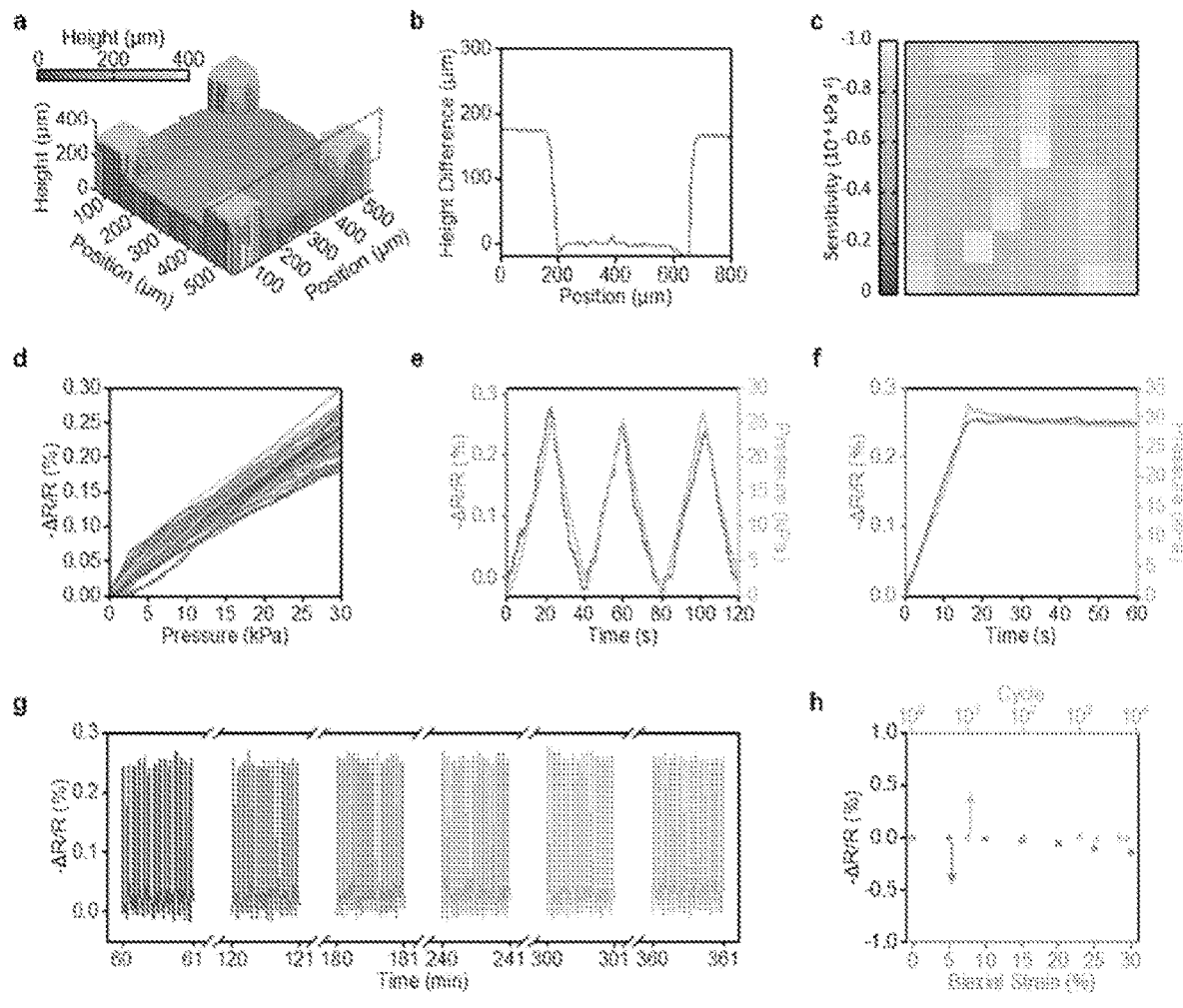
FIG. 41 shows additional characterization results for the pressure sensor array, according to embodiments of the invention. a, Height distribution of the silicon cavity measured from a 3D optical profiler. b, Height distribution of the silicon structure along the red dashed box in (a). c, Spatial map of the sensitivities of the array. d, Fractional changes of resistance of the sixty-four pressure sensors at pressure from 0 to 30 kPa. e, Time-domain fractional change of resistance of the sensor under cyclic loading and unloading with overlapped pressure curve measured from a commercial force gauge. f, Time-domain fractional change of resistance of the sensor under constant pressure (blue curve) and pressure measured from a commercial force gauge (orange curve). g, Fractional change of resistance of the sensor under cyclic 20% uniaxial stretching (orange points) and different biaxial strains (blue points). h, Time-domain fractional change of resistance of the pressure sensor from 60 min to 360 min.
Figure 42:
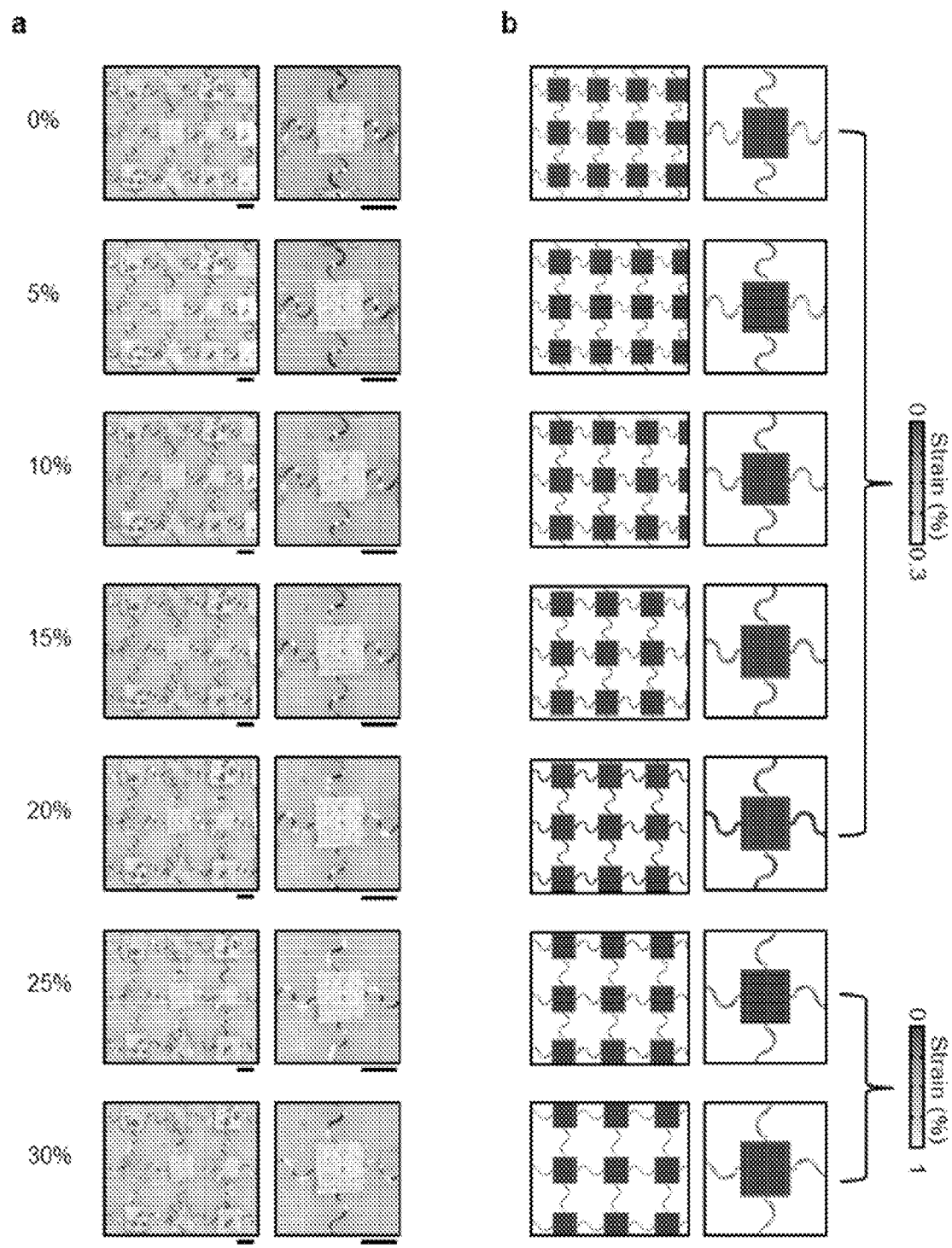
FIG. 42 shows a pressure sensor array under biaxial stretching, according to embodiments of the invention. a, Optical images. b, FEA results. Scale bars, 700 μm.
Figure 43:
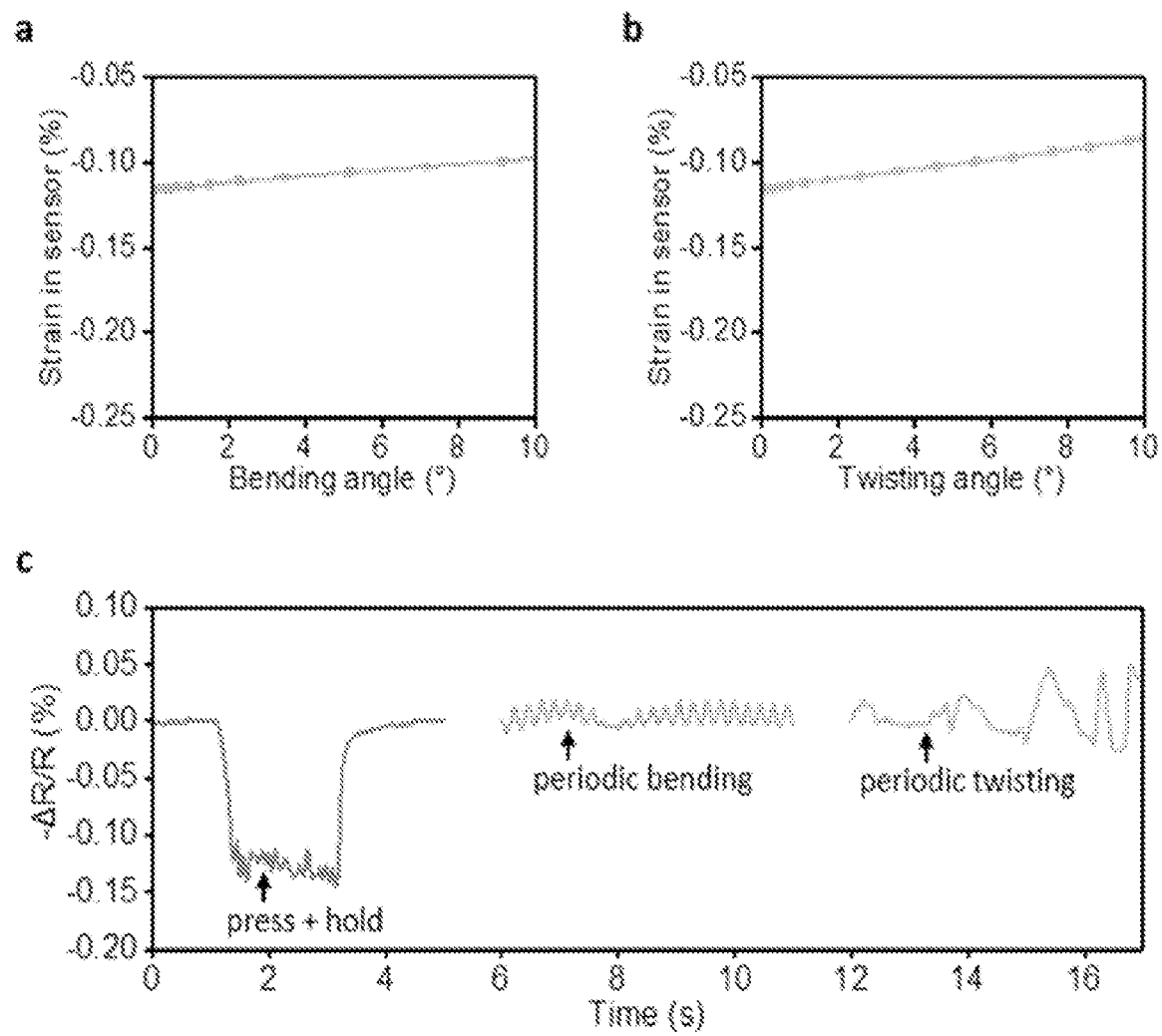
FIG. 43 shows responses of the pressure sensor under twisting and bending. a, FEA results of the pressure sensor under twisting, according to embodiments of the invention.

For mounting on balloon catheters, these pressure sensor arrays must be not only stretchable, but also robust in response to extreme mechanical perturbations associated with catheter deployment and navigation through a sheath. Covering the 3D tent-like mesostructures with silicon cavities (FIGS. 2B-2D) protects the pressure sensors from various forces associated with these procedures, with additional design flexibility to control their sensitivity. Each cavity has lateral dimensions of about 0.84 by 0.84 mm, with four square/rectangle pillars (each pillar having a side length, LP, of about 0.16 mm, and a height, HP, of about 170 μm) at the corners (FIG. 41, panels a-b, and FIG. 44, panel a). In addition, rigid islands (PI, about 0.84 by 0.84 mm in lateral dimension, about 12.5 μm in thickness) selectively bonded to the bottom surface of the substrate (P8 in FIGS. 1A and 10) constrain the deformations of the tent-like 3D mesostructures under stretching, while maintaining stretchability of the whole array, as verified by experimental and FEA results in FIGS. 2E and 42. Such configurations also render the pressure sensor insensitive to other types of mechanical deformations such as bending and twisting (FIG. 43). The stretchable features allow the pressure sensor array to conformally integrate with balloons and various other soft curvilinear surfaces (FIGS. 2C-2D).

Figure 2G:
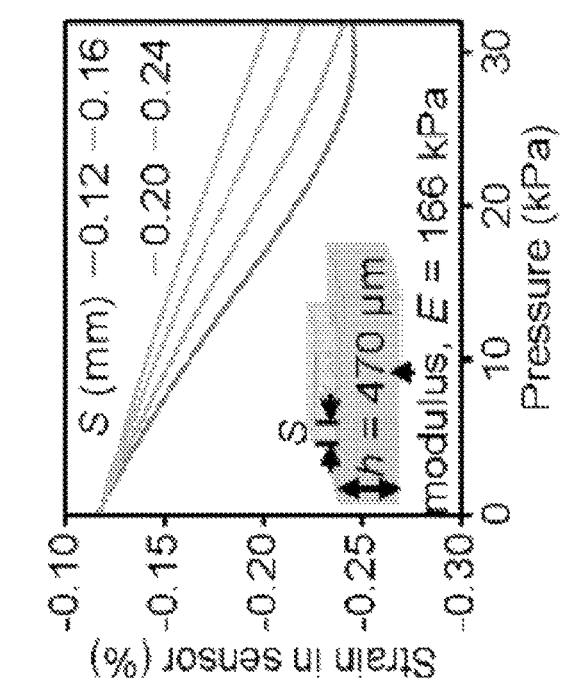
FIG. 2G: FEA results illustrating the influence of geometric parameters on the sensitivity.
Figure 2F:
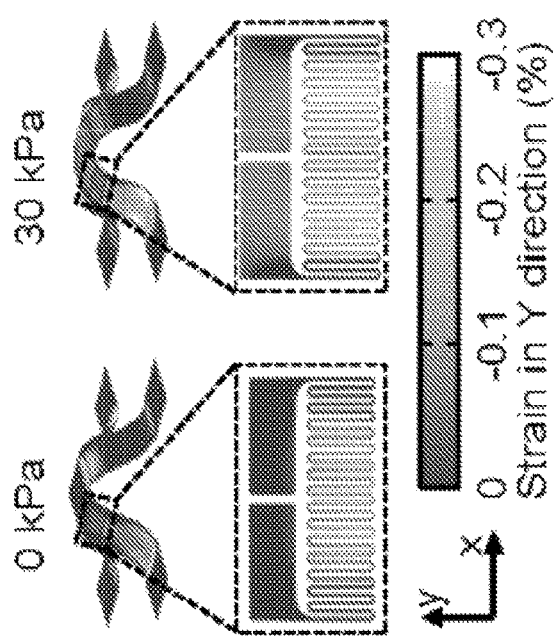
FIG. 2F: FEA results of the strain distribution in the Au of one sensor under pressures of 0 and 30 kpa.

With this structural design, normal pressures applied to the cavity depress the four pillars into the underlying elastomeric substrate (Dragon Skin 10 slow, 166 kPa in modulus, about 470 μm in thickness), thereby deforming the 3D tent-like mesostructures. The result is an increase in compressive strains in the metal strain gauges, which in turn, reduces the resistances of the sensors (FIG. 2F). Adjusting the side lengths LP of the pillars provides a means to tune the sensitivity. Specifically, reducing the side length LP increase the pressure as a result of an associated decrease in contact areas, thereby increasing the sensitivity and decreasing the linear response range (e.g., reducing the side length LP from about 0.24 to 0.12 mm improves the sensitivity by a factor of about 1.7, FIG. 2G). Other options to adjust the sensitivity and the linear response range involve changing the shapes of the 3D mesostructures, the thicknesses of the polymer layers, and the thickness, h, and modulus of the elastomeric substrate, E (FIG. 44). The thicknesses of the top elastomeric layers (e.g., those associated with the electrodes or temperature sensors), however, have no influence on the sensitivity (FIG. 45), thereby ensuring stable performances of the pressure sensors when stacking additional functional layers on top.

In vitro characterization of the pressure sensor array relies on the same DAQ system used for recording temperature data (FIGS. 2H-K and FIG. 41, panels c-h). Calibration of the 64 pressure sensors with a commercial force gauge reveals 100% yield and good uniformity in the sensitivity (mean of about $8.2\times10^5$ kPa$^{-1}$ and standard deviation of about $7.8\times10^{-6}$ kPa$^{-1}$ under Gaussian fitting, FIG. 2H and FIG. 41, panels c-d). An external pressure of about 30 kPa leads to small changes in strain in the metal wires (from about −0.12% to about −0.24% on average) and small displacements of the silicon pillars (about 10% of the thickness of the elastomer). These pressure profiles have linear responses (R-squared>0.996 in linear regression) with minimal hysteresis effects (difference in ΔR/R<0.014%, FIG. 2I). The linear responses from 0 to 30 kPa match the relevant range of pressures for many surgical procedures (e.g., catheter ablation, force from 0 to 0.5 N under a hemispherical catheter tip with a diameter of about 3.5 mm, corresponding to a pressure range of 0 to 26 kPa). Time-domain fractional changes in resistance of the sensor and pressure curves measured from the commercial force gauge demonstrate high consistency in both dynamic (correlation coefficient>0.96) and static conditions (correlation coefficient>0.99, FIG. 41, panels e-f). The pressure sensor shows negligible time delay compared with the commercial force gauge in response to unloading of pressure at rates of about 50 mm/s (FIG. 2J), and exhibits similar responses (ΔR/R with a mean of about 0.26% and a standard deviation of about 0.009%) under cyclic loading and unloading (about 5,000 cycles) at 30 kPa (FIG. 2K and FIG. 41, panel g). Besides the high linearity, low hysteresis and drift, fast response time, and long-term stability, these platforms also exhibit mechanical robustness under biaxial stretching (strains up to about 30%) and multiple cycles of uniaxial stretching (about 10,000 cycles, about 20% strain, FIG. 41, panel h).

Integrating the pressure sensor array onto a customized balloon catheter allows the system to be inserted through small openings with the balloon in its deflated state, for spatiotemporal mapping of pressure generated once the inflated balloon makes contact with a target surface. In vitro experiments on a non-perfused porcine heart demonstrate such capabilities. In this experiment, a thin layer of silicone (Ecoflex 0030, about 100 μm in thickness) covers the 3D mesostructures and silicon cavities to eliminate the sharp edges that can potentially harm the tissue. FIG. 2L shows optical images of the catheter inserted into the left ventricle (LV) of the porcine heart before and after inflation. During the process of inflation, the balloon expands, gradually contacting the endocardial surface as recorded with the pressure sensors. FIGS. 2M-2N show the pressure distributions on the balloon and the time-domain pressure curves recorded from different sensors during inflation.

Figure 3A:
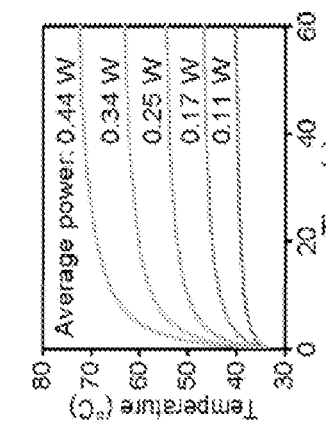
Figure 3B:
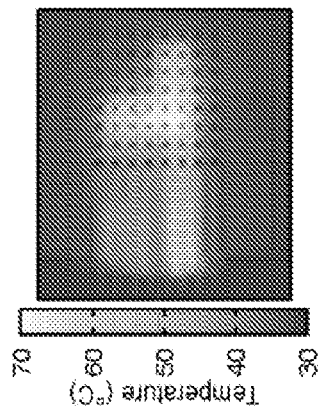
FIG. 3B: A representative example of the temperature distribution during bi-polar RF ablation (measured from an IR microscope). Passing RF power to multiple electrode pairs yields an "L" pattern. The ablation experiments in FIGS. 3A-3B involve agar hydrogel (2 wt. % agar+98 wt. % 0.1 M PBS) at 37° C.

The collection of multimodal, multiplexed sensing capabilities reported here creates many options in advanced, high-density, and multifunctional diagnostics. Therapeutic functions are also possible by delivering different types of electrical signals to the biology through the system. One example involves sinusoidal inputs (frequency of about 400-500 kHz, FIG. 46) to selected electrodes in the array for RF ablation therapy, currently the most widely used procedure to terminate arrhythmias, via electrical currents and associated Joule heating in the adjacent tissues. For characterization purposes, ionic conductive hydrogel (about 2 wt. % agar+about 98 wt. % 0.1 M phosphate-buffered saline, PBS) serves as a tissue phantom. FIG. 3A shows the time-domain profile of the maximum temperature during bipolar RF ablation, where all sixty-four electrodes in the array contact the hydrogel and RF signals pass only to two adjacent electrodes, at different powers (from about 0.1 to about 0.4 W, corresponding to current densities from about 38 to about 77 mA/mm$^2$). The array format enables spatially programmable RF ablation by applying power to selected electrodes (FIGS. 3B and 47-50). Advantages include capabilities for (1) creating lesions at different positions without moving the array (top frames in FIG. 47, panels a-b), and (2) forming a series of lesions with programmable shapes and dimensions such as an "L" pattern (FIG. 3B), separate lesions at multiple locations, and large-area lesions (bottom frames in FIG. 47, panels a-b). Such features may provide an attractive alternative to the traditional means for creating lesions in a point-by-point manner by manual steering a catheter tip with only a single pair of exposed electrodes.

Figure 3C:
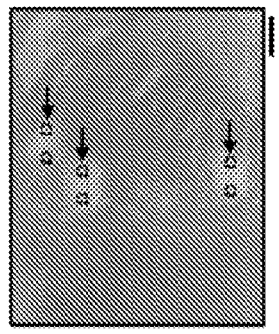
FIG. 3C: Photograph of lesions created on a non-perfused tissue (chicken breast) through RF ablation. The black dashed squares illustrate the positions of the electrodes for ablation. Scale bar, 2 mm.
Figure 3D:
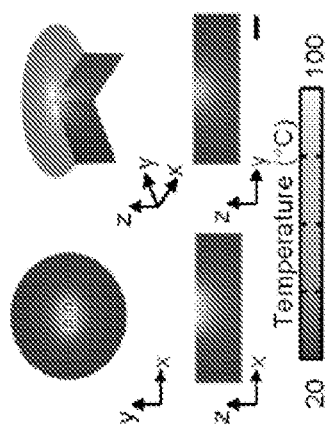
FIG. 3D: FEA results for the 3D temperature distributions during RF ablation. Red solid squares in the top left frame indicate the positions of the electrodes. Scale bars, 2 mm.

The same process can naturally apply to non-perfused biological tissues (FIGS. 3C and 51-54). FIG. 3C displays an optical image of chicken breast after simultaneous, multisite bipolar ablation. Three lesions appear as white regions, marked with black dashed squares, as a demonstration of the ablation functionality. Additional results, including ablation based on monopolar configurations, yield lesions with lateral dimensions from about 0.5 mm to about 10 mm and depths from about 0.2 mm to about 3.2 mm (FIGS. 51-54). FEA models can capture the three-dimensional distributions in temperature for these cases (FIGS. 43, 46, 47 and 49-57). FIG. 3D presents an example for bipolar ablation. An alternating voltage of about 33.6 V at a frequency of about 400 kHz applied to two adjacent electrodes leads to temperatures that reach the highest values in the areas near the electrodes, and gradually decrease with distance from the electrodes (parameters listed in Table 2). Additional FEA results indicate that precise control of the dimensions of the lesions are possible through adjusting the geometrical parameters of the electrode array, as disclosed in EXAMPLE 4, and FIGS. 59-62.

TABLE 2

Parameters used in FEA for tissue ablation.

| Material | ρ (kg/m$^3$) | k (W/(m · K)) | σ (S/m) | $C_p$ (J/(kg · K)) |
|---|---|---|---|---|
| Au | 19300 | 317 | 4.56*10$^7$ | 129 |
| Ecoflex | 909 | 0.21 | 0 | 2100 |
| Polystrene | 1280 | 0.24 | 0 | 1250 |
| Tissue | 1079 | 0.533 + 0.0028*(T – T$_0$) | 0.2, T < 100° C. 0, T > 100° C. | 3870 |
| Hydrogel | 1000 | k$_0$ | 0.1 + 0.002*(T – T$_0$), T < 100° C. 0, T > 100° C. | 4200 |
| Cu | 8960 | 400 | 5.998*10$^7$ | 385 |

$k_0 = -0.869083936 + 0.00894880345*T - 1.58366345E-5*T^2 + 7.97543259E-9*T^3$.

Figure 3E:
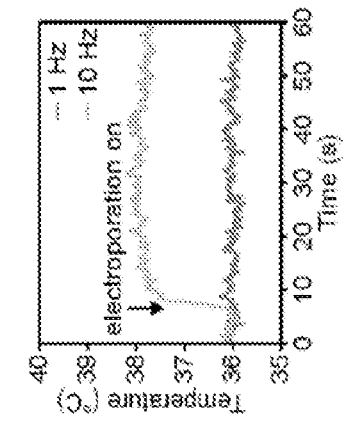
FIG. 3E: Temperature profiles determined with sensors at the locations of the electrodes during IRE at frequencies of 1 Hz and 10 Hz.
Figure 3F:
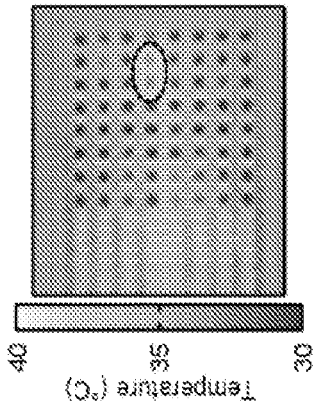
FIG. 3F: Temperature distribution during IRE at 10 Hz (measured from an IR microscope). The black dashed circles indicate the electrodes with applied RF power.

Different types of input signals enable additional modes of therapy. For example, application of a series of high voltage pulses to a pair of electrodes enables IRE ablation, the latest Food and Drug Administration approved method for treating arrhythmias. In this process, pulsed electric fields (greater than 500 V/cm) increase cell permeability, thereby causing cell death and termination of aberrant rhythms, typically without significant heating. FIGS. 3E-3H and 63-70 demonstrate the capabilities of the electrode array for IRE. This approach exploits electrical mechanisms of cell death without the side effects of thermal processes, for enhanced safety and improved confinement of lesion formation. This scheme also exhibits improved tissue specificity, and reduced potential for collateral damage and thrombus formation compared with RF ablation. An IR microscope can capture the temperature profiles (FIG. 3E) during IRE from bi-phasic voltage pulses with amplitudes of about 200 V and durations of about 100 μs (FIG. 63, panel a). Pulses at a frequency of 10 Hz (FIG. 63, panel a) cause a temperature rise of only about 2° C. (FIGS. 3E-3F). Advantages of IRE through a high-density electrode array include reductions in voltages necessary to generate sufficient electric fields between adjacent electrodes, options in spatially programmable patterns of IRE, and relatively uniform electric field lines, as required by preclinical studies.

Figure 3G:
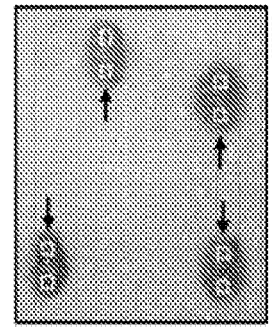
FIG. 3G: Photograph of lesions created on a vegetal model (potato) through IRE (1 Hz, 20 s). The white dashed squares illustrate the positons of the electrodes for IRE. Scale bar, 2 mm. IRE in FIGS. 3E-3G uses biphasic pulses with amplitudes of about 200 V and durations of 100 μs.
Figure 3H:
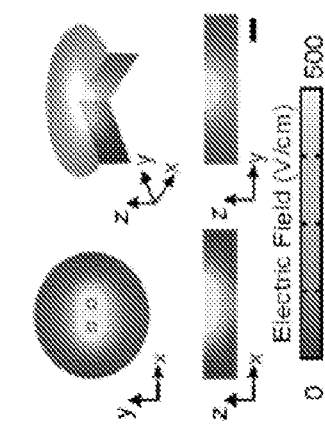
FIG. 3H: FEA results for the 3D electric field distributions during IRE. The red solid squares in the top left frame indicate the positions of the electrodes. Scale bars, 2 mm.

In vitro experiments on a vegetal (potato) model (FIGS. 3G and 65-67) and FEA results (FIGS. 3H and 68-70) verify these advantages. IRE on a potato can damage the membranes of the cells under high electric field to release phenoloxidase enzyme. The enzyme then promotes the oxidation of phenolic compounds to yield dark regions. Experiments that exploit these effects involve a set of twenty bi-phasic voltage pulses (amplitudes of about 200 V and durations of about 100 μs) at a frequency of about 1 Hz applied to two adjacent electrodes in contact with a potato. The dark lesions become visible twelve hours after IRE (FIG. 3G). Lesions arranged in an "L" pattern demonstrate the programmability supported by the addressable electrode array (FIG. 65). The small spacings between the electrodes (about 1 mm) allow formation of lesions at relatively low voltages (about 100 V, FIG. 66). The voltages required to form lesions depend, in theory, on the spacing of electrodes, in a manner consistent with the electric field distributions from coplanar electrodes. For a given voltage, electrodes with smaller spacings create deeper lesions in most cases, but the relationship follows a non-trivial functional form. EXAMPLE 5 and FIG. 68 show these scaling relationships. Based on analytical approximations, the depths of the lesions (d) correspond to the maximum value of d that satisfies $$\frac{V_0}{2K(L,S)} \frac{\frac{L-S}{2}}{\sqrt{\left(\frac{(L-S)^2}{4} + \frac{(L-S)^2}{(L+S)^2}d^2\right)\left(\frac{(L-S)^2}{4} + d^2\right)}} > E_{thres} \quad (1)$$

where $V_0$ is the applied potential to the electrodes, L is the distance between the centers of two electrodes, S is the side length of the electrodes, K(L,S) is the elliptic integral and equals to $$\int_0^{\pi/2} \frac{d\theta}{\sqrt{1 - \left(\frac{L-S}{L+S}\sin\theta\right)^2}},$$

$E_{thres}$ is the electric field intensity required to form lesions. Assigning parameters used in the experiments ($V_0$=200 V, L=1.5 mm, S=0.5 mm, $E_{thres}$=500 V/cm) to equation (1) yields lesion depth of 0.75 mm, comparable to the experimental results (about 0.60 mm, FIG. 65). These features may allow termination of arrhythmias with voltages lower than those (about 3000 V) used in recent preclinical cardiac studies with conventional electrodes. FEA results in FIGS. 3H and 69-70 demonstrate good agreement with experimental results.

These models provide a means to examine the lesions in three dimensions and to predict the dimensions of the lesions under different conditions.

These therapeutic functions (i.e., RF and IRE ablation) and capabilities in electrophysiological and functional mapping offer some advantages over commercial catheter devices such as high spatial and temporal resolution, relatively low power and voltage thresholds to achieve effective therapies, and multimodal capabilities on a single system to obviate the need for multiple catheters (Table 3). Combining these diagnostic and therapeutic functions also creates possibilities for interventions guided, in real-time, by multifunctional sensor feedback. FIGS. 3I-3L shows temperature mapping during RF ablation as a demonstration of the simultaneous operation of the arrays of electrodes and temperature sensors. Here, the array of temperature sensors bonds to the bottom surface of the electrode array with a thin layer of PI (about 1.5 μm in thickness, FIG. 3I, left), to offer small thickness, strong adhesion and excellent thermal and physical contact for precise temperature measurements during ablation. In comparison, bonding the temperature sensors to the electrodes through a layer of silicone (Ecoflex, about 100 μm in thickness, right) results in reduced measurement accuracy. FIG. 3J compares the temperature profiles measured from systems built with these two bonding strategies during RF ablation on hydrogel (about 2 wt. % agar+about 98 wt. % 0.1 M PBS, about 37° C.). Results of FEA (EXAMPLE 6 and FIG. 71) yield detailed information on the relationships between the temperature and the thickness of the interlayer, the thermal resistance at the interface and the thermal properties of the constituent materials. Spatiotemporal mapping of temperature can further enrich the information for improved control. FIGS. 3K-3L and 72A present the spatial distributions of temperature and the time-domain temperature profiles recorded from different sensors during bipolar RF ablation with two adjacent electrodes on hydrogel (about 2 wt. % agar+about 98 wt. % 0.1 M PBS, about 37° C.). Such results can potentially provide insights during ablation therapy to improve control over the process.

the PBS. Thermal conduction through the PBS transfers heat to the surface of the tissue, resulting in lesions with comparatively large, poorly controlled, lateral dimensions (ellipse with major axis of about 3.2 mm and minor axis of about 2.4 mm) and small depths (about 0.65 mm).

The temperature and pressure sensors both rely on resistance changes in thin, metal wires. Minimizing interference across these different sensors is important. The arrays of temperature sensors adopt a planar configuration to avoid significant geometric changes under normal pressure. These sensors can yield calibration factors to account for the effect of temperature on the pressure sensors. An alternative way to reduce the effects of temperature sensitivity of the pressure sensors is to replace thin wires of Au with copper-nickel alloy (constantan, $Cu_{55}Ni_{45}$), which has a similar strain gauge factor (about 2) but a much smaller TCR compared with Au. Sputtering of constantan at room temperature (RT) and elevated temperature (about 100° C.) yields sensors with TCRs of about −40 ppm/K and about 9.8 ppm/K, respectively (FIG. 3O). The temperature sensitivities are about 40 and about 170 times smaller than those from the arrays of temperature sensors based on Au. Similar procedures allow the fabrication of 3D pressure sensors in constantan in parallel fashion (FIG. 3P, and EXAMPLE 3). The pressure sensors in constantan can effectively detect normal pressure and integrate with other electronic devices to allow RF ablation, temperature sensing and pressure sensing simultaneously (FIGS. 3Q and FIG. 72, panels c-d).

TABLE 3

Technical specifications of the instrumented catheter system.

|  | Requirements | Instrumented Catheter System | Commercial Catheters |
|---|---|---|---|
| Electrogram mapping |  |  | HD 56 (Abbott)[1] |
| Spatial resolution | the higher the better | >0.5 mm$^{-2}$ (64 pixels) | >0.3 mm$^{-2}$ (56 pixels) |
| Temporal resolution | 1 ms is sufficient | 0.05 ms | 1 ms |
| Impedance | the lower the better | about 9 kΩ @ 1 kHz |  |
| RF ablation |  |  | 7F/4 mm Blazer ™[2] |
| Lesion depth | >3 mm | about 0.2-3.2 mm | >3 mm |
| Lesion width | no requirement | about 0.5-10 mm$^2$ |  |
| Temperature | >50° C. | >50° C. | >50° C. |
| Power to reach 50° C. | no requirement | 0.44 W | about 10 W |
| IRE ablation |  |  | 20-mm-diameter 7F circular catheter[3] |
| Lesion depth | usually in mm scale | about 0.6 mm @ 200 V | >2 mm |
| Lesion width | no requirement | about 2 mm @ 200 V | >2 mm |
| Eclectic field intensity | >500 V/cm | >500 V/cm | >500 V/cm |
| Voltage to reach 500 V/cm | no requirement | <200 V | about 950 V |
| Temperature mapping |  |  | THERMOCOOL ® |
| Spatial resolution | the higher the better | >0.5 mm$^{-2}$ (64 pixels) | single pixel |
| Temporal resolution | 0.1 s is sufficient | about 0.025 s |  |
| Temperature range | 30-80° C. | 30-80° C. | can cover the range |
| Sensitivity | no requirement | 0.17%° C.$^{-1}$ |  |
| Pressure mapping |  |  | SMARTTOUCH ® |
| Spatial resolution | the higher the better | >0.5 mm$^{-2}$ (64 pixels) | single pixel |
| Temporal resolution | 0.1 s is sufficient | about 0.025 s |  |
| Pressure range | 0-30 kPa | 0-30 kPa | can cover the range |
| Sensitivity | no requirement | 8.2 × 10$^{-5}$ kPa$^{-1}$ |  |

Pressure sensors in this multimodal electronic system can operate in conjunction with electrodes and temperature sensors for both diagnostic and therapeutic functions. Here, non-perfused tissues immersed in 1 M PBS serve as the targets to simulate in vivo conditions. The impedances between the two electrodes that contact with the tissue, in this case, increase with the applied pressure (measured from the pressure sensors, FIG. 3M and FIG. 72, panel b), due to a reduction in the amount of PBS at the interface. Compared with traditional tip or ring electrodes for ablation, the planar electrodes and soft, stretchable substrates used here can naturally adapt to the surfaces of the tissues, and hence require less pressure to eliminate fluids at the interface, thereby enhancing the thermal dissipation into the tissues, rather than adjacent biofluids. FIG. 3N presents a series of lesions created through bipolar RF ablation under different pressures (from 0 to 30 kPa, measured from the pressure sensors). At low pressures, RF energy is mostly delivered to Experiments on ex vivo Langendorff-perfused rabbit heart models validate all of the diagnostic and therapeutic functions of the instrumented balloon catheters. Here, electrograms and corresponding voltage maps recorded from the epicardial surface of a rabbit heart using the electrode array during both paced activation pattern and arrhythmia, highlight electrical sensing capabilities (FIGS. 4A-4C and 73-77). The results correspond to placement on the left posterior ventricular surface of the rabbit heart (FIG. 4A). Representative electrograms show the ability to detect atrial excitation (P wave), ventricular excitation (QRS wave), and the ventricular relaxation (T wave) (FIG. 4B). Voltage maps for select time points (indicated by the dashed lines in FIG. 4B) illustrate sensing of the excitation wave (time points 2 and 3) as it propagates along the ventricular surface (FIG. 4C).

IRE and RF ablation testing prove efficacy in therapy. In IRE, a pair of electrocardiogram (ECG) electrodes records signals during the process (FIG. 4D). Initially, the rabbit heart rate is in sinus rhythm. Application of IRE (biphasic electric pulses with amplitudes of about 200 V, duration of about 100 µs, and frequency of about 50 Hz) immediately induces an arrhythmia. After about 46 s, the arrhythmia terminates spontaneously, and the heart exhibits sinus rhythm again. RF ablation therapy allows the creation of lesions on the epicardial surface (FIG. 4E). In this case, the thin, soft electronics offer two advantages over conventional rigid devices. First, the electrode array for RF ablation forms an intimate, conformal contact to the cardiac surface, with minimal exposed area to the surrounding blood, thereby reducing the undesired resistive heating outside of the tissue (FIG. 78). Second, the temperature sensor array, located below the electrode array and separated with only a thin layer (about 1.5 µm in thickness) of PI, accurately records the temperature with capability for use in feedback control of the ablation. FIGS. 4F-4G demonstrate the spatiotemporal distributions of temperature during RF ablation. The two temperature sensors that correspond to the two electrodes for RF ablation exhibit the highest temperature increments, as expected.

The vertically stacked arrays of electrodes and pressure sensors allow for synchronized multimodal measurements of electrograms and pressure. FIGS. 4H-4I presents results during both sinus rhythm and under pacing conditions. The amplitudes of the electrograms recorded from the electrodes range from about 1 mV to about 3 mV and depend on the contact pressure. Poor contacts between the electrodes and the cardiac tissue, corresponding to low pressures, result in reduced amplitudes (blue curves in FIG. 4H, left). At a contact pressure of about 16 kPa, the sensors detect subtle contractions of the rabbit heart, as indicated by the peaks and valleys in plots of the time dependence of the pressure (green curves in FIG. 4H, left). The synchronized signals of electrogram and pressure afford opportunities in investigating correlations between the electrical and mechanical behaviors of cardiac tissues (FIG. 4H, right). Further increasing the contact pressure locally restricts the movement of the heart and the pressure sensor in this case yields nearly constant values without obvious peaks and valleys (orange curves in FIG. 4H, left). In this case, the mechanical stress impairs the cardiac activity and results in lower overall amplitude of electrograms.

Experiments on the endocardial surface of an ex vivo donor human heart LV wedge model further validate the multifunctional capabilities and highlight the fidelity in electrogram mapping (FIGS. 5 and 79-83). Placing the electrode array on the endocardial surface of the left ventricle (FIGS. 5A-5B) yields electrograms and the ability to detect ventricular excitation and repolarization wavefronts (FIG. 5C). The voltage maps involve selected time points (indicated by the dashed lines in FIG. 5C) to highlight sensing of the excitation wave (time points 2 and 3) and the repolarization wave (time point 5) propagating along the endocardial surface (FIG. 5D).

Representative time aligned optical and electrical signals recorded from LV surface highlight the ability to record data consistent with that captured using an optical mapping modality (FIGS. 5E-5K), through electrograms and optical action potentials (OAP) recorded from the endocardial surface. Representative time-aligned electrograms and OAPs from three distinct locations, highlighted by the blue, green, and red asterisks (FIG. 5E), correspond to two different heart rates (30 and 60 beats per minute (BPM)) (FIG. 5F). The features extracted from the OAPs and the electrograms include the activation time and the action potential duration (FIG. 5G). The activation time corresponds to the maximum upstroke on the OAP, and the minimum slope on the electrogram. The action potential duration (APD50) on the OAP corresponds to time point when the tissue has relaxed by 50%; for the electrogram, this time corresponds to the maximum slope on the T-wave. The optical activation maps at 30 BPM (FIG. 5H) and 60 BPM (FIG. 5I) and the corresponding electrical activation maps at 30 BPM (FIG. 5J) and 60 BPM (FIG. 5K) show strong correlations. Slight discrepancies result from the different sensing mechanisms. Optical signals average electrical activity over the depth (about 4 mm, associated with diffusion of the voltage sensitive dye) of the tissue while the electrodes record signals from the tissue surface that is in proximity of the myocardium.

The electrode array can also ablate the tissue to create lesions that can be examined using immunohistology (FIGS. 5L-5M). The visual examination of the ablated region shows a lesion of 3 mm diameter and 2 mm depth (FIG. 5L). Histological evaluation in FIG. 5M indicates that the region with RF ablation (right part) has a reduced amount of nuclei (blue dots). The balloon-mounted systems offer better control of the locations of the electrodes and lesions compared with other flexible arrays based on ultrathin films, open mesh designs, or filamentary probes, due to the random deformations of the latter systems after implantation. Relatively small uncertainties of the shapes of the inflated balloons (within 10% of the target shape, <0.6 mm in distance for the balloon used here) are acceptable for ablation therapies in human, where the total lateral dimensions of the lesions range from several millimeters to centimeter scale. These results suggest the possibility of using the instrumented balloon catheter as an advanced surgical tool for the diagnosis and treatment of heart diseases in humans.

The results presented here address fundamental limitations of conventional cardiac devices—modulus mismatch between the devices and cardiac tissues, and insufficient modalities and spatial densities in sensing and actuation—through a collection of soft, multiplexed electronic systems in multilayered configurations. Integration of such systems with commercial and/or customized catheters yield sophisticated platforms with capabilities in conformal, high density, and multimodal sensing and actuation. In vitro testing, together with computational studies and evaluations in rabbit and human hearts, demonstrates advantages over conventional cardiac devices in form factor, functionality, and programmability. Key advances involve (1) the capabilities in high-density multifunctional mapping using devices that adopt both 2D and 3D designs, (2) multilayer, modular layouts that provide scalable paths to technologies with customizable diagnostic and therapeutic functions, and (3) the simultaneous, multimodal operation of arrays of sensors and actuators, with potential for closed-loop control. These features promise to allow physicians to acquire a rich set of physiological information and to complete surgeries in shorter times with a single instrumented catheter system. The integration strategy can naturally apply to other surgical instruments relevant to procedures on various parts of the nervous system, urinary system, gastrointestinal tract and others. These concepts may, thus, form a starting point for further developments of advanced surgical devices capable of minimally invasive interactions with the human body.

Device Fabrication

Electrode array: Fabrication of the electrode array began with spin coating a layer of PI (PI2545, about 3.3 µm in thickness) on a silicon wafer with Ti/Cu (about 10 nm/100 nm in thickness) as the sacrificial layer. Subsequent lift-off processes defined the pattern of metal electrodes and serpentine connections (Cr/Au, about 10 nm/300 nm in thickness). Spin coating another layer of PI (PI2545, about 3.3 µm in thickness) covered the metal pattern. Deposition of $SiO_2$ (about 100 nm in thickness) created a layer of material for a hard mask. Photolithography and dry etching of the $SiO_2$, and oxygen plasma etching (March RIE) of PI yielded the outline of the electrode array. Removing the top layer of Cu and undercutting the bottom layer of Cu allowed transfer of the electrode array from the silicon wafer to a water soluble tape.

Temperature sensor array: Fabrication of the temperature sensor array started with spin coating a layer of PI (PI2545, about 3.3 µm in thickness) on a silicon wafer with Ti/Cu (about 10 nm/100 nm in thickness) as the sacrificial layer. Lift-off processes defined the patterns for the temperature sensors and serpentine connections for row selection in Cr/Au (about 10 nm/100 nm in thickness). Another layer of PI (PI2545, about 1 µm in thickness) covered the metal pattern. Photolithography (AZ4620, about 10 µm in thickness) and oxygen plasma etching (March RIE) defined vias through the PI at appropriate locations. Sputter deposition of Cr/Au (about 10 nm/100 nm in thickness) coated the exposed regions as well as the side walls of the vias with metal. Photolithography and wet etching of Cr/Au yielded the serpentine connections for column selection. Spin coating another layer of PI (PI2545, about 1 µm in thickness) covered the metal pattern for column selection. Deposition of Cu (about 100 nm in thickness) yielded a hard mask for dry etching of the PI. Photolithography and wet etching of the Cu, and oxygen plasma etching (March RIE) of the PI formed the outline of the temperature sensor array. Removing the top layer of Cu and undercutting the bottom layer of Cu allowed transfer of the temperature sensor array from the silicon wafer to a water-soluble tape. Deposition of $SiO_2$ (about 100 nm in thickness) on the tape through a shadow mask and subsequent UV ozone treatment of the $SiO_2$ surface and of a layer of silicone enabled bonding of the temperature sensor array to the silicone elastomer.

Pressure sensor array: Fabrication of the Au-based pressure sensor array began with the same procedures used for fabricating the temperature sensor array. After transferring the array onto water soluble tape, deposition of $SiO_2$ (about 100 nm in thickness) through a shadow mask defined the bonding regions. UV ozone treatment of a prestretched silicone elastomer and of the $SiO_2$ surface created hydroxyl termination on the surfaces for bonding. Attaching the 2D precursor to the pressure sensor array onto the stretched elastomer, followed by heating (about 70° C., about 10 min), dissolving water soluble tape, and releasing the prestrain, yielded the final 3D configuration. Laser cutting (LPKF ProtoLaser R) and assembling the silicon cavities and PI islands on the top and bottom surfaces completed the fabrication. Fabrication of the constantan-based pressure sensor array followed similar procedures but with the row selection lines (Au) and the sensors formed in two separate steps of lithography, as described in EXAMPLE 3.

Multilayer integration: The process for stacking multiplexed arrays exploited a polydimethylsiloxane (PDMS) stamp with patterns of relief configured to selectively deliver uncured PI (spin coat at about 3000 rpm) as an adhesive layer. A transfer printing machine aligned the temperature sensor array on silicone with the electrode array on water soluble tape, with uncured PI as the adhesive layer. Curing the PI and removing the tape completed the stacking process. UV ozone treatment of the bottom surface of the temperature sensor array and the top surface of the pressure sensor array (i.e., silicon rigid cavities) induced hydroxyl termination for bonding. After the alignment of the stacked arrays of electrodes and temperature sensors with the pressure sensor array, heating at about 70° C. for about 10 min yielded strong bonding and completed the fabrication.

In Vitro Characterization

Electrophysiology: A digital potentiostat (Metrohm Autolab) with an Ag—AgCl reference electrode and a Pt counter electrode captured the impedance spectrum of the electrode in 0.1 M PBS at RT. An impedance analyzer (Keysight, E4990A) recorded the impedance between two electrodes at RT and about 37° C., with 0.1 M PBS, or hydrogel (about 2 wt. % agar+about 98 wt. % 0.1 M PBS), or non-perfused tissue (e.g., chicken breast) as the media. Impedance maps at a fixed frequency (e.g., 1 kHz) were from Intan 1024 ch recording controller.

Temperature sensing: A customized circuit enabled automated measurement of the resistance of each temperature sensor in the array at different temperatures (from about 30° C. to about 80° C.). Calibrated spatial maps of the TCR corresponded the slopes of the ΔR/R vs. temperature curves defined by linear least squares fitting to the data. An IR camera (FLIR A655sc) provided spatiotemporal temperature measurements at a sampling rate of about 20 Hz for comparisons.

Pressure sensing: A customized circuit enabled automated measurement of the resistance of each pressure sensor in the array at different pressures. Calibrated spatial maps of sensitivity corresponded to the slopes of the zIRIR vs. pressure curves defined by linear least squares fitting to the data. A dynamic mechanical analysis system (DMA, TA Instruments RSA G2) provided a means for programmable and automatic loading/unloading and measurements of the force at a sampling rate of about 30 Hz as the reference for pressure measurement.

Mechanical test: A customized mechanical stage allowed the application of precisely controlled biaxial strains to the electronics. A linear stage (Aerotech Inc., ATS100-150) with a LabVIEW control interface provided capabilities for cyclic uniaxial stretching tests.

RF Ablation: Sinusoidal voltages with amplitudes ranging from about 10 V to about 40 V at a frequency of about 400 kHz served as the signals for RF ablation. The temperature sensor array or an IR microscope (Optotherm Inc., Thermal imaging system) were used to record the temperature during RF ablation. In the case of measurement with an IR microscope, the recorded values corresponded to the temperatures at the back surface of the electrode array (i.e., the surface of the bottom PI layer). Media for in vitro RF ablation included 0.1 M PBS, hydrogel (about 2 wt. % agar+about 98 wt. % 0.1 M PBS), and non-perfused tissues in 0.1 M PBS at RT and 37° C.

IRE Ablation: Biphasic pulses with amplitudes of about 200 V and durations of about 100 µs served as the signals for IRE. Temperature measurements during IRE used an IR microscope (Optotherm Inc., Thermal imaging system). The recorded values were the temperatures at the back surface of the electrode array (i.e., the surface of the bottom PI layer). In vitro IRE tests exploited potato models at RT.

Multiplexed Data Acquisition and Signal Processing

Electrogram mapping: Anisotropic conductive film (ACF) and laser-defined flexible printed circuit board (PCB) connectors connected the electrode array to a zero insertion force (ZIF) connector soldered to a customized PCB board. The PCB board connected to the Intan 1024 ch recording controller through two 36-pin wire adapters, a 64-channel amplifier board (RHD2164), and a serial peripheral interface (SPI) cable. A commercial software interface simultaneous recorded electrograms from 64 channels at a sampling rate of about 20 kS/s. The bandwidth of the amplifier hardware extended from about 0.1 Hz to about 200 Hz. A notch filter at about 60 Hz further reduced the noise signal from electrical wires.

Temperature and pressure mapping: An ACF cable and laser-defined flexible PCB connectors connected the arrays of temperature and pressure sensors to a customized PCB board. Wires from the PCB board joined the sensors to a customized circuit for time-division multiplexing. A PowerLab computer interface (ADInstruments, Model 8/35) recorded the signal from the common path at a sampling rate of about 200 kS/s. A square wave at about 5 kHz, generated from the PowerLab computer interface, served as the clock signal for multiplexing. Customized MATLAB code decoded the signal from one common path into 64 traces of signals that correspond with the 64 individual sensors. A digital moving mean filter with a window size of 20 smoothed the 64 demultiplexed signals.

Synchronized recording: (1) Synchronized measurements of temperatures from the temperature sensor array and the IR camera relied on the absolute time recorded from both the PowerLab computer interface (ADInstruments, Model 8/35) and the IR camera (FLIR A655sc). (2) Synchronized measurements from the pressure sensor array and the commercial force gauge (DMA, TA Instruments RSA G2) used the absolute time recorded from the PowerLab computer interface and the created/modified time of the file from the gauge for alignment. (3) Synchronized measurements of electrograms from the Intan recording controller and optical signals from the MiCAM05 exploited the MARK OUT port from the Intan system. The MARK OUT port sent a digital pulse to trigger the optical mapping. (4) Synchronized measurements of pressures and electrograms were based on two PowerLab computer interfaces. One PowerLab computer interface recorded the ECG through commercial electrodes, provided electrical output to another commercial electrodes for pacing, and generated a trigger signal using the TRIGGER port at the start of the measurement. The other PowerLab computer interface measured the trigger signal as a marker for alignment, and provided clock and reset signals to control the customized circuit for pressure mapping. (5) Synchronized measurements of temperatures from the temperature array during RF ablation used the PowerLab computer interface to provide clock and reset signals to control the customized circuit for temperature mapping. The RF signal generator sent a synchronized signal to the PowerLab computer interface as a marker at the starting point of RF ablation.

FEA Analysis

ABAQUS/Standard v2016 served as the software platform for static finite element simulations of the mechanical deformations of the electrodes, temperature sensors and pressure sensors under multiple boundary and loading conditions, i.e., in-plane and out-of-plane tension and compression and out-of-plane pressure. The finite element mesh of the electrodes, temperature sensors and pressure sensors comprised 4-node rectangular elements and linear shape functions in plane stress with reduced integration (S4R). 8-node solid element with linear shape functions and reduced integration (C3D8R) modelled the underlying substrate. The elements were in uniform size and each interconnect had at least 6 elements across its thickness. Enhanced hourglass control was employed to ensure accuracy. Simulations of the silicone elastomers (Ecoflex and Dragon Skin) exploited the hyperelastic model following the Mooney-Rivlin law described below, $$U = C_{10}(\bar{I}_1 - 3) + C_{01}(\bar{I}_2 - 3) + \frac{1}{D_1}(J^{el} - 1)^2 \quad (2)$$

where $C_{10}$=(0.008054, 0.02228, 0.134228), $C_{01}$=(0.002013, 0.00557, 0.033557), and $D_1$=(2.0, 0.72289, 0.12), given by the initial elastic modulus $E_{sub}$=(60, 166, 1000) kPa and the Poisson's ratio $v_{sub}$=0.49 for isotropic elastic materials at small strain. Simulations for PI and silicon used linear elastic material models (E=2.5 GPa, v=0.34 for PI, and E=112.4 GPa, v=0.28 for silicon). Modeling of Au was based on the ideal elastic-plastic model (Young's modulus E=79 GPa, Poisson's ratio v=0.44, yield strength=237 MPa).

The commercial software COMSOL (version 5.3) was adopted to predict the tissue ablation with coupled multi-fields of electric currents, bioheat transfer, and electrical circuit. The electric currents module yielded the predictions of the electric field distribution in resistive heating. The bioheat transfer module yielded the predictions of the heat transfer and tissue ablation/injury. The electrical circuit module allowed the investigation of the potential drop on electrode due to the resistance of stretchable interconnections. In addition, the simulation of tissue ablation included latent heat of evaporation of water ($2.4112 \times 10^6$ J/kg) as a domain source. The tissue damage with energy absorption type was included in bioheat transfer module. The material parameters (density $\rho$, thermal conductivity k, electric conductivity $\sigma$, heat capacity at constant pressure $C_p$) appeared in Table 2.

Animal Experiments

The experiments were conducted in accordance with the ethical guidelines of the National Institutes of Health and with the approval of the Institutional Animal Care and Use Committee of the George Washington University in Washington DC. Three adult female New Zealand White rabbits were used for the instrumented balloon catheter validation. This was a prospective and non-randomized study as there was only one group. Representative data from one of the experiments are presented here. The details of the whole heart rabbit preparation have been previously described. Briefly, the heart was placed in a temperature-controlled bath at about 37° C. and perfused under constant pressure (60 mmHg) with oxygenated Tyrode's solution. The heart was immobilized using 10 µM Blebbistatin (Cayman Chemical, Ann Arbor, MI) to eliminate motion artifacts and a voltage sensitive dye, di-4-ANBDQBS (Potentiometric Probes, Farmington, CT) was used to stain the tissue. After a stabilization period of about 20-30 min, optical or electrical recordings were acquired.

Donor Human Heart Experiments

The experiments using human heart tissue was approved by the Institutional Review Board (Office of Human Research) at the George Washington University. The 2 de-identified donor human hearts were procured from Washington Regional Transplant Community in Washington, DC. As with the animal experiments, this was a prospective, non-randomized study to validate the devices. The Human LV wedge preparations have been described previously. Briefly, wedges from the posterolateral LV free wall perfused via the left marginal artery were dissected, cannulated and mounted in a tissue chamber. The tissue was perfused with Tyrode solution and treated with blebbistatin and di-4-ANBDQBS respectively to minimize motion artifacts and stain the tissue respectively. The electrical and optical recordings were similarly acquired. The optical and electrical data were analyzed using custom MATLAB® software: RHYTHM and PFEIFER, respectively.

Example 2

Fabrication Procedures for the Multimodal, Multiplexed Electronics

Electrode Array

Preparation of substrate: Clean Si wafers with acetone and IPA; and deposit Ti/Cu (10 nm/100 nm in thickness) as sacrificial layer.

Bottom polymer: Spin coat PI2545 (1500 rpm, 40 s; bake at 110° C. for 180 s, 150° C. for 300 s; fully cure).

Metal layer: Define metal pattern using photoresist (AZ nLof 2035, 5000 rpm); oxygen plasma treatment for 1 min (March RIE 190 mT, 100 W, 19 sccm); deposit Cr/Au (10 nm/300 nm in thickness) using electron-beam evaporation; and lift off in acetone (sonicate if necessary).

Top polymer: Spin coat PI2545 (1500 rpm, 40 s; bake at 110° C. for 180 s, 150° C. for 300 s; fully cure); deposit $SiO_2$ (100 nm in thickness) as hard mask; define top polymer pattern using photoresist (S1813, 4000 rpm); dry etch of $SiO_2$ in reactive ion etcher (RIE) with $CF_4$ (Samco RIE-10NR); and oxygen plasma etching of PI2545 (March RIE 200 mT, 200 W, 20 sccm)

Transfer printing: Undercut Cu sacrificial layer in copper etchant; and transfer electrode array from silicon wafer to water soluble tape (designated as DEVICE 1).

Temperature Sensor Array

Preparation of substrate: Clean Si wafers with acetone and IPA; and Deposit Ti/Cu (10 nm/100 nm in thickness) as sacrificial layer Bottom polymer: Spin coat PI2545 (1500 rpm, 40 s; bake at 110° C. for 180 s, 150° C. for 300 s; fully cure).

First metal layer: Define metal pattern using photoresist (AZ nLof 2035, 5000 rpm); Oxygen plasma treatment for 1 min (March RIE 190 mT, 100 W, 19 sccm); Deposit Cr/Au (10 nm/100 nm in thickness) using electron-beam evaporation; and Lift off in acetone (sonicate if necessary)

Middle polymer: Spin coat PI2545 (6000 rpm, 40 s; bake at 110° C. for 180 s, 150° C. for 300 s; fully cure).

Via: Define via pattern using photoresist (AZ 4620, 2000 rpm); oxygen plasma etching of PI2545 (March RIE 200 mT, 200 W, 20 sccm); and remove photoresist in acetone.

Second metal layer: Deposit Cr/Au (10 nm/100 nm in thickness) using sputter to cover the side walls; Define metal pattern using photoresist (S1813, 4000 rpm); etch Au/Cr with gold and chromium etchant; and remove photoresist in acetone.

Top polymer: Spin coat PI2545 (6000 rpm, 40 s; bake at 110° C. for 180 s, 150° C. for 300 s; fully cure); deposit Cu (100 nm in thickness) as hard mask; define top polymer pattern using photoresist (S1813, 4000 rpm); etch Cu with diluted copper etchant; and oxygen plasma etching of PI2545 (March ME 200 mT, 200 W, 20 sccm).

Transfer printing: Undercut Cu sacrificial layer in copper etchant; transfer temperature array from silicon wafer to water soluble tape; deposit $SiO_2$ (100 nm in thickness) on water soluble tape through a shadow mask; spin coat PMMA on a glass slide(3000 rpm, 40 s; bake at 180° C. for 180 s); spin coat Ecoflex 0030 on the glass slide (1500 rpm, 40 s; bake at 70° C. for 1 h); UVO treatment of Ecoflex 0030 and water soluble tape with $SiO_2$ for 4 min; print water soluble tape onto Ecoflex 0030 ($SiO_2$ side facing down, bake at 70° C. for 10 min); and dissolve water soluble tape with warm water to expose the temperature sensor array (designated as DEVICE 2).

Pressure Sensor Array

Preparation of substrate: Clean Si wafers with acetone and IPA; and deposit Ti/Cu (10 nm/100 nm in thickness) as sacrificial layer.

Bottom polymer: Spin coat PI2545 (1500 rpm, 40 s; bake at 110° C. for 180 s, 150° C. for 300 s; fully cure).

First metal layer: Define metal pattern using photoresist (AZ nLof 2035, 5000 rpm); oxygen plasma treatment for 1 min (March RIE 190 mT, 100 W, 19 sccm); deposit Cr/Au (10 nm/100 nm in thickness) using electron-beam evaporation; and lift off in acetone (sonicate if necessary).

Middle polymer: Spin coat PI2545 (6000 rpm, 40 s; bake at 110° C. for 180 s, 150° C. for 300 s; fully cure).

Via: Define via pattern using photoresist (AZ 4620, 2000 rpm); oxygen plasma etching of PI2545 (March RIE 200 mT, 200 W, 20 sccm); and remove photoresist in acetone Second metal layer: Deposit Cr/Au (10 nm/100 nm in thickness) using sputter to cover the side walls; define metal pattern using photoresist (S1813, 4000 rpm); etch Au/Cr with gold and chromium etchant; and remove photoresist in acetone.

Top polymer: Spin coat PI2545 (6000 rpm, 40 s; bake at 110° C. for 180 s, 150° C. for 300 s; fully cure); deposit Cu (100 nm in thickness) as hard mask; define top polymer pattern using photoresist (S1813, 4000 rpm); etch Cu with diluted copper etchant; and oxygen plasma etching of PI2545 (March RIE 200 mT, 200 W, 20 sccm).

Transfer printing: Undercut Cu sacrificial layer in copper etchant; transfer the pressure array from silicon wafer to water soluble tape; and deposit $SiO_2$ (100 nm in thickness) with a shadow mask to define the bonding sites.

Compressive buckling: Prepare silicone (e.g., Dragon Skin 10 slow) as the elastomer for compressive buckling; UVO treatment of silicone and water soluble tape with $SiO_2$ for 4 min; print water soluble tape onto pre-stretched silicone ($SiO_2$ side facing down, bake at 70° C. for 10 min); dissolve water soluble tape with warm water; and release the prestrain to form 3D pressure sensor array.

Rigid cavities on top: Clean Si wafer with acetone and IPA; thinning part of the silicon wafer with laser (LPKF ProtoLaser R); cutting outline of the silicon wafer with laser (LPKF ProtoLaser R) to yield Si rigid cavities; Spin coat PDMS (1:10, 3000 rpm) on a glass slide; place bottom surfaces of the rigid cavities onto uncured PDMS; align rigid cavities on top of 3D pressure sensor array; and cure PDMS at 70° C. for 1 h.

Rigid islands at the bottom: Laminate PI film (12.5 μm in thickness) onto water soluble tape; laser cut PI film into squares as rigid islands, peel off extra PI film; deposit $SiO_2$ (100 nm in thickness); and align rigid islands at the bottom surface of the 3D pressure sensor array (designated as DEVICE 3).

Fabrication procedures for the constantan-based pressure sensor array are disclosed in EXAMPLE 3.

Vertically Stacking of Multilayer Electronics

Preparation of PDMS stamp with micro patterns: Clean Si wafers with acetone and IPA; define PDMS pattern using photoresist (AZ 4620, 2000 rpm); deep reactive-ion etching of Si; remove photoresist in Nanostrip; Pour PDMS (1:10) onto Si mold, cure at 70° C. for 1 h, detach PDMS from Si mold; and deposit parylene-C (4 μm in thickness) on PDMS stamp.

Stacking electrode array (DEVICE 1) with temperature sensor array (DEVICE 2): Spin coat PI2545 (3000 rpm); place PDMS stamp onto uncured PI; align uncured PI pattern on PDMS stamp to DEVICE 2; Align DEVICE 1 to DEVICE 2 with uncured PI as the adhesive layer; Bake at 110° C. for 1 h, dissolve water soluble tape on DEVICE 1 with warm water; and bake at 150° C. for 300 s, fully cure PI.

Stacking electrode and temperature sensor arrays (DEVICES 1 and 2) with pressure sensor array (DEVICE 3): UVO treatment of the top surface of DEVICE 3 and bottom surface of DEVICES 1 and 2 for 4 min; and align DEVICE 1&2 to DEVICE 3, bake at 70° C. for 10 min.

Instrument on Balloon Catheters and Wire Connection

Bond connectors and ACF cables to the stacked multi-layer electronics; dip-coating a thin layer of Ecoflex 0030 on balloon catheters (deflated silicone balloon or inflated PU balloon); cure Ecoflex 0030 with hot air at 100° C.; corona treatment of balloon catheters for 1 min and UVO treatment of the stacked multilayer electronics for 4 min; laminate multilayer electronics on balloon catheters, bake at 70° C. for 10 min; and dissolve water soluble tape with warm water.

Example 3

Fabrication Procedures for the Constantan-Based Pressure Sensor Array

Preparation of substrate: Clean Si wafers with acetone and IPA; and deposit Ti/Cu (10 nm/100 nm in thickness) as sacrificial layer.

Bottom polymer: Spin coat PI2545 (1500 rpm, 40 s; bake at 110° C. for 180 s, 150° C. for 300 s; fully cure).

First metal layer (row selection, Au): Define metal pattern using photoresist (AZ nLof 2035, 5000 rpm); oxygen plasma treatment for 1 min (March RIE 190 mT, 100 W, 19 sccm); deposit Cr/Au (10 nm/100 nm in thickness) using electron-beam evaporation; and lift off in acetone (sonicate if necessary).

Second metal layer (pressure sensor, constantan): Define reversed metal pattern using photoresist (AZ nLof 2035, 5000 rpm); oxygen plasma treatment for 1 min (March RIE 190 mT, 100 W, 19 sccm); deposit Mg (500 nm in thickness) using electron-beam evaporation; Lift off in acetone (sonicate if necessary); deposit Cr/constantan (10 nm/100 nm in thickness) using sputter at 100° C.; and dissolve Mg in hot water (sonicate if necessary).

Middle polymer: Spin coat PI2545 (6000 rpm, 40 s; bake at 110° C. for 180 s, 150° C. for 300 s; fully cure).

Via: Define via pattern using photoresist (AZ 4620, 2000 rpm); oxygen plasma etching of PI2545 (March RIE 200 mT, 200 W, 20 sccm); and remove photoresist in acetone.

Third metal layer (column selection, Au): Deposit Cr/Au (10 nm/100 nm in thickness) using sputter to cover the side walls; define metal pattern using photoresist (S1813, 4000 rpm); etch Au/Cr with gold and chromium etchant; and remove photoresist in acetone.

Top polymer: Spin coat PI2545 (6000 rpm, 40 s; bake at 110° C. for 180 s, 150° C. for 300 s; fully cure); deposit Cu (100 nm in thickness) as hard mask; define top polymer pattern using photoresist (S1813, 4000 rpm); etch Cu with diluted copper etchant; and oxygen plasma etching of PI2545 (March ME 200 mT, 200 W, 20 sccm).

The remaining steps follow the procedures for fabrication of Au-based pressure sensor array described in EXAMPLE 2.

Example 4

Scaling Law for Tissue Ablation

In the present study, three physical fields (electric currents, bioheat transfer, and electrical circuit) were considered to predict the tissue ablation in COMSOL software. Simulations suggest that the resistance heating and heat transfer mainly dominate the tissue ablation. Therefore, the governing equation for electric currents dictates $$\nabla \cdot J = 0$$

$$J = \sigma E$$

$$E = -\nabla V \qquad (3)$$

where J, E, σ, and V is current density, electric field intensity, electrical conductivity, and potential, respectively. The governing equation for bioheat transfer dictates $$\rho C_p \frac{\partial T}{\partial t} + \nabla \cdot q = Q_e \qquad (4)$$

$$q = -k \nabla T$$

$$Q_e = J \cdot E$$

where ρ, $C_p$, q, k, and $Q_c$ is density, heat capacity, heat flux, thermal conductivity and resistance heating source, respectively.

Firstly, the substrate underneath the electrode was ignored, and steady-state heat transfer for bipolar ablation was considered. In conjunction with the boundary conditions, the temperature distribution in tissue follows $$T - T_0 = f(V_0, \sigma, L, S, k, x, y, z) \qquad (5)$$

where $T_0$, $V_0$, L, and S are the initial temperature, the applied potential on electrode, the electrode spacing, and the electrode size as shown in FIG. 59, panel a, respectively. Combination of equations (3)-(5) gives the scaling law $$\frac{k(T - T_0)}{\sigma V_0^2} = f\left(\frac{S}{L}, \frac{x}{L}, \frac{y}{L}, \frac{z}{L}\right) \qquad (6)$$

For normal tissue, the irreversible damage occurs quickly when the temperature larger than $T_c=60°$ C. The FEA validation of the scaling law was shown in FIG. 59, panel b. Then, the bipolar lesion size can be obtain as an integration of a bool function, $$\begin{cases} D = L \int \text{Bool} \cdot d\frac{z}{L} \\ A = L^2 \int \text{Bool} \cdot d\frac{x}{L} d\frac{y}{L} \\ V = L^3 \int \text{Bool} \cdot d\frac{x}{L} d\frac{y}{L} d\frac{z}{L} \end{cases} \quad (7)$$

where $$\text{Bool} = \begin{cases} 1 & T - T_c \geq 0 \\ 0 & T - T_c < 0 \end{cases},$$

D, A, and V are the lesion depth, area, and volume, respectively.

Therefore, the scaling law for lesion size dictates $$\begin{cases} D/L = g_1\left(\frac{S}{L}, \frac{k(T_c - T_0)}{\sigma V_0^2}\right) \\ A/L^2 = g_2\left(\frac{S}{L}, \frac{k(T_c - T_0)}{\sigma V_0^2}\right) \\ V/L^3 = g_3\left(\frac{S}{L}, \frac{k(T_c - T_0)}{\sigma V_0^2}\right) \end{cases} \quad (8)$$

The FEA validation of the scaling law was shown in FIG. 60, suggesting good consistency. For steady-state monopolar tissue ablation, the tissue thickness (H) has a significant influence. Similarly, the scaling law for monopolar lesion size dictates $$\begin{cases} D/H = g_1\left(\frac{S}{H}, \frac{k(T_c - T_0)}{\sigma V_0^2}\right) \\ A/H^2 = g_2\left(\frac{S}{H}, \frac{k(T_c - T_0)}{\sigma V_0^2}\right) \\ V/H^3 = g_3\left(\frac{S}{H}, \frac{k(T_c - T_0)}{\sigma V_0^2}\right) \end{cases} \quad (9)$$

The FEA validation of the scaling law was shown in FIG. 61, suggesting a good consistency.

Secondly, the substrate underneath the electrode was considered. It was found that the thickness ($H_{top}$) and thermal conductivity ($k_{top}$) of the substrate underneath the electrode had a considerable influence on tissue ablation. Then, the scaling law for bipolar lesion size rewrites as $$\begin{cases} D/L = g_1\left(\frac{S}{L}, \frac{k(T_c - T_0)}{\sigma V_0^2}, \frac{k_{top}}{k}, \frac{H_{top}}{L}\right) \\ A/L^2 = g_2\left(\frac{S}{L}, \frac{k(T_c - T_0)}{\sigma V_0^2}, \frac{k_{top}}{k}, \frac{H_{top}}{L}\right) \\ V/L^3 = g_3\left(\frac{S}{L}, \frac{k(T_c - T_0)}{\sigma V_0^2}, \frac{k_{top}}{k}, \frac{H_{top}}{L}\right) \end{cases} \quad (10)$$

The influence of the thickness ($H_{top}$) and thermal conductivity ($k_{top}$) of the substrate underneath the electrode on tissue ablation was shown in FIG. 62.

Example 5

Scaling Law for Electroporation in a Potato Model

A pulsed potential was applied during the bipolar potato electroporation, which contributes to the low temperature increase as shown in FIG. 64. Therefore, only equation (3) governs the electric filed distribution during bipolar electroporation. In conjunction with the boundary conditions, the electric field intensity distribution in the potato follows $$E = f(V_0, L, S, x, y, z) \quad (11)$$

Dimensional analysis gives the scaling law as follows $$\frac{E}{V_0/L} = f\left(\frac{S}{L}, \frac{x}{L}, \frac{y}{L}, \frac{z}{L}\right). \quad (12)$$

The irreversible damage occurs when the electric field intensity larger than $E_c=500$ V/cm. Then, the scaling law for lesion size in potato during bipolar electroporation dictates $$\begin{cases} D/L = g_1\left(\frac{S}{L}, \frac{E_c L}{V_0}\right) \\ A/L^2 = g_2\left(\frac{S}{L}, \frac{E_c L}{V_0}\right) \\ V/L^3 = g_3\left(\frac{S}{L}, \frac{E_c L}{V_0}\right) \end{cases} \quad (13)$$

The FEA validation of the scaling law is shown in FIG. 68, suggesting good consistency.

Example 6

Theoretical Analysis of the Temperature Differences Between the Electrode and Temperature Sensor In the present five-layer model (FIG. 71, panel a), the electrode and sensor layer were ignored due to their much smaller thickness in comparison to others. The steady-state heat transfer along the thickness was studied. The natural convection in the exterior boundary was considered. Firstly, full bonding between adjacent layers, namely, no thermal contact resistance between adjacent layers, was considered. The heat flux thorough each layer gives $$Q = -\frac{k_i}{t_i}(T_i - T_{i-1}) + \frac{4t_i}{S} \cdot h\left(T_a - \frac{T_i + T_{i-1}}{2}\right) \quad (14)$$

where $k_i$, $t_i$, $T_i$, $T_a$, h, and S is the thermal conductivity, thickness of layer i, the temperature at the interface of between layer i and layer i+1, the ambient temperature, the natural convective heat transfer coefficient, and the size of each layer, respectively. The boundary condition on the top surface of layer 5 gives $$Q = -h(T_a - T_5) \quad (15)$$

where $T_5$ is the top surface temperature of the layer 5 as shown in FIG. 71, panel a. Combination of equations (14)-(15), the temperature difference between the electrode and temperature sensor can be written as the function the thickness of layer 2, namely, $T_0 - T_3 = f(t_2)$. The FEA validation of the theoretical analysis is shown in FIG. 71, panels c-d, suggesting a good consistency.

The interlayer polymer (layer 2) may have a rough surface due to the preparation process, which could cause incomplete contact between layer 1 and layer 2, and between layer 2 and layer 3. In this condition, the thermal contact resistance between layer 1 and 2, layer 2 and 3 was considered, which would introduce two interfacial temperatures, namely, $T_{12}$ and $T_{23}$. Then, the heat flux thorough each layer gives $$\begin{cases} Q = -\frac{k_i}{t_i}(T_i - T_{i-1}) + \frac{4t_i}{S} \cdot h\left(T_a - \frac{T_i + T_{i-1}}{2}\right) \\ \text{for layer } i, i = 1, 4, 5 \\ Q = -\frac{1}{R}(T_{12} - T_1) = -\frac{1}{R}(T_{23} - T_2) \\ \text{at interface between layer 1 and 2, layer 2 and 3} \\ Q = -\frac{k_2}{t_2}(T_2 - T_{12}) + \frac{4t_2}{S} \cdot h\left(T_a - \frac{T_2 + T_{12}}{2}\right) \\ \text{for layer 2} \\ Q = -\frac{k_3}{t_3}(T_3 - T_{23}) + \frac{4t_3}{S} \cdot h\left(T_a - \frac{T_3 + T_{23}}{2}\right) \\ \text{for layer 3} \end{cases} \quad (16)$$

where R is the thermal contact resistance at the interface between layer 1 and 2, and between layer 2 and 3. Combination of equations (15)-(16), the temperature difference between the electrode and sensor can be written as the function the thermal contact resistance, namely, $T_0-T_3=f(R)$. The FEA validation of the theoretical analysis is shown in FIG. 71, panel e, suggesting good consistency.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

Some references, which may include patents, patent applications and various publications, are cited and discussed in the description of this invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference was individually incorporated by reference.

LIST OF REFERENCES

[1]. Biere, S. S. et al. Minimally invasive versus open oesophagectomy for patients with oesophageal cancer: a multicentre, open-label, randomised controlled trial. *The Lancet* 379, 1887-1892 (2012).

[2]. Bacha, E. & Kalfa, D. Minimally invasive paediatric cardiac surgery. *Nature Reviews Cardiology* 11, 24 (2014).

[3]. Martens, T. P. et al. Percutaneous cell delivery into the heart using hydrogels polymerizing in situ. *Cell Transplantation* 18, 297-304 (2009).

[4]. Oxley, T. J. et al. Minimally invasive endovascular stent-electrode array for high-fidelity, chronic recordings of cortical neural activity. *Nature Biotechnology* 34, 320-327 (2016).

[5]. Kim, D. H. et al. Dissolvable films of silk fibroin for ultrathin conformal bio-integrated electronics. *Nature Materials* 9, 511-517 (2010).

[6]. Dukkipati, S. R. et al. Visual balloon-guided point-by-point ablation: reliable, reproducible, and persistent pulmonary vein isolation. *Circulation: Arrhythmia Electrophysiology* 3, 266-273 (2010).

[7]. Wazni, O., Wilkoff, B. & Saliba, W. Catheter ablation for atrial fibrillation. *New England Journal of Medicine* 365, 2296-2304 (2011).

[8]. Kim, D. H. et al. Materials for multifunctional balloon catheters with capabilities in cardiac electrophysiological mapping and ablation therapy. *Nature Materials* 10, 316-323 (2011).

[9]. Roche, E. T. et al. A light-reflecting balloon catheter for atraumatic tissue defect repair. *Science Translational Medicine* 7, 306ra149-306ra149 (2015).

[10]. Lee, S. P. et al. Catheter-based systems with integrated stretchable sensors and conductors in cardiac electrophysiology. *Proceedings of the IEEE* 103, 682-689 (2015).

[11]. Kim, Y., Parada, G. A., Liu, S. & Zhao, X. Ferromagnetic soft continuum robots. *Science Robotics* 4, eaax7329 (2019).

[12]. Ashammakhi, N. et al. Minimally invasive and regenerative therapeutics. *Advanced Materials* 31, 1804041 (2019).

[13]. Fang, H. et al. Capacitively coupled arrays of multiplexed flexible silicon transistors for long-term cardiac electrophysiology. *Nature Biomedical Engineering* 1, 1-12 (2017).

[14]. Hua, Q. et al. Skin-inspired highly stretchable and conformable matrix networks for multifunctional sensing. *Nature Communications* 9, 1-11 (2018).

[15]. Chung, H. U. et al. Binodal, wireless epidermal electronic systems with in-sensor analytics for neonatal intensive care. *Science* 363, eaau0780 (2019).

[16]. Sharma, T., Aroom, K., Naik, S., Gill, B. & Zhang, J. X. Flexible thin-film PVDF-TrFE based pressure sensor for smart catheter applications. *Annals of biomedical engineering* 41, 744-751 (2013).

[17]. Klinker, L. et al. Balloon catheters with integrated stretchable electronics for electrical stimulation, ablation and blood flow monitoring. *Extreme Mechanics Letters* 3, 45-54 (2015).

[18]. Lee, K. et al. Microneedle drug eluting balloon for enhanced drug delivery to vascular tissue. *Journal of Controlled Release* (2020).

[19]. Liu, Z. et al. Transcatheter self-powered ultrasensitive endocardial pressure sensor. *Advanced Functional Materials* 29, 1807560 (2019).

[20]. Bergmann, O. et al. Dynamics of cell generation and turnover in the human heart. *Cell* 161, 1566-1575 (2015).

[21]. Xu, S. et al. Assembly of micro/nanomaterials into complex, three-dimensional architectures by compressive buckling. *Science* 347, 154-159 (2015).

[22]. Wu, J. F. Scanning approaches of 2-D resistive sensor arrays: A review. *IEEE Sensors Journal* 17, 914-925 (2016).

[23]. Gustafsson, S. E. Transient plane source techniques for thermal conductivity and thermal diffusivity measurements of solid materials. *Review of Scientific Instruments* 62, 797-804 (1991).

[24]. Webb, R. C. et al. Ultrathin conformal devices for precise and continuous thermal characterization of human skin. *Nature Materials* 12, 938-944 (2013).
[25]. Krishnan, S. R. et al. Epidermal electronics for non-invasive, wireless, quantitative assessment of ventricular shunt function in patients with hydrocephalus. *Science Translational Medicine* 10 (2018).
[26]. Yokoyama, K. et al. Novel contact force sensor incorporated in irrigated radiofrequency ablation catheter predicts lesion size and incidence of steam pop and thrombus. *Circulation: Arrhythmia and Electrophysiology* 1, 354-362 (2008).
[27]. Ariyarathna, N., Kumar, S., Thomas, S. P., Stevenson, W. G. & Michaud, G. F. Role of contact force sensing in catheter ablation of cardiac arrhythmias: evolution or history repeating itself? *JACC: Clinical Electrophysiology* 4, 707-723 (2018).
[28]. Yousef, H., Boukallel, M. & Althoefer, K. Tactile sensing for dexterous in-hand manipulation in robotics—A review. *Sensors and Actuators A: physical* 167, 171-187 (2011).
[29]. Costa, P., Ribeiro, S. & Lanceros-Mendez, S. Mechanical vs. electrical hysteresis of carbon nanotube/styrene-butadiene—styrene composites and their influence in the electromechanical response. *Composites Science and Technology* 109, 1-5 (2015).
[30]. Jang, K. I. et al. Self-assembled three dimensional network designs for soft electronics. *Nature Communications* 8, 1-10 (2017).
[31]. Dewire, J. & Calkins, H. State-of-the-art and emerging technologies for atrial fibrillation ablation. *Nature Reviews Cardiology* 7, 129 (2010).
[32]. Maor, E. et al. Pulsed electric fields for cardiac ablation and beyond: A state-of-the-art review. *Heart Rhythm* 16, 1112-1120 (2019).
[33]. Hjouj, M. & Rubinsky, B. Magnetic resonance imaging characteristics of nonthermal irreversible electroporation in vegetable tissue. *The Journal of membrane biology* 236, 137-146 (2010). [34]. Ramer, O. Integrated optic electrooptic modulator electrode analysis. *IEEE Journal of Quantum Electronics* 18, 386-392 (1982).
[35]. Maor, E. et al. Pulsed electric fields for cardiac ablation and beyond: A state-of-the-art review. *Heart rhythm* (2019).
[36]. Nath, S., DiMARCO, J. P. & Haines, D. E. Basic aspects of radiofrequency catheter ablation. *Journal of cardiovascular electrophysiology* 5, 863-876 (1994).
[37]. McClintock, R. Strain gauge calibration device for extreme temperatures. *Review of Scientific Instruments* 30, 715-718 (1959).
[38]. Hur, S. G., Kim, D. J., Kang, B. D. & Yoon, S. G. Effect of the deposition temperature on temperature coefficient of resistance in CuNi thin film resistors. *Journal of Vacuum Science Technology B: Microelectronics Nanometer Structures Processing, Measurement, Phenomena* 22, 2698-2701 (2004).
[39]. Pikul, J. et al. Stretchable surfaces with programmable 3D texture morphing for synthetic camouflaging skins. *Science* 358, 210-214 (2017).
[40]. Gloschat, C. et al. RHYTHM: an open source imaging toolkit for cardiac panoramic optical mapping. *Scientific Reports* 8, 1-12 (2018).
[41]. Aras, K. K., Faye, N. R., Cathey, B. & Efimov, I. R. Critical volume of human myocardium necessary to maintain ventricular fibrillation. *Circulation: Arrhythmia Electrophysiology* 11, e006692 (2018).
[42]. Rodenhauser, A. et al. PFEIFER: Preprocessing Framework for Electrograms Intermittently Fiducialized from Experimental Recordings. *Journal of Open Source Software* 3 (2018).
[43]. Magtibay, Karl, et al. "Physiological assessment of ventricular myocardial voltage using omnipolar electrograms." *Journal of the American Heart Association* 6.8 (2017): e006447.
[44]. https://www.bostonscientific.com/content/dam/bostonscientific/ep/general/Blazer%20Family%20of%20Ablation%20Catheters.pdf.
[45]. Wittkampf, Fred H M, et al. "Myocardial lesion depth with circular electroporation ablation." *Circulation: Arrhythmia and Electrophysiology* 5.3 (2012): 581-586.

What is claimed is:

1. An electronic system for multimodal diagnostic measurements and therapeutic interventions, comprising:
a plurality of element network layers vertically stacked one with another on a flexible substrate, each element network layer being bi-axially stretchable and comprising a plurality of elements configured in an addressable, interconnected array formed in a multilayered structure and operably performing a distinct function,
wherein the plurality of element network layers comprises:
an electrode array configured to perform electrophysiological recording and/or therapeutic interventions in a target of interest;
a temperature sensor array for precision thermography; and
a pressure sensor array for measuring forces or pressures associated with soft tissue contact in the target of interest;
wherein the pressure sensor array is disposed on the flexible substrate, the temperature sensor array is disposed on the pressure sensor array, and the electrode array is disposed on the temperature sensor array; and
wherein the pressure sensor array comprises a plurality of pressure sensors, each pressure sensor being formed of a metal strain gauge, wherein the metal strain gauge of each pressure sensor is in a form of a three-dimension (3D) tent-like mesostructure with high sensitivity to normal force and low effective modulus, wherein each 3D tent-like mesostructure is covered with a silicon cavity, and said cavity has lateral dimensions with a plurality of pillars at the corners, each pillar having a length and a height.

2. The electronic system of claim 1, wherein the flexible substrate is a balloon catheter or an elastic object that is operably in a deflated state or an inflated state.

3. The electronic system of claim 1, wherein the therapeutic interventions comprise electrical stimulation, radio frequency (RF) ablation, and/or irreversible electroporation (IRE) ablation.

4. The electronic system of claim 2, wherein the electrode array comprises a plurality of electrodes connected to stretchable interconnects and disposed between first and second polymer layers such that the plurality of electrodes is exposed.

5. The electronic system of claim 4, wherein the plurality of electrodes is individually and selectively controllable and/or programmable.

6. The electronic system of claim 4, wherein the exposed electrodes are in contact with the target of interest when the flexible substrate is operably in the inflated state.

7. The electronic system of claim 4, wherein each of the first and second polymer layers is formed of polyimides, polyurethane, polyethylene, and/or silicone.

8. The electronic system of claim 7, wherein each of the first and second polymer layers has a thickness of about 0.8-4 μm.

9. The electronic system of claim 4, wherein each electrode has a lateral dimension of about 400 μm×400 μm to 1 mm×1 mm, and a thickness of about 200 nm to 750 nm.

10. The electronic system of claim 4, wherein the plurality of electrodes and the stretchable interconnects are formed of a metal, or an alloy.

11. The electronic system of claim 4, wherein the stretchable interconnects are configured to accommodate bi-axial stretching greater than about 30% without inducing fractures in the electrode array.

12. The electronic system of claim 11, wherein each of the stretchable interconnects has a width of about 10-80 μm and is separated from one another by a width of about 10-100 μm of polyimides, polyurethane, polyethylene, and/or silicone.

13. The electronic system of claim 1, wherein the temperature sensor array comprises a plurality of temperature sensors, each temperature sensor being formed of metal traces, and electrically coupled to two temperature sensor connection lines that allow column and row selection multiplexing using signals delivered through the temperature sensor connection lines.

14. The electronic system of claim 13, wherein the metal traces are formed of a metal, or an alloy.

15. The electronic system of claim 14, wherein the metal traces are formed of gold, or a copper-nickel alloy.

16. The electronic system of claim 13, wherein each metal trace has a thickness of about 80-120 nm and a width of about 3-5 μm.

17. The electronic system of claim 13, wherein the temperature sensor connection lines for row selection reside in a first layer with the plurality of temperature sensors, while those for column selection lie a second layer above the first layer, separated by an insulating layer and connected to one side of the temperature sensors through a via hole.

18. The electronic system of claim 17, wherein the insulating layer is formed of polyimides, polyurethane, polyethylene, and/or silicone.

19. The electronic system of claim 17, wherein the insulating layer has a thickness in a range of about 1-10 μm.

20. The electronic system of claim 13, wherein averaged outputs from the plurality of temperature sensors yield a precision of one standard deviation ranging from about 10 mK to about 200 mK.

21. The electronic system of claim 13, wherein the temperature sensor array further comprises a layer of thermal actuators separated from the plurality of temperature sensors for spatial mapping of tissue thermal conductivity.

22. The electronic system of claim 21, wherein transient plane source analysis of the time-domain temperature profiles from the plurality of temperature sensors yields tissue thermal conductivities at different locations.

23. The electronic system of claim 22, wherein data acquired from the temperature sensor array are processed for assessment of parameters including flow of blood and other biofluids and tissue hydration levels.

24. The electronic system of claim 1, wherein each pressure sensor is electrically coupled to two pressure sensor connection lines that allow column and row selection multiplexing using signals delivered through the pressure sensor connection lines.

25. The electronic system of claim 24, wherein column and row selection occurs through serpentine interconnects across two different layers.

26. The electronic system of claim 24, wherein two terminals of each strain gauge are arranged in a cross-shaped geometry having a ribbon width and a ribbon length for facilitating wiring for the column and row selections.

27. The electronic system of claim 26, wherein each strain gauge and its two terminals are formed of a metal or an alloy.

28. The electronic system of claim 26, wherein each strain gauge has a thickness in a range of about 80-120 μm and a width in a range of about 1-3 μm, and wherein the ribbon width is in a range of about 100-150 μm, and the ribbon length is in a range of about 700-1100 μm.

29. The electronic system of claim 25, wherein the serpentine interconnects are in a form of 3D helices with exceptional stretchability.

30. The electronic system of claim 1, wherein the lateral dimensions of said cavity are in a range of about 0.5 mm by 0.5 mm to 1 mm by 1 mm, the length and the height of the pillars are in ranges of about 100-250 μm and about 150-200 μm, respectively.

31. The electronic system of claim 1, wherein sensitivity of each pressure sensor is tunable by adjusting side lengths of the pillars of said cavity, shapes of the 3D tent-like mesostructures, thicknesses of the polymer layers, and/or thickness and modulus of the flexible substrate.

32. The electronic system of claim 29, wherein the pressure sensor array further comprises rigid islands selectively bonded to the bottom surface of the pressure sensor array to constrain deformations of the 3D tent-like mesostructures under stretching, while maintaining stretchability of the pressure sensor array.

33. The electronic system of claim 24, wherein the pressure sensor array is insensitive to other types of mechanical deformations including bending and twisting.

34. The electronic system of claim 1, wherein the temperature sensor array is bonded to a bottom surface of the electrode array with a thin layer of polyimide (PI) to offer small thickness, strong adhesion and excellent thermal and physical contact for precise temperature measurements during ablation or other procedures.

35. The electronic system of claim 34, wherein the thin layer of PI has a thickness in a range of about 1-2 μm.

36. The electronic system of claim 34, wherein the pressure sensor array is located at the bottom of the plurality of element network layers for measurements of the local transverse forces at the interface between the electrodes and the contacting soft tissues.

37. The electronic system of claim 36, wherein the electrode array, the temperature sensor array and the pressure sensor array are vertically stacked to define a multilayer mesh having an array of sensing elements, each element comprising an electrode, a temperature sensor and a pressure sensor, and being connected to one another through the stretchable interconnects and connection lines that are untethered to the flexible substrate so as to enable out-of-plane deformations for enhanced stretchability.

38. The electronic system of claim 37, wherein the array of sensing elements is individually and selectively controllable and/or programmable.

39. The electronic system of claim 4, wherein in operation, the flexible substrate is in the inflated state, the exposed electrodes of the electrode array are in contact with target biological tissues to perform electrophysiological recording and/or therapeutic interventions, the temperature sensor array tracks changes in temperature associated with the therapeutic interventions; and the pressure sensor array measures local transverse forces at the interface between the electrodes and the biological tissues.

40. The electronic system of claim 39, wherein the measured temperature and pressure provide feedbacks for the therapeutic interventions in the target surface of interest.

41. The electronic system of claim 4, further comprising a multiplexed data acquisition (DAQ) system electrically coupled to the electrode array, wherein the DAQ comprises an application-specific integrated circuit (ASIC) configured to amplify, digitize and multiplex signals output from or input to the plurality of electrodes, thereby reducing a total number of wires connecting to an external instrument.

42. The electronic system of claim 1, further comprising a multiplexing circuit coupled to the temperature sensor array and/or the pressure sensor array for multiplexing of input and output signals of the plurality of temperature sensors and/or the plurality of pressure sensors and eliminating crosstalk with grounding.

43. The electronic system of claim 1, wherein the electronic system is conformally integrated with the flexible substrate.

\* \* \* \* \*